US011137898B2

(12) United States Patent
Chaudhri et al.

(10) Patent No.: US 11,137,898 B2
(45) Date of Patent: Oct. 5, 2021

(54) DEVICE, METHOD, AND GRAPHICAL USER INTERFACE FOR DISPLAYING A PLURALITY OF SETTINGS CONTROLS

(71) Applicant: Apple Inc., Cupertino, CA (US)

(72) Inventors: Imran Chaudhri, San Francisco, CA (US); Lawrence Yang, Bellevue, WA (US); Alessandro Sabatelli, San Francisco, CA (US); Brian Schmitt, Venice, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/412,114

(22) Filed: May 14, 2019

(65) Prior Publication Data

US 2019/0265885 A1 Aug. 29, 2019

Related U.S. Application Data

(63) Continuation of application No. 15/332,919, filed on Oct. 24, 2016, now Pat. No. 10,310,732, which is a
(Continued)

(51) Int. Cl.
*G06F 3/0488* (2013.01)
*G06F 3/0484* (2013.01)
(Continued)

(52) U.S. Cl.
CPC ........ *G06F 3/04883* (2013.01); *G06F 3/0482* (2013.01); *G06F 3/04817* (2013.01);
(Continued)

(58) Field of Classification Search
CPC ...... G06F 3/041; G06F 3/0412; G06F 3/0416; G06F 3/044; G06F 3/048–04886;
(Continued)

(56) References Cited

U.S. PATENT DOCUMENTS 4,386,410 A 5/1983 Pandya et al.
5,140,678 A 8/1992 Torres
(Continued)

FOREIGN PATENT DOCUMENTS

CN 15123301 A 7/2004
CN 1658150 A 8/2005
(Continued)

OTHER PUBLICATIONS

Screen captures from YouTube video clip entitled "I9300XXDLG4—Galaxy S III Android 4.1.1 Jelly Bean", 7 pages, uploaded on Aug. 16, 2012 by user "SamsungFirmwares". Retrieved from Internet <https://www.youtube.com/watch?v=qkR1CBSky2o>. (Year: 2012).*
(Continued)

*Primary Examiner* — Nathan Danielsen
(74) *Attorney, Agent, or Firm* — Morgan, Lewis & Bockius LLP

(57) ABSTRACT

A device, method, and graphical user interface for displaying a plurality of settings controls are disclosed. An example method includes: at a multifunction device with a touch-sensitive display: while displaying a home screen user interface, detecting a gesture on the touch-sensitive display; and in response to detecting the gesture on the touch-sensitive display: in accordance with a determination that the gesture is a first swipe gesture in a first direction, displaying a plurality of application images that corresponds to at least some of a plurality of recently used applications; and in accordance with a determination that the gesture is a second swipe gesture in a second direction distinct from the first direction, displaying a settings user interface that includes one or more media player controls for adjusting media playback at the multifunction device.

66 Claims, 85 Drawing Sheets

Related U.S. Application Data continuation of application No. 14/183,353, filed on Feb. 18, 2014, now Pat. No. 9,477,404.

(60) Provisional application No. 61/832,892, filed on Jun. 9, 2013, provisional application No. 61/801,943, filed on Mar. 15, 2013.

(51) Int. Cl.

| | | |
|---|---|---|
| *G06F 3/0482* | (2013.01) | |
| *G06F 3/16* | (2006.01) | |
| *G06F 3/147* | (2006.01) | |
| *G06F 3/0481* | (2013.01) | |
| *G09G 5/14* | (2006.01) | |

(52) U.S. Cl.
CPC .......... *G06F 3/04847* (2013.01); *G06F 3/147* (2013.01); *G06F 3/165* (2013.01); *G09G 5/14* (2013.01); *G06F 2203/04804* (2013.01); *G09G 2354/00* (2013.01); *G09G 2370/10* (2013.01)

(58) Field of Classification Search
CPC ............... G06F 3/147; G06F 3/165; G06F 2203/04802–04804; G06F 2203/04808; G09G 5/14; G09G 2354/00; G09G 2370/10
See application file for complete search history.

(56) References Cited

U.S. PATENT DOCUMENTS

| | | | |
|---|---|---|---|
| 5,430,839 | A | 7/1995 | Jagannathan et al. |
| 5,434,964 | A | 7/1995 | Moss et al. |
| 5,553,225 | A | 9/1996 | Perry |
| 5,590,265 | A | 12/1996 | Nakazawa |
| 5,644,737 | A | 7/1997 | Tuniman et al. |
| 5,712,995 | A | 1/1998 | Cohn |
| 5,784,045 | A | 7/1998 | Cline et al. |
| 5,880,733 | A | 3/1999 | Horvitz et al. |
| 5,923,326 | A | 7/1999 | Bittinger et al. |
| 5,933,141 | A | 8/1999 | Smith |
| 6,072,488 | A | 6/2000 | McFarland |
| 6,115,043 | A | 9/2000 | Levine et al. |
| 6,229,542 | B1 | 5/2001 | Miller |
| 6,459,442 | B1 | 10/2002 | Edwards et al. |
| 6,489,975 | B1 | 12/2002 | Patil et al. |
| 6,831,666 | B1 | 12/2004 | Kreis |
| 7,036,088 | B2 | 4/2006 | Tunny |
| 7,134,093 | B2 | 11/2006 | Etgen et al. |
| 7,159,189 | B2 | 1/2007 | Weingart et al. |
| 7,346,855 | B2 | 3/2008 | Hellyar et al. |
| 7,380,218 | B2 | 5/2008 | Rundell |
| 7,490,295 | B2 | 2/2009 | Chaudhri et al. |
| 7,581,186 | B2 | 8/2009 | Dowdy et al. |
| 7,673,255 | B2 | 3/2010 | Schechter et al. |
| 7,680,513 | B2 | 3/2010 | Haitani et al. |
| 7,694,231 | B2 | 4/2010 | Kocienda et al. |
| 7,694,236 | B2 | 4/2010 | Gusmorino et al. |
| 7,739,604 | B1 | 6/2010 | Lyons et al. |
| 7,757,185 | B2 | 7/2010 | Paquette et al. |
| 7,788,595 | B2 | 8/2010 | Biwer et al. |
| 7,844,914 | B2 | 11/2010 | Andre et al. |
| 7,870,496 | B1 | 1/2011 | Sherwani |
| 7,880,728 | B2 | 2/2011 | de los Reyes et al. |
| 7,921,373 | B2 | 4/2011 | Yamashita et al. |
| 7,957,762 | B2 | 6/2011 | Herz et al. |
| 8,010,900 | B2 | 8/2011 | Hart et al. |
| 8,020,028 | B1 | 9/2011 | Lutter |
| 8,024,670 | B1 | 9/2011 | Rahmatian et al. |
| 8,046,712 | B2 | 10/2011 | Landman et al. |
| 8,214,768 | B2 | 7/2012 | Boule et al. |
| 8,239,784 | B2 | 8/2012 | Hotelling et al. |
| 8,438,504 | B2 | 5/2013 | Cranfill et al. |
| 8,473,871 | B1 | 6/2013 | Sandler et al. |
| 8,479,122 | B2 | 7/2013 | Hotelling et al. |
| 8,490,019 | B2 | 7/2013 | Jarrett et al. |
| 8,806,369 | B2 | 8/2014 | Khoe et al. |
| 9,058,186 | B2 | 6/2015 | Chaudhri |
| 9,105,121 | B2 | 8/2015 | Ubillos et al. |
| 9,417,779 | B2 | 8/2016 | Flake et al. |
| 9,477,404 | B2 | 10/2016 | Chaudhri et al. |
| 2001/0035882 | A1 | 11/2001 | Stoakley et al. |
| 2003/0117440 | A1 | 6/2003 | Hellyar et al. |
| 2003/0142137 | A1 | 7/2003 | Brown et al. |
| 2004/0019852 | A1 | 1/2004 | Purvis |
| 2004/0025112 | A1 | 2/2004 | Chasen et al. |
| 2004/0148571 | A1 | 7/2004 | Lue |
| 2004/0155908 | A1 | 8/2004 | Wagner |
| 2004/0165010 | A1 | 8/2004 | Robertson et al. |
| 2005/0022138 | A1 | 1/2005 | Tunney |
| 2005/0088452 | A1 | 4/2005 | Hanggie et al. |
| 2005/0091608 | A1 | 4/2005 | Gusmorino et al. |
| 2005/0149879 | A1 | 7/2005 | Jobs |
| 2005/0177798 | A1 | 8/2005 | Thomson et al. |
| 2006/0041846 | A1 | 2/2006 | Masselle et al. |
| 2006/0055662 | A1 | 3/2006 | Rimas-Ribikauskas et al. |
| 2006/0107226 | A1 | 5/2006 | Matthews et al. |
| 2006/0129933 | A1 | 6/2006 | Land et al. |
| 2006/0160528 | A1 | 7/2006 | Wang et al. |
| 2006/0161847 | A1 | 7/2006 | Holecek et al. |
| 2006/0161861 | A1 | 7/2006 | Holecek et al. |
| 2006/0161868 | A1 | 7/2006 | Van Dok et al. |
| 2006/0197753 | A1 | 9/2006 | Hotelling |
| 2006/0218503 | A1 | 9/2006 | Matthews et al. |
| 2006/0224952 | A1 | 10/2006 | Lin |
| 2006/0224986 | A1 | 10/2006 | Lindsay et al. |
| 2006/0242602 | A1 | 10/2006 | Schechter et al. |
| 2006/0253874 | A1 | 11/2006 | Stark et al. |
| 2006/0265653 | A1 | 11/2006 | Paasonen et al. |
| 2007/0028183 | A1 | 2/2007 | Ostojic et al. |
| 2007/0070066 | A1 | 3/2007 | Bakhash |
| 2007/0101279 | A1 | 3/2007 | Chaudhri et al. |
| 2007/0101297 | A1 | 5/2007 | Forstall et al. |
| 2007/0124692 | A1 | 5/2007 | Lindsay et al. |
| 2007/0128899 | A1 | 6/2007 | Mayer |
| 2007/0130541 | A1 | 6/2007 | Louch et al. |
| 2007/0152980 | A1 | 7/2007 | Kocienda et al. |
| 2007/0157089 | A1 | 7/2007 | Van Os et al. |
| 2007/0226327 | A1 | 7/2007 | Redpath |
| 2007/0220445 | A1 | 9/2007 | Yach et al. |
| 2007/0262964 | A1 | 11/2007 | Zotov et al. |
| 2007/0294634 | A1 | 12/2007 | Kokemohr |
| 2007/0294639 | A1 | 12/2007 | Van Berkel et al. |
| 2008/0034316 | A1 | 2/2008 | Thoresson |
| 2008/0036743 | A1 | 2/2008 | Westerman et al. |
| 2008/0064447 | A1 | 3/2008 | Lee et al. |
| 2008/0094368 | A1 | 4/2008 | Ording et al. |
| 2008/0109753 | A1 | 5/2008 | Karstens |
| 2008/0165144 | A1 | 7/2008 | Forstall et al. |
| 2008/0165152 | A1 | 7/2008 | Forstall et al. |
| 2008/0168379 | A1 | 7/2008 | Forstall et al. |
| 2008/0168401 | A1 | 7/2008 | Boule et al. |
| 2008/0211959 | A1 | 9/2008 | Balram et al. |
| 2008/0222545 | A1 | 9/2008 | Lemay et al. |
| 2008/0270910 | A1 | 10/2008 | Lukasik et al. |
| 2008/0284743 | A1 | 11/2008 | Hsu et al. |
| 2008/0307335 | A1 | 12/2008 | Chaudhri et al. |
| 2008/0307345 | A1 | 12/2008 | Hart et al. |
| 2008/0307351 | A1 | 12/2008 | Louch et al. |
| 2008/0307360 | A1 | 12/2008 | Chaudhri et al. |
| 2008/0316183 | A1 | 12/2008 | Westerman et al. |
| 2008/0320391 | A1 | 12/2008 | Westerman et al. |
| 2009/0007017 | A1 | 1/2009 | Anzures et al. |
| 2009/0036108 | A1 | 2/2009 | Cho |
| 2009/0064021 | A1 | 3/2009 | Boettcher et al. |
| 2009/0064055 | A1 | 3/2009 | Chaudhri et al. |
| 2009/0094562 | A1 | 4/2009 | Jeong et al. |
| 2009/0109175 | A1 | 4/2009 | Fein et al. |
| 2009/0178008 | A1 | 7/2009 | Herz et al. |
| 2009/0178010 | A1 | 7/2009 | Chaudhri |
| 2009/0197635 | A1 | 8/2009 | Kim et al. |
| 2009/0244379 | A1 | 10/2009 | Tsai |
| 2009/0249210 | A1 | 10/2009 | Sheldon et al. |

(56) References Cited

U.S. PATENT DOCUMENTS

| | | |
|---|---|---|
| 2009/0249247 A1 | 10/2009 | Tseng et al. |
| 2009/0259942 A1 | 10/2009 | Bitonti et al. |
| 2009/0293007 A1 | 11/2009 | Duarte et al. |
| 2009/0293062 A1 | 11/2009 | Amir et al. |
| 2010/0007613 A1 | 1/2010 | Costa |
| 2010/0058182 A1 | 3/2010 | Jung |
| 2010/0064262 A1 | 3/2010 | Liao |
| 2010/0070931 A1 | 3/2010 | Nichols |
| 2010/0077338 A1 | 3/2010 | Matthews et al. |
| 2010/0085304 A1 | 4/2010 | Patterson et al. |
| 2010/0088628 A1 | 4/2010 | Flygh et al. |
| 2010/0093325 A1 | 4/2010 | Jang |
| 2010/0095240 A1 | 4/2010 | Shiplacoff et al. |
| 2010/0100841 A1 | 4/2010 | Shin et al. |
| 2010/0125816 A1 | 5/2010 | Bezos |
| 2010/0146387 A1 | 6/2010 | Hoover |
| 2010/0156812 A1 | 6/2010 | Stallings et al. |
| 2010/0185989 A1 | 7/2010 | Shiplacoff et al. |
| 2010/0211872 A1 | 8/2010 | Rolston et al. |
| 2010/0251168 A1 | 9/2010 | Fujita et al. |
| 2010/0262928 A1 | 10/2010 | Abbott |
| 2010/0269039 A1 | 10/2010 | Pahlavan et al. |
| 2010/0299639 A1 | 11/2010 | Ramsay et al. |
| 2010/0302172 A1 | 12/2010 | Wilairat |
| 2011/0061010 A1 | 3/2011 | Wasko |
| 2011/0087982 A1 | 4/2011 | McCann et al. |
| 2011/0096174 A1 | 4/2011 | King et al. |
| 2011/0115721 A1 | 5/2011 | Li et al. |
| 2011/0131520 A1 | 6/2011 | Al-Shaykh et al. |
| 2011/0131531 A1 | 6/2011 | Russell et al. |
| 2011/0145068 A1 | 6/2011 | King et al. |
| 2011/0145764 A1 | 6/2011 | Higuchi et al. |
| 2011/0157029 A1 | 6/2011 | Tseng |
| 2011/0161878 A1* | 6/2011 | Stallings ............... G06F 3/0485 715/811 |
| 2011/0163966 A1 | 7/2011 | Chaudhri |
| 2011/0216083 A1 | 9/2011 | McRae |
| 2011/0219329 A1 | 9/2011 | Breglio |
| 2011/0227857 A1 | 9/2011 | Chaudhri |
| 2011/0231790 A1 | 9/2011 | Forstall et al. |
| 2011/0252357 A1 | 10/2011 | Chaudhri |
| 2011/0252370 A1 | 10/2011 | Chaudhri |
| 2011/0252375 A1 | 10/2011 | Chaudhri |
| 2011/0252376 A1 | 10/2011 | Chaudhri |
| 2011/0252380 A1 | 10/2011 | Chaudhri |
| 2011/0252381 A1 | 10/2011 | Chaudhri |
| 2011/0258582 A1 | 10/2011 | Bang |
| 2011/0296327 A1 | 12/2011 | Kang et al. |
| 2011/0296333 A1 | 12/2011 | Bateman et al. |
| 2011/0296351 A1 | 12/2011 | Ewing, Jr. et al. |
| 2011/0307778 A1 | 12/2011 | Tsai et al. |
| 2012/0036435 A1 | 2/2012 | Yang et al. |
| 2012/0084692 A1 | 4/2012 | Bae |
| 2012/0098766 A1 | 4/2012 | Dippel et al. |
| 2012/0110452 A1 | 5/2012 | Hiipakka et al. |
| 2012/0159380 A1 | 6/2012 | Kocienda et al. |
| 2012/0162093 A1 | 6/2012 | Buxton et al. |
| 2012/0194428 A1 | 8/2012 | Kwon et al. |
| 2012/0206497 A1 | 8/2012 | Sarjanoja |
| 2012/0210268 A1 | 8/2012 | Hillbrink et al. |
| 2012/0216139 A1 | 8/2012 | Ording et al. |
| 2012/0216143 A1 | 8/2012 | Shiplacoff et al. |
| 2012/0218304 A1 | 8/2012 | Anzures et al. |
| 2012/0287039 A1 | 11/2012 | Brown et al. |
| 2012/0304084 A1 | 11/2012 | Kim et al. |
| 2012/0327009 A1 | 12/2012 | Fleizach |
| 2013/0091439 A1 | 4/2013 | Sirpal et al. |
| 2013/0093708 A1 | 4/2013 | Annett et al. |
| 2013/0106899 A1 | 5/2013 | Bhatt |
| 2013/0125043 A1 | 5/2013 | Jeon et al. |
| 2013/0125056 A1 | 5/2013 | Suda |
| 2013/0139109 A1 | 5/2013 | Kim et al. |
| 2013/0205131 A1 | 8/2013 | Lee et al. |
| 2013/0212483 A1* | 8/2013 | Brakensiek ......... G06F 3/04883 715/740 |
| 2013/0219342 A1 | 8/2013 | Nosou et al. |
| 2013/0232445 A1 | 9/2013 | Ording et al. |
| 2013/0298014 A1 | 11/2013 | Kodimer et al. |
| 2013/0339884 A1 | 12/2013 | Wilson et al. |
| 2014/0108995 A1 | 4/2014 | Sandler et al. |
| 2014/0173517 A1 | 6/2014 | Chaudhri |
| 2014/0223313 A1 | 8/2014 | Aebi |
| 2014/0232671 A1 | 8/2014 | Chaudhri |
| 2014/0245203 A1 | 8/2014 | Lee et al. |
| 2014/0245215 A1 | 8/2014 | Rydenhag et al. |
| 2014/0267362 A1 | 9/2014 | Kocienda et al. |
| 2014/0267363 A1 | 9/2014 | Kocienda et al. |
| 2014/0282110 A1 | 9/2014 | Chaudhri |
| 2014/0282207 A1 | 9/2014 | Wouhaybi et al. |
| 2014/0282208 A1 | 9/2014 | Chaudhri |
| 2014/0340332 A1 | 11/2014 | Lemay |
| 2015/0177927 A1 | 6/2015 | Chaudhri |
| 2015/0331571 A1 | 11/2015 | Chaudhri |
| 2015/0346952 A1 | 12/2015 | Yang et al. |
| 2015/0346976 A1 | 12/2015 | Karunamuni et al. |
| 2016/0026371 A1 | 1/2016 | Lu et al. |
| 2016/0139747 A1 | 5/2016 | Kocienda et al. |
| 2016/0147427 A1 | 5/2016 | Liverance et al. |
| 2016/0283106 A1 | 9/2016 | Thorne |
| 2016/0291858 A1 | 10/2016 | Kocienda et al. |
| 2017/0038966 A1 | 2/2017 | Chaudhri et al. |
| 2018/0074673 A1 | 3/2018 | Chaudhri |
| 2019/0012054 A1 | 1/2019 | Shiplacoff et al. |
| 2019/0121503 A1 | 4/2019 | Chaudhri |
| 2021/0103371 A1 | 4/2021 | Chaudhri |

FOREIGN PATENT DOCUMENTS

| | | |
|---|---|---|
| CN | 1661556 A | 8/2005 |
| CN | 1758205 A | 4/2006 |
| CN | 1955906 A | 5/2007 |
| CN | 101102573 A | 1/2008 |
| CN | 101167122 A | 4/2008 |
| CN | 201107762 Y | 8/2008 |
| CN | 101452365 A | 6/2009 |
| CN | 101630228 A | 1/2010 |
| CN | 101727268 A | 6/2010 |
| CN | 101981987 A | 2/2011 |
| CN | 102037435 A | 4/2011 |
| CN | 102063253 A | 5/2011 |
| CN | 102099776 A | 6/2011 |
| CN | 102625931 A | 8/2012 |
| CN | 102667702 A | 9/2012 |
| CN | 103092502 A | 5/2013 |
| DE | 2112009000073 | 2/2011 |
| DE | 202009018283 | 8/2011 |
| DE | 112009001281 | 9/2011 |
| DE | 112009001276 A | 1/2012 |
| EP | 1 562 105 A2 | 8/2005 |
| EP | 1 568 966 A2 | 8/2005 |
| EP | 1 571 549 A2 | 9/2005 |
| EP | 1 640 855 A2 | 3/2006 |
| EP | 2 076 000 A2 | 7/2009 |
| EP | 2 284 646 A1 | 2/2011 |
| EP | 2 286 324 A2 | 2/2011 |
| EP | 2 286 325 A2 | 2/2011 |
| EP | 2474153 A | 4/2011 |
| EP | 2 375 316 A2 | 10/2011 |
| EP | 2 434 368 A1 | 3/2012 |
| GB | 2350991 A | 12/2000 |
| GB | 2473389 A | 3/2011 |
| GB | 2492709 A | 1/2013 |
| JP | H 10320167 A | 12/1998 |
| JP | 2000-148348 A | 5/2000 |
| JP | 2001-103584 A | 4/2001 |
| JP | 2002-41023 | 2/2002 |
| JP | 2002-268867 A | 9/2002 |
| JP | 2002-286489 A | 10/2002 |
| JP | 2003-84744 A | 3/2003 |
| JP | 2004-021522 A | 1/2004 |
| JP | 2004-152169 A | 5/2004 |
| JP | 2005-70777 A | 3/2005 |
| JP | 2005-222553 A | 8/2005 |
| JP | 2005-309933 A | 11/2005 |

(56) References Cited

FOREIGN PATENT DOCUMENTS

| | | | |
|---|---|---|---|
| JP | 2007-517462 A | 6/2007 | |
| JP | 2008-017373 A | 1/2008 | |
| JP | 2008-76818 A | 4/2008 | |
| JP | 2008-76853 A | 4/2008 | |
| JP | 2008-167133 A | 7/2008 | |
| JP | 2009-134508 | 6/2009 | |
| JP | 2009-217815 A | 9/2009 | |
| JP | 2009-303143 A | 12/2009 | |
| JP | 2011-045085 A | 3/2011 | |
| JP | 2011-516936 A | 5/2011 | |
| JP | 2011-232009 A | 11/2011 | |
| KR | 2008-0078108 A | 8/2008 | |
| KR | 2010-0010072 A | 2/2010 | |
| KR | 2010-0010302 A | 2/2010 | |
| KR | 2010-0023637 A | 3/2010 | |
| KR | 2010-0034608 A | 4/2010 | |
| KR | 2010-0126718 A | 12/2010 | |
| WO | WO 2006/073020 A1 | 7/2006 | |
| WO | WO 2009/059062 A2 | 5/2009 | |
| WO | WO 2009/097555 A2 | 8/2009 | |
| WO | WO 2009/143075 A2 | 11/2009 | |
| WO | WO 2009/143076 A2 | 11/2009 | |
| WO | WO 2009/143294 A2 | 11/2009 | |
| WO | WO 2009/148781 A1 | 12/2009 | |
| WO | WO 2010/000919 A1 | 1/2010 | |
| WO | WO 2011/025188 A2 | 3/2011 | |

OTHER PUBLICATIONS

Naver blog, "Galaxy SIII Rom for Galaxy ACE UF18 Ver.3 with Upper Bar Menu Patched in Korean Vision", https://blog.naver.com/eric_na/110158257259, Jan. 29, 2013, 2 pages.
Naver blog, "Optimum LTE2 Jelly Bean Method and Review", https://blog.naver.com/gjh3475/50157212021, Dec. 15, 2012, 8 pages.
Patterson, "The iPad Control Panel You (maybe) Didn't Know About", https://heresthethingblog.com/2012/03/22/ipads-hidden-control-panel-revealed, Mar. 22, 2012, 6 pages.
Office Action, dated Jul. 26, 2018, received in Chinese Patent Application 201510451417.4, which corresponds with U.S. Appl. No. 12/888,381, 10 pages.
Patent, dated Apr. 26, 2019, received in Chinese Patent Application 201510451417.4, which corresponds with U.S. Appl. No. 12/888,381, 4 pages.
Office Action, dated Apr. 10, 2019, received in European Patent Application 201510451941.1, which corresponds with U.S. Appl. No. 12/888,381, 4 pages.
Office Action, dated Mar. 19, 2019, received in Korean Patent Application 2017-7013080, which corresponds with U.S. Appl. No. 12/888,381, 5 pages.
Notice of Allowance, dated May 29, 2019, received in Korean Patent Application 2017-7013080, which corresponds with U.S. Appl. No. 12/888,381, 4 pages.
Office Action, dated Feb. 14, 2019, received in Australian Patent Application 2017268610, which corresponds with U.S. Appl. No. 12/888,391, 2 pages.
Office Action, dated Feb. 22, 2019, received in Japanese Patent Application 2018-079291, which corresponds with U.S. Appl. No. 12/888,391, 7 pages.
Notice of Acceptance, dated Mar. 14, 2019, received in Australian Patent Application No. 2017204010, which corresponds with U.S. Appl. No. 14/183,353, 3 pages.
Office Action, dated Apr. 24, 2019, received in Chinese Patent Application 201480023878.5, which corresponds with U.S. Appl. No. 14/183,353, 3 pages.
Office Action, dated May 14, 2019, received in Korean Patent Application 2017-7016346, which corresponds with U.S. Appl. No. 14/183,353, 7 pages.
Office Action, dated Apr. 12, 2019, received in U.S. Appl. No. 14/727,747, 19 pages.

Office Action, dated Apr. 18, 2019, received in U.S. Appl. No. 15/818,591, 12 pages.
Google, Nexus One User's Guide, https://theinformr.com/download/phones/manuals/htc-nexus-one-manual.pdf, Mar. 15, 2010, 334 pages.
HTC, HTC User Manual, https://ghostscript.com/~robin?090720_Hero_English_UM.pdf, 2009, 222 pages.
Wayback Machine, "Task Changer Titanium—Multitasking", http://web.archive.org/web/20120623032235/https://forum.xdadevelopers.com/shwthread.php?t=1264272, dated Jun. 23, 2012, 6 pages.
YouTube, "Use iOS 5 and AirPlay to Mirror the iPad 2 on Your TV", https://youtu.be/U630_12hJkQ, Aug. 4, 2011, 8 pages.
Notice of Allowance, dated Feb. 18, 2020, received in Korean Patent Application No. 2019-7020288, which corresponds with U.S. Appl. No. 12/888,381, 4 pages.
Patent, dated Mar. 18, 2020, received in Korean Patent Application No. 2019-7020288, which corresponds with U.S. Appl. No. 12/888,381, 3 pages.
Office Action, dated Apr. 6, 2020, received in Australian Patent Application No. 2019204750, which corresponds with U.S. Appl. No. 12/888,391, 5 pages.
Board Decision, dated Jan. 13, 2020, received in Chinese Patent Application No. 201480032814.1, which corresponds with U.S. Appl. No. 14/183,331, 2 pages.
Notice of Allowance, dated Mar. 5, 2020, received in Chinese Patent Application No. 201480032814.1, which corresponds with U.S. Appl. No. 14/183,331, 3 pages.
Decision to Grant, dated Jan. 30, 2020, received in European Patent Application No. 14735019.3, which corresponds with U.S. Appl. No. 14/183,331, 1 page.
Office Action, dated Mar. 3, 2020, received in Australian Patent Application No. 2019203663, which corresponds with U.S. Appl. No. 14/183,353, 5 pages.
Intention to Grant, dated Mar. 3, 2020, received in European Patent Application No. 14710473.1, which corresponds with U.S. Appl. No. 14/183,353, 7 pages.
Office Action, dated Apr. 13, 2020, received in Korean Patent Application No. 20207005350, which corresponds with U.S. Appl. No. 14/183,353, 5 pages.
Office Action, dated Mar. 5, 2020, received in U.S. Appl. No. 16/223,020, 27 pages.
Sonos, "Sonos Playbar—The Soundbar for Music Lovers", https://www.youtube.com/watch?time_continue=64&v=rfQpcMc1_Ek, Feb. 12, 2013, 3 pages.
Notice of Allowance, dated Jun. 14, 2019, received in Japanese Patent Application No. 2018-079291, which corresponds with U.S. Appl. No. 12/888,391, 5 pages.
Summons, dated Apr. 9, 2019, received in European Patent Application No. 14710473.1, which corresponds with U.S. Patent Application No. 14/183,353. 13 pages.
Notice of Allowance, dated Jun. 7, 2019, received in Japanese Patent Application No. 2017-156610, which corresponds with U.S. Appl. No. 14/183,353, 5 pages.
Notice of Allowance, dated Sep. 4, 2019, received in European Patent Application No. 201510451941.1, which corresponds with U.S. Appl. No. 12/888,381, 3 pages.
Patent, dated Aug. 2, 2019, received in Hong Kong Application No. 16104768.4, which corresponds with U.S. Appl. No. 12/888,381, 4 pages.
Certificate of Grant, dated Aug. 28, 2019, received in Australian Patent Application No. 2017268610, which corresponds with U.S. Appl. No. 12/888,391, 4 pages.
Alzona, "Full Screen Maximization with RightZoom," available at <http://www.brighthub.com/computing/macplatform/articles/31024.aspx>, Mar. 31, 2009, 2 pages.
Anonymous, "4.0 Ice Cream Sandwich—What Actually Happens When You Swipe an App out of the Recent Apps List?—Android Enthusiasts Stack Exchange", http://android.stackexchange.com/questions/19987/what-actually-happens-when-you-swipe-an-app-out-of-the-apps-list, Sep. 14, 2012, 3 pages.
Anonymous, "UltimateFaves for Android", http://web.archive.org/web/20100122231537/http://ultimatefaves.wordpress.com/2010/01/12/ultimatefaves.pro-1-2, Oct. 28, 2015, 10 pages.

(56) References Cited

OTHER PUBLICATIONS

Apple, "iPhone 3G User Manual", http://manuals.info.apple.com/en_US/iPhone_User_Guide.pdf, Jul. 11, 2008, 154 pages.
Davies, "LG Optimus G Pro hands-on: It's a big 'un", https://www.slashgear.com/lg-optimus-g-pro-hands-on-its-a-big-un-25271187, Feb. 25, 2013, 25 pages.
Davies2, "LG Optimus G Pro Hands-On" video, https://www.youtube.com/watch?v=QD8mMc4Qjtl, Feb. 24, 2013, 5 pages.
Dilger, "Inside Apple's iPad: Multitasking," Appleinsider.com, Available at <http://www.appleinsider.com/articles/10/02/18/inside_apples_ipad_multitasking.html, Feb. 18, 2010, 4 pages.
Eitelbach, "9 Awesome Android Ice Cream Sandwich Tips/Smartphone", http://blog.laptopmag.com/9-awesome-android-ice-cream-tips, May 7, 2012, 1 pages.
Etrade Supply, "What's New? The New iOS 7," https://www.etradesupply.com/blog/new-ios-7, Jun. 11, 2013, 15 pages.
Fahey, "The iPad Blows Up iPhone Apps Real Good," www.kotaku.com.au/2010/01/the-ipad-blows-up-iphone-apps-real-good/, Jan. 27, 2010, 3 ages.
Fehily, "Visual QuickStart Guide: Microsoft Windows 7," Peachpit Press, Berkeley, California, 2010, pp. 34-37, 40, 71, 76, and 267.
Google Patent, Google, Google Patent Representative Search, Aug. 30, 2017, 2 pages.
Guia Das Technologias, "Nokia N9: Interface (MeeGo 1.2 Harmattan)", youtube, https://www.youtube.com/watch?v=OKgm1pU24QI, Feb. 19, 2012, 4 pages.
Heddings, "Stupid Geek Tricks: Tile or Cascade Multiple Windows in Windows 7", http://www.howtogeek.com/howto/11073/stupid-geek-tricks-tile-or-cascade-multiple-windows-in-windows-7, Feb. 18, 2010, 3 pages.
Hintsforums, "Windows that Actually Maximize to Fit the Screen", http://hitsforums.macworld.com/archive/index.php/t-12747.html, Jun. 17, 2003, 4 pages.
Hixanthus, "[MOD+ROM] Flashable Mods [JDQ39 OTA] odex + deodexed stock", http://forums.androidcentral.com/google-nexus-7-2012-rooting-roms-hacks/259019-mod-rom-flashable-mods-jdq39-ota-odex-deodexed-stock.html, Mar. 12, 2013, 6 pages.
Holly, "5 Cool Things About LG Optimus G Pro", https://www.geek.com/android/5-cool-things-about-the-lg-optimus-g-pro-1554057/, May 3, 2013, 11 pages.
HTC, "User Manual—PDA Phone—HTC P3050 Touch", http://web.archive.org/web/20101228223033/http://www.comparecellular.com, Nov. 2, 2007, 154 pages.
Jade et al., "Apple's iPhone 4.0 to Support Multitasking via Expose-like Interface," appleinsider.com, http://www.appleinsider.com/articles/10/03/31/apples_iphone_4_0_to_support_multitasking_via_expose_like_interface.html, Mar. 31, 2010, 4 pages.
Jade et al., "Apple's iPhone 4.0 Software to Deliver Multitasking Support", Appleinsider.com, http://www.appleinsider.com/articles/10/03/11/apples_iphone_4_0_software_to_Deliver_Multitasking_Support.html, Mar. 11, 2010, 3 pages.
Juell, "Viewing Your Windows Programs Without Seeing Windows", Vmware Fusion Blog, Nov. 10, 2011, 10 pages.
Khalid, "A Complete Summary of Major New Features & Changes in iOS 7", http://www.addictivetips.com/ios/complete-summary-of-major-new-features-changes-in-ios-7, Jun. 11, 2013, 12 pages.
Kim, et al., "Menu Design in Cell Phones: Use of 3D Menus", Human Computer Interaction, Part 3, vol. 5612, Jul. 19, 2009, 10 pages.
Kishore, "Make the OS X Maximize Button Work like Windows", http://www.switchingtomac.com/making-the-switch/make-the-os-x-maximize-button-work-like-windows, May 5, 2009, 3 pages.
Lifehacker, "Sidebar, a switcher application for Android, which has one want the function also for iPhone", http://www.lifehacker.jp/2013/03/13013sidebar_android.html, Mar. 13, 2013, 5 pages.
MacRumors, "Fit to Screen Button Poll for Mac / Windows Users", http://forums.macrumors.com/showthread.php?t=615215, Dec. 11, 2008, 7 pages.
MacRumors, "Window, Fit to Screen?", http://forums.macrumors.com/showthread.php?t-439783, Feb. 22, 2008, 2 pages.
Metafilter Network Inc., "Enable Screen Resize?", http:://ask.metafilter.com/31720/Enable-screen-resize, Morgan Notes, Jan. 29, 2006, 4 pages.
Mick, "iPhone OS 4.0 Will Bring True Multitasking This Summer", DailyTech, http://www.dailytech.com/report+iphone+os+40+will+bring+true+multitasking+this+summer/article 17878.htm, Mar. 11, 2010, 3 pages.
Molen, "HTC Sense 3.6 Preview", https://www.engadget.com/2012/03/13/htc-sense-3.6-preview/, Mar. 13, 2012, 22 pages.
Moth, "Write Code Once for Both Mobile and Desktop Apps", MSDN Magazine, http://msdn.microsoft.com/en-us/magazine/cc163387.aspx, Jul. 2007, 15 pages.
Newman, "Sprint's HTC EVO 4G: 5 Killer Features," PCWorld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, http://www.androidcentral.com/review-new-htc-sense-android-phones, Feb. 22, 2010, 10 pages.
Nilsson, Design Guidelines for Mobile Applications, SINTEF ICT, Jun. 2008, 73 pages.
Nilsson et al., "Design Patterns for User Interafce for Mobile Applications," Advances in Engineering Software, Elsevier Science, Oxford, GB, vol. 40, No. 12, Dec. 2009 pp. 11 pages.
Octoba, "PullOpenSettings: Free Application for Android, which Slightly Conveniently Enables to Draw a Dialoge for Changing the Setting from the Edge of the Display Anytime", (in Japanese language only), http://octoba.net/archives/20130108-android-app-pullopensettings-177293.html>, Jan. 8, 2013, 6 pages.
Pacosal, "Task Changer PRO—Easy Task Multitasking", http://web.archive.org/web/20120623032235/https://forum.xda-developers.com/showthread.php?t=1264272, Jun. 23, 2012, 11 pages.
Raphael, "Android 4.0: The Ultimate Guide (plus cheat sheet)—Computerworld", http//www.Android_4.0_The_ultimate_guide_plus_cheat_sheet_?taxonomyId=238&pageNumber=1, Aug. 16, 2012, 11 pages.
Rieger, "Effective Design for Multiple Screen Sizes," http://mobiforge.com/designing/story/effective-design-multiple-screen-sizes, Jan. 2009, 12 pages.
Robertson, et al., "The Task Gallery: A 3D Window Manager", CHI 2000 Conference proceedings, Apr. 1-6, 2000, 8 pages.
Ruddock, "LG Optimus G Pro (Korean Version) Review: LG Finally Finds the Sweet Spot (A Relatively Large One)", http:www.androidpolice.com/2013/04/23/lg-optimus-g-pro-korean-version-review-lg-finally-finds-the-sweet-spot-a-relatively-large-one/, Apr. 23, 2013, 22 pages.
Samsung, "Samsung Galaxy S4 4G LTE Smartphone User Manual", http://downloadcenter.samsung.com/center/UM/20130426000247000/ATT-SGH-I337_English_User_Manual_MDB_F3.pdf, 2013, 260 pages.
Savov, "HTC Enhances Sense with Leap and Friend Stream (updated with video)", Engadget, http://www.engadget.com/2010/02/16/htc-enhances-sense-with-leap-and-friend-stream, Feb. 16, 2010, 4 pages.
Schwartz, "Making the Samsung Galaxy S4 Your Own", http://www.informit.com/articles/article.aspx?p=2128063, Oct. 29, 2013, 16 pages.
Seffah et al., 'Multi-Devices "Multiple" User Interfaces: Development Models and Research Opportunities', ScienceDirect, The Journal of Systems and Software, available online: wwww.sciencedirect.com, Dec. 25, 2003, 14 pages.
Siracusa, "Antacid Tablet," http://arstechnica.com/staff/2010/01/antacid-tablet/, Jan. 2, 2010, 4 pages.
Tech and Me, "Android Status Bar Customization Extreme", youtube, www.youtube.com/watch?v=s8Yc-kgtjMo, Jul. 26, 2012, 3 pages.
Viana et al., "Xmobile: A MB-UID Environment for Semi-Automatic Generation of Adaptive Applications for Mobile Devices," ScienceDirect, The Journal of Systems and Software, Available Online: www.sciencedirect.com, Jun. 9, 2007, 13 pages.
"Windows 7 Aero 3D Trick", https:www.youtube/watch?v=N7X3LECEK, Jan. 17, 2010, 1 page.
Windows 7, "Switch Between Flip 3D Shortcut", Windows Seven Forum, http://www.sevenforums.com/tutorials/2694-switch-between-windows-flip-3d-shortcut.html, Jan. 22, 2009, 9 pages.
YouTube, "Android 4.1 Jelly Bean Notifications", https://www.youtube.com/watch?v=wobNrvMFrTc, Jul. 12, 2012, 1 pages.

(56) References Cited

OTHER PUBLICATIONS

YouTube, "No Jailbreak: Enable Airplay on Mac. Phone & iPad to Mac, AirServer—UPDAED Ios 6", http://www.youtube.com/watch?v=2uskxrhrFeQ, Dec. 11, 2012, 4 pages.
YouTube, "WebOS_Style_App_Switcher_for_Android_4_0_on_the_HP_TouchPad", http://www.youtube.com/watch?v=qQB4Z7ziXpk, Mar. 9, 2012, 3 pages.
YouTube, "Task Changer Titanium", https://www.youtube.com/watch?v=KC24zeSJuv8, Mar. 19, 2012, 2 pages.
Office Action, dated May 22, 2012, received in U.S. Appl. No. 12/888,381, 18 pages.
Final Office Action dated Nov. 19, 2012, received in U.S. Appl. No. 12/888,381, 14 pages.
Office Action, dated Dec. 10, 2013, received in U.S. Appl. No 12/888,381 13 pages.
Notice of Allowance, dated Oct. 21, 2014, received in U.S. Appl. No. 12/888,381, 8 pages.
Notice of Allowance, dated Feb. 17, 2015, received in U.S. Appl. No. 12/888,381, 5 pages.
Office Action, dated Aug. 8, 2013, received in Australian Patent Application 2010350740, which corresponded with U.S. Appl. No. 12/888,381, 3 pages.
Office Action, dated Feb. 24, 2016, received in Australian Patent Application No. 2015202565, which corresponds with U.S. Appl. No. 12/888,381, 2 pages.
Patent, dated Jun. 15, 2017, received in Australian Patent Application No. 2015202565, which corresponds with U.S. Appl. No. 12/888,381, 1 page.
Office Action, dated Aug. 17, 2016, received in Australian Patent Application No. 2015230769 which corresponds with U.S. Appl. No. 12/888,381, 3 pages.
Office Action, dated Aug. 31, 2017, received in Australian Patent Application No. 2015230769, which corresponds with U.S. Appl. No. 12/888,381, 3 pages.
Grant, dated Dec. 18, 2018, received in Australian Patent Application No. 2015230769, which corresponds with U.S. Appl. No. 12/888,381, 1 page.
Office Action, dated Aug. 28, 2012, received in Chinese Patent Application No. 201010602688.2, which corresponds with U.S. Appl. No. 12/888.381, 6 pages.
Office Action, dated May 24, 2013, received in Chinese Patent Application No. 201010602688.2, which corresponds with U.S. Appl. No. 12/888,381, 7 pages.
Office Action, dated Jan. 14, 2014, received in Chinese Patent Application No. 201010602688.2, which corresponds with U.S. Appl. No. 12/888,381, 8 pages.
Office Action, dated Sep. 4, 2017, received in Chinese Patent Application No. 201510451417.4, which corresponds with U.S. Appl. No. 12/888,381, 5 pages.
Notice of Allowance, dated Feb. 12, 2019, received in Chinese Patent Application No. 201510451417.4, which corresponds with U.S. Appl. No. 12/888,381, 3 pages.
Office Action, dated Sep. 28, 2017, received in Chinese Patent Application No. 201510451660.6, which corresponds with U.S. Appl. No. 12/888,381, 6 pages.
Notice of Allowance, dated May 4, 2018, received in Chinese Patent Application No. 201510451660.6, which corresponds with U.S. Appl. No. 12/888,381, 2 pages.
Patent, dated Jun. 5, 2018, received in Chinese Patent Application No. 201510451660.6, which corresponds with U.S. Appl. No. 12/888,381, 4 pages.
Office Action, dated Dec. 5, 2017, received in Chinese Patent Application No. 201510451941.1, which corresponds with U.S. Appl. No. 12/888,381, 4 pages.
Office Action, dated Oct. 15, 2018, received in European Patent Application No. 201510451941.1, which corresponds with U.S. Appl. No. 12/888,381, 5 pages.
Office Action, dated Aug. 6, 2013, received in European Patent Application No. 10760867.1, which corresponds with U.S. Appl. No. 12/888,381, 4 pages.

Oral Summons, dated Apr. 10, 2018, received in European Patent Application No. 10760867.1, which corresponds with U.S. Appl. No. 12/888,381, 10 pages.
Office Action, dated Oct. 12, 2018, received in European Patent Application No. 1518629.0, which corresponds with U.S. Appl. No. 12/888,381, 7 pages.
Office Action, dated Dec. 6, 2013, received in Japanese Patent Application No. 2013-503722, which corresponds with U.S. Appl. No. 12/888,381, 2 pages.
Notice of Allowance, dated Dec. 8, 2013, received in Japanese Patent Application No. 2013-503722, which corresponds with U.S. Appl. No. 12/888,381, 1 page.
Patent, dated Jan. 9, 2015, received in Japanese Patent Application No. 2013-503722, which corresponds with U.S. Appl. No. 12/888,381, 1 page.
Office Action, dated Jan. 5, 2016, received in Japanese Patent Application No. 2014-263264, which corresponds with U.S. Appl. No. 12/888,381, 4 page.
Office Action, dated Jun. 26, 2017, received in Japanese Patent Application No. 2016-169964, which corresponds with U.S. Appl. No. 12/888,381, 5 pages.
Notice of Allowance, dated Mar. 19, 2018, received in Japanese Patent Application No. 2016-169964, which corresponds with U.S. Appl. No. 12/888,381, 5 pages.
Patent, dated Apr. 27, 2018, received in Japanese Patent Application No. 2016-169964, which corresponds with U.S. Appl. No. 12/888,381, 2 pages.
Office Action, dated Nov. 6, 2014, received in Korean Patent Application No. 2012-7029281, which corresponds with U.S. Appl. No. 12/888,381, 3 pages.
Notice of Allowance, dated Dec. 28, 2915, received in Korean Patent Application No. 2012-7029281, which corresponds with U.S. Appl. No. 12/888,381, 3 pages.
Office Action, dated Dec. 10, 2015, received in Korean Patent Application No. 2015-7020457, which corresponds with U.S. Appl. No. 12/888,381, 3 pages.
Office Action, dated Oct. 26, 2016, received in Korean Patent Application No. 2015-7020457, which corresponds with U.S. Appl. No. 12/888,381, 3 pages.
Office action, dated Feb. 13, 2017, received in Korean patent Application No. 2015-7020457, which corresponds with U.S. Appl. No. 12/888,381, 5 pages.
Office Action, dated Jul. 28, 2017, received in Korean Patent Application No. 2017-7013080 which corresponds with U.S. Appl. No. 12/888,381, 9 pages.
Office Action, dated May 10, 2012, received in U.S. Appl. No. 12/888,382 9 pages.
Final Office Action, dated Nov. 15, 2012, received in U.S. Appl. No. 12/888,382, 11 pages.
Office Action, dated Dec. 10, 2013, received in U.S. Appl. No. 12/888,382, 13 pages.
Notice of Allowance, dated Oct. 31, 2014, received in U.S. Appl. No. 12/888,382, 5 pages.
Notice of Allowance, dated Feb. 13, 2015, received in U.S. Appl. No. 12/888,382, 6 pages.
Office Action, dated May 17, 2012, received in U.S. Appl. No. 12/888,384, 15 pages.
Final Office Action, dated Nov. 7, 2012, received in U.S. Appl. No. 12/888,384, 15 pages.
Office Action, dated May 16, 2012, received in U.S. Appl. No. 12/888,386, 11 pages.
Final Office Action, dated Nov. 8, 2012, received in U.S. Appl. No. 12/888,386, 13 pages.
Office Action, dated Jan. 23, 2013, received in U.S. Appl. No. 12/888,389, 11 pages.
Final Office Action, dated Sep. 12, 2013, received in U.S. Appl. No. 12/888,389, 9 pages.
Notice of Allowance, dated Sep. 8, 2014, received in U.S. Appl. No. 12/888,389, 13 pages.
Notice of Allowance, dated Feb. 11, 2015, received in U.S. Appl. No. 12/888,389, 13 pages.
Notice of Allowance, dated Jun. 15, 2012, received in U.S. Appl. No. 12/888,391, 23 pages.

(56) References Cited

OTHER PUBLICATIONS

Office Action, dated Nov. 23, 2015, received in U.S. Appl. No. 14/183,316, 17 pages.
Final Office Action, dated Jun. 16, 2016, received in U.S. Appl. No. 14/183,316, 20 pages.
Office Action, dated Jan. 20, 2017, received in U.S. Appl. No. 14/183,316, 19 pages.
Notice of Allowance, dated Aug. 30, 2017, received in U.S. Appl. No. 14/183,316, 6 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance, dated Jul. 15, 2016, received in U.S. Appl. No. 14/183,347, 7 pages.
Office Action, dated Apr. 12, 2016, received in U.S. Appl. No. 14/183,331, 23 pages.
Notice of Allowance, dated Nov. 21, 2016, received in U.S. Appl. No. 14/183,331, 5 pages.
Notice of Allowance, dated Mar. 10, 2017, received in U.S. Appl. No. 14/183,331, 6 pages.
Office Action, dated Jun. 29, 2018, received in Chinese Patent Application No. 201480032814.1, which corresponds with U.S. Appl. No. 14/183,331, 4 pages.
Office Action, dated Aug. 28, 2018, received in Chinese Patent Application No. 201480032814.1, which corresponds with U.S. Appl. No. 14/183,331, 3 pages.
Office Action, dated Jan. 30, 2019, received in Chinese Patent Application No. 201480032814.1, which corresponds with U.S. Appl. No. 14/183,331, 5 pages.
Office Action, dated Jul. 24, 2017, received in European Patent Application No. 14735019.3, which corresponds with U.S. Appl. No. 14/183,331, 4 pages.
Office Action, dated Nov. 6, 2017, received in European Patent Application No. 14735019.3, which corresponds with U.S. Appl. No. 14/183,331, 10 pages.
Office Action, dated Oct. 15, 2018, received in European Patent Application No. 14735019.3, which corresponds with U.S. Appl. No. 14/183,331, 8 pages.
Office Action, dated Aug. 14, 2015, received in U.S. Appl. No. 14/183,353, 13 pages.
Final Office Action, dated Feb. 10, 2016, received in U.S. Appl. No. 14/183,353, 7 pages.
Notice of Allowance, dated May 20, 2016, received in U.S. Appl. No. 14/183,353, 7 pages.
Notice of Allowance, dated Aug. 16, 2016, received in U.S. Appl. No. 14/183,353, 5 pages.
Office Action, dated Aug. 14, 2015, received in Australian Patent Application No. 2014238101, which corresponds with U.S. Appl. No. 14/183,353, 3 pages.
Office Action, dated May 31, 2018, received in Australian Patent Application No. 2017204010, which corresponds with U.S. Appl. No. 14/183,353, 7 pages.
Innovation Patent, dated Oct. 10, 2017, received in Australian Patent Application No. 2014101611, which corresponds with U.S. Appl. No. 14/183,353, 1 page.
Office Action, dated Dec. 1, 2017, received in Chinese Patent Application No. 201480023878.5 (5952CN), which corresponds with U.S. Appl. No. 14/183,353, 5 pages.
Office Action, dated Sep. 25, 2018, received in Chinese Patent Application No. 201480023878.5, which corresponds with U.S. Appl. No. 14/183,353, 5 pages.
Office Action, dated May 10, 2017, received in European Patent Application No. 14710473.1, which corresponds with U.S. Appl. No. 14/183,353, 8 pages.
Office Action, dated Feb. 5, 2018, received in European Patent Application No. 14710473.1, which corresponds with U.S. Appl. No. 14/183,353, 8 pages.
Office Action, dated Sep. 30, 2016, received in Japanese Patent Application No. 2016-500435, which corresponds with U.S. Appl. No. 14/183,353, 7 pages.
Final Office Action, dated Apr. 14, 2017, received in Japanese Patent Application No. 2016-500435, which corresponds with U.S. Appl. No. 14/183,353, 6 pages.
Notice of Allowance, dated Sep. 15, 2017, received in Japanese Patent Application No. 2016-500435, which corresponds with U.S. Appl. No. 14/183,353, 5 pages.
Patent, dated Oct. 6, 2017, received in Japanese Patent Application No. 2016-500435, which corresponds with U.S. Appl. No. 14/183,353, 2 pages.
Office Action, dated Jun. 29, 2018, received in Japanese Patent Application No. 2017-156610, which corresponds with U.S. Appl. No. 14/183,353, 5 pages.
Office Action, dated May 17, 2016, received in Korean Patent Application No. 2015-7029237, which corresponds with U.S. Appl. No. 14/183,353, 7 pages.
Office Action, dated Mar. 14, 2017, received in Korean Patent Application No. 2015-7029237, which corresponds with U.S. Appl. No. 14/183,353, 5 pages.
Patent, dated Jun. 14, 2017, received in Korean Patent Application No. 2015-7029237, which corresponds with U.S. Appl. No. 14/183,353, 2 pages.
Office Action, dated Oct. 2, 2014, received in U.S. Appl. No. 14/290,952, 66 pages.
Office Action, dated May 7, 2015, received in U.S. Appl. No. 14/290,952, 68 pages.
Office Action, dated Jul. 7, 2016, received in U.S. Appl. No. 14/290,952, 18 pages.
Notice of Allowance, dated Feb. 10, 2017, received in U.S. Appl. No. 14/290,952, 8 pages.
Notice of Allowance, dated Apr. 10, 2017, received in U.S. Appl. No. 14/290,952, 9 pages.
Office Action, dated Aug. 21, 2017, received in U.S. Appl. No. 14/727,747, 23 pages.
Final Office Action, dated May 17, 2018, received in U.S. Appl. No. 14/272,747, 18 pages.
Office Action, dated Apr. 3, 2017, received in U.S. Appl. No. 14/727,765, 19 pages.
Final Office Action, dated Oct. 31, 2017, received in U.S. Appl. No. 14/727,765, 28 pages.
Office Action, dated May 3, 2018, received in U.S. Appl. No. 15/332,919, 9 pages.
Office Action, dated Nov. 19, 2018, received in U.S. Appl. No. 15/332,919, 11 pages.
Notice of Allowance, dated Jan. 24, 2019, received in U.S. Appl. No. 15/332,919, 8 pages.
Office Action, dated Oct. 7, 2015, received in U.S. Appl. No. 14/599,339, 15 pages.
Office Action, dated May 9, 2016, received in U.S. Appl. No. 14/599,339, 20 pages.
Office Action, dated May 25, 2017, received in U.S. Appl. No. 14/599,339, 26 pages.
Final Office Action, dated Nov. 2, 2017, received in U.S. Appl. No. 14/599,339, 25 pages.
Notice of Allowance, dated Jun. 7, 2018, received in U.S. Appl. No. 14/599,339, 16 pages.
Notice of Allowance, dated Jul. 5, 2018, received in U.S. Appl. No. 14/599,339, 2 pages.
Office Action, dated Oct. 7, 2015, received in U.S. Appl. No. 14/814,420, 16 pages.
Final Office Action, dated Mar. 24, 2016, received in U.S. Appl. No. 14/814,420, 18 pages.
Office Action, dated Mar. 9, 2017, received in U.S. Appl. No. 14/814,420 17 pages.
Final Office Action, dated Oct. 17, 2017, received in U.S. Appl. No. 14/814,420, 20 pages.
Notice of Allowance, dated May 23, 2018, received in U.S. Appl. No. 14/814,420, 24 pages.
Extended European Search Report, dated Nov. 12, 2015, received in European Patent Application No. 15186629.0, which corresponds with U.S. Appl. No. 12/888,381, 9 pages.

(56) References Cited

OTHER PUBLICATIONS

International Search Report and Written Opinion, dated Dec. 10, 2010, received in International Patent Application No. PCT/US2010/050057, which corresponds with U.S. Appl. No. 12/888,381, 9 pages.
International Preliminary Report on Patentability, dated Oct. 9, 2012, received in International Patent Application No. PCT/US2010/050057, which corresponds with U.S. Appl. No. 12/888,381, 6 pages.
International Search Report and Written Opinion, dated Dec. 19, 2014, received in International Patent Application No. PCT/US2014/040395, which corresponds with U.S. Appl. No. 14/183,331, 16 pages.
International Preliminary Report on Patentability, dated Dec. 15, 2015, received in International Patent Application No. PCT/US2014/040395, which corresponds with U.S. Appl. No. 14/183,331, 16 pages.
International Search Report and Written Opinion, dated Jul. 18, 2014, received in International Patent Application No. PCT/US2014/018724, which corresponds with U.S. Appl. No. 14/183,331, 12 pages.
International Preliminary Report on Patentability, dated Sep. 15, 2015, received in International Patent Application No. PCT/US2014/018724, which corresponds with U.S. Appl. No. 14/183,331, 9 pages.
YouTube, "How to Get a Control Panel on Your iPhone or iPod Touch", https://www.youtube.com/watch?v=eSF8NX5w871, Dec. 23, 2019, 6 pages.
Patent, dated Nov. 1, 2019, received in European Patent Application No. 201510451941.1, which corresponds with U.S. Appl. No. 12/888,381, 6 ages.
Office Action, dated Sep. 23, 2019, received in Korean Patent Application No. 2019-7020288, which corresponds with U.S. Appl. No. 12/888,381, 2 pages.
Office Action, dated Sep. 24, 2019, received in Chinese Patent Application No. 201480032814.1, which corresonds with U.S. Appl. No. 14/183,331, 4 pages.
Intention to Grant, dated Sep. 23, 2019, received in European Patent Application No. 14735019.3, which corresonds with U.S. Appl. No. 14/183,331, 6 pages.
Notice of Allowance, dated Sep. 19, 2019, received in Chinese Patent Application No. 201480023878.5, which corresonds with U.S. Appl. No. 14/183,353, 3 pages.
Patent, dated Nov. 19, 2019, received in Chinese Patent Application No. 201480023878.5, which corresonds with U.S. Appl. No. 14/183,353, 3 pages.
Office Action, dated Nov. 15, 2019, received in Korean Patent Application No. 2017-7016346, which corresonds with U.S. Appl. No. 14/183,353, 4 pages.
Office Action, dated Dec. 24, 2019, received in Korean Patent Application No. 2017-7016346, which corresonds with U.S. Appl. No. 14/183,353, 5 pages.
Final Office Action, dated Nov. 18, 2019, received in U.S. Appl. No. 14/818,591, 15 pages.
Patent, dated Jul. 12, 2019, received in Korean Patent Application No. 2017-7013080, which corresponds with U.S. Appl. No. 12/888,381, 8 pages.
Certificate of Grant, dated Jul. 18, 2019, received in Australian Patent Application No. 2017204010, which corresponds with U.S. Appl. No. 14/183,353, 3 pages.
Patent, dated Jul. 5, 2019, received in Japanese Patent Application No. 2017-156610, which corresponds with U.S. Appl. No. 14/183,353, 3 pages.
Gunther, "Google Play Music Updated with Expandable Notifications", https://web.archive.org/web/20120827082408/https://androidcommunity.com/google-play-music-updated-with-expandable-notifications-magazines-updated-too, Aug. 23, 2012, 2 pages.
Patent, dated May 8, 2020, received in Hong Kong Patent Application No. 1217126, which corresponds with U.S. Appl. No. 12/888,381, 13 pages.
Decision to Grant, dated Mar. 3, 2020, received in European Patent Application No. No. 14710473.1, which corresponds with U.S. Appl. No. 14/183,353, 2 pages.
Office Action, dated Jul. 10, 2020, received in Japanese Patent Application No. 2019-120136, which corresponds with U.S. Appl. No. 14/183,353, 9 pages.
Office Action, dated Apr. 20, 2020, received in U.S. Appl. No. 15/818,591, 18 pages.
Office Action, dated May 7, 2020, received in Korean Patent Application No. 2020-7007827, which corresponds with U.S. Appl. No. 12/888,381, 4 pages.
Patent, dated May 5, 2020, received in Chinese Patent Application No. 201480032814.1, which corresponds with U.S. Appl. No. 14/183,331, 6 pages.
NTT Docomo, "HT-03A Manual", https://www.nttdocomo.co.jp/english/support/trouble/manual/download/ht03a/index.html, Oct. 31, 2009, 172 pages.
Patent, dated Dec. 11, 2020, received in Hong Kong Application No. 1217124, which corresponds with U.S. Appl. No. 12/888,381, 14 pages.
Office Action, dated Dec. 30, 2020, received in Korean Patent Application No. 2020-7007827, which corresponds with U.S. Appl. No. 12/888,381, 1 page.
Office Action, dated Oct. 5, 2020, received in Japanese Patent Application No. 2019-120127, which corresponds with U.S. Appl. No. 12/888,391, 15 pages.
Office Action, dated Nov. 20, 2020, received in Australian Patent Application No. 2019203663, which corresponds with U.S. Appl. No. 14/183,353, 4 pages.
Patent, dated Aug. 12, 2020, received in European Patent Application No. 14710473.1, which corresponds with U.S. Appl. No. 14/183,353, 6 pages.
Office Action, dated Sep. 23, 2020, received in Korean Patent Application No. 2020-7005350, which corresponds with U.S. Appl. No. 14/183,353, 4 pages.
Notice of Allowance, dated Sep. 15, 2020, received in U.S. Appl. No. 15/818,591, 13 pages.
Notice of Allowance, dated Sep. 18, 2020, received in U.S. Appl. No. 16/223,020, 10 pages.
Extended European Search Report, dated Sep. 9, 2020, received in European Patent Application No. 20179198.5, which corresponds with U.S. Appl. No. 14/183,353, 14 pages.
Patent, dated Mar. 5, 2021, received in Korean Patent Application No. 2020-7007827, which corresponds with U.S. Appl. No. 12/888,381, 4 pages.
Notice of Acceptance, dated Mar. 4, 2021, received in Australian Patent Application No. 2019204750, which corresponds with U.S. Appl. No. 12/888,391, 3 pages.
Notice of Allowance, dated Apr. 5, 2021, received in Japanese Patent Application No. 2019-120127, which corresponds with U.S. Appl. No. 12/888,391, 2 pages.
Office Action, dated Mar. 1, 2021, received in Australian Patent Application No. 2019203663, which corresponds with U.S. Appl. No. 14/183,353, 5 pages.
Office Action, dated Jan. 14, 2021, received in Korean Patent Application No. 2020-7005350, which corresponds with U.S. Appl. No. 14/183,353, 4 pages.
Office Action, dated May 11, 2021, received in Korean Patent Application No. 2021-70006709, which corresponds with U.S. Appl. No. 12/888,381, 2 pages.
Office Action, dated Apr. 26, 2021, received in Japanese Patent Application No. 2014101611, which corresponds with U.S. Appl. No. 14/183,353, 2 pages.
Office Action, dated May 17, 2021, received in Korean Patent Application No. 2021-70072821, which corresponds with U.S. Appl. No. 14/183,353, 2 pages.
Patent, dated Apr. 30, 2021, received in Japanese Patent Application No. 2019-120127, which corresponds with U.S. Appl. No. 12/888,391, 2 pages.

\* cited by examiner

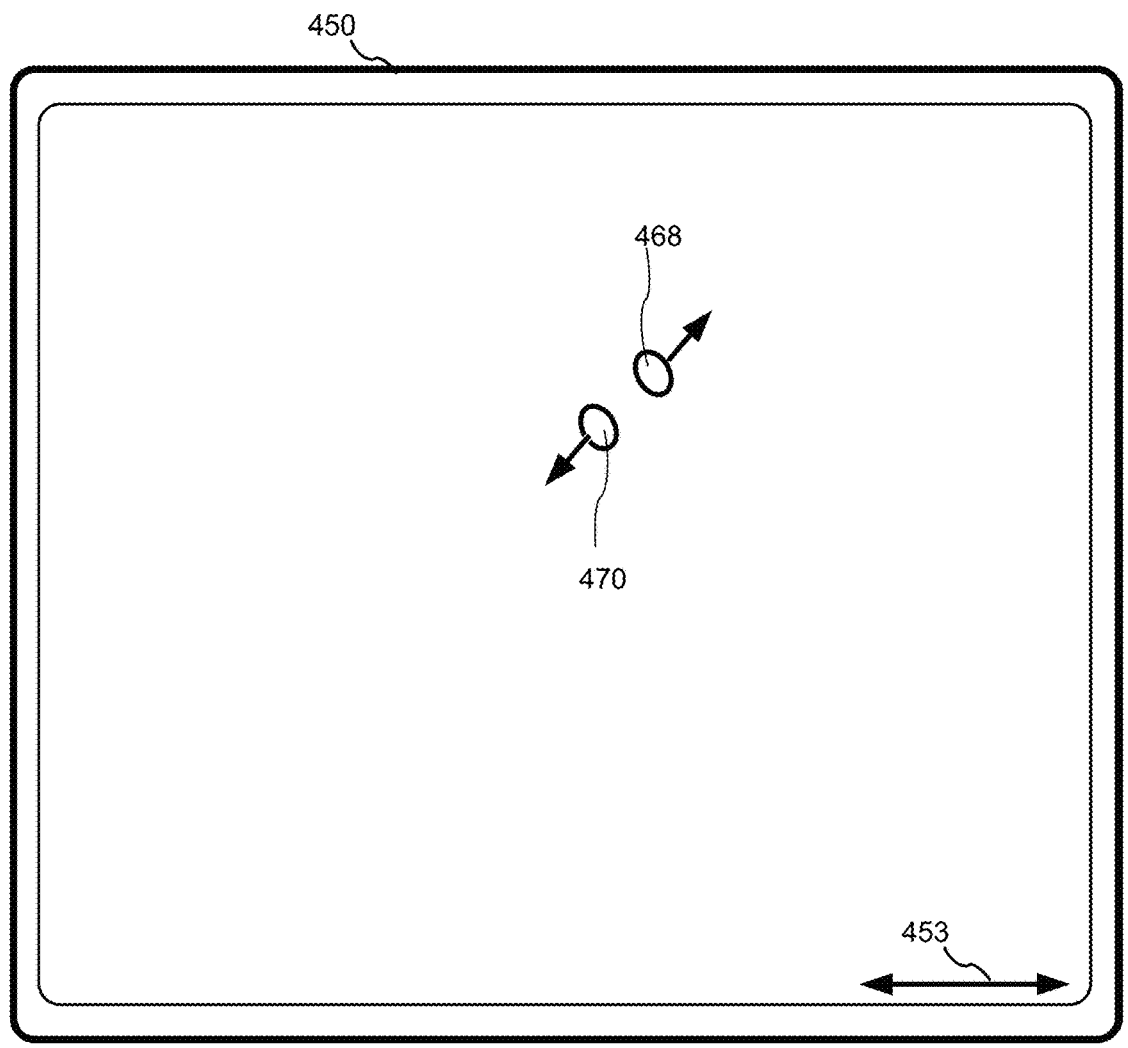
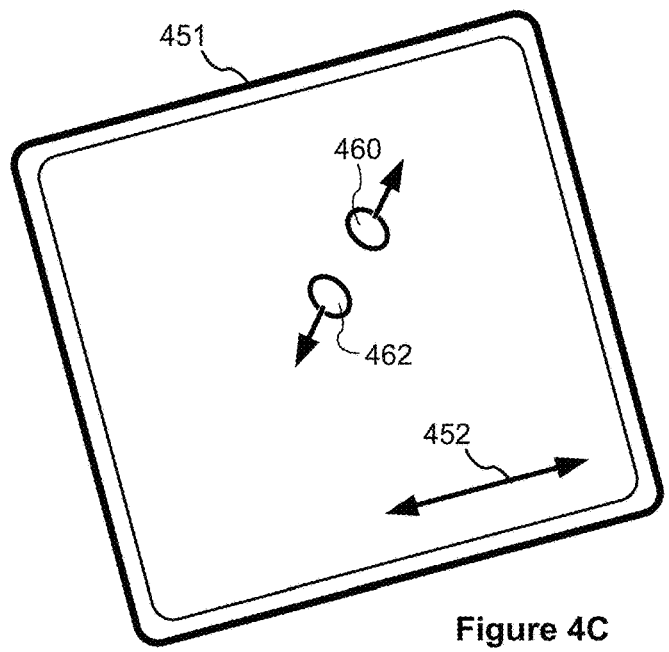
Figure 4C

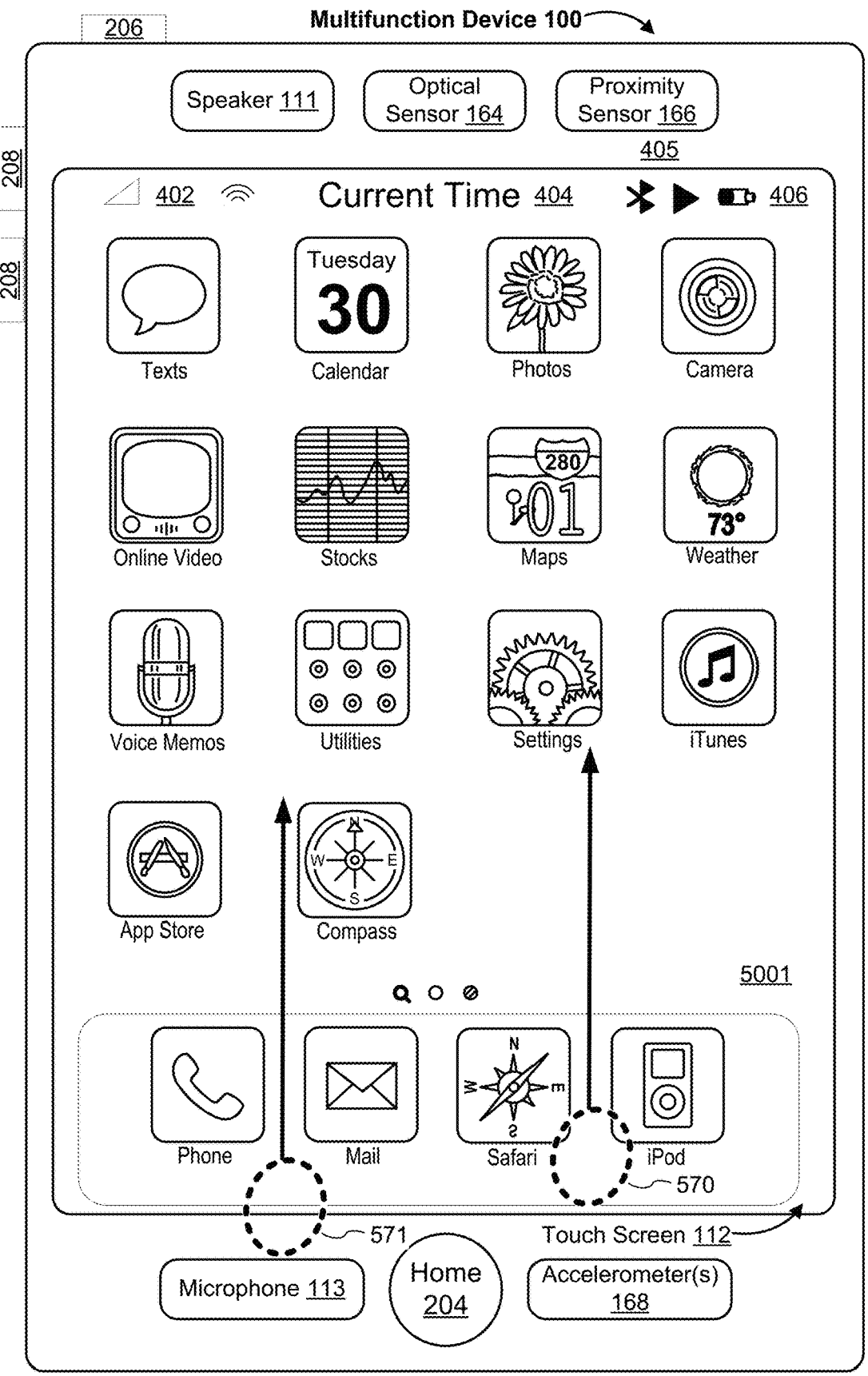
Figure 5AAA

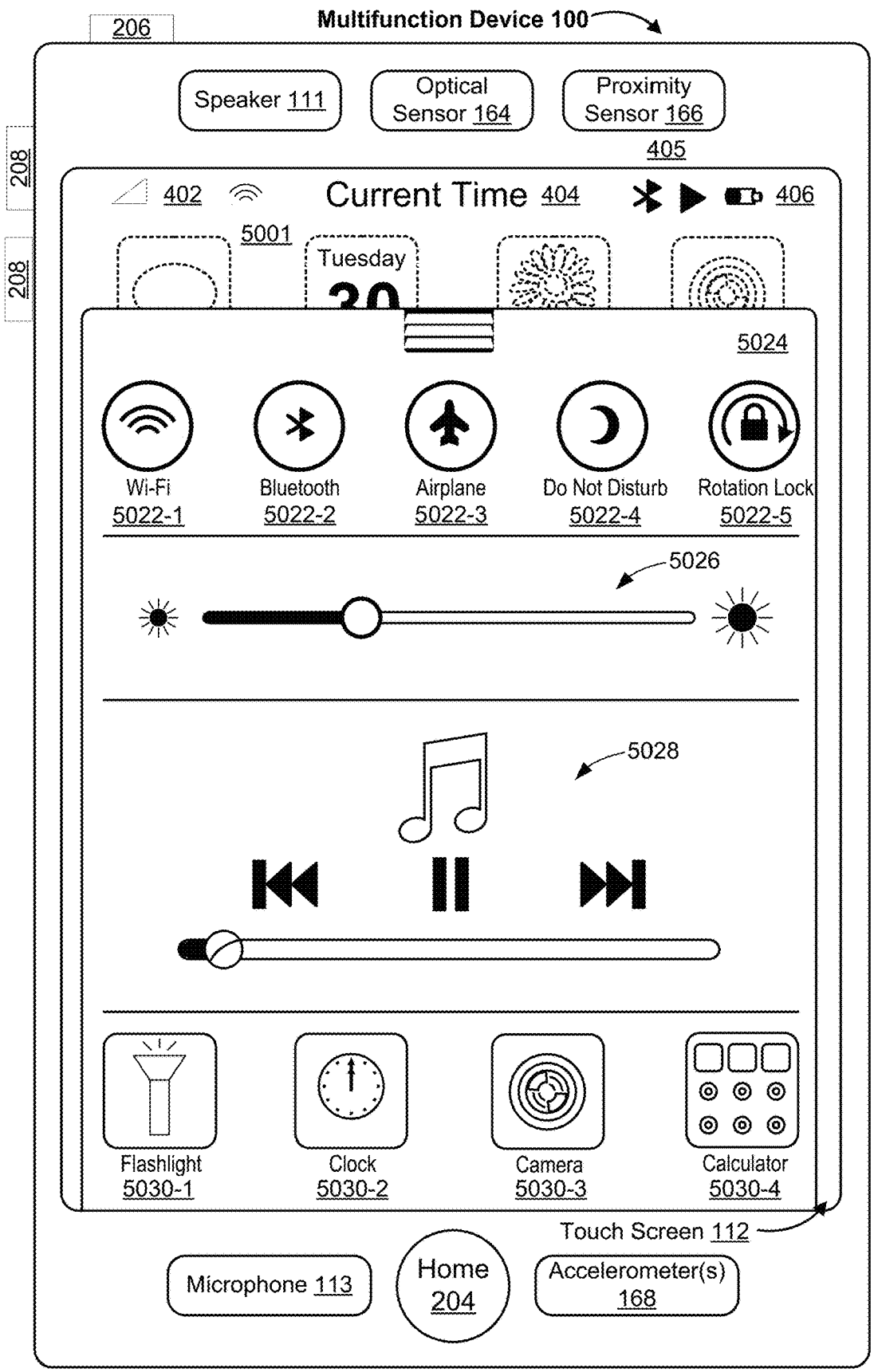
Figure 5BBB

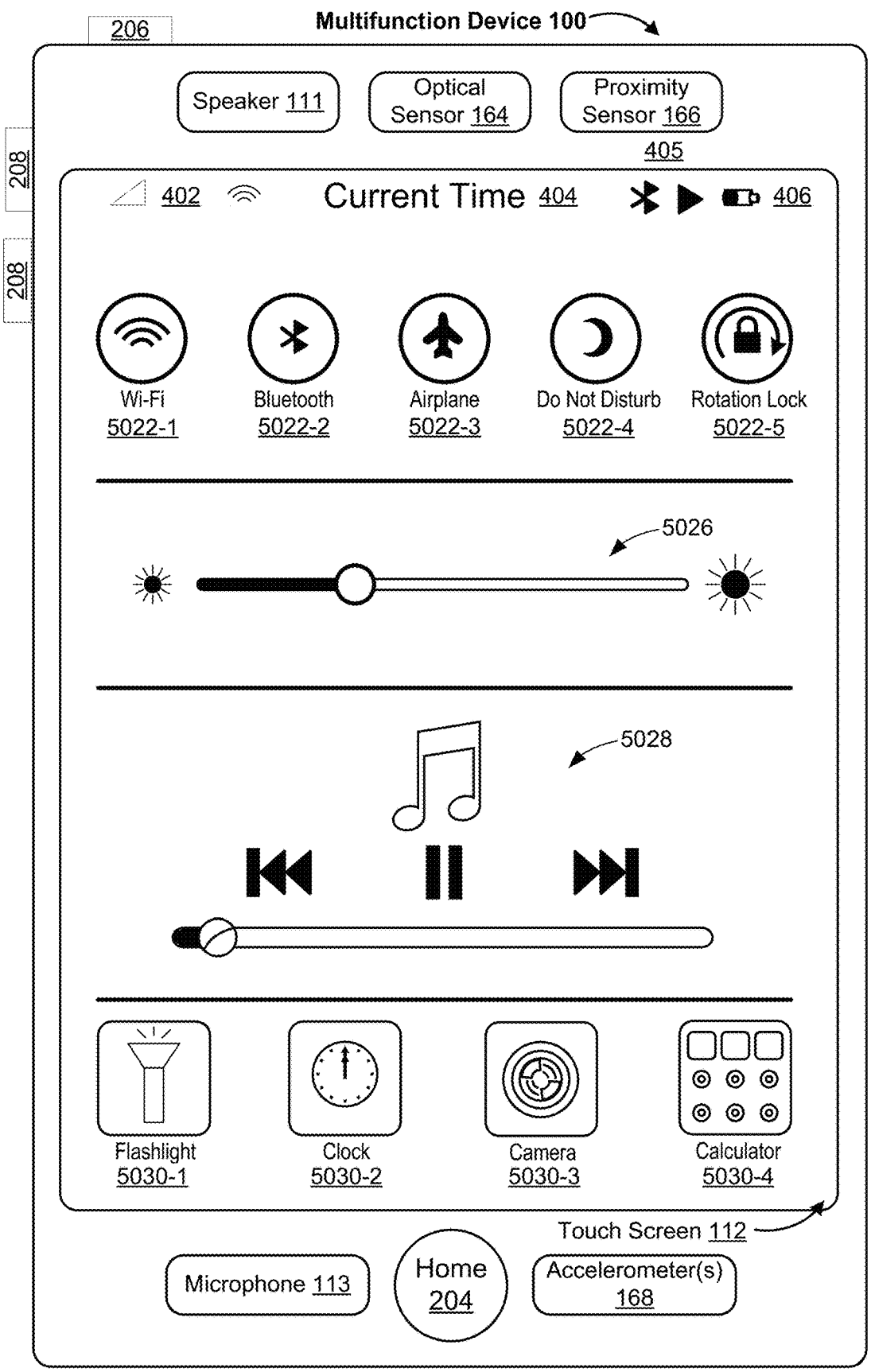
Figure 5CCC

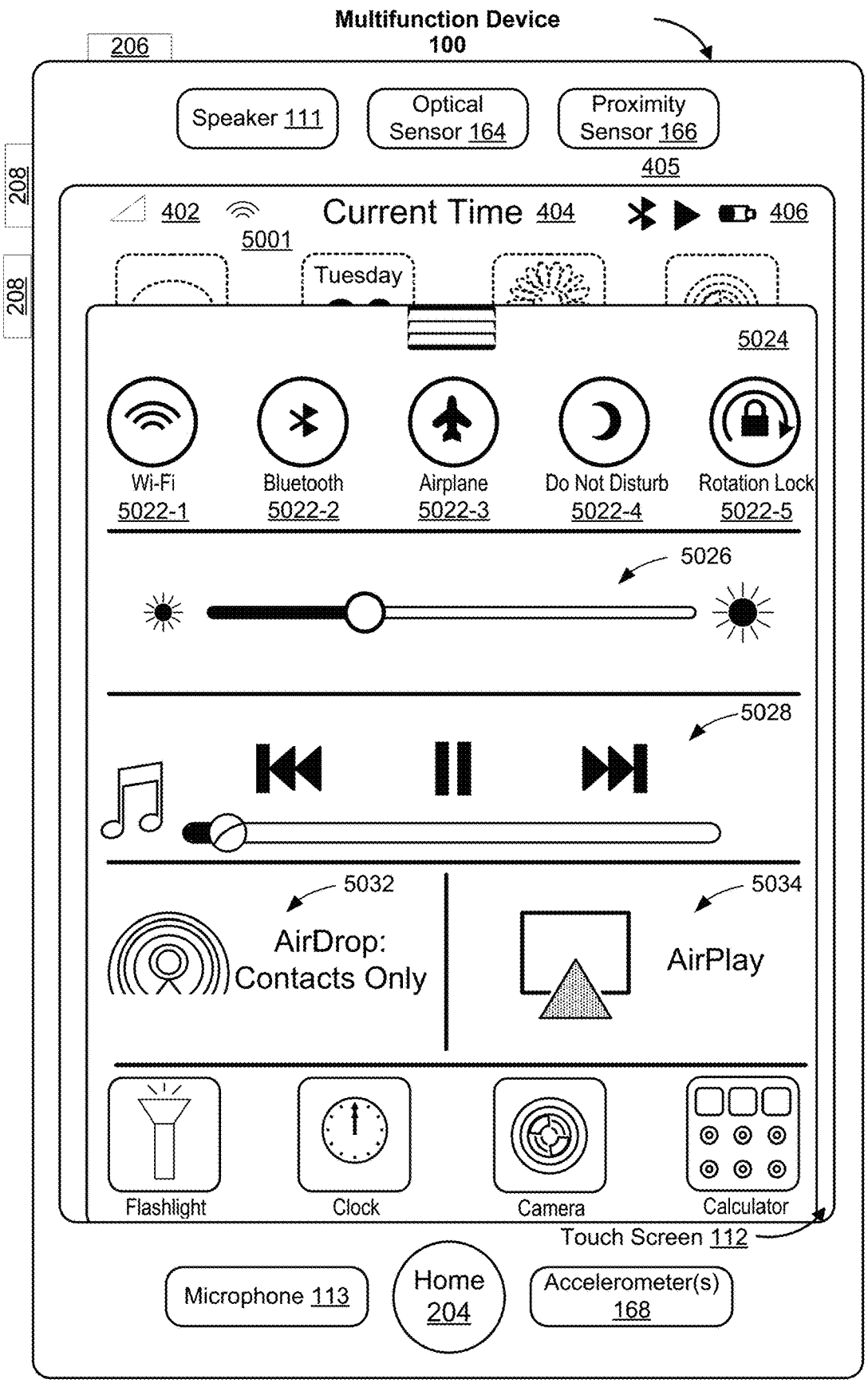
Figure 5DDD

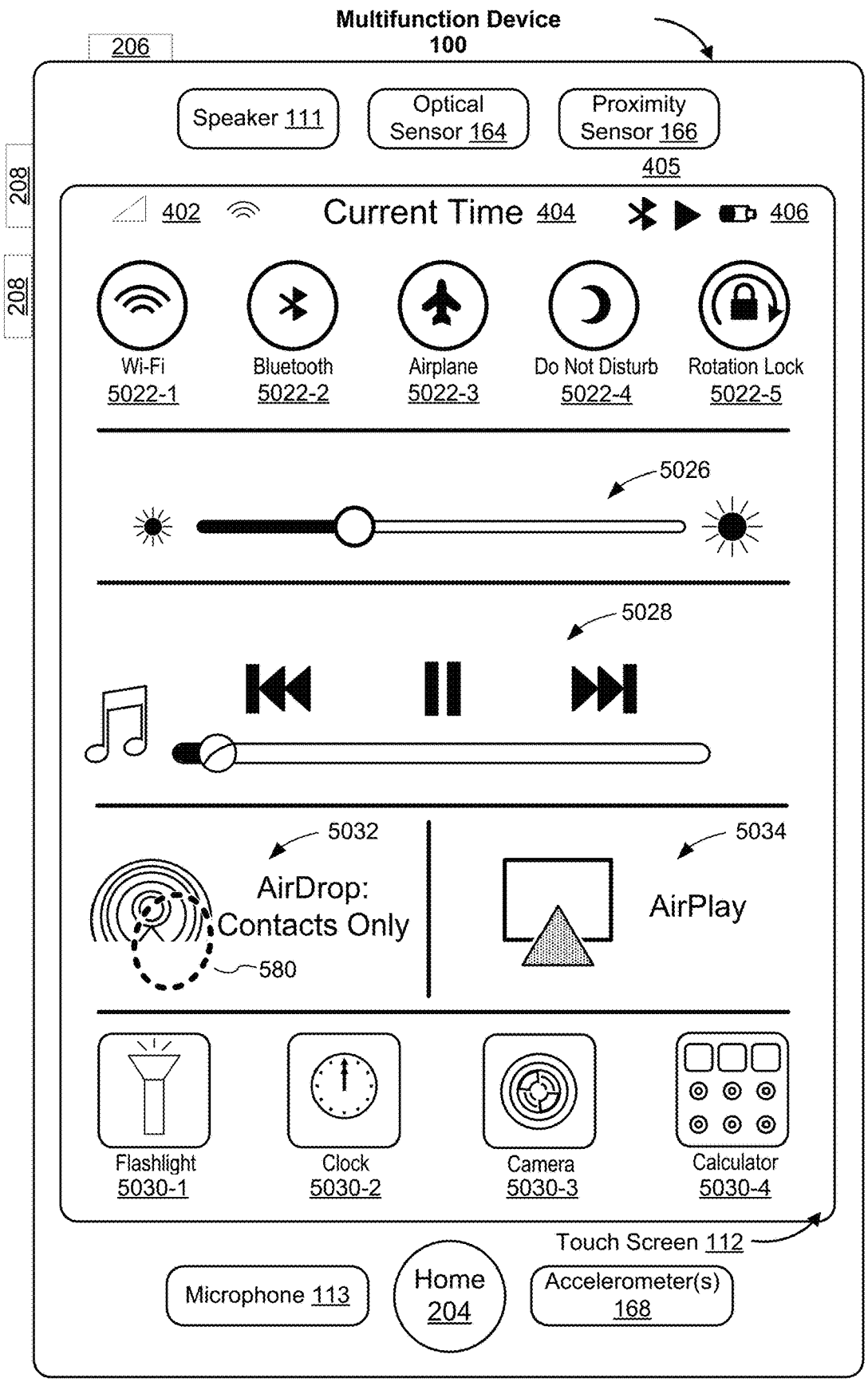
Figure 5EEE

Figure 5FFF

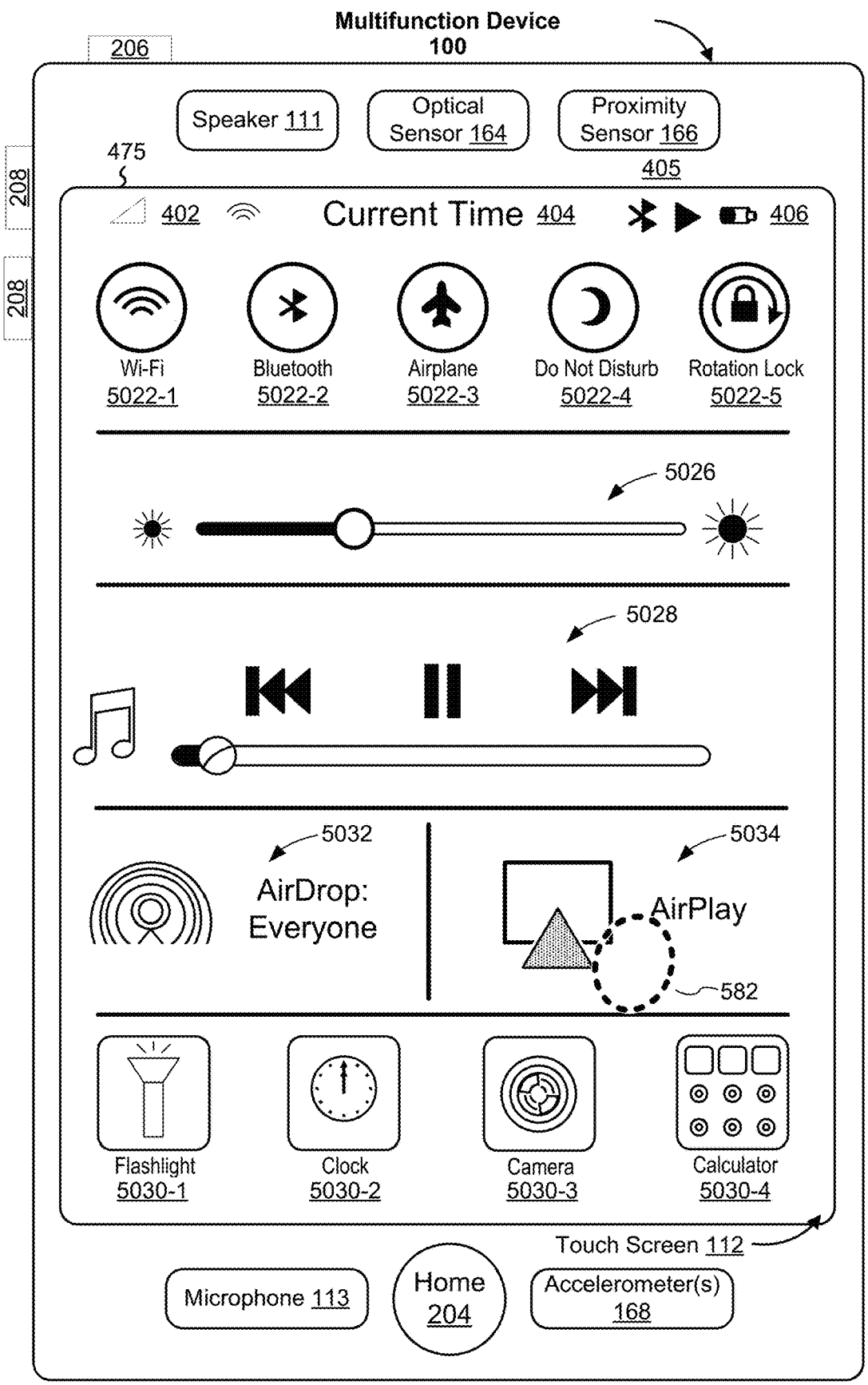
Figure 5GGG

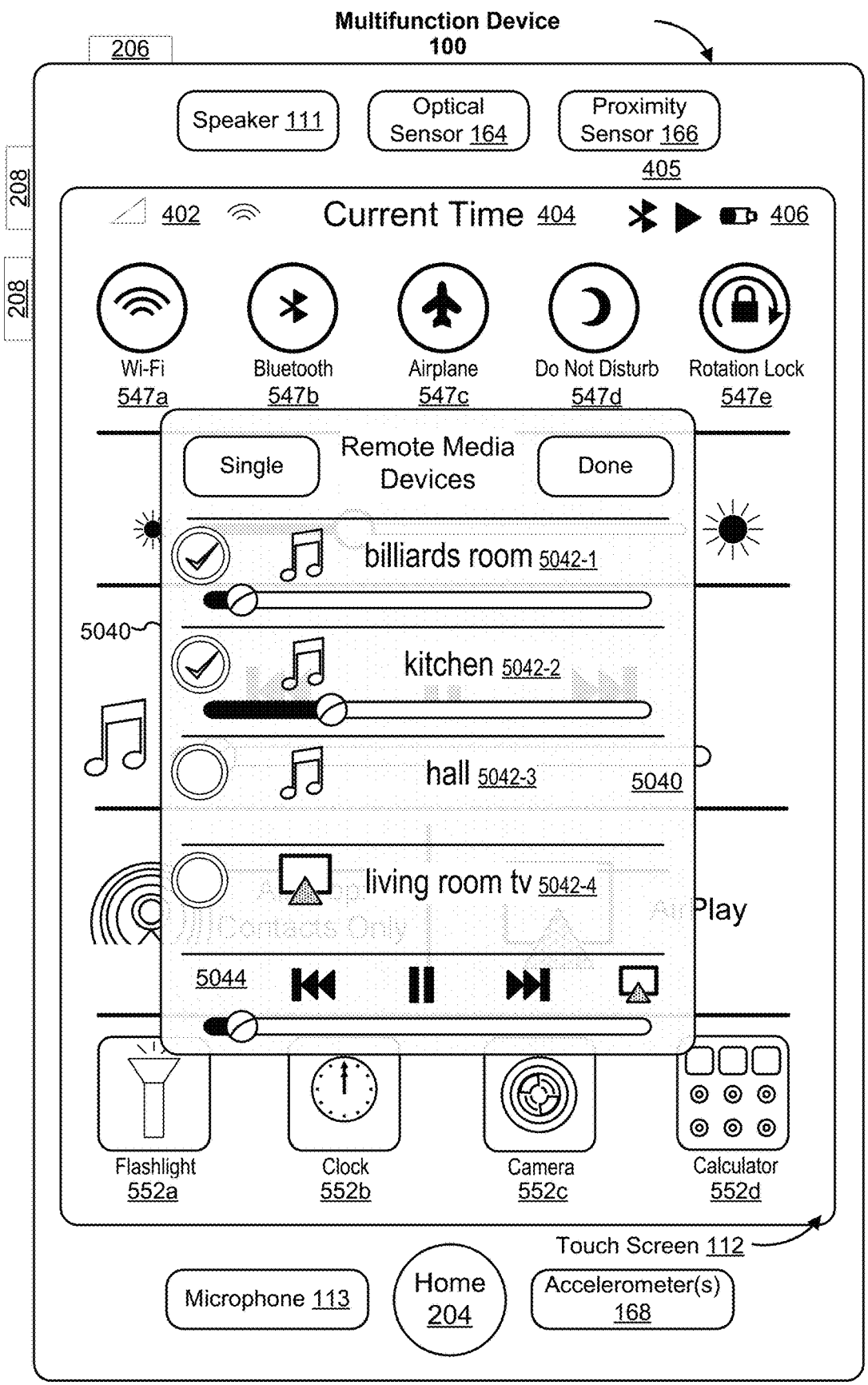
Figure 5HHH

1200

1202 Display a first application view at a first size on the touch-sensitive display. The first application view corresponds to a first application in a plurality of concurrently open applications, and the first application view is displayed without concurrently displaying at the first size an application view for any other application in the plurality of concurrently open applications.

1204 Detect a first input

1206 The first input includes a swipe gesture on a touch-sensitive display that originates from an edge of the touch-sensitive display In response to detecting the first input

1208 Enter an application view selection mode for selecting one of the concurrently open applications for display in a corresponding application view

1210 Display images of open applications. Each image is displayed at a second size that is smaller than the first size, a corresponding open application icon is concurrently displayed with each image, and the images and corresponding open application icons correspond to at least some of the plurality of concurrently open applications.

1212 The images of open applications are displayed in a single scrollable row or column

1214 The images of open applications are displayed in a grid. The grid includes at least two rows of images of open applications

1216 Concurrently display the images of open applications and a search icon

1218 Detect a gesture at a location that corresponds to the search icon. In response to detecting the gesture at the location that corresponds to the search icon, display a search input user interface. Receive one or more search terms in the search input user interface. Perform a search using the one or more search terms. Display results of the search.

1220 Detect a swipe gesture on one of the images of open applications. In response to detecting the swipe gesture on the one of the images of open applications, scroll the images of open applications so that at least one of the images of open applications is removed from the touch-sensitive display and at least a portion of another one of the images of open applications is added to the touch-sensitive display. Concurrently scroll the open application icons.

1222 Detect a swipe gesture on one of the open application icons. In response to detecting the swipe gesture on the one of the open application icons, scroll the open application icons so that a plurality of the open application icons is removed from the touch-sensitive display and a second plurality of open application icons is added to the touch-sensitive display. Concurrently scroll the images of open applications so that the displayed images of open applications are removed from the touch-sensitive display and a plurality of images of open applications is added to the touch-sensitive display.

1224 Subsequent to scrolling the images of open applications and the open application icons, concurrently display a first number of images of open applications and a second number of open application icons. The second number is larger than the first number.

1226 Detect a selection gesture on a respective image of an open application

1228 In response to detecting the selection gesture on the respective image, display a respective application view at the first size on the touch-sensitive display for a corresponding application in the plurality of concurrently open applications. The respective application view is displayed without concurrently displaying at the first size an application view for any other application in the plurality of concurrently open applications. Cease to display the images and corresponding open application icons; and exit the application view selection mode.

1230 While in the application view selection mode, detect a selection gesture on a respective open application icon. In response to detecting the selection gesture on the respective open application icon, display a particular application view at the first size on the touch-sensitive display for a corresponding application in the plurality of concurrently open applications. The particular application view is displayed without concurrently displaying at the first size an application view for any other application in the plurality of concurrently open applications. Cease to display the images and corresponding open application icons; and exit the application view selection mode

DEVICE, METHOD, AND GRAPHICAL USER INTERFACE FOR DISPLAYING A PLURALITY OF SETTINGS CONTROLS

RELATED APPLICATIONS

This application is a continuation of U.S. application Ser. No. 15/332,919, filed Oct. 24, 2016, which is a continuation of U.S. application Ser. No. 14/183,353, filed Feb. 18, 2014, now U.S. Pat. No. 9,477,404, which claims priority to U.S. Provisional Patent Application Ser. No. 61/832,892, filed Jun. 9, 2013 and U.S. Provisional Patent Application Ser. No. 61/801,943, filed Mar. 15, 2013, which are incorporated herein by reference in their entirety.

This application is also related to the following: (1) U.S. patent application Ser. No. 12/888,382, filed Sep. 22, 2010, entitled "Device, Method, and Graphical User Interface for Managing Concurrently Open Software Applications," (2) U.S. patent application Ser. No. 12/888,384, filed Sep. 22, 2010, entitled "Device, Method, and Graphical User Interface for Managing Concurrently Open Software Applications," (3) U.S. patent application Ser. No. 12/888,386, filed Sep. 22, 2010, entitled "Device, Method, and Graphical User Interface for Managing Concurrently Open Software Applications," (4) U.S. patent application Ser. No. 12/888,389, filed Sep. 22, 2010, entitled "Device, Method, and Graphical User Interface for Managing Concurrently Open Software Applications," (5) U.S. patent application Ser. No. 12/888,391, filed Sep. 22, 2010, entitled "Device, Method, and Graphical User Interface for Managing Concurrently Open Software Applications," and (6) U.S. patent application Ser. No. 12/888,381, filed Sep. 22, 2010, which claims priority to U.S. Provisional Application Ser. No. 61/321,869, filed Apr. 7, 2010. All of these applications are incorporated herein by reference in their entirety.

TECHNICAL FIELD

This relates generally to portable electronic devices with touch-sensitive surfaces, including but not limited to portable electronic devices with touch-sensitive surfaces that are configured to have multiple open software applications.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to select, launch, and manage software applications.

For portable electronic devices, existing methods for managing concurrently open applications are cumbersome and inefficient. For example, portable devices with small screens (e.g., smart phones and other pocket-sized devices) typically display a single application at a time, even though multiple applications may be running on the device. With such devices, a user may have difficulty seeing and managing the currently open applications. This situation creates a significant cognitive burden on a user. In addition, existing methods for managing currently open applications take longer than necessary, thereby wasting energy. This latter consideration is particularly important in battery-operated devices.

SUMMARY

Accordingly, there is a need for computing devices with faster, more efficient methods and interfaces for managing concurrently open applications. Such methods and interfaces may complement or replace conventional methods for managing concurrently open applications. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a touch-sensitive display. The method includes displaying a first application view on the touch-sensitive display that corresponds to a first application in a plurality of concurrently open applications. The first application view is displayed without concurrently displaying an application view for any other application in the plurality of concurrently open applications. The method also includes detecting a first input, and in response to detecting the first input, entering an application view selection mode for selecting one of the concurrently open applications for display in a corresponding application view, displaying in a first predefined area an initial group of open application icons that correspond to at least some of the plurality of concurrently open applications, and concurrently displaying at least a portion of the first application view adjacent to the first predefined area. The method further includes detecting a gesture on a respective open application icon in the first predefined area, and, in response to detecting the gesture on the respective open application icon, displaying a respective application view on the touch-sensitive display for a corresponding application in the plurality of concurrently open applications, ceasing to display open application icons in the first predefined area, and exiting the application view selection mode. The respective application view is displayed without concurrently displaying an application view for any other application in the plurality of concurrently open applications.

In accordance with some embodiments, a method is performed at a multifunction device with a touch-sensitive display. The method includes displaying a first application view on the touch-sensitive display that corresponds to a first application in a plurality of concurrently open applications. The first application view is displayed without concurrently displaying an application view for any other application in the plurality of concurrently open applications. The method also includes detecting a first input, and in response to detecting the first input, entering an application view selection mode for selecting one of the concurrently open applications for display in a corresponding application view, and displaying in a predefined area images of open applications that correspond to at least some of the plurality of concurrently open applications. The images of open applications are displayed in a three-dimensional stack extending backwards on the display. The method furthermore includes detecting a gesture on a respective image of an open application in the three-dimensional stack, and in response to detecting the gesture on the respective image of the open application, displaying a respective application view on the touch-sensitive display for a corresponding application in the plurality of concurrently open applications, ceasing to display the three-dimensional stack of images of open applications, and exiting the application view selection mode. The respective application view is displayed without concurrently displaying an application view for any other application in the plurality of concurrently open applications.

In accordance with some embodiments, a method is performed at a multifunction device with a touch-sensitive display. The method includes displaying a first application view at a first size on the touch-sensitive display. The first application view corresponds to a first application in a plurality of concurrently open applications, and the first application view is displayed without concurrently displaying at the first size an application view for any other application in the plurality of concurrently open applications. The method also includes detecting a first input, and in response to detecting the first input, entering an application view selection mode for selecting one of the concurrently open applications for display in a corresponding application view, and displaying images of open applications in a predefined area. Each image is displayed at a second size that is smaller than the first size, and the images correspond to at least some of the plurality of concurrently open applications. The method further includes detecting a gesture on a respective image of an open application in the predefined area, and in response to detecting the gesture on the respective image, displaying a respective application view at the first size on the touch-sensitive display for a corresponding application in the plurality of concurrently open applications, ceasing to display the images in the predefined area, and exiting the application view selection mode. The respective application view is displayed without concurrently displaying at the first size an application view for any other application in the plurality of concurrently open applications.

In accordance with some embodiments, a method is performed at a multifunction device with a touch-sensitive display. The method includes displaying a first application view at a first size the touch-sensitive display. The first application view corresponds to a first application in a plurality of concurrently open applications, and the first application view is displayed without concurrently displaying at the first size an application view for any other application in the plurality of concurrently open applications. The method also includes concurrently displaying in a predefined area images of open applications. Each image is displayed at a second size that is smaller than the first size, and the images correspond to at least some of the plurality of concurrently open applications. The method furthermore includes detecting a gesture on a respective image of an open application in the predefined area, and in response to detecting the gesture on the respective image, displaying a respective application view at the first size on the touch-sensitive display for a corresponding application in the plurality of concurrently open applications. The respective application view is displayed without concurrently displaying at the first size an application view for any other application in the plurality of concurrently open applications.

In accordance with some embodiments, a method is performed at a multifunction device with a touch-sensitive display. The method includes performing the following actions, while in an application view selection mode for selecting one of a plurality of concurrently open applications for display in a corresponding application view. The method includes displaying in a predefined area an initial group of open application icons that correspond to at least some of the plurality of concurrently open applications, detecting a gesture in the predefined area, and in response to detecting the gesture in the predefined area, performing one of the following actions. When the gesture is a first scroll gesture in a first direction, the method includes scrolling to display other open application icons in the plurality of concurrently open application icons in the predefined area. When the gesture is a second scroll gesture in a second direction opposite the first direction, the method includes scrolling to display settings icons in the predefined area. When the gesture is a first gesture on a respective open application icon, the method includes displaying a respective application view on the touch-sensitive display for a corresponding application in the plurality of concurrently open applications, ceasing to display open application icons in the predefined area, and exiting the application view selection mode.

In accordance with some embodiments, a method is performed at a multifunction device with a touch-sensitive display. The method includes displaying a first application view at a first size in a first application. The first application view includes a user selectable object associated with a second application that is distinct from the first application. The method also includes detecting a first gesture at a location that corresponds to the user selectable object, and in response to detecting the first gesture, ceasing to display the first application view, and displaying a second application view in the second application. The method furthermore includes, while in the second application, detecting an input, and in response to detecting the input, entering an application view selection mode for selecting one of a plurality of concurrently open applications for display in a corresponding application view, displaying in a first predefined area images of open applications, and displaying in a second predefined area, distinct from the first predefined area, a portion of a view with application icons for launching applications. The images of open applications correspond to at least some of the plurality of concurrently open applications, each image is displayed at a second size that is smaller than the first size, and the images include an image of the first application view and an image of a view in the second application. The method includes while in the application view selection mode, detecting a second gesture, and in response to detecting the second gesture, performing one of the following actions. The method includes, when the second gesture is at a location corresponding to the image of the first application view, displaying the first application view at the first size in the first application, ceasing to display the images in the first predefined area, and exiting the application view selection mode. The method includes, when the second gesture is at a location corresponding to the second predefined area, displaying the view with application icons for launching applications, ceasing to display the images in the first predefined area, and exiting the application view selection mode.

In accordance with some embodiments, a method is performed at a multifunction device with a touch-sensitive display. The method includes displaying a first application view at a first size on the touch-sensitive display. The first application view corresponds to a first application in a plurality of concurrently open applications, and the first application view is displayed without concurrently displaying at the first size an application view for any other application in the plurality of concurrently open applications. The method includes detecting a first input; and, in response to detecting the first input, entering an application view selection mode for selecting one of the concurrently open applications for display in a corresponding application view; and displaying images of open applications. Each image is displayed at a second size that is smaller than the first size, a corresponding open application icon is concurrently displayed with each image, and the images and corresponding open application icons correspond to at least some of the plurality of concurrently open applications. The method includes detecting a selection gesture on a respective image of an open application; and, in response to detecting the selection gesture on the respective image, displaying a respective application view at the first size on the touch-sensitive display for a corresponding application in the plurality of concurrently open applications; ceasing to display the images and corresponding open application icons; and exiting the application view selection mode. The respective application view is displayed without concurrently displaying at the first size an application view for any other application in the plurality of concurrently open applications.

In accordance with some embodiments, a method is performed at a multifunction device with a touch-sensitive display. The method includes detecting a gesture on the touch-sensitive display. In response to detecting the gesture on the touch-sensitive display, the method includes, when the gesture is a first swipe gesture in a first direction, displaying a plurality of open application icons that corresponds to at least some of a plurality of concurrently open applications. The method further includes, when the gesture is a second swipe gesture in a second direction distinct from the first direction, displaying one or more settings icons. In some embodiments, the first direction is a horizontal direction, and the second direction is an upward direction.

In accordance with some embodiments, a method is performed at a multifunction device with a touch-sensitive display. The method includes detecting a gesture on the touch-sensitive display. In response to detecting the gesture on the touch-sensitive display, the method includes, when the gesture is a first swipe gesture in a first direction, displaying at least a list of recent electronic notifications. The method further includes, when the gesture is a second swipe gesture in a second direction distinct from the first direction, displaying one or more settings icons. In some embodiments, the first direction is a downward direction, and the second direction is an upward direction.

In accordance with some embodiments, an electronic device includes a touch-sensitive display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a touch-sensitive display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions, which, when executed by an electronic device with a touch-sensitive display, cause the device to perform the operations of any of the methods described above. In accordance with some embodiments, an electronic device includes: a touch-sensitive display; and means for performing the operations of any of the methods described above. In accordance with some embodiments, an information processing apparatus, for use in an electronic device with a touch-sensitive display, includes means for performing the operations of any of the methods described above.

In accordance with some embodiments, an electronic device includes a touch-sensitive display unit configured to display a first application view at a first size on the touch-sensitive display unit, wherein the first application view corresponds to a first application in a plurality of concurrently open applications, and the first application view is displayed without concurrently displaying at the first size an application view for any other application in the plurality of concurrently open applications. The electronic device also includes a processing unit coupled to the touch-sensitive display unit. The processing unit is configured to detect a first input; and, in response to detecting the first input, enter an application view selection mode for selecting one of the concurrently open applications for display in a corresponding application view; and enable display of images of open applications. Each image is displayed at a second size that is smaller than the first size. A corresponding open application icon is concurrently displayed with each image. The images and corresponding open application icons correspond to at least some of the plurality of concurrently open applications. The processing unit is configured to detect a selection gesture on a respective image of an open application; and, in response to detecting the selection gesture on the respective image, enable display of a respective application view at the first size on the touch-sensitive display unit for a corresponding application in the plurality of concurrently open applications, wherein the respective application view is displayed without concurrently displaying at the first size an application view for any other application in the plurality of concurrently open applications; cease to display the images and corresponding open application icons; and exit the application view selection mode.

In accordance with some embodiments, an electronic device includes a touch-sensitive display unit and a processing unit coupled to the touch-sensitive display unit. The processing unit is configured to detect a gesture on a touch-sensitive display of the touch-sensitive display unit. The processing unit is configured to, in response to detecting the gesture on the touch-sensitive display, when the gesture is a first swipe gesture in a first direction, enable display of a plurality of open application icons that corresponds to at least some of a plurality of concurrently open applications. The processing unit is further configured to, when the gesture is a second swipe gesture in a second direction distinct from the first direction, enable display of one or more settings icons. In some embodiments, the first direction is a horizontal direction, and the second direction is an upward direction.

In accordance with some embodiments, an electronic device includes a touch-sensitive display unit and a processing unit coupled to the touch-sensitive display unit. The processing unit is configured to detect a gesture on a touch-sensitive display of the touch-sensitive display unit. The processing unit is configured to, in response to detecting the gesture on the touch-sensitive display, when the gesture is a first swipe gesture in a first direction, enable display of at least a list of recent electronic notifications. The processing unit is further configured to, when the gesture is a second swipe gesture in a second direction distinct from the first direction, enable display of one or more settings icons. In some embodiments, the first direction is a downward direction, and the second direction is an upward direction.

Thus, multifunction devices with touch-sensitive displays are provided with faster, more efficient methods and interfaces for managing concurrently open software applications, thereby increasing the effectiveness, efficiency, and user satisfaction with such devices. Such methods and interfaces may complement or replace conventional methods for managing concurrently open software applications.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4C illustrates an exemplary user interface for a multifunction device with a touch-sensitive surface that is separate from the display in accordance with some embodiments.

FIGS. 5AAA-5HHH illustrate exemplary user interfaces for displaying settings icons and other information in accordance with some embodiments.

FIGS. 12A-12B are flow diagrams illustrating a method of selecting one of concurrently open applications in accordance with some embodiments.

DESCRIPTION OF EMBODIMENTS

Figure 1A:
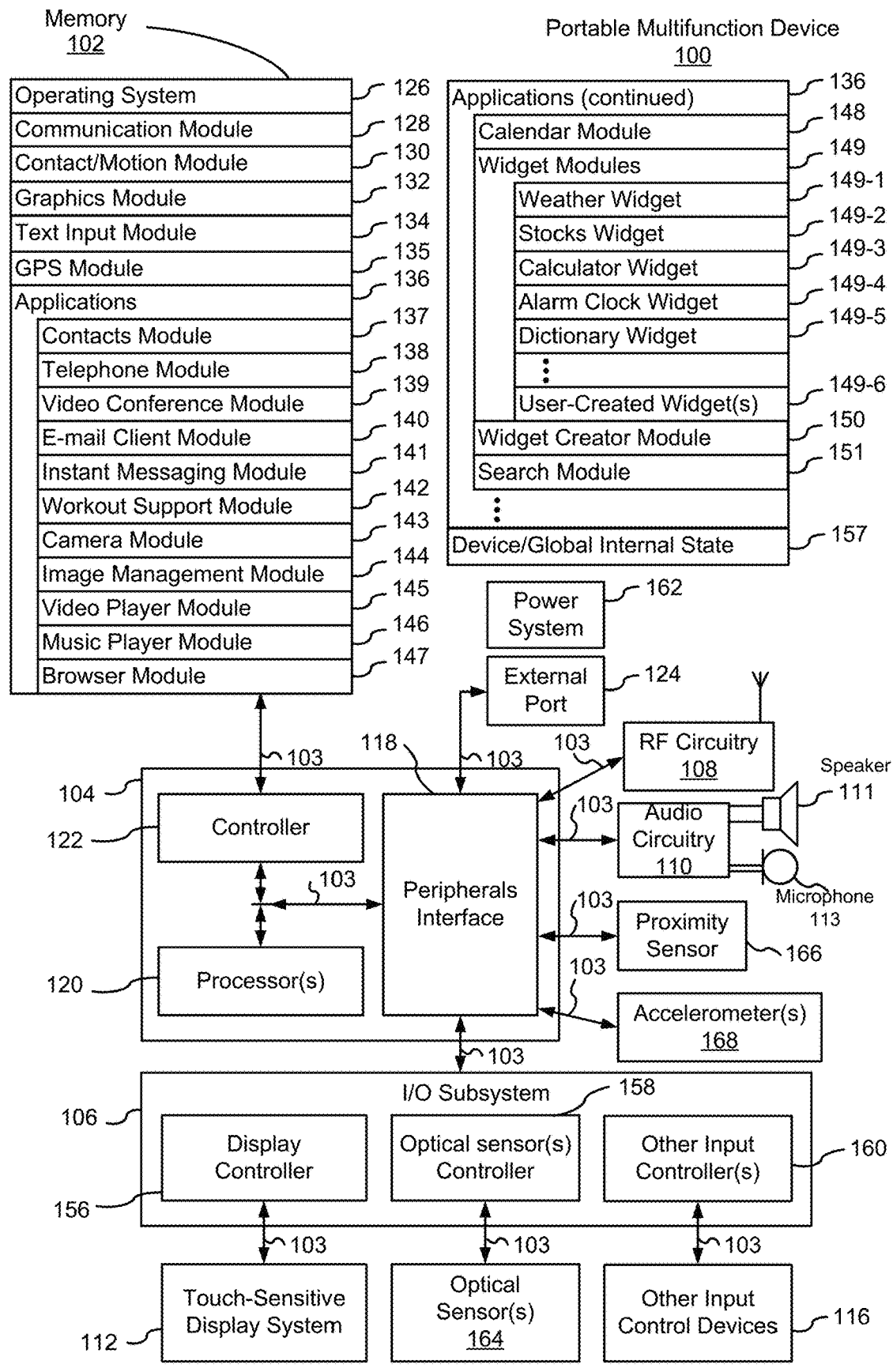
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
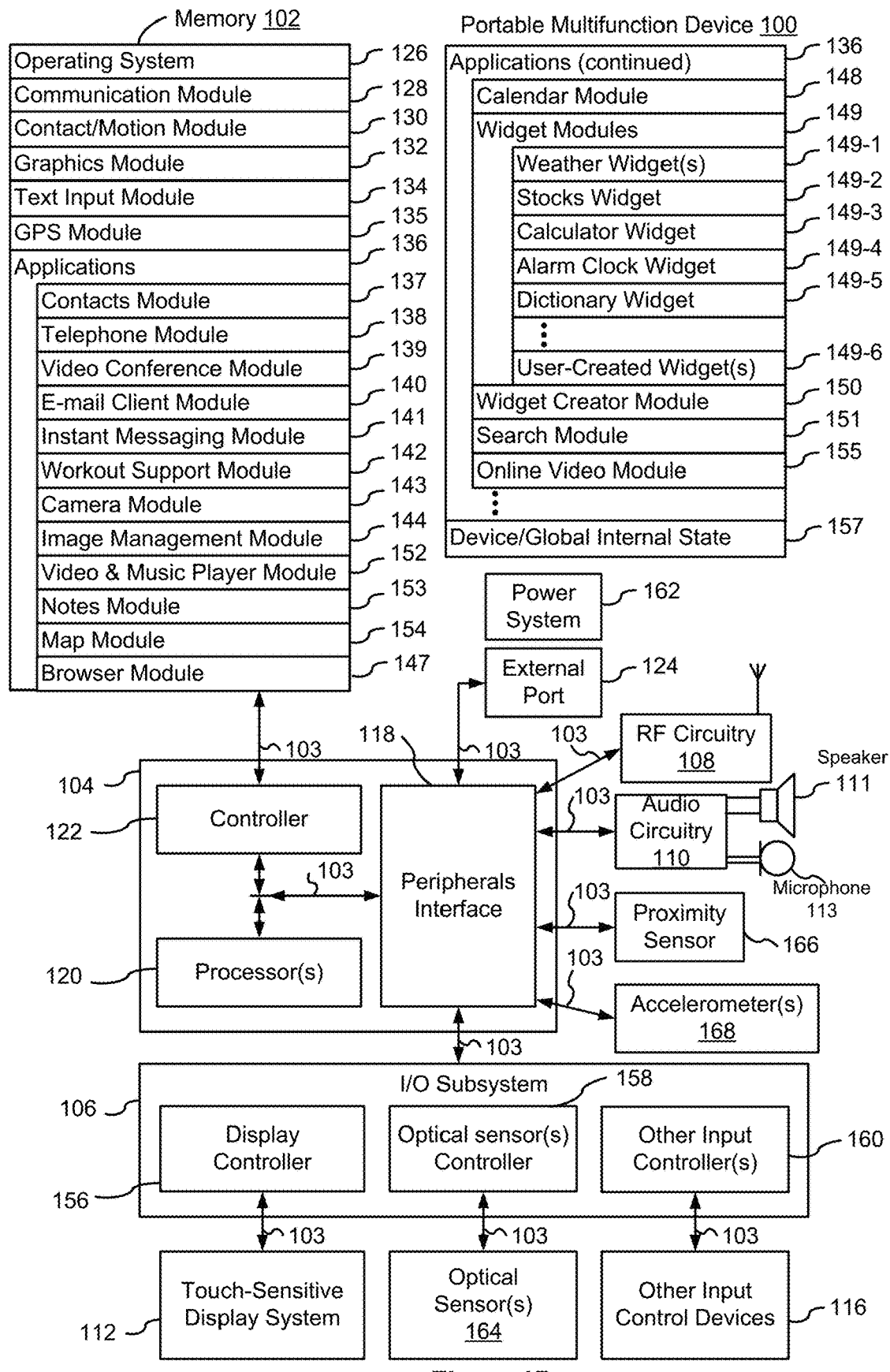

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
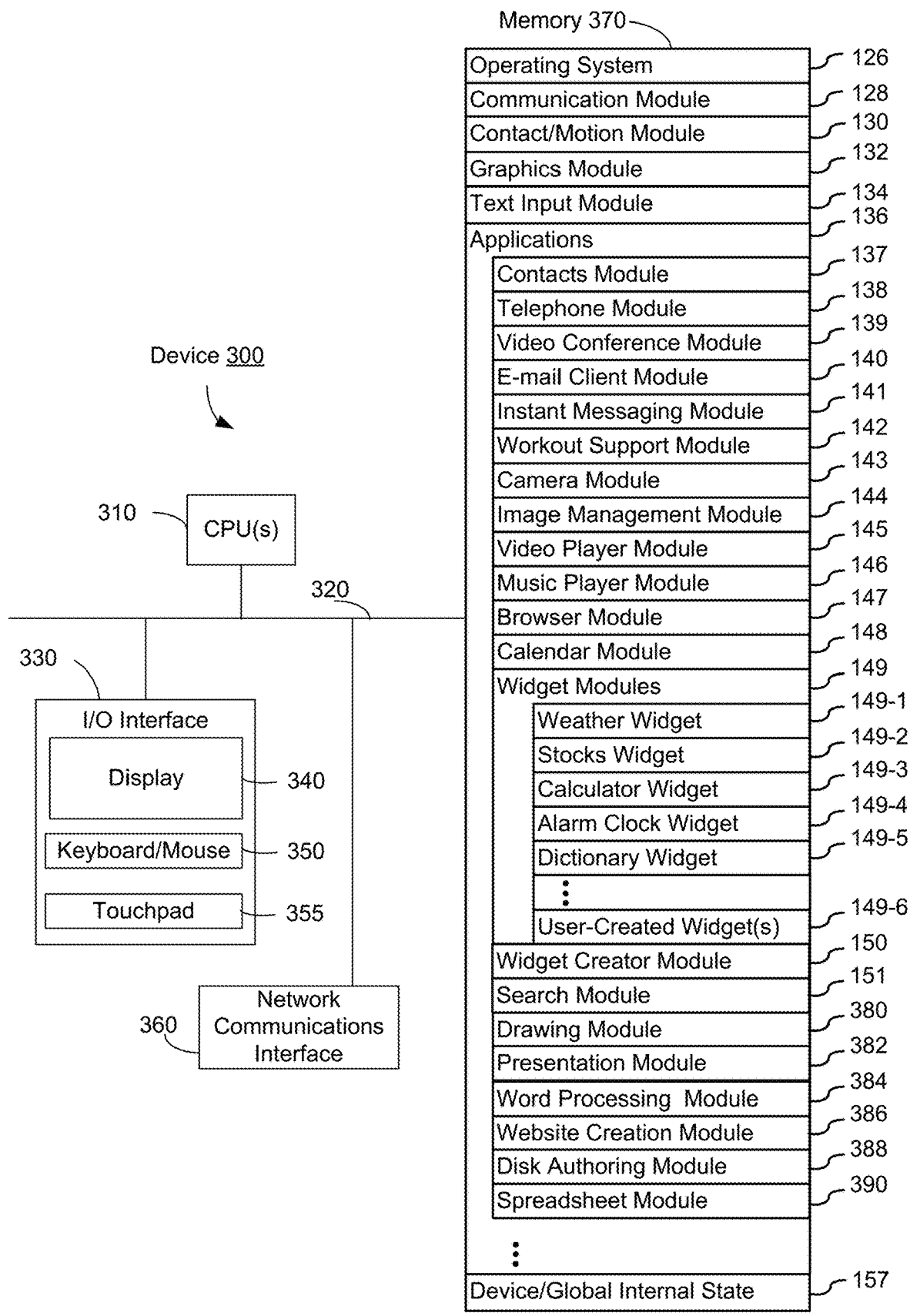
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module 145;
music player module 146;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
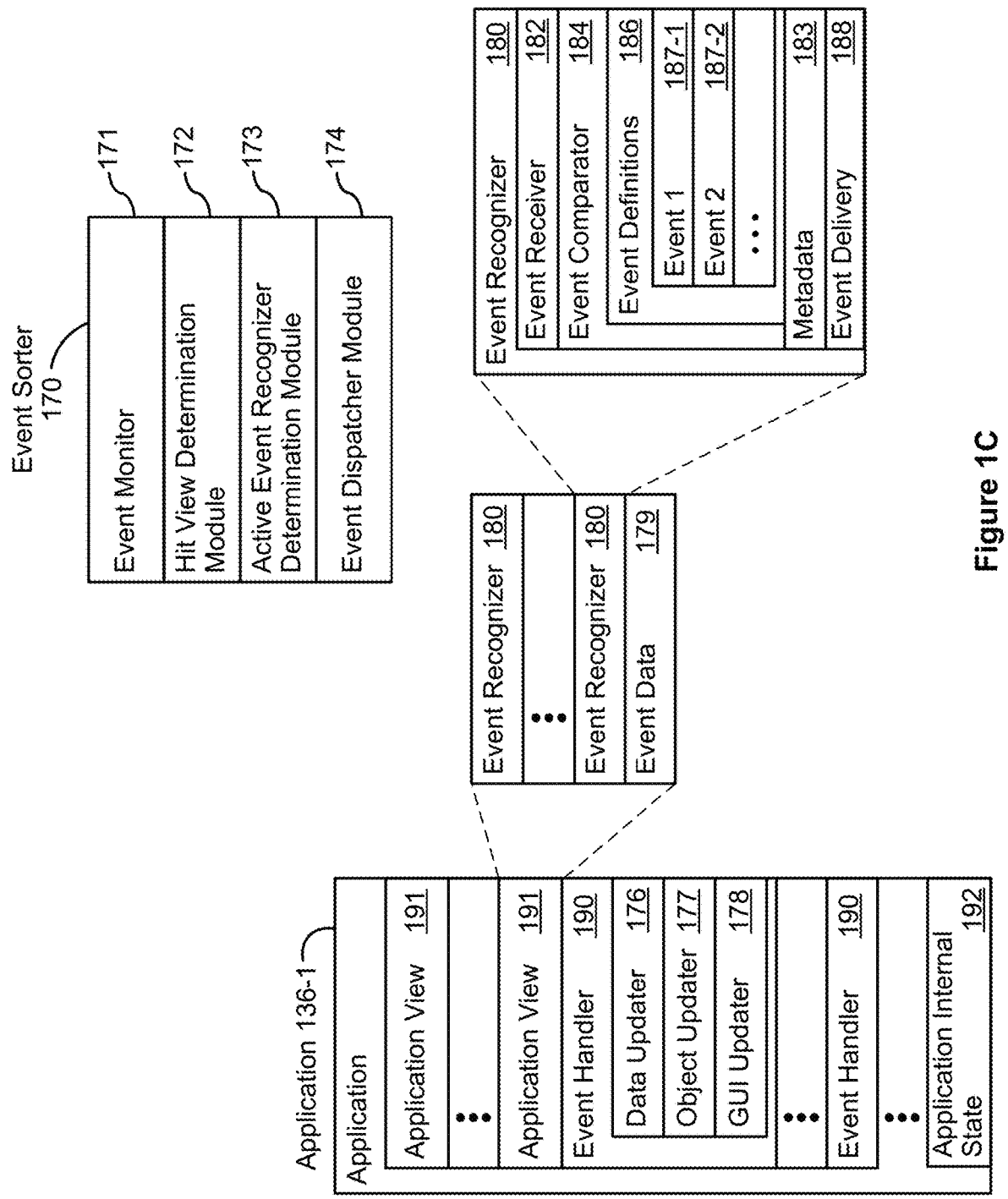
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1.

For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
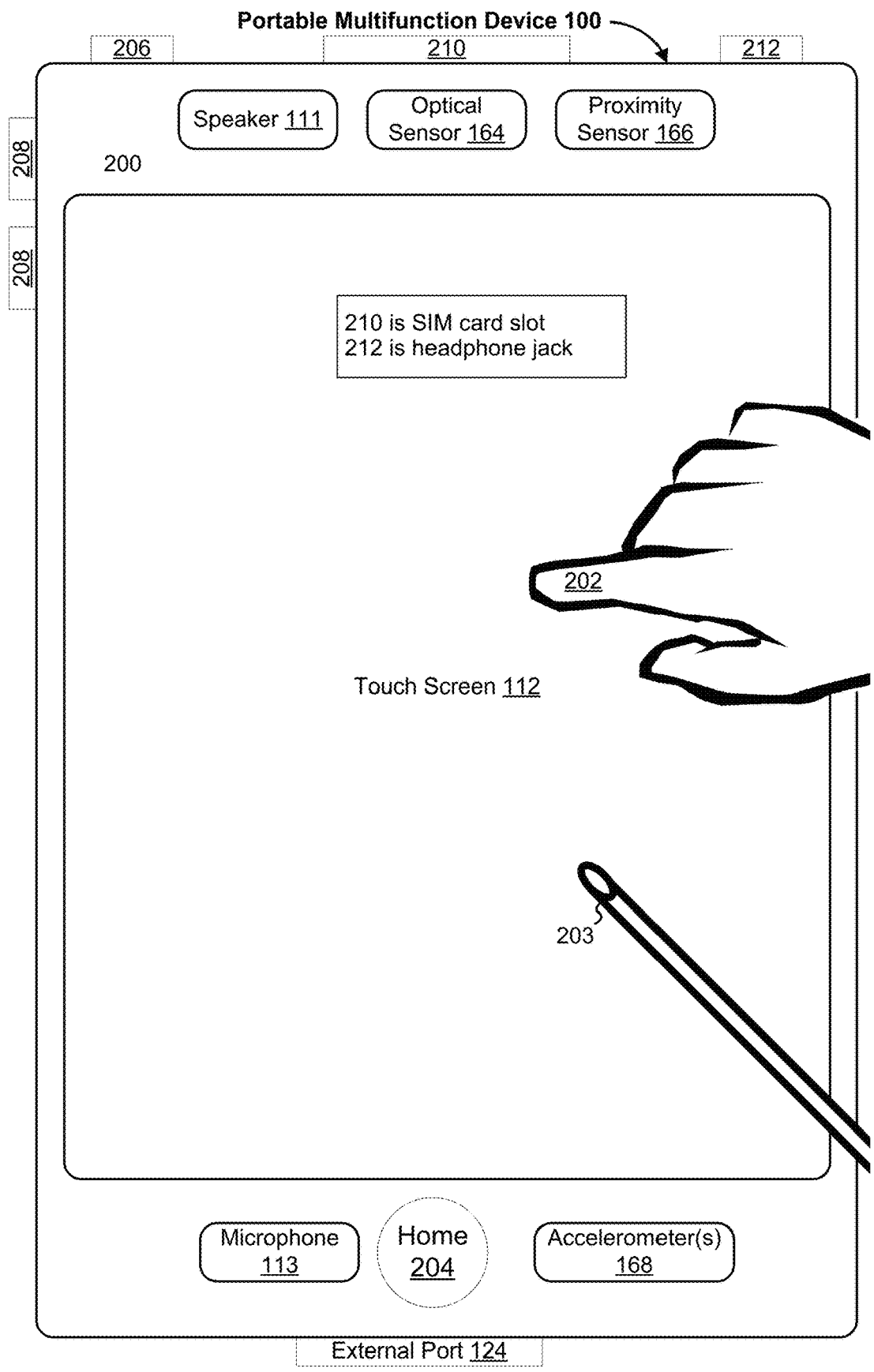
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
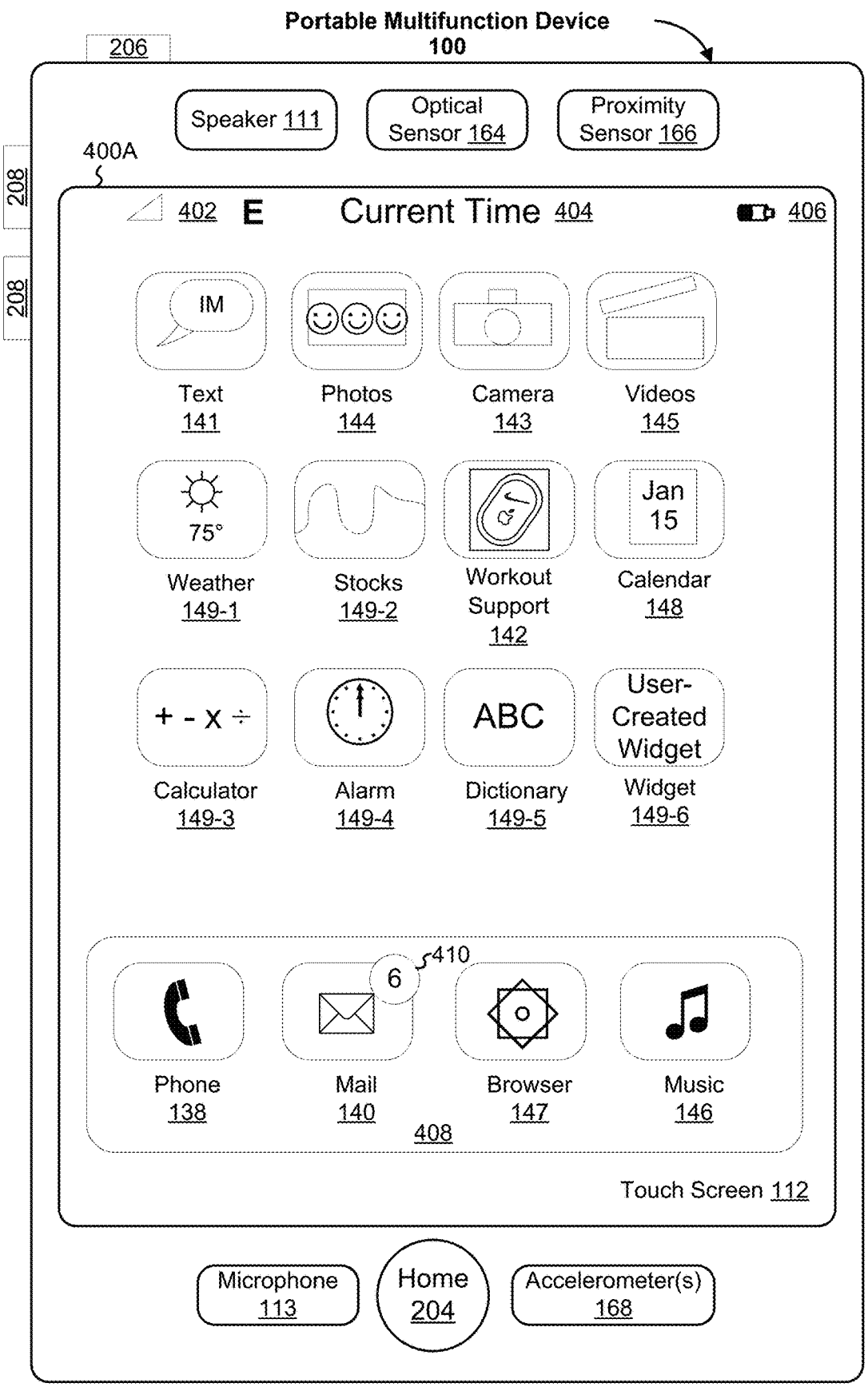
FIGS. 4A and 4B illustrate exemplary user interfaces for a menu of applications on a portable multifunction device in accordance with some embodiments.
Figure 4B:
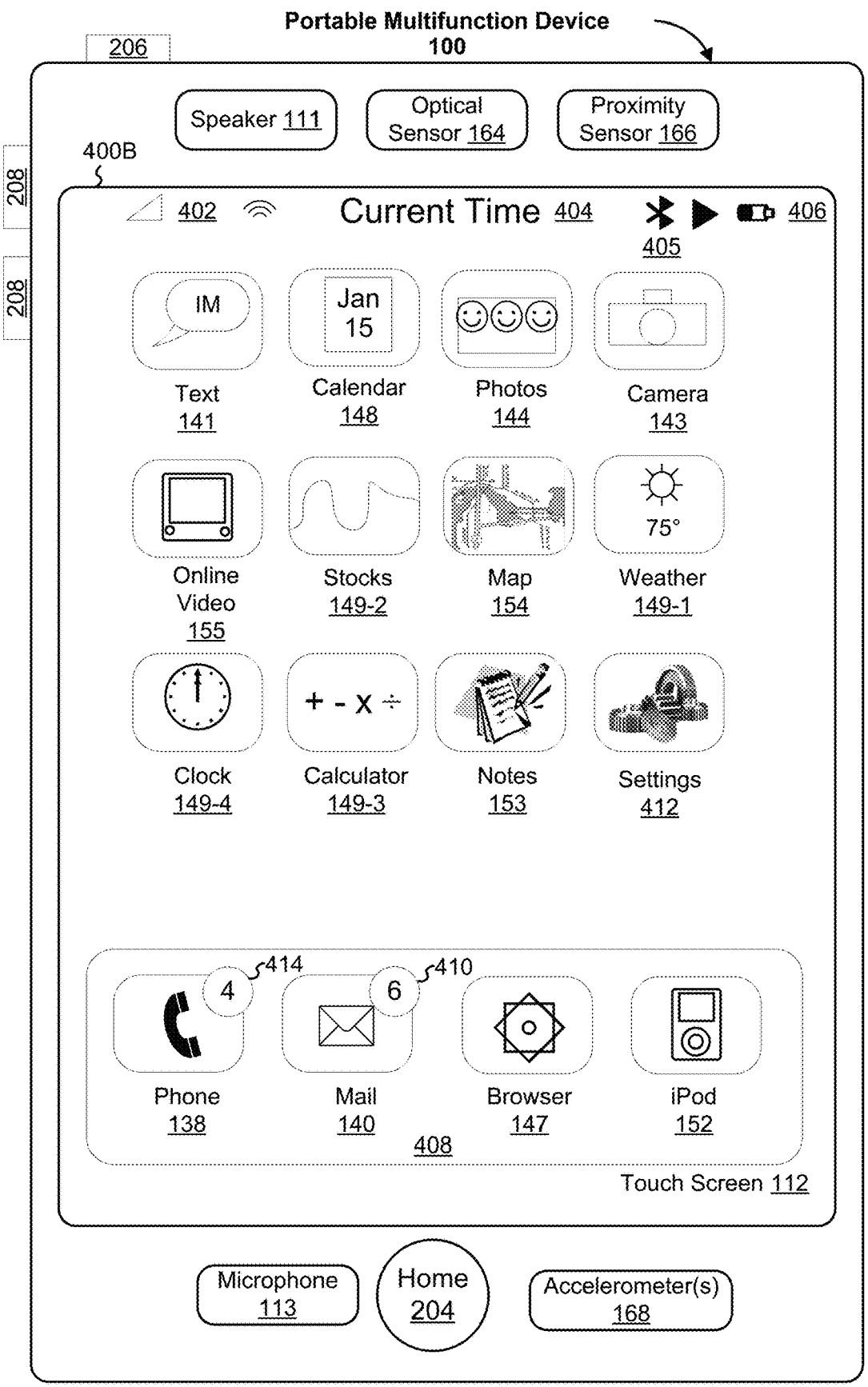

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:
402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Attention is now directed towards embodiments of user interfaces ("UI") and associated processes that may be implemented on a multifunction device with a display and a touch-sensitive surface, such as device 300 or portable multifunction device 100.

Figure 5A:
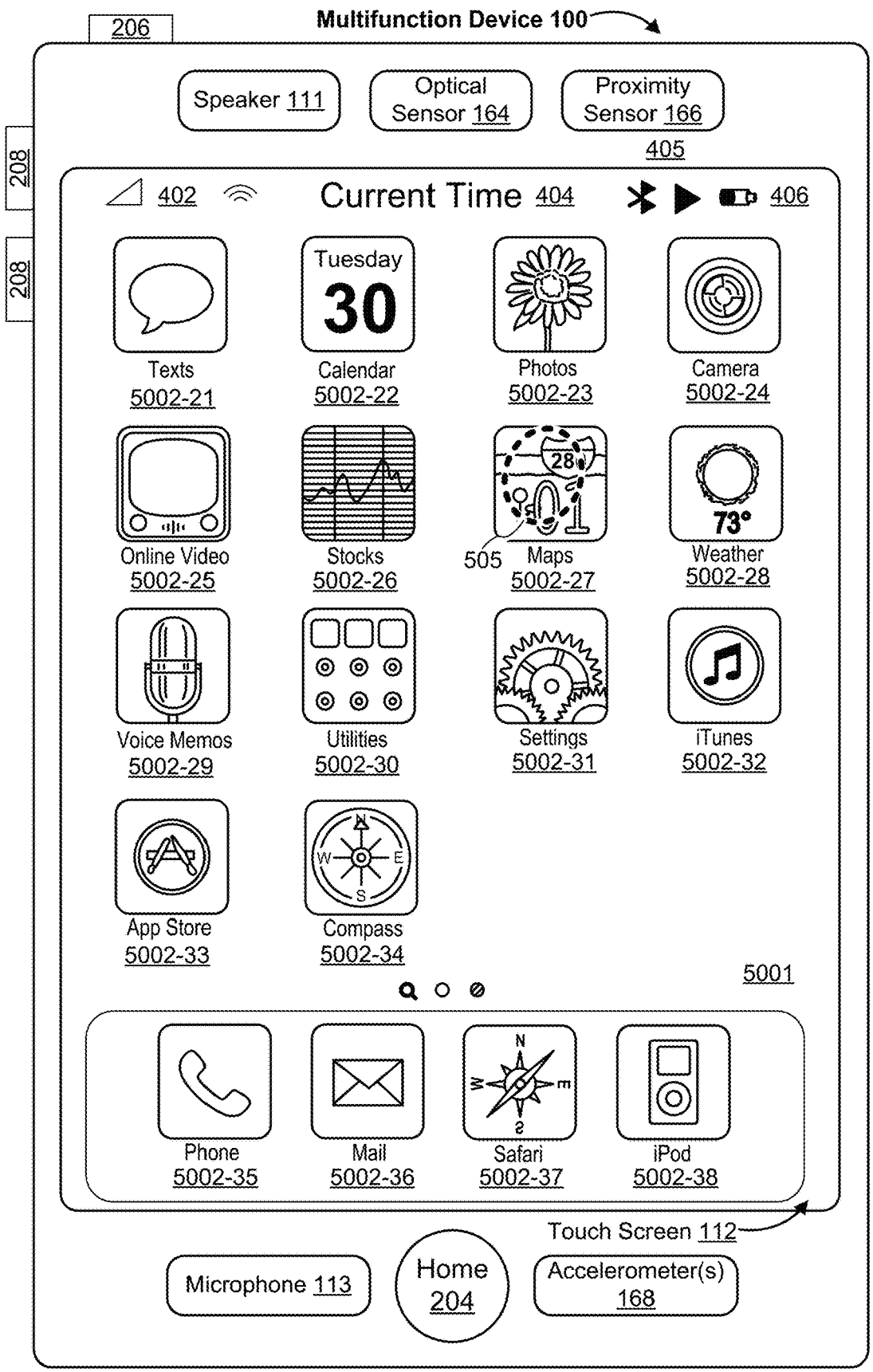
FIGS. 5A-5ZZ illustrate exemplary user interfaces for selecting one of concurrently open applications in accordance with some embodiments.
Figure 5B:
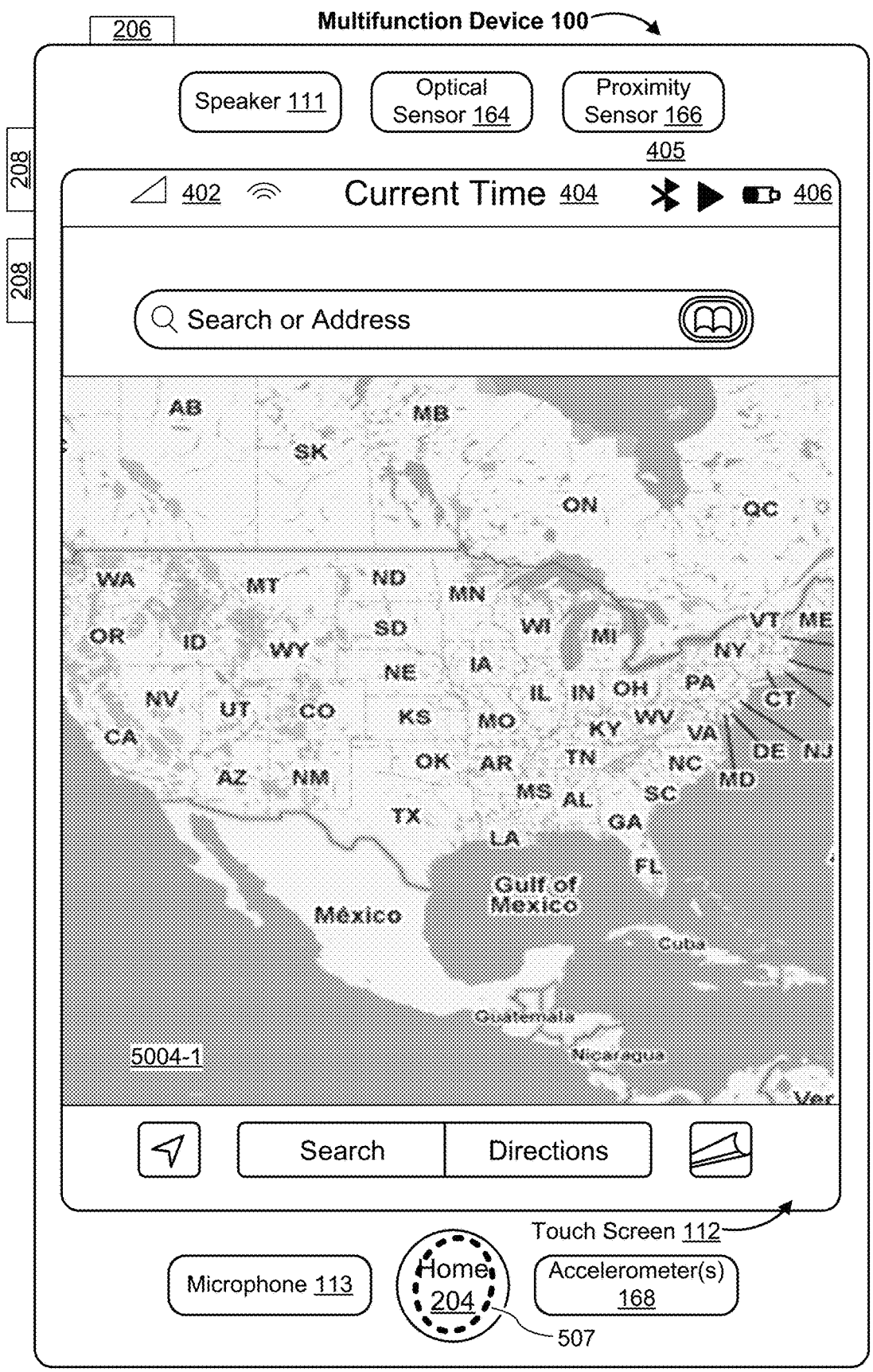
Figure 5C:
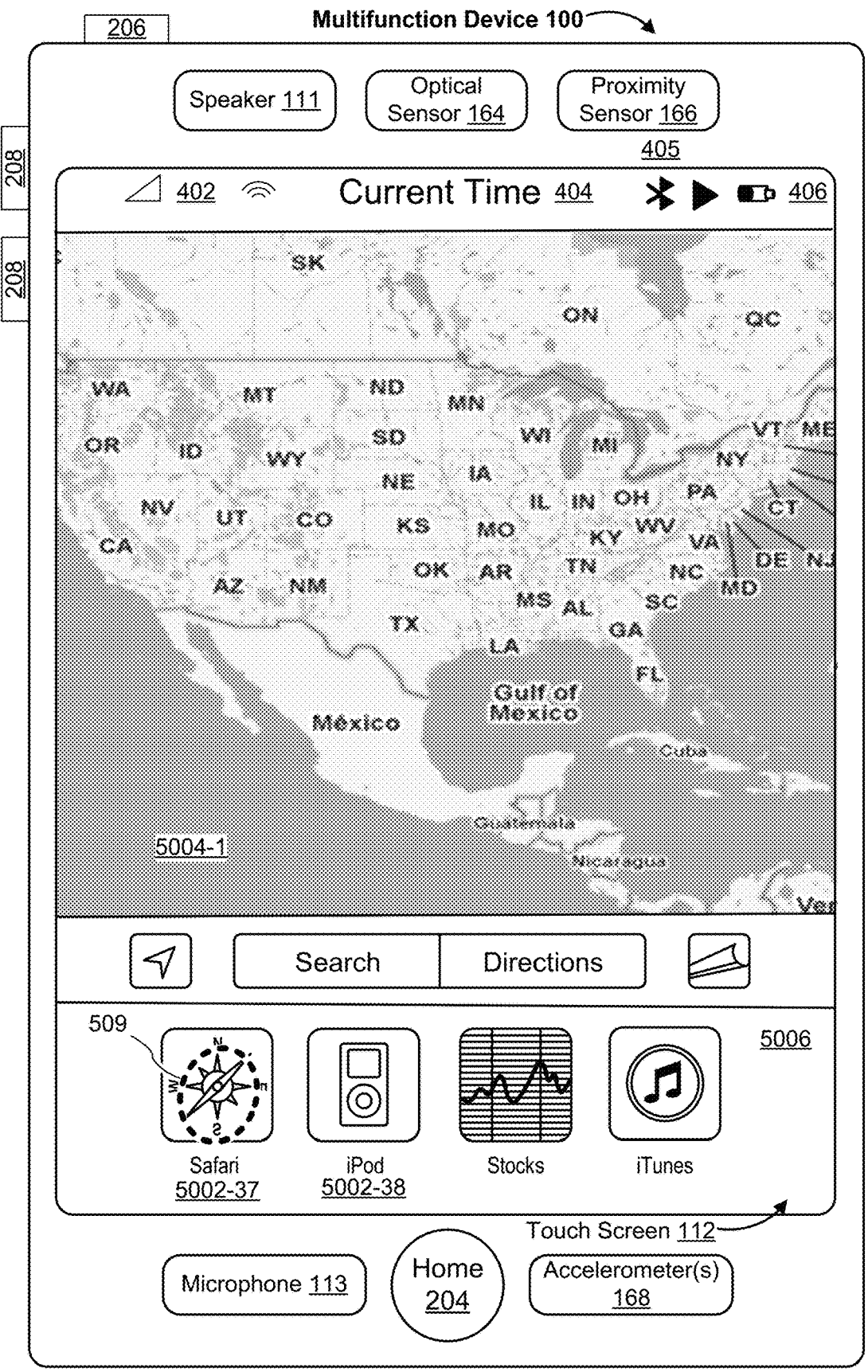
Figure 5D:
Figure 5E:
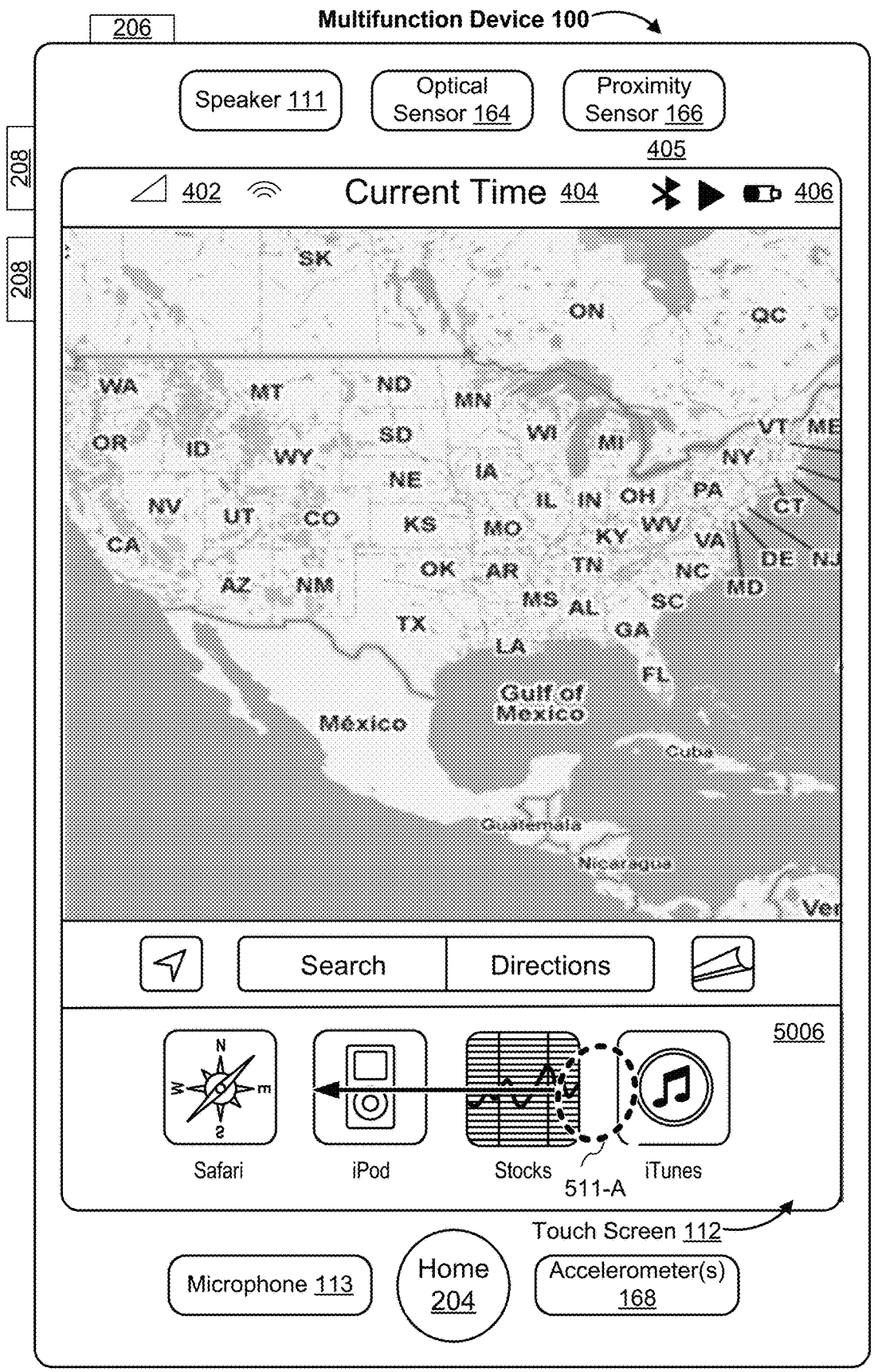
Figure 5F:
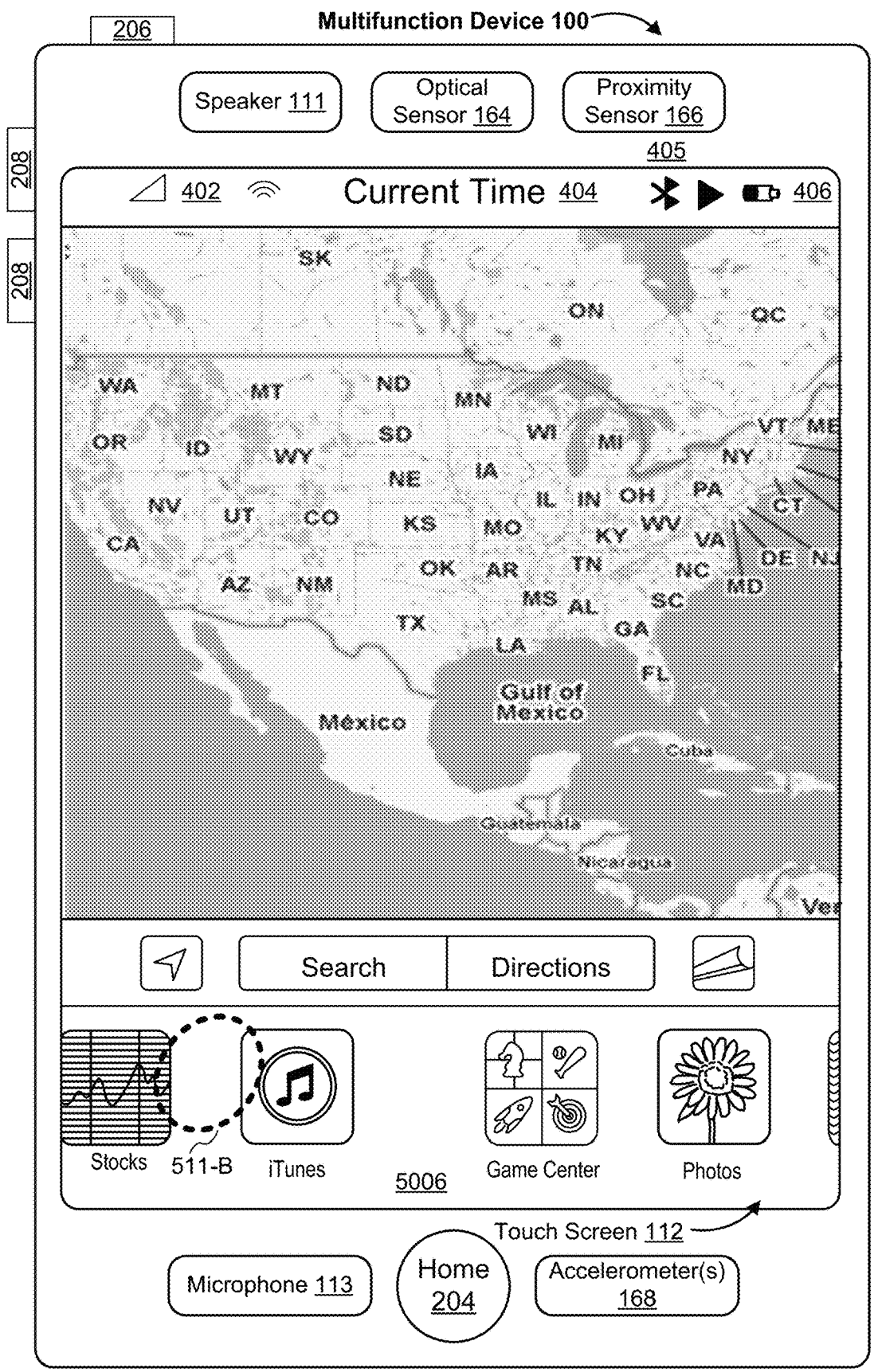
Figure 5G:
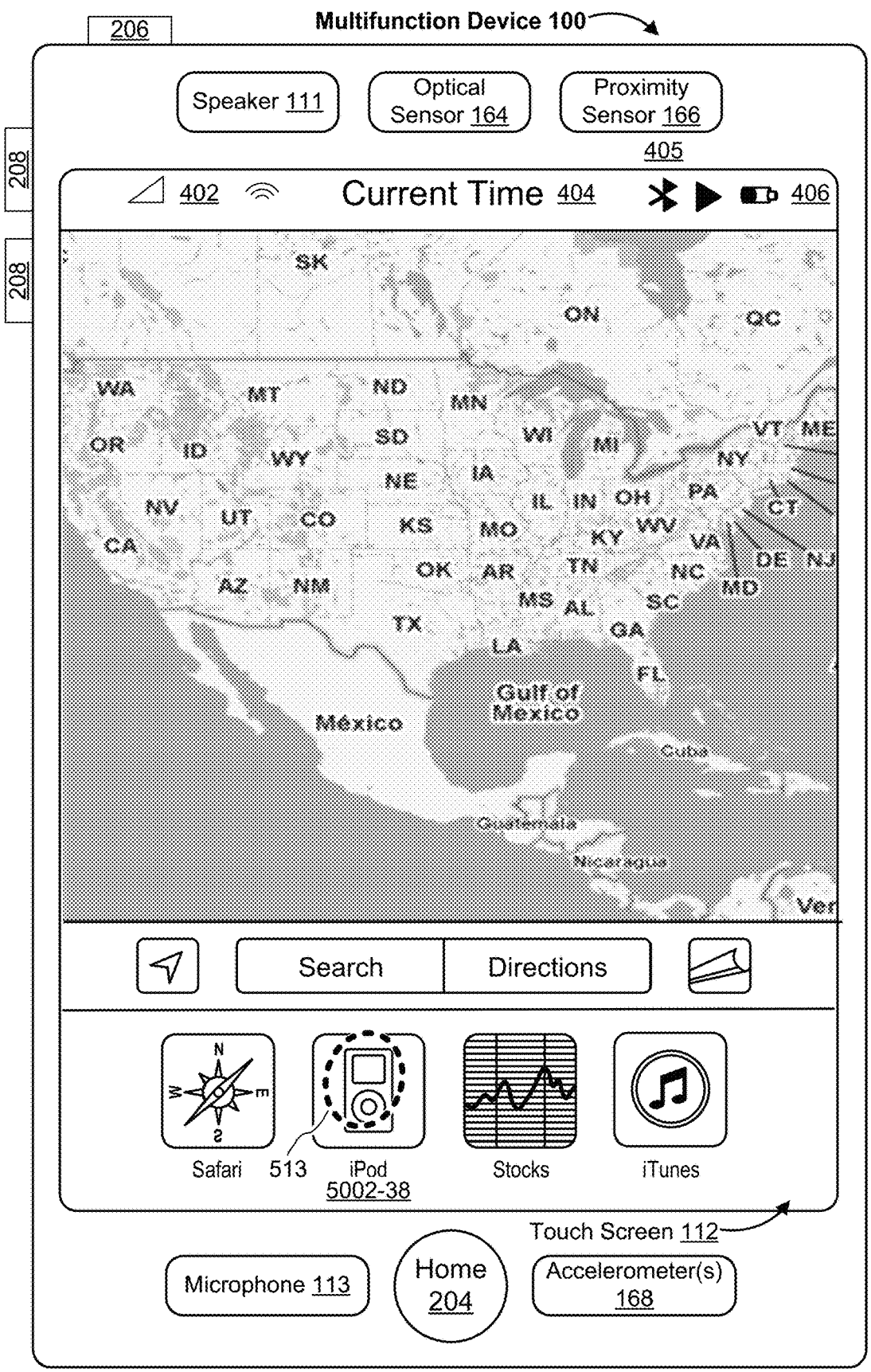
Figure 5H:
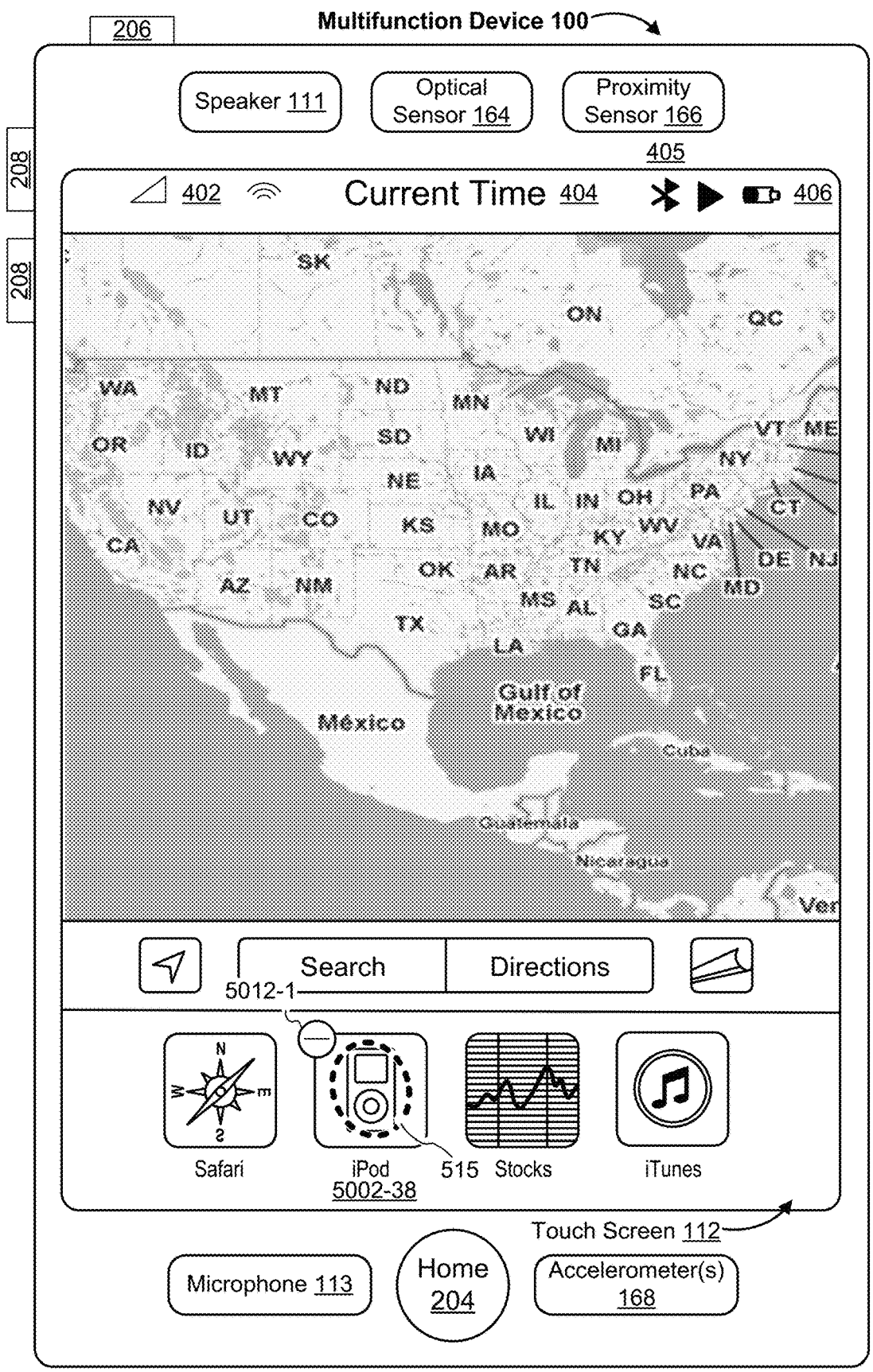
Figure 5I:
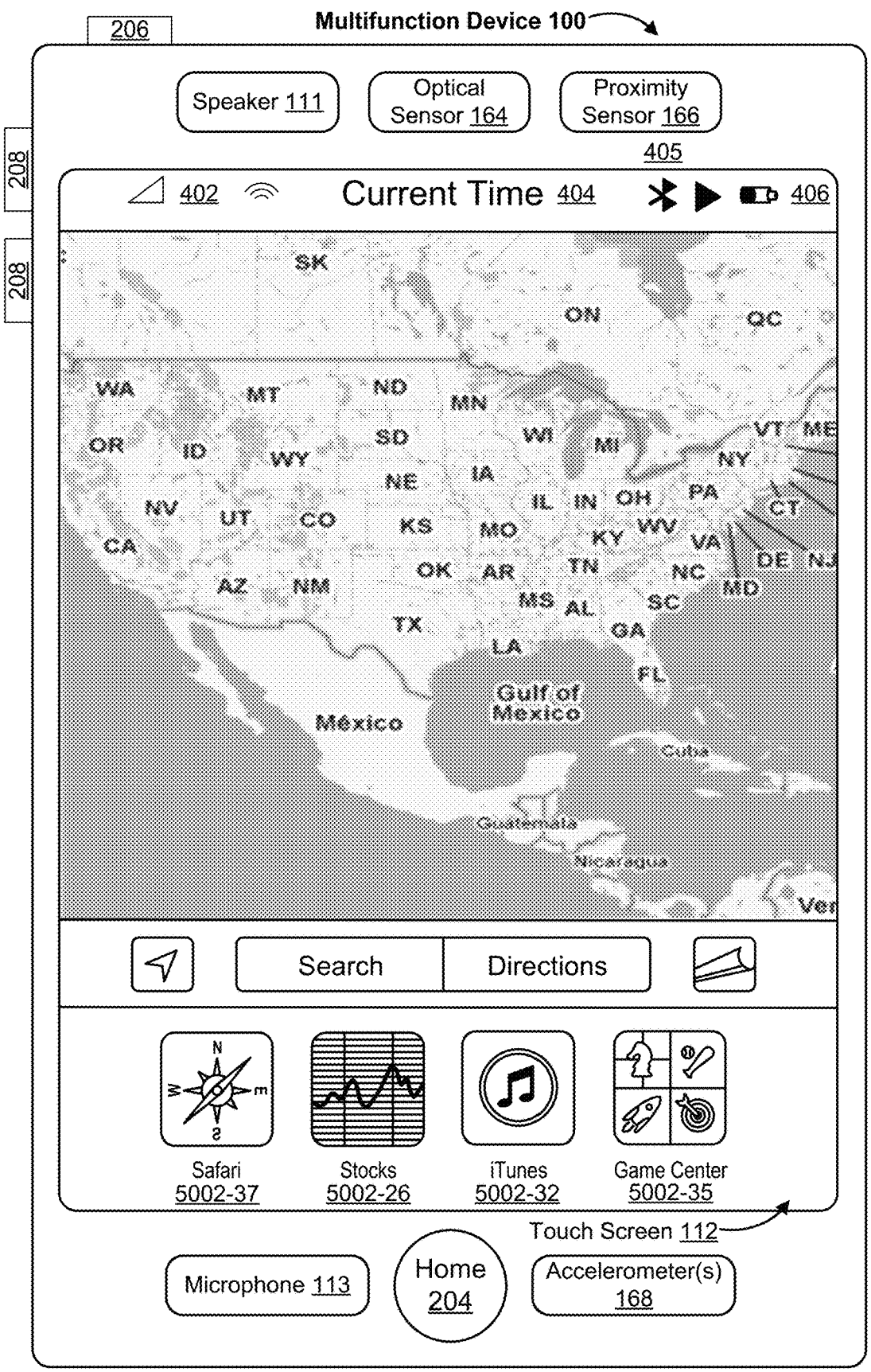
Figure 5J:
Figure 5K:
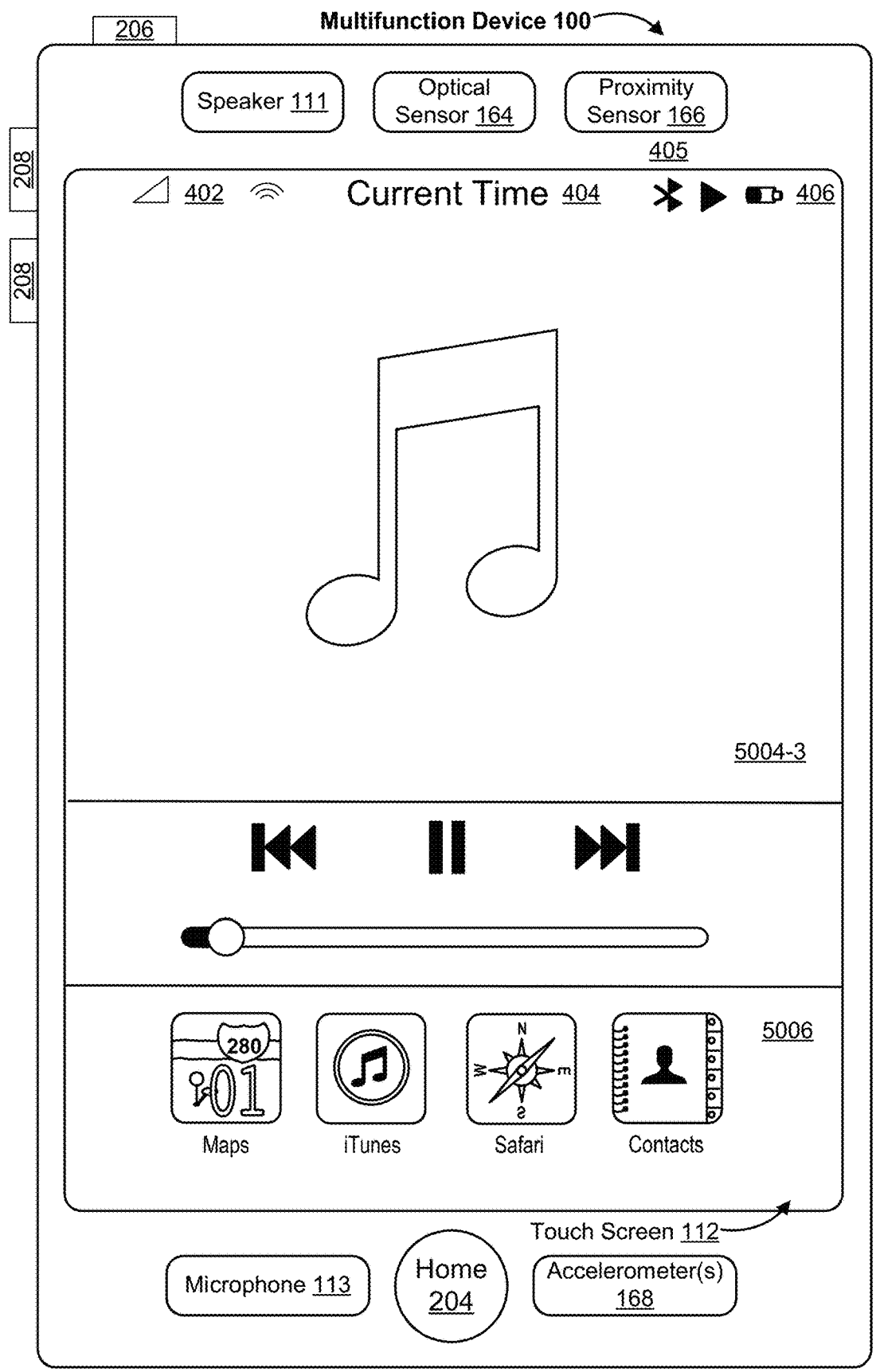
Figure 5L:
Figure 5M:
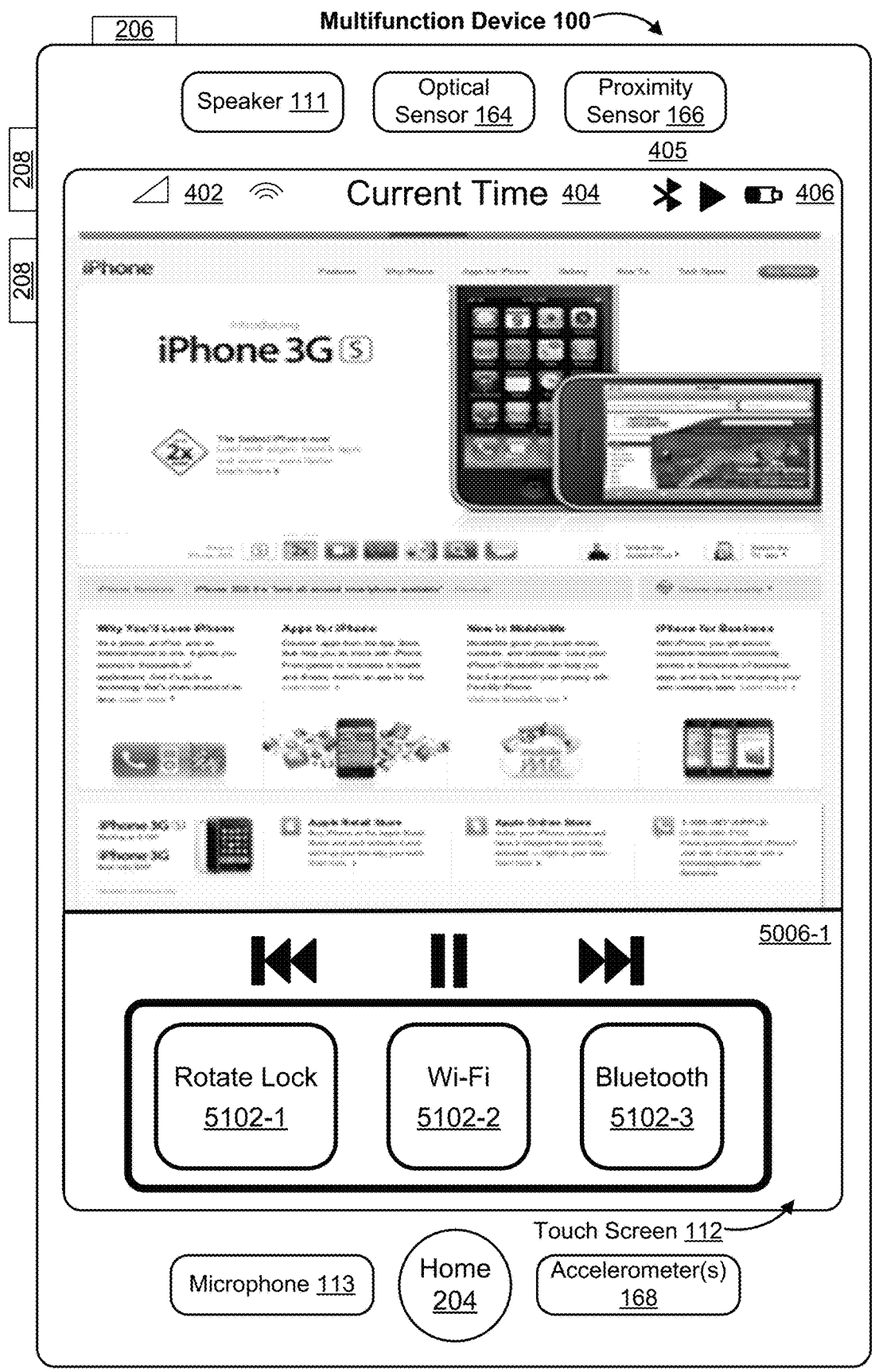
Figure 5N:
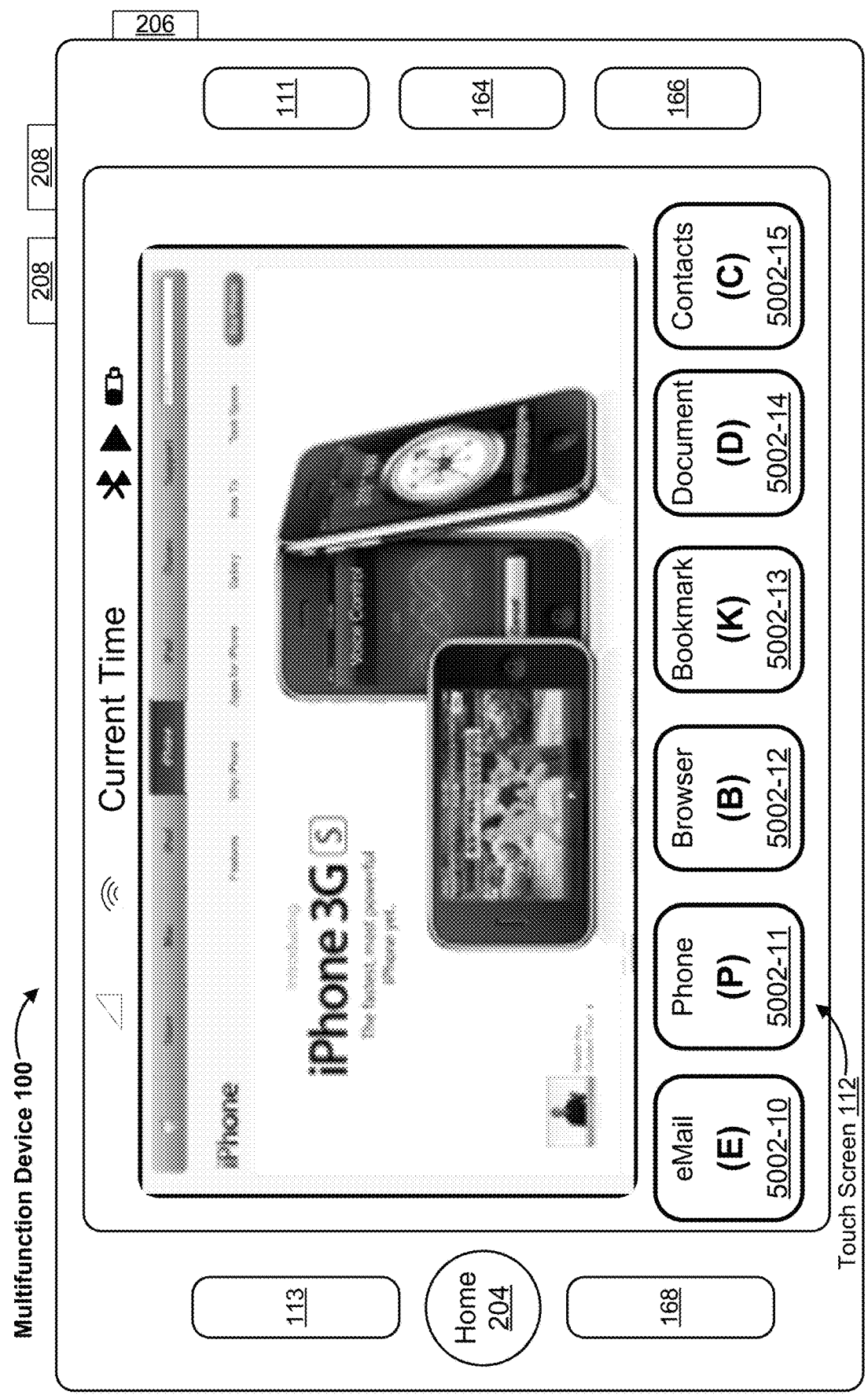
Figure 5O:
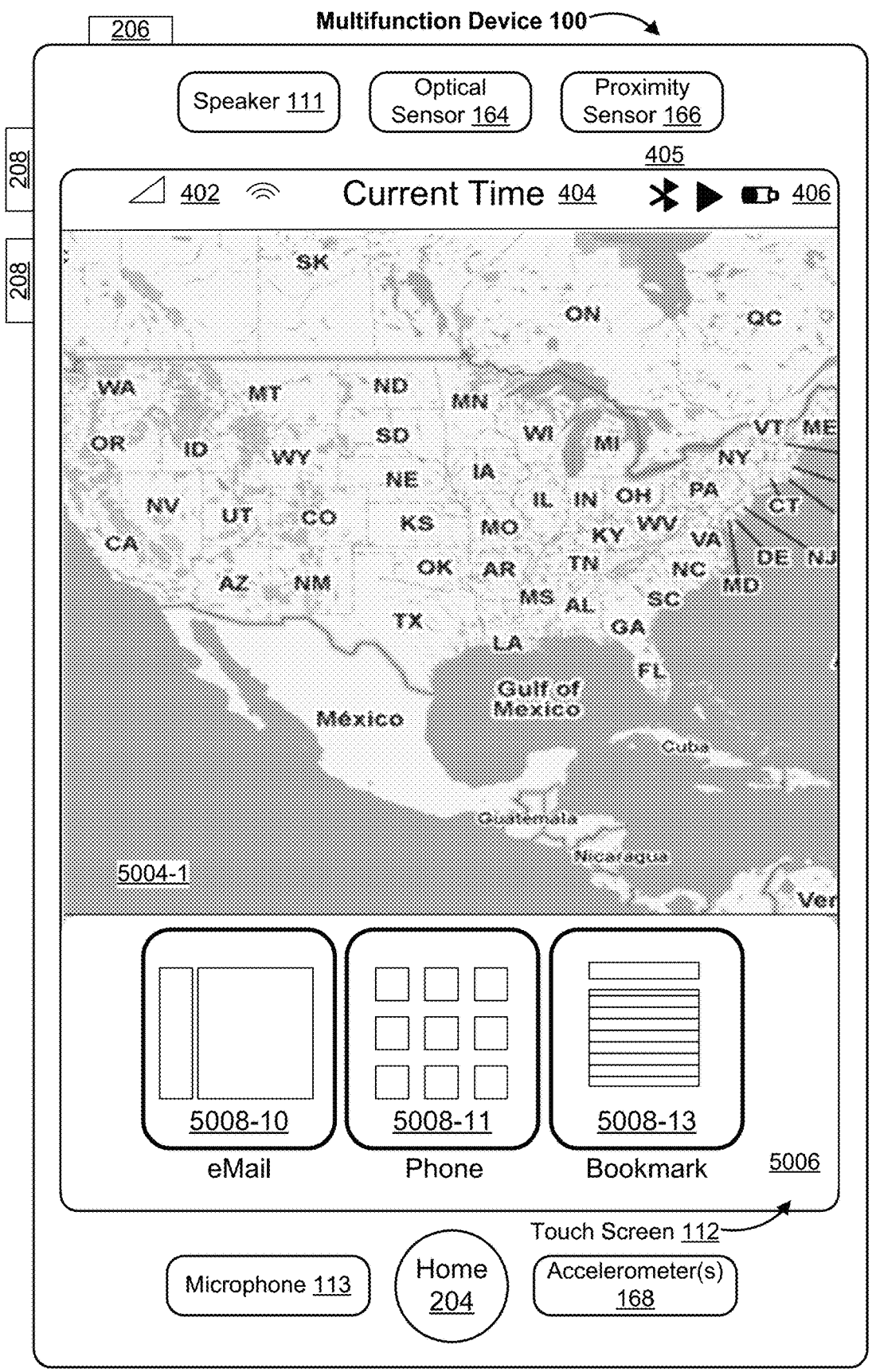
Figure 5P:
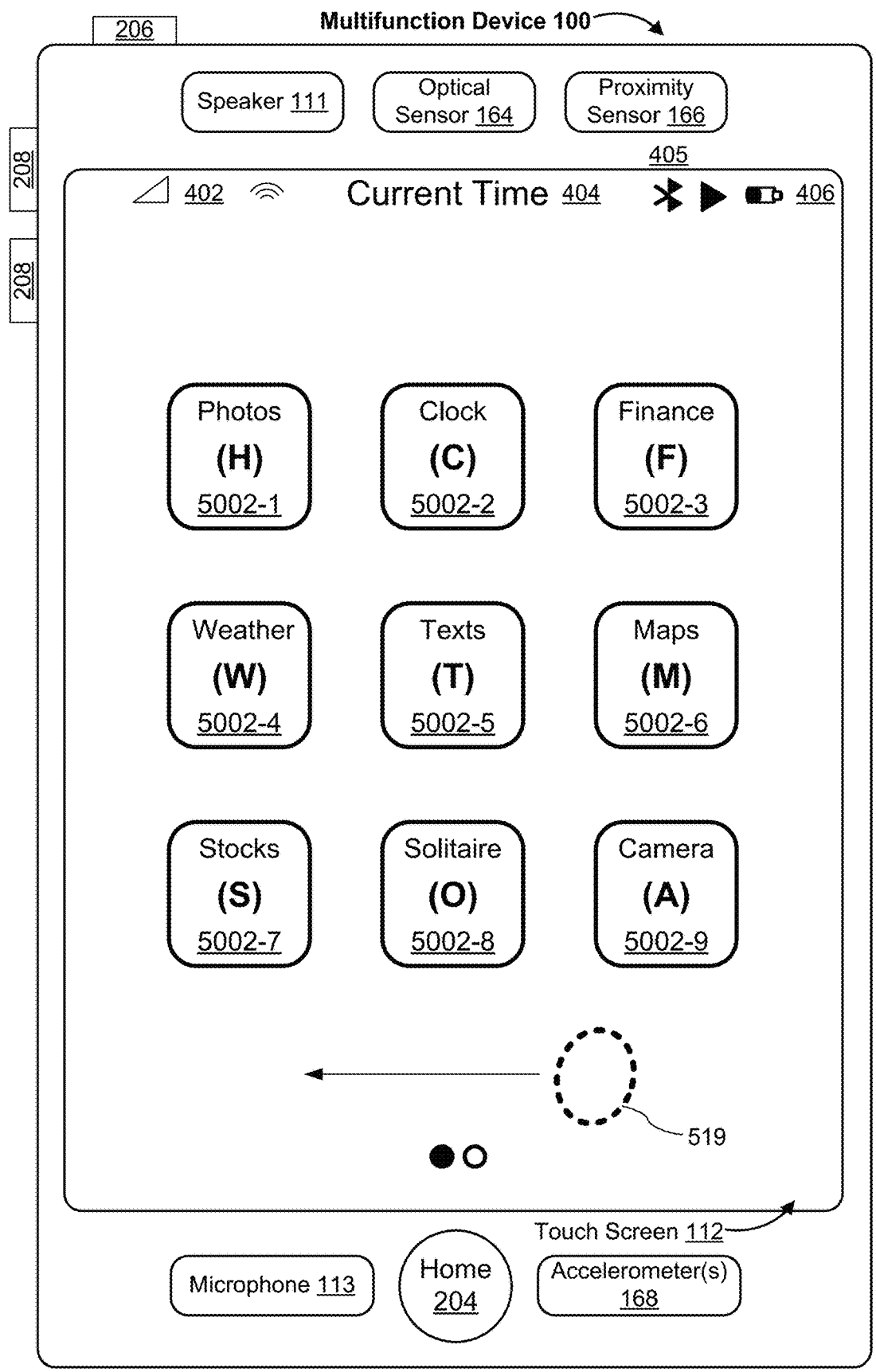
Figure 5Q:
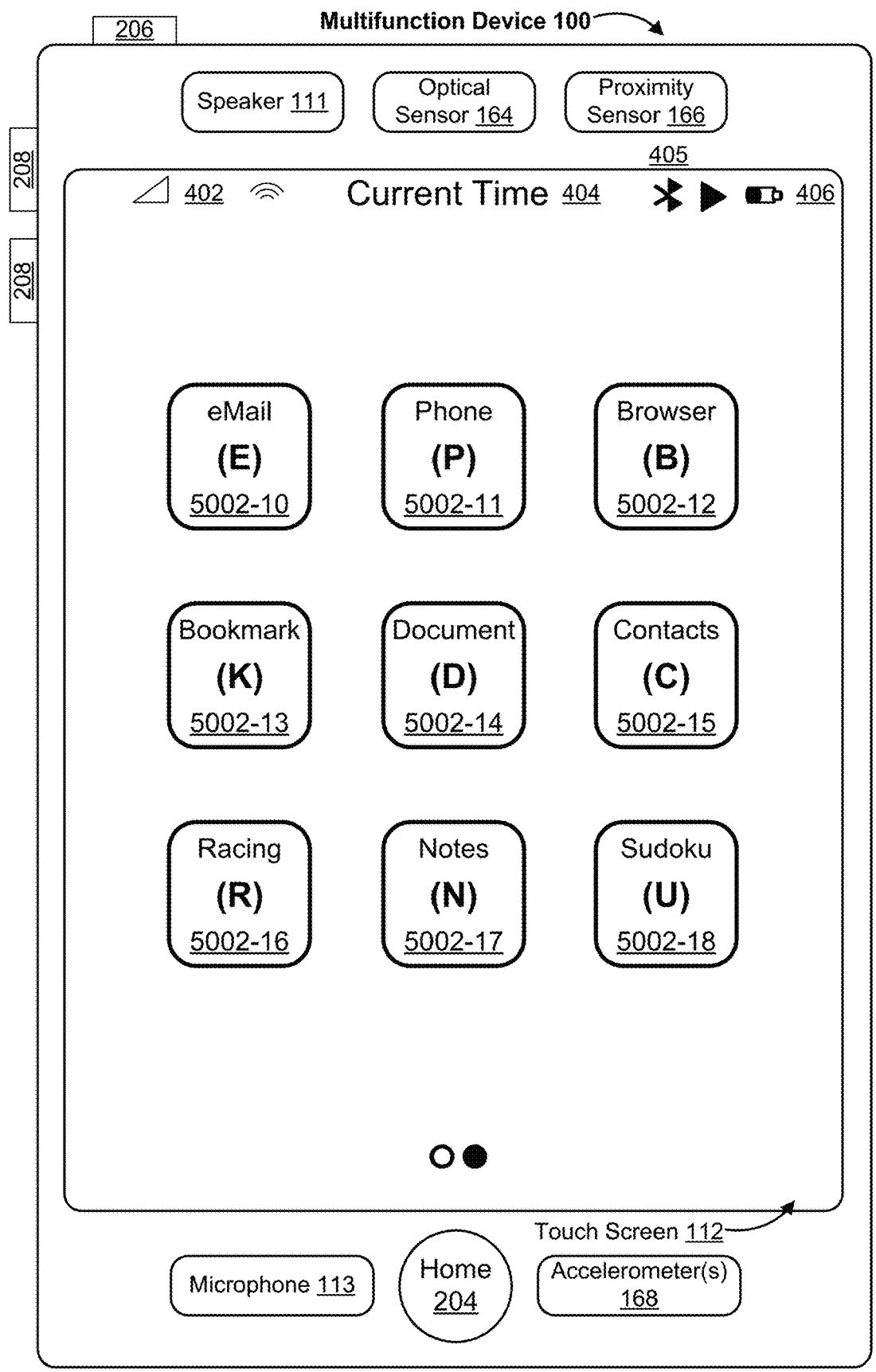
Figure 5R:
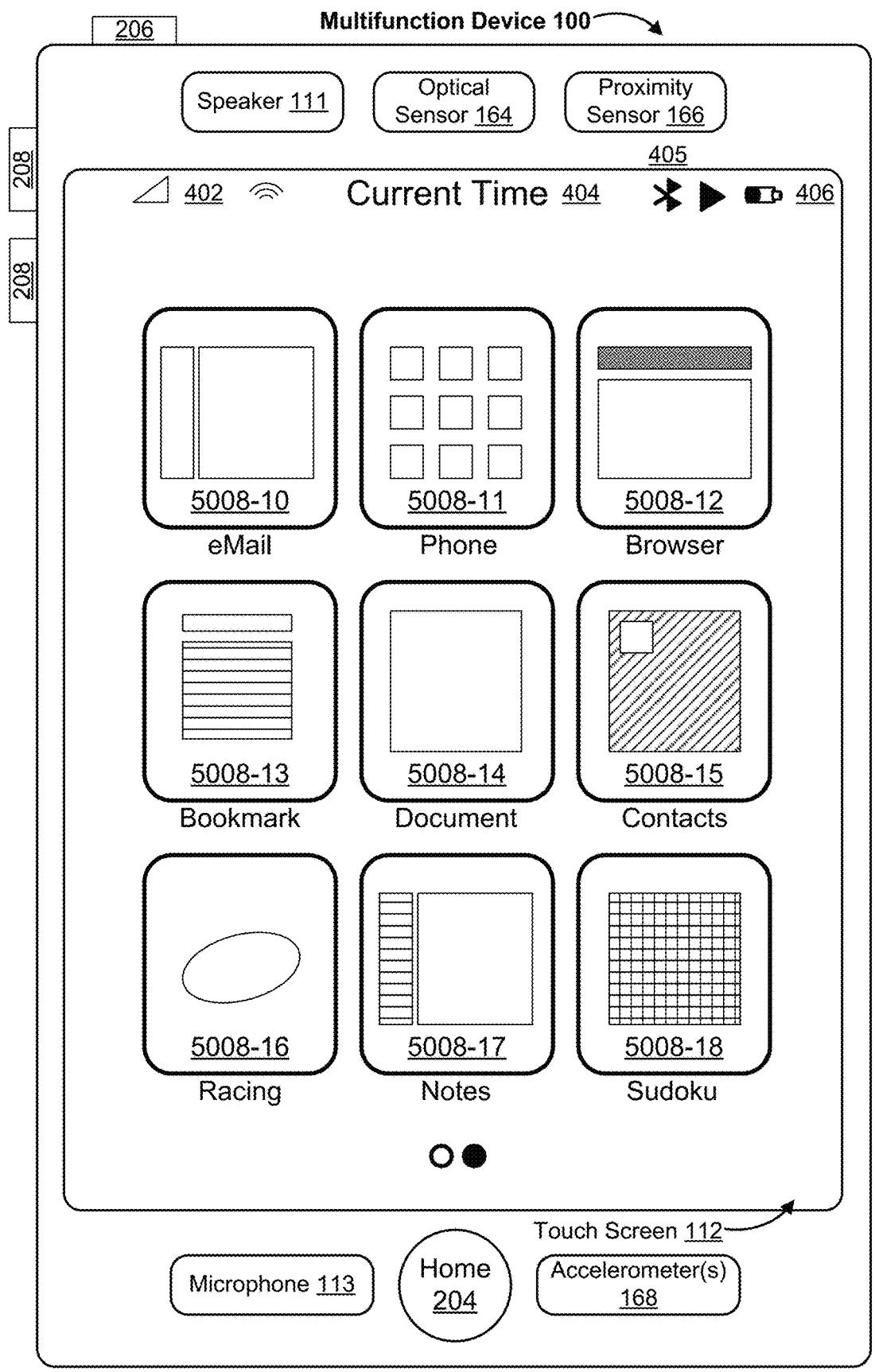
Figure 5S:
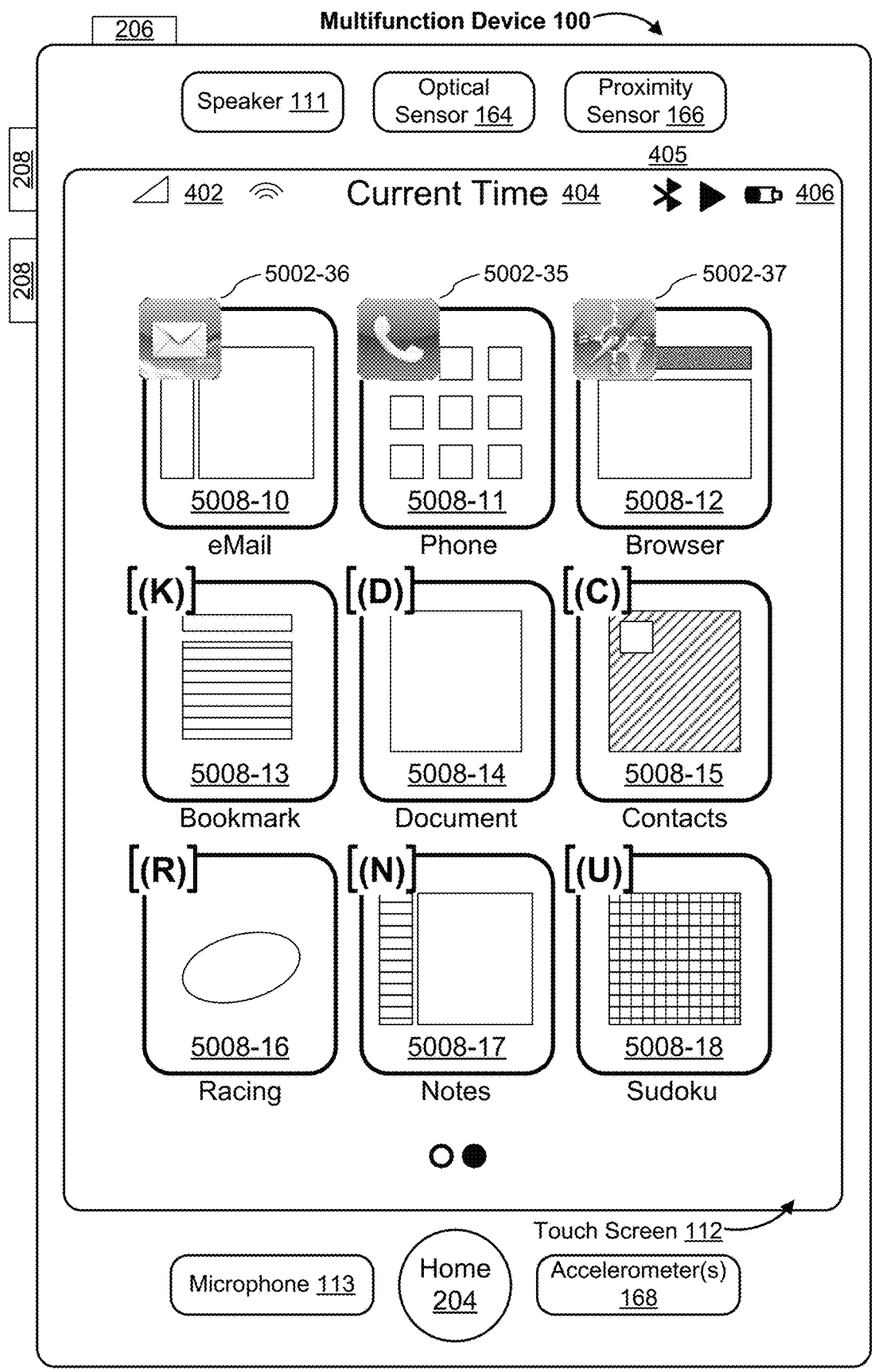
Figure 5T:
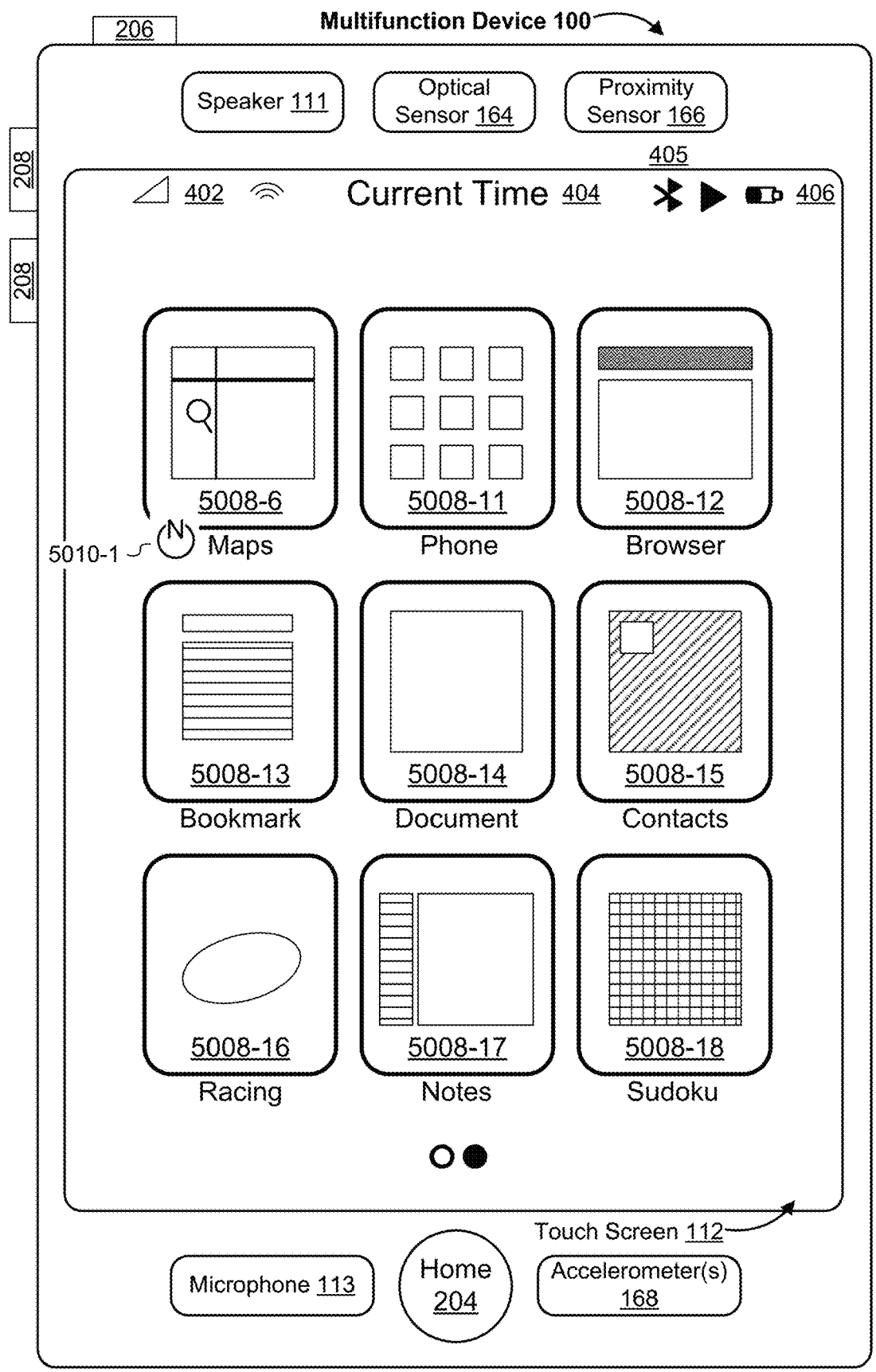
Figure 5U:
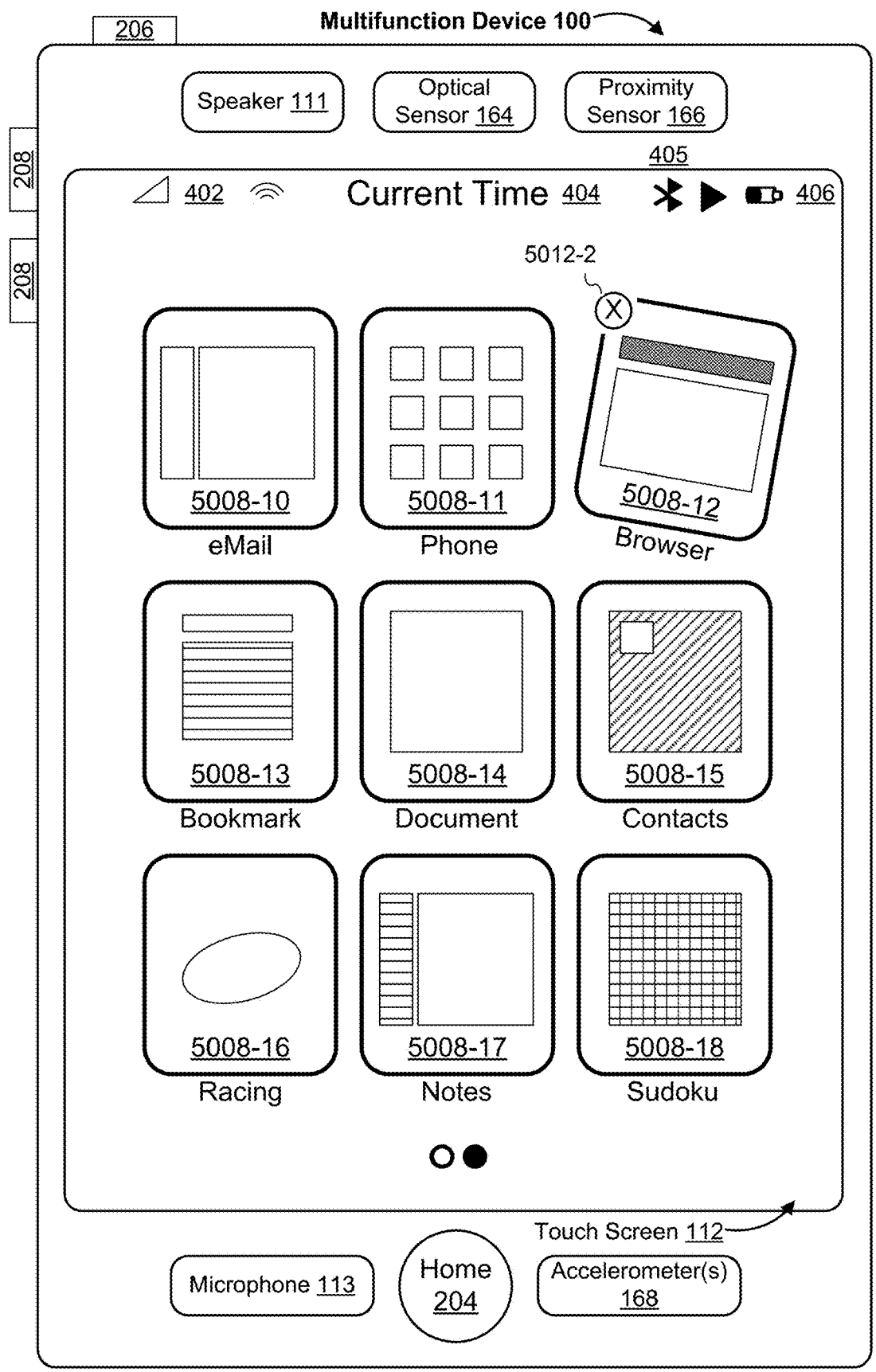
Figure 5V:
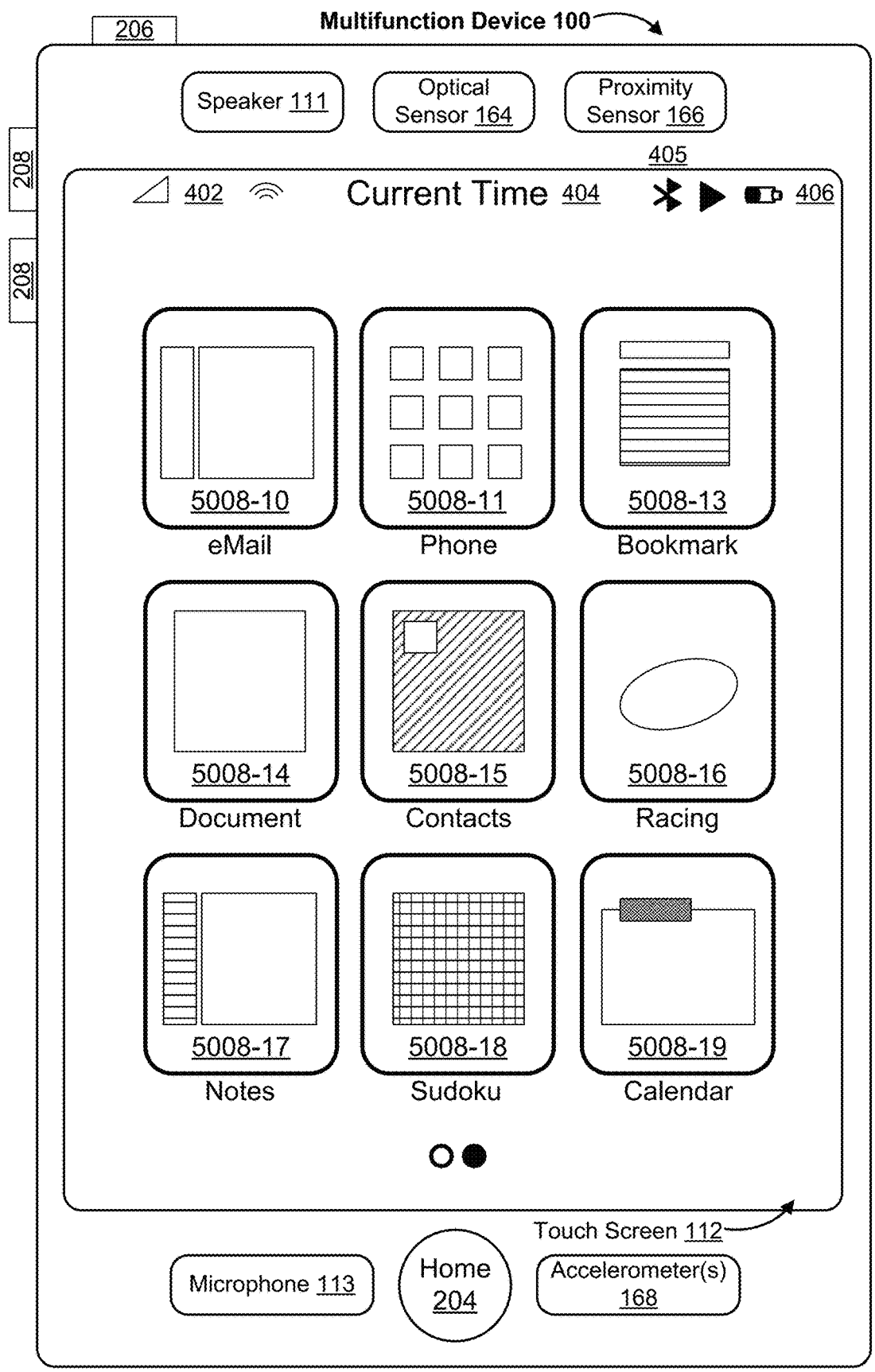
Figure 5W:
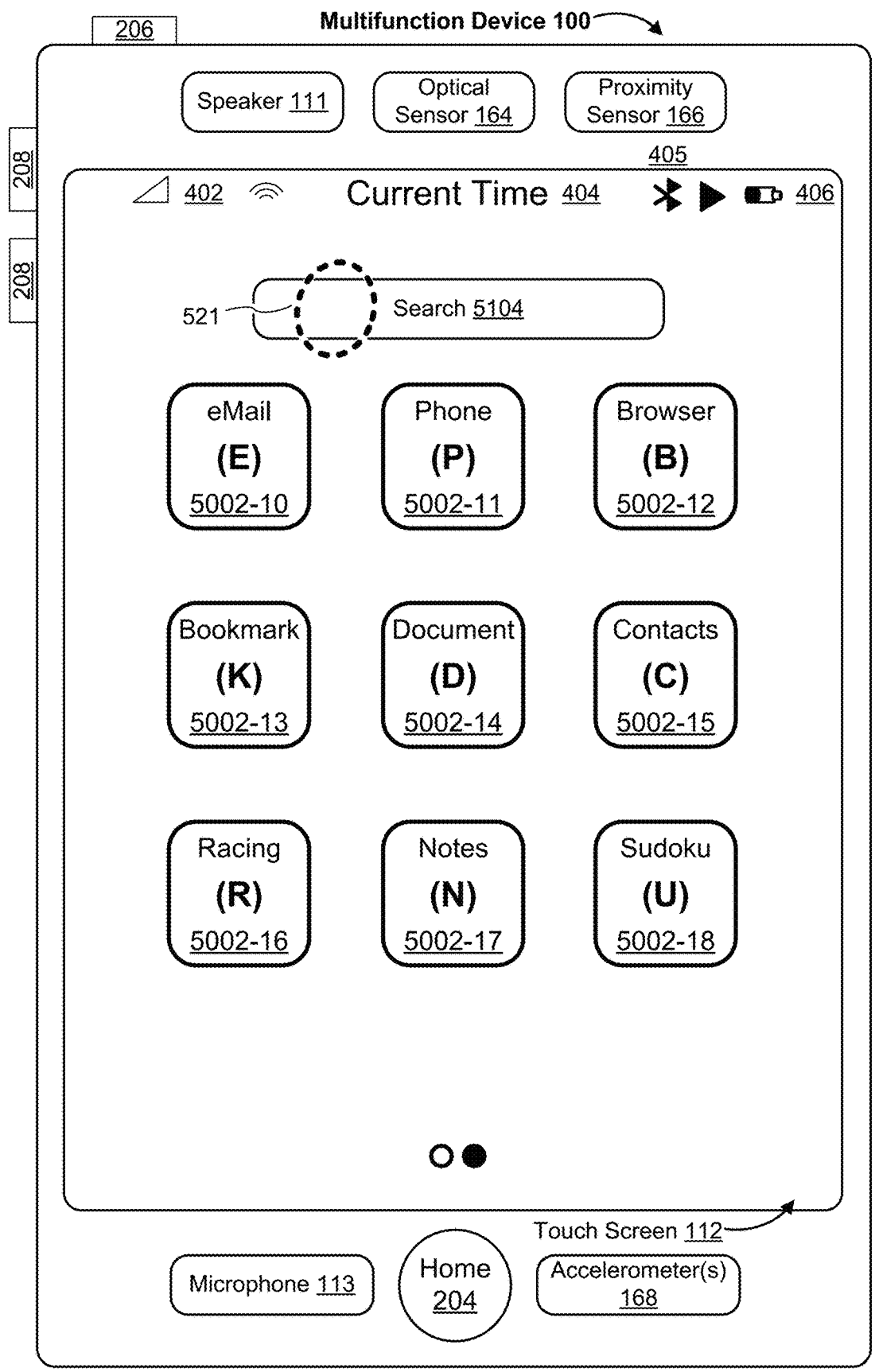
Figure 5X:
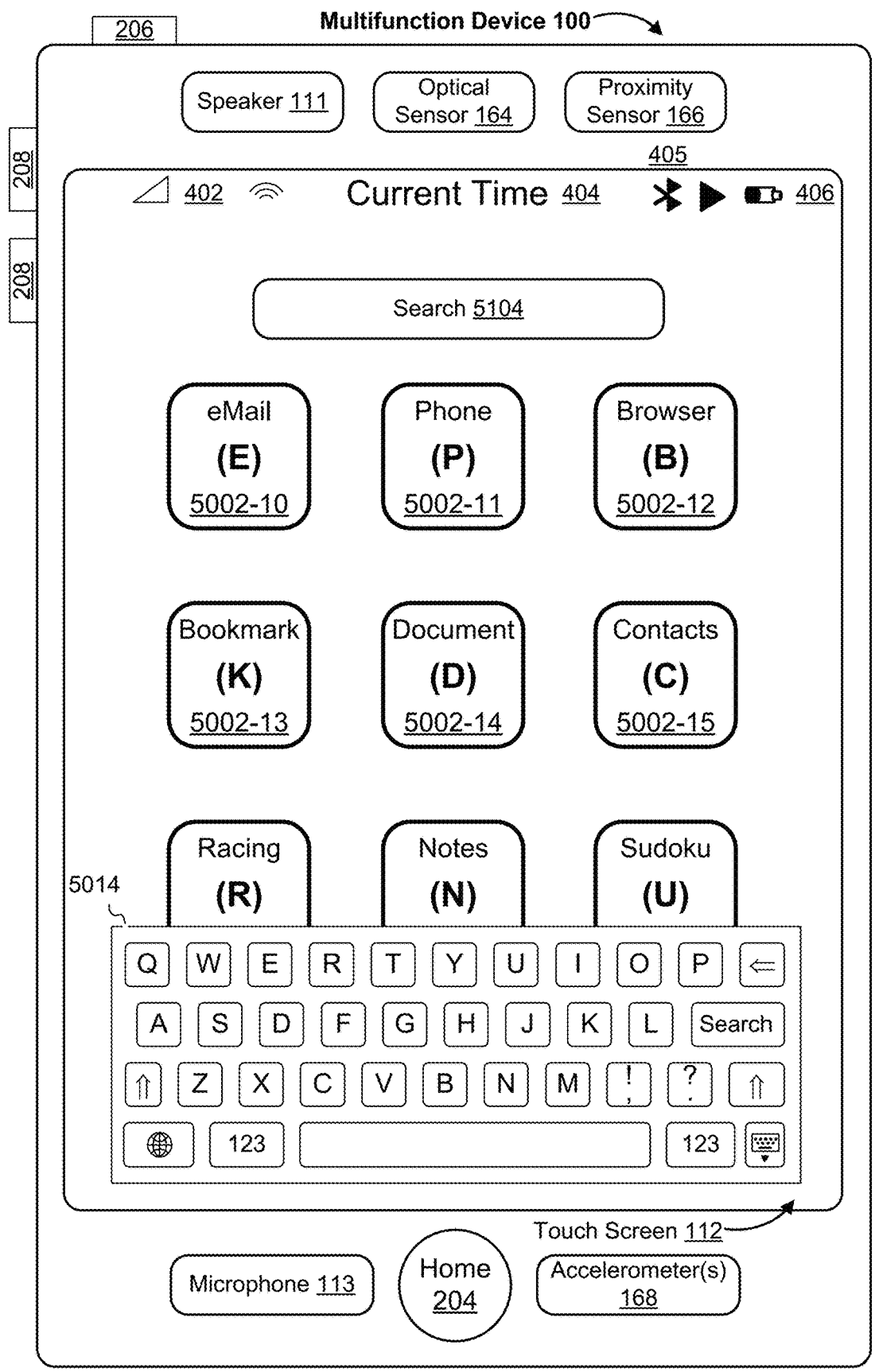
Figure 5Y:
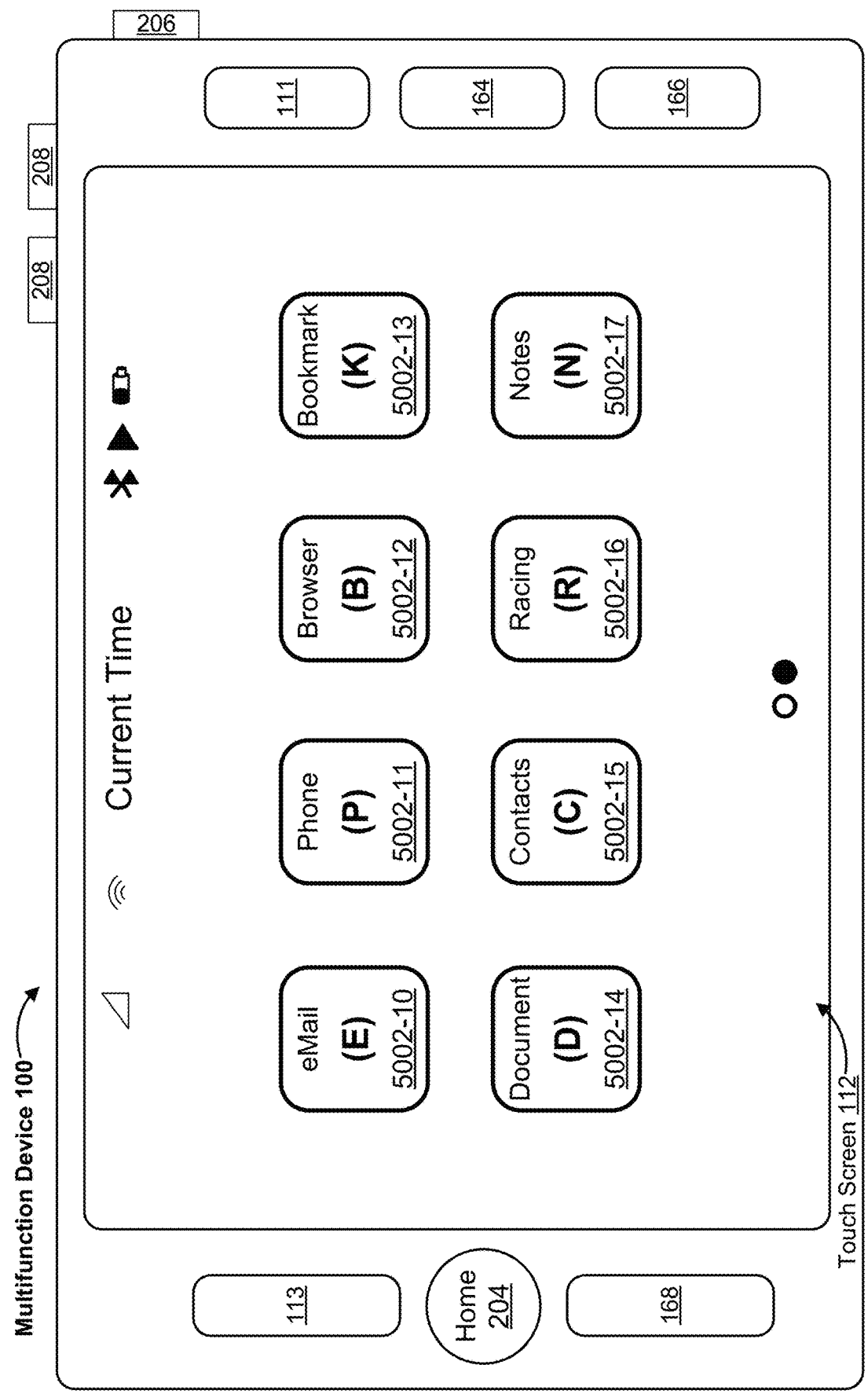
Figure 5Z:
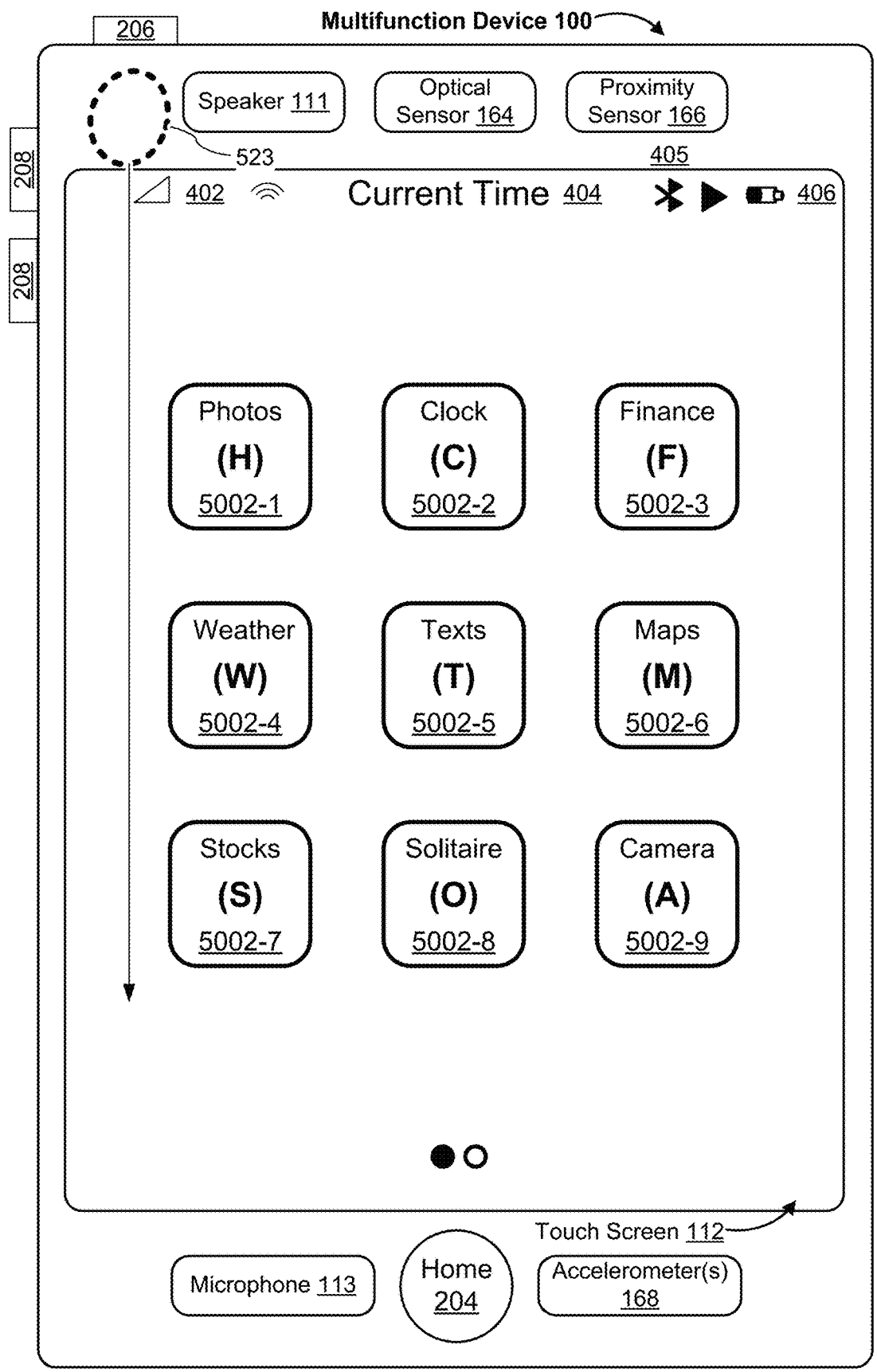
Figure 5A:
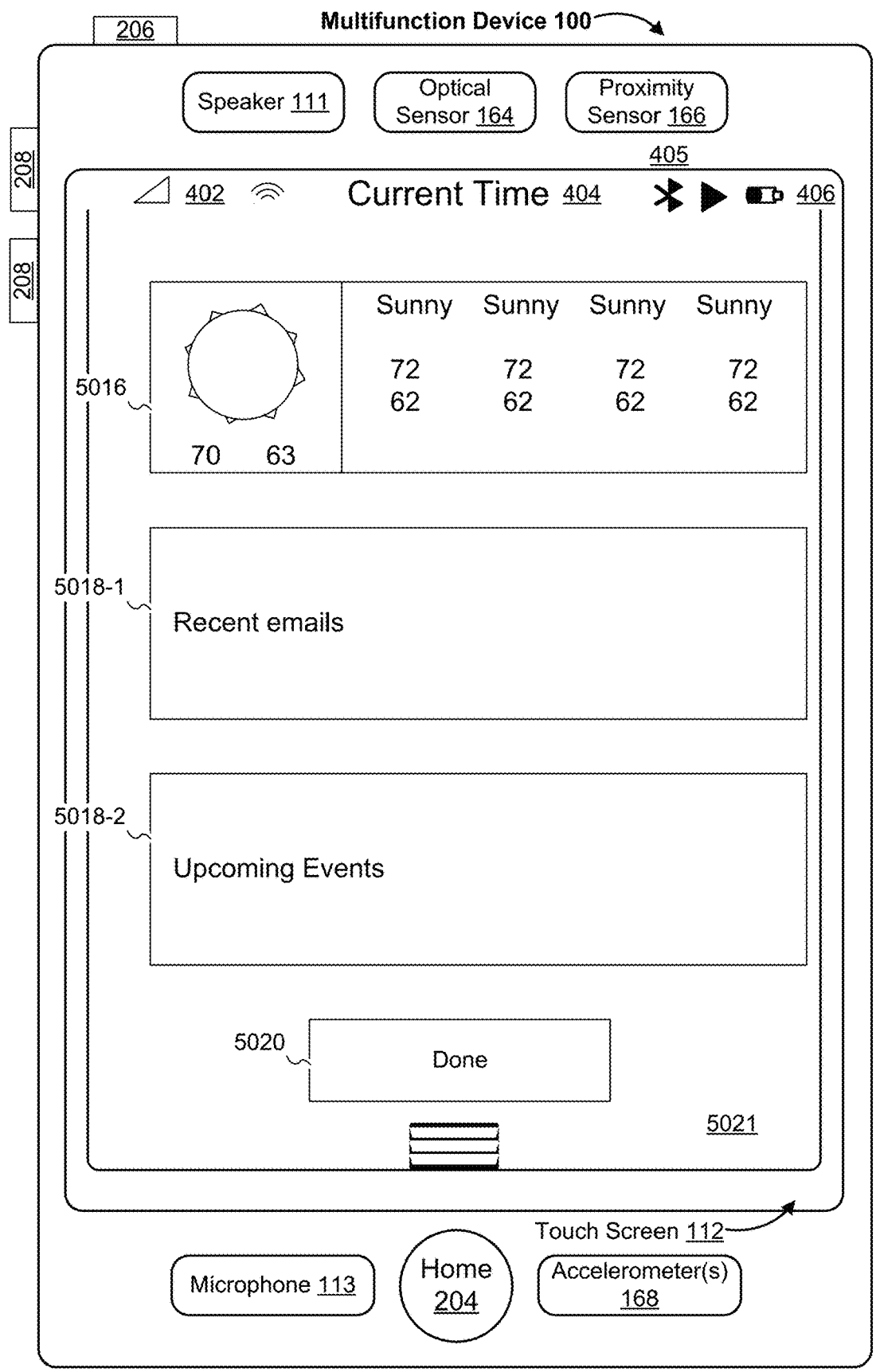
Figure 5B:
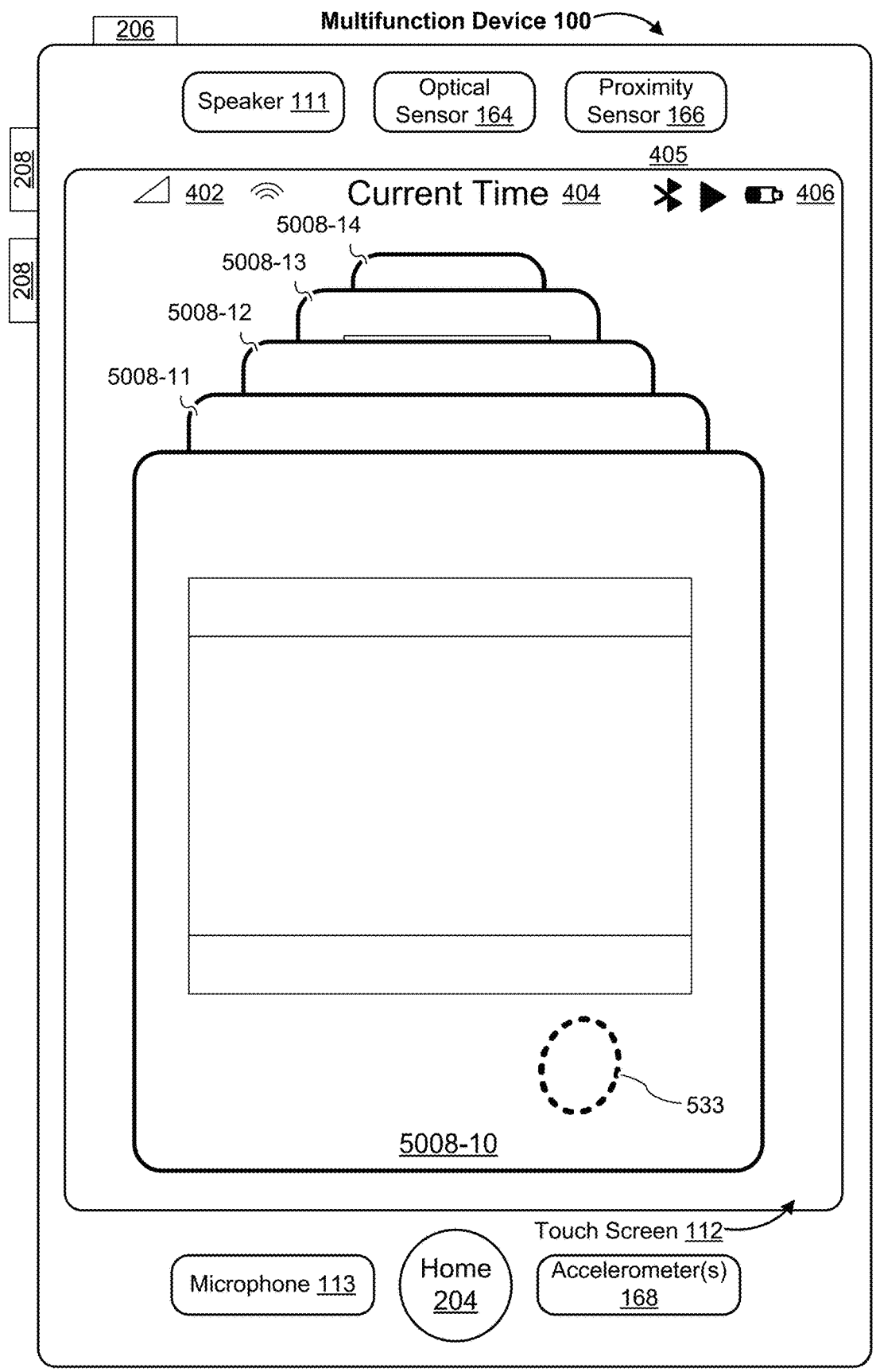
Figure 5C:
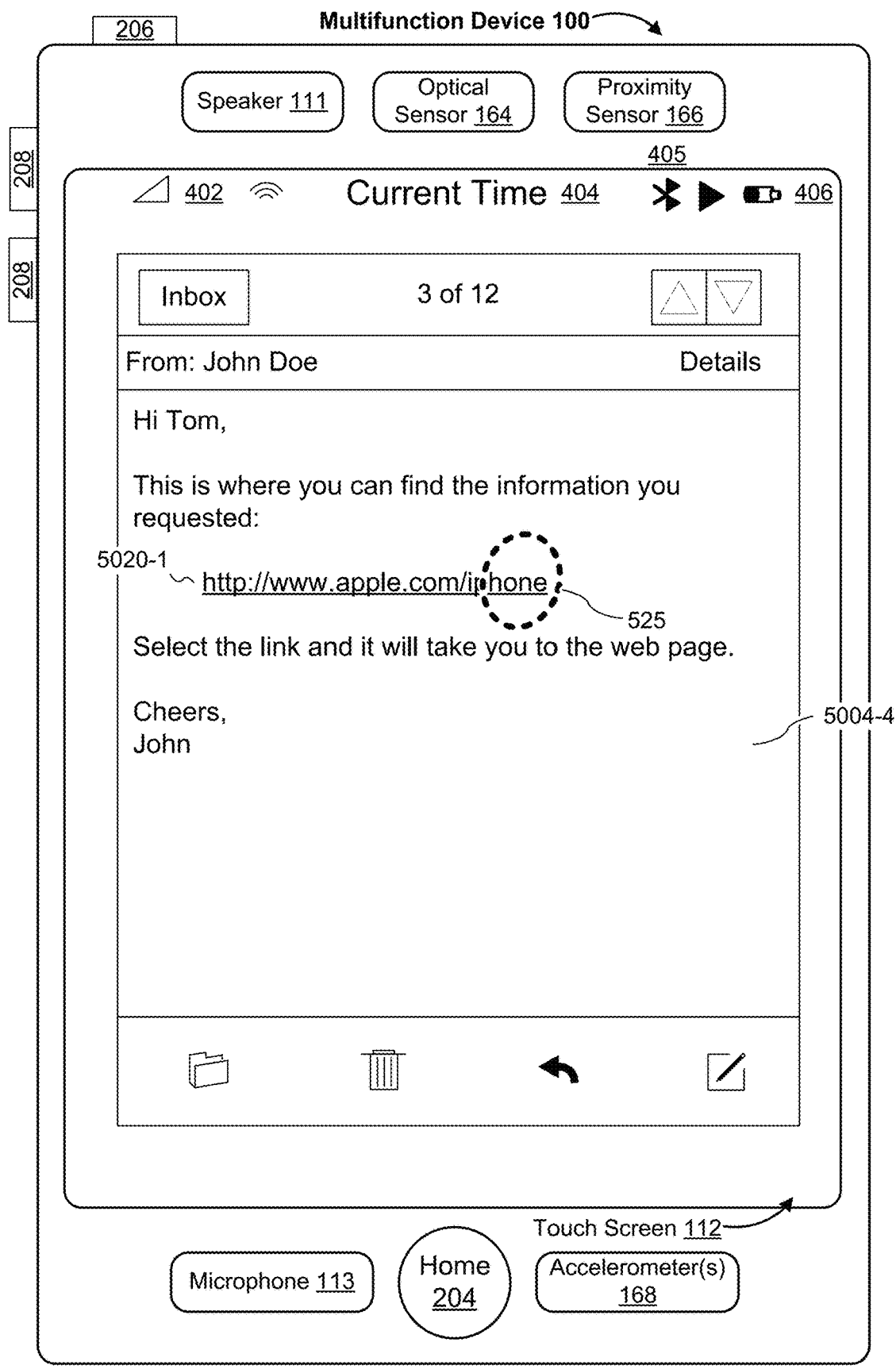
Figure 5D:
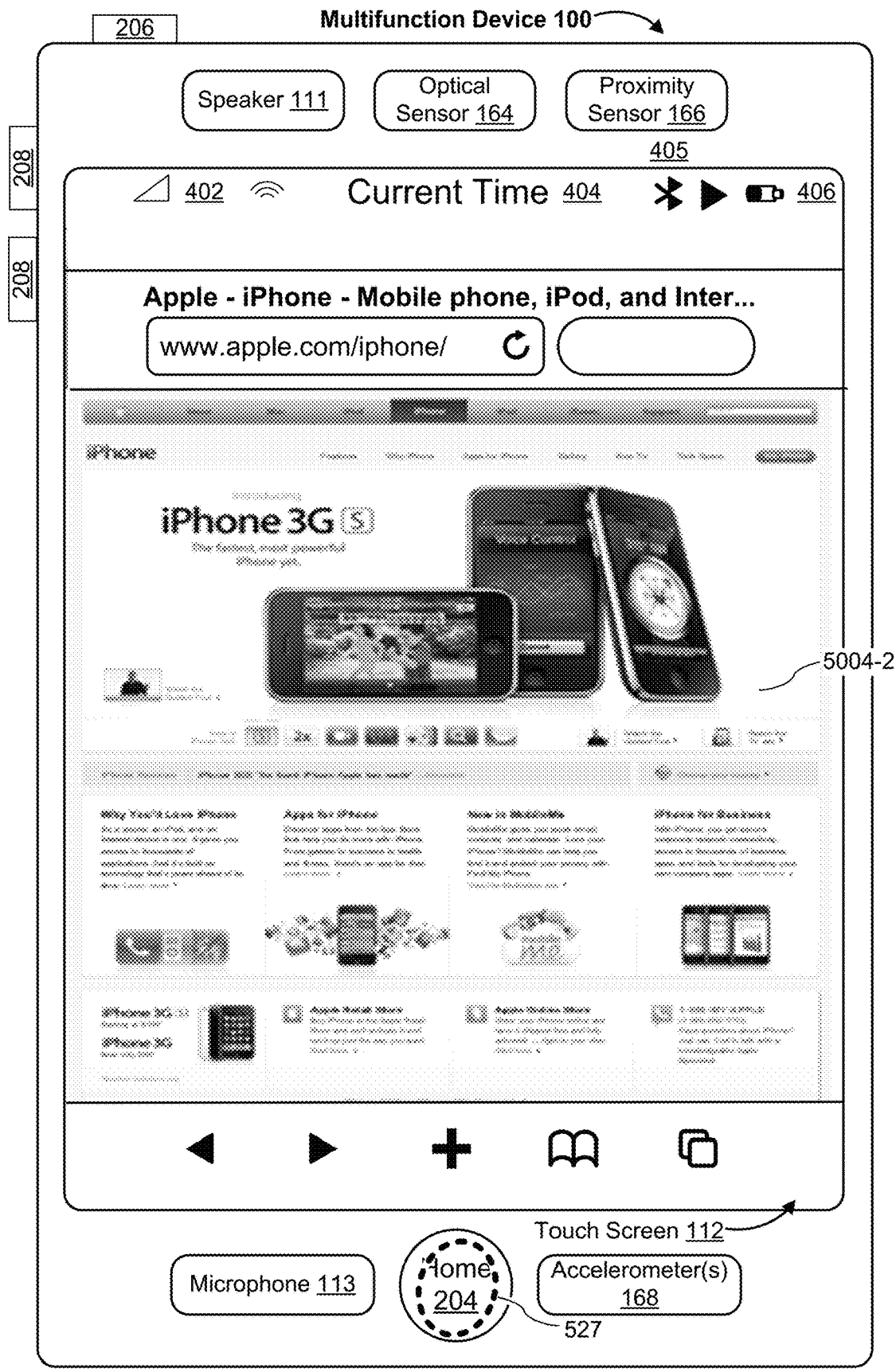
Figure 5E:
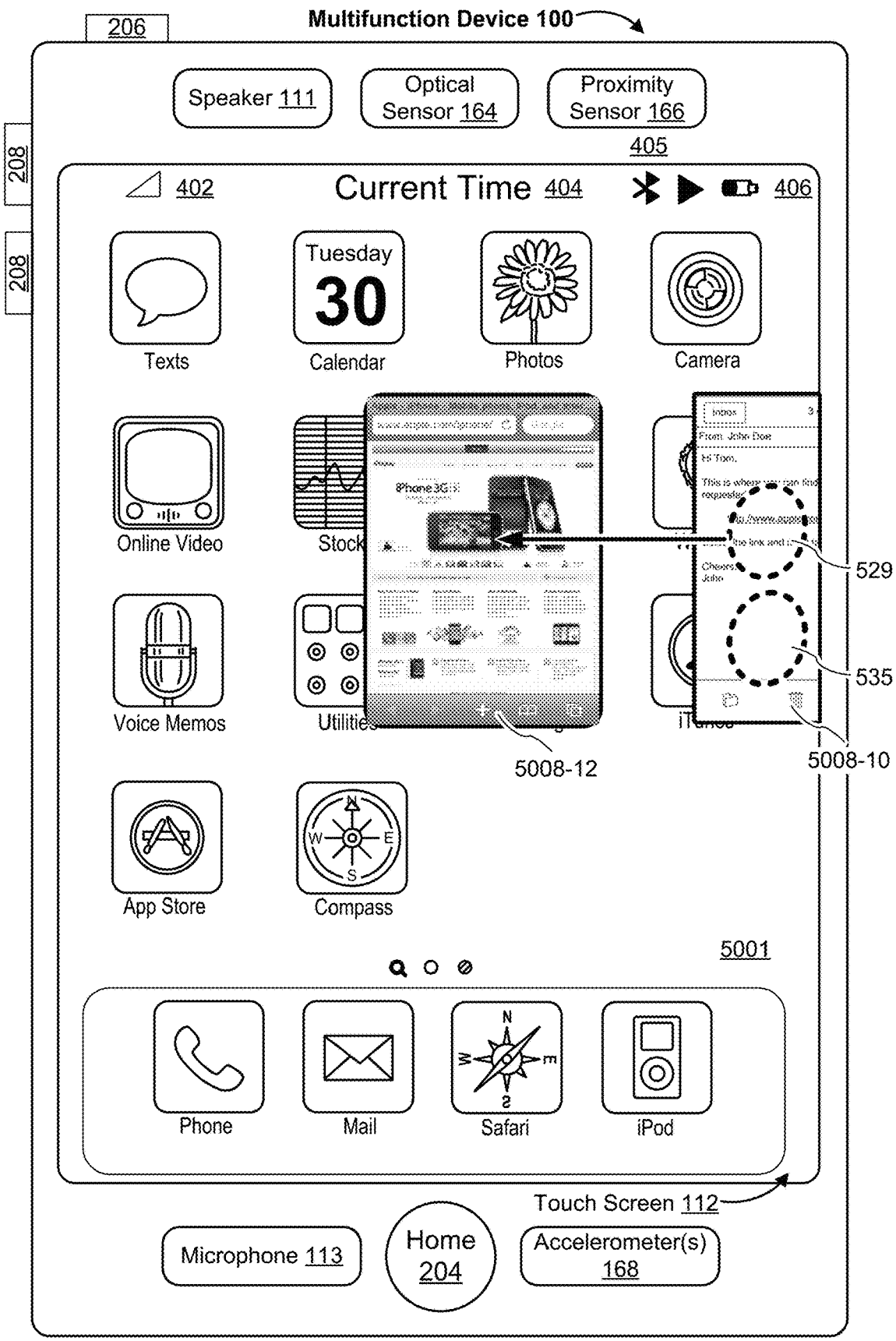
Figure 5F:
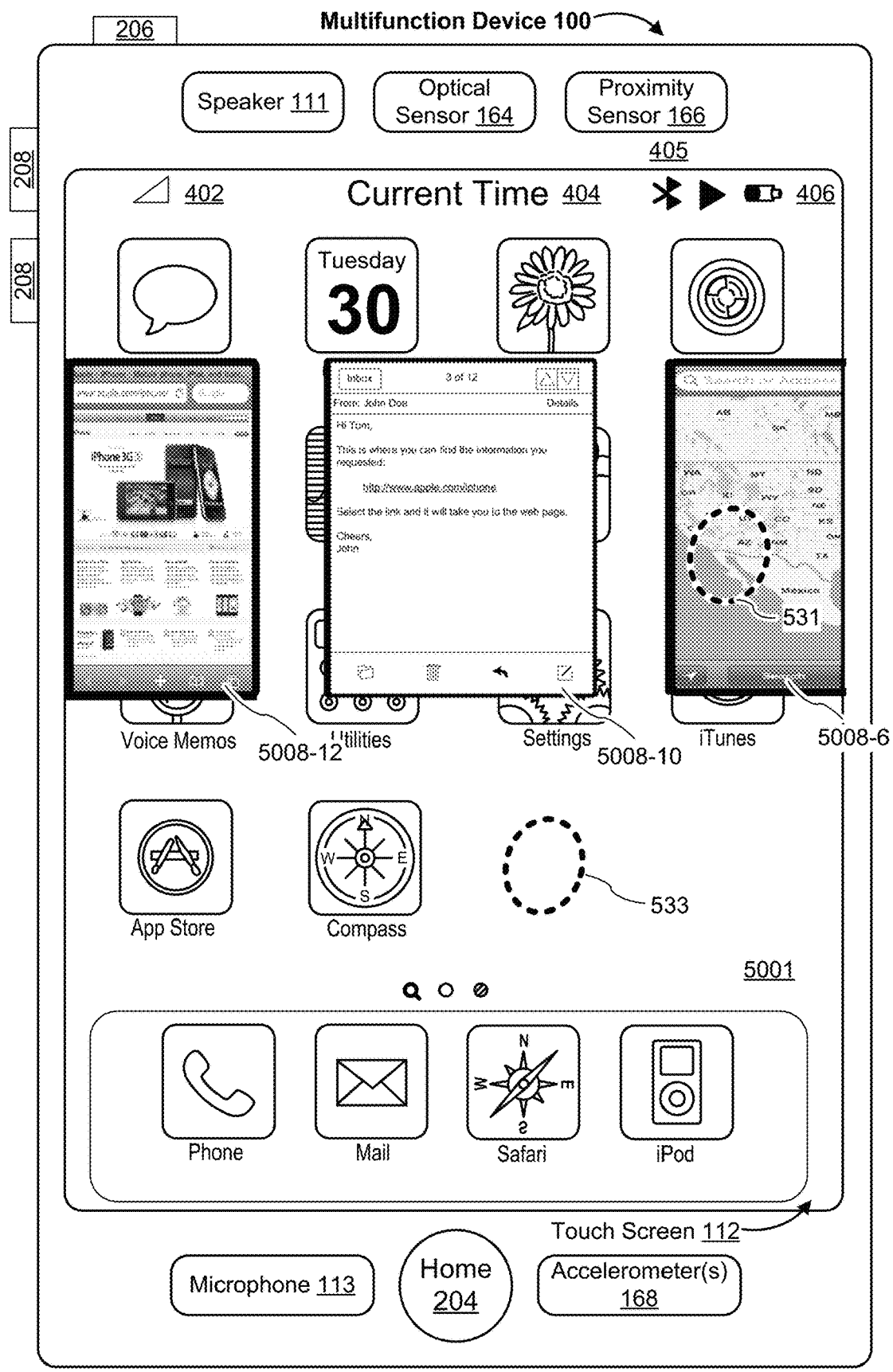
Figure 5G:
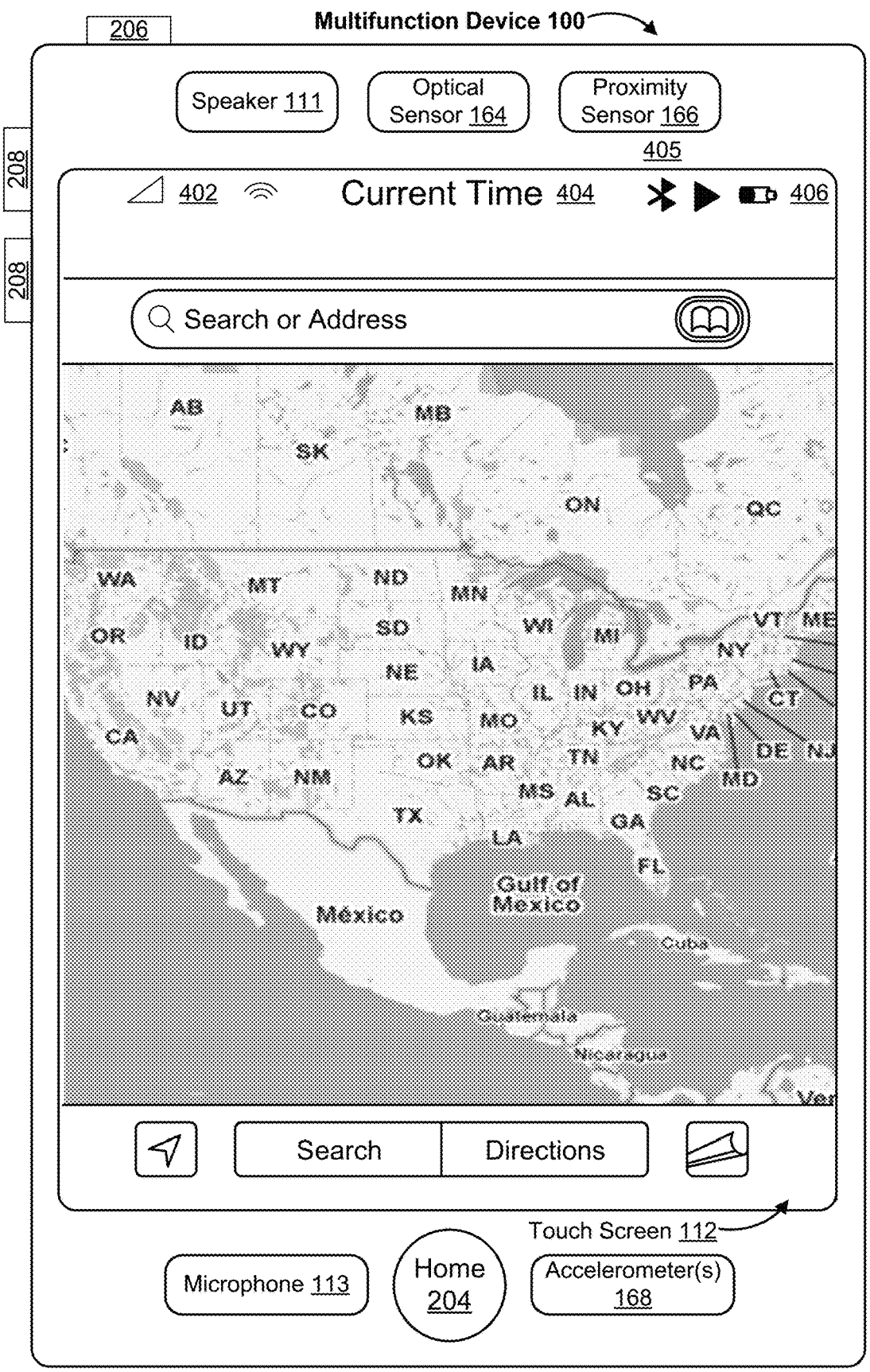
Figure 5H:
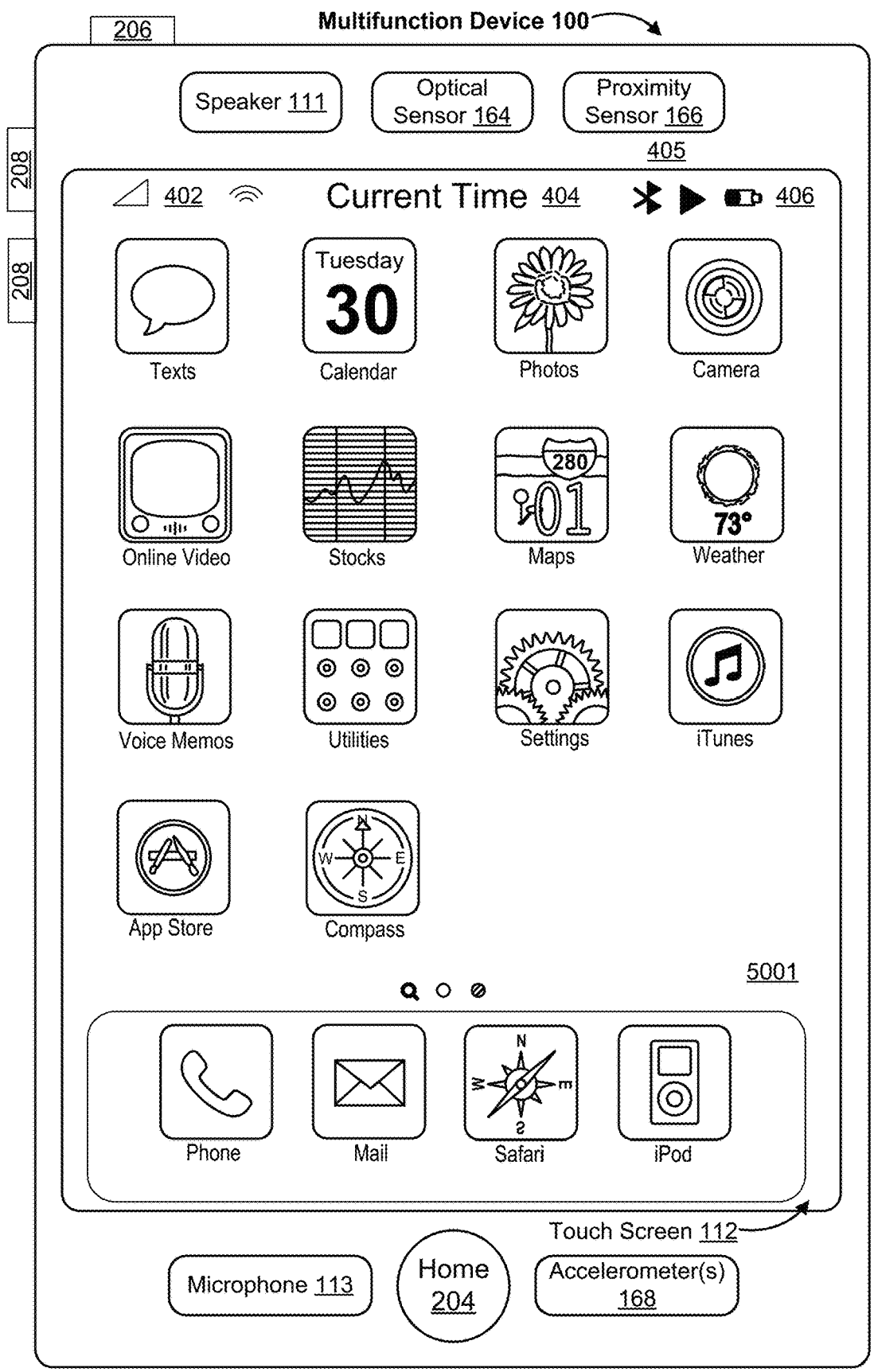
Figure 5I:
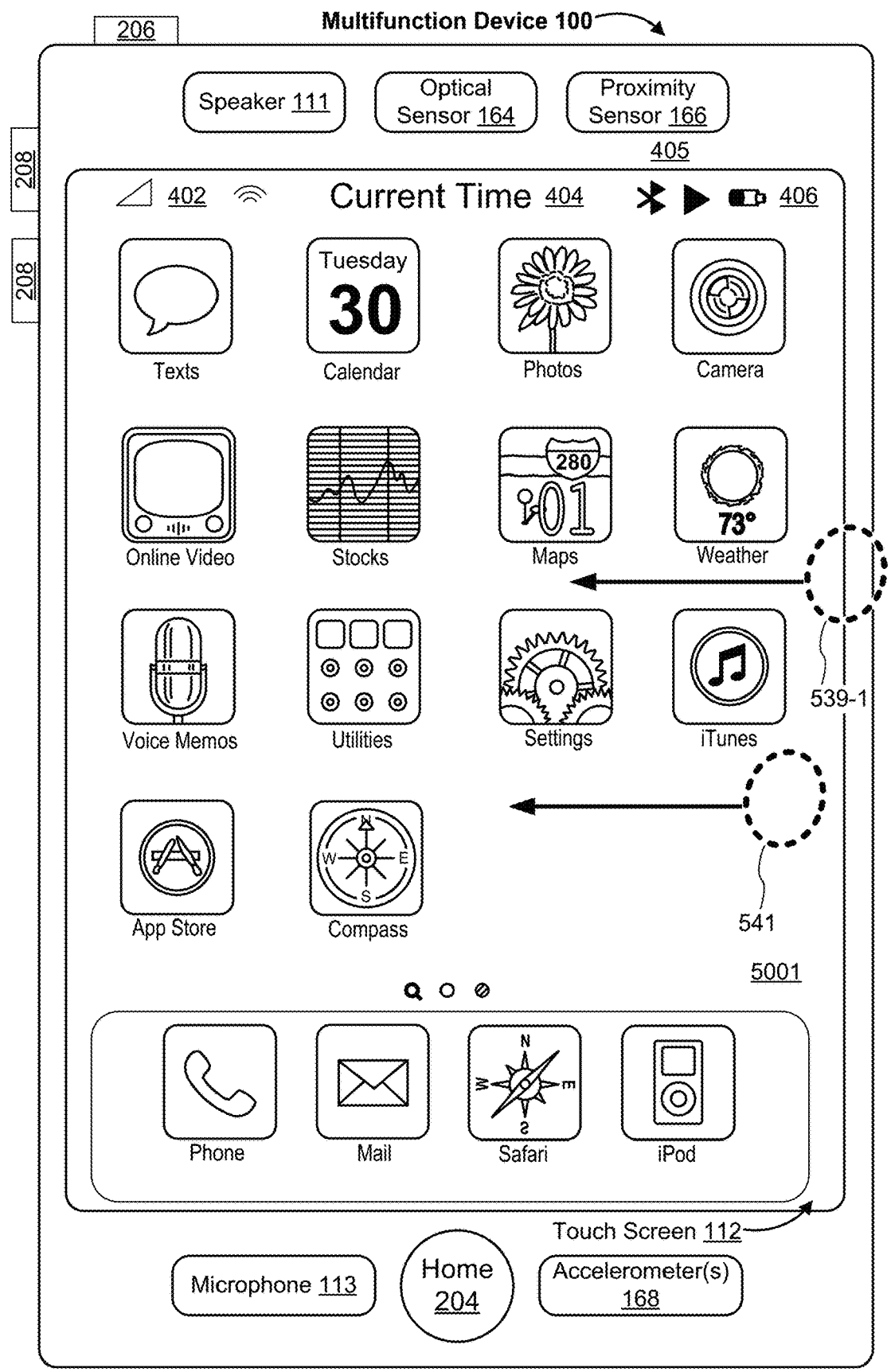
Figure 5J:
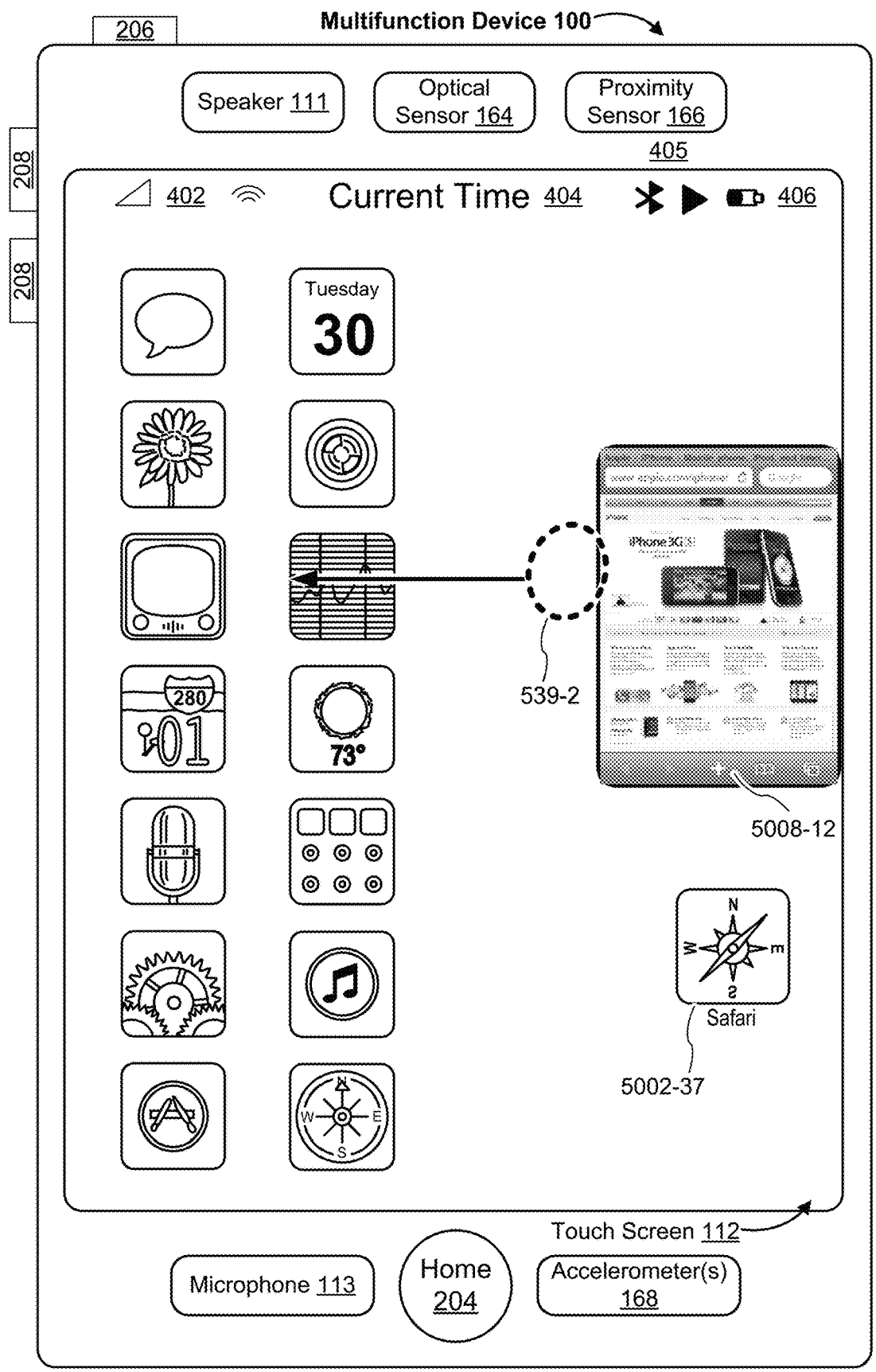
Figure 5K:
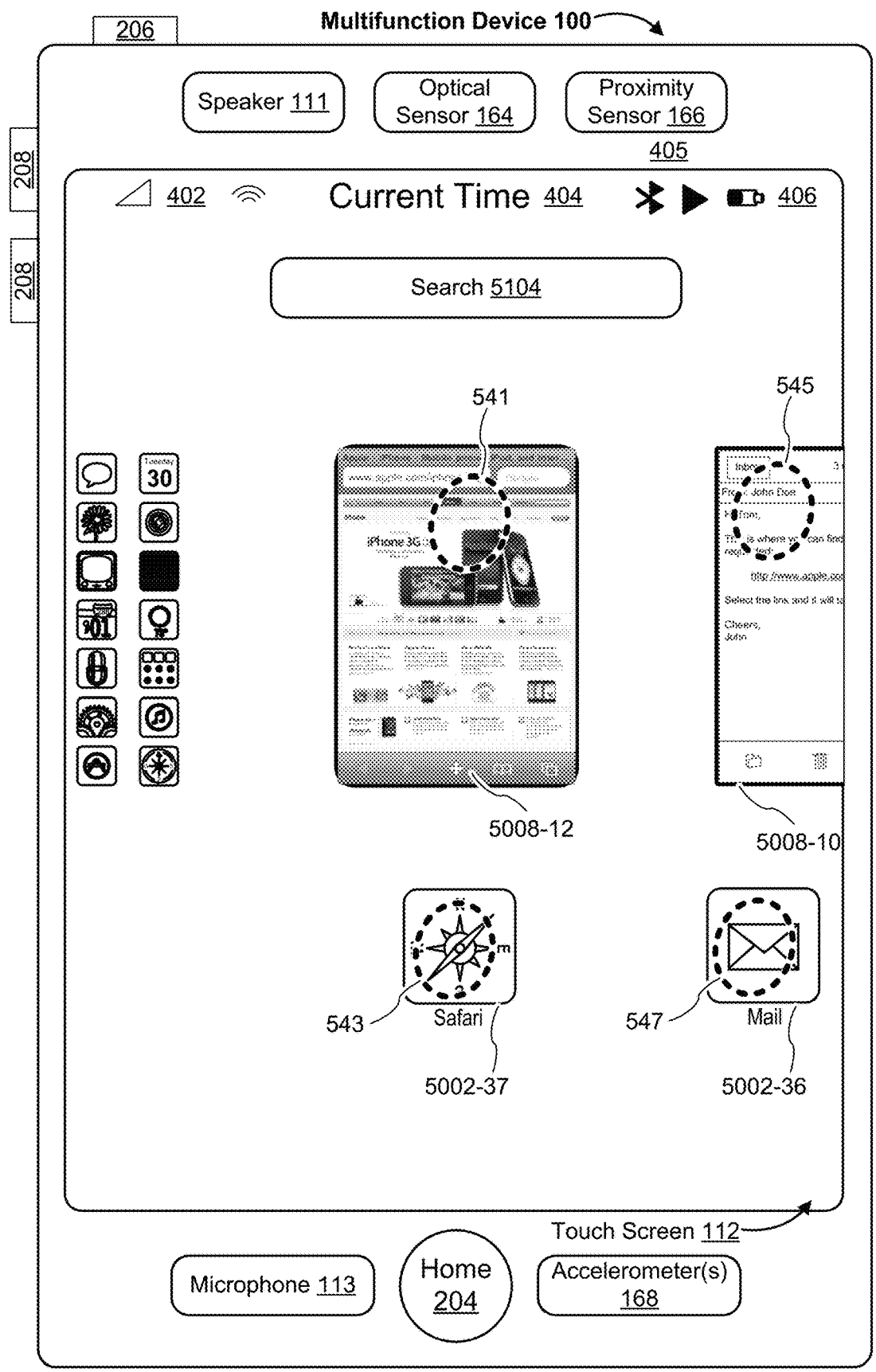
Figure 5L:
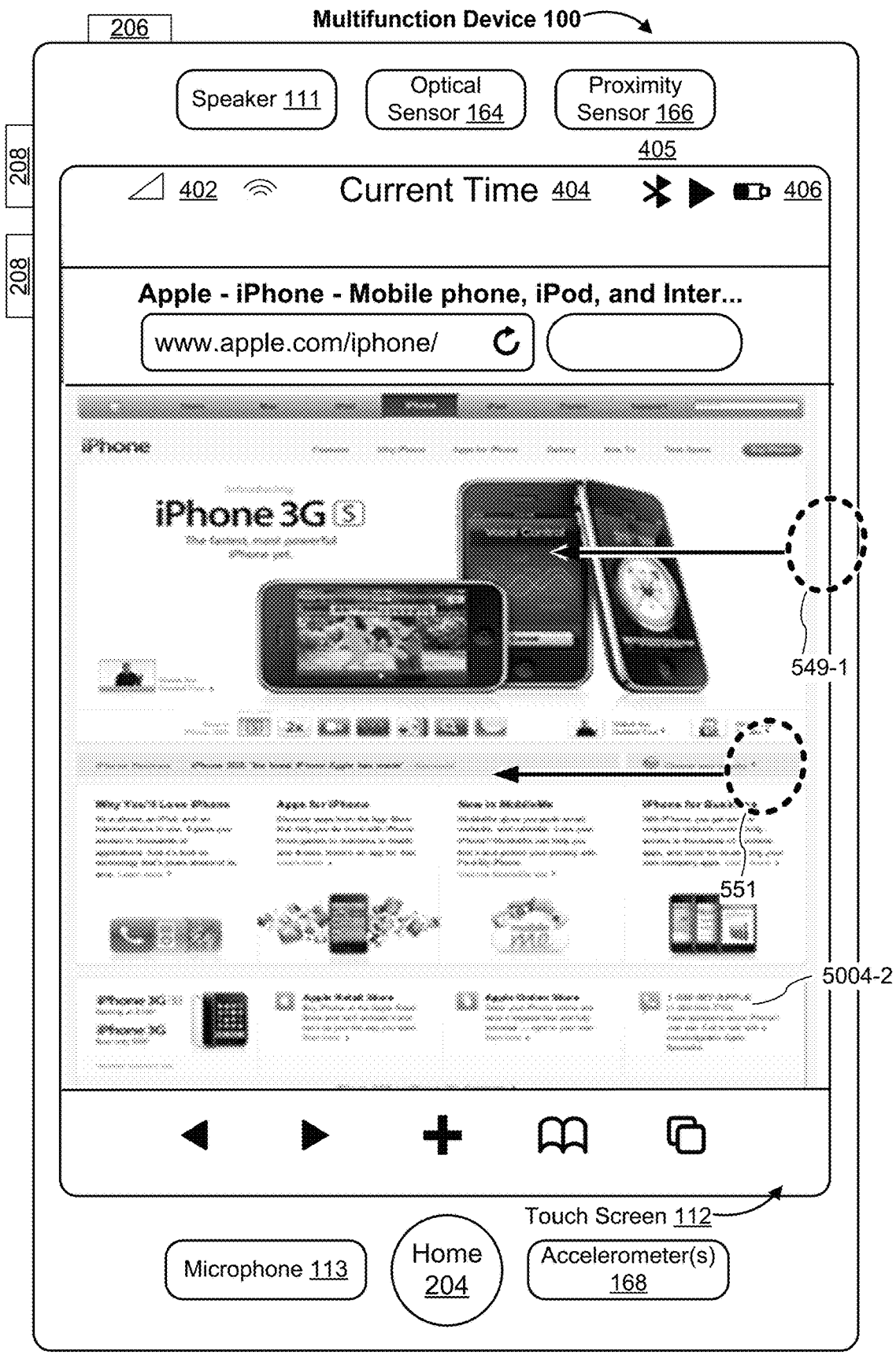
Figure 5M:
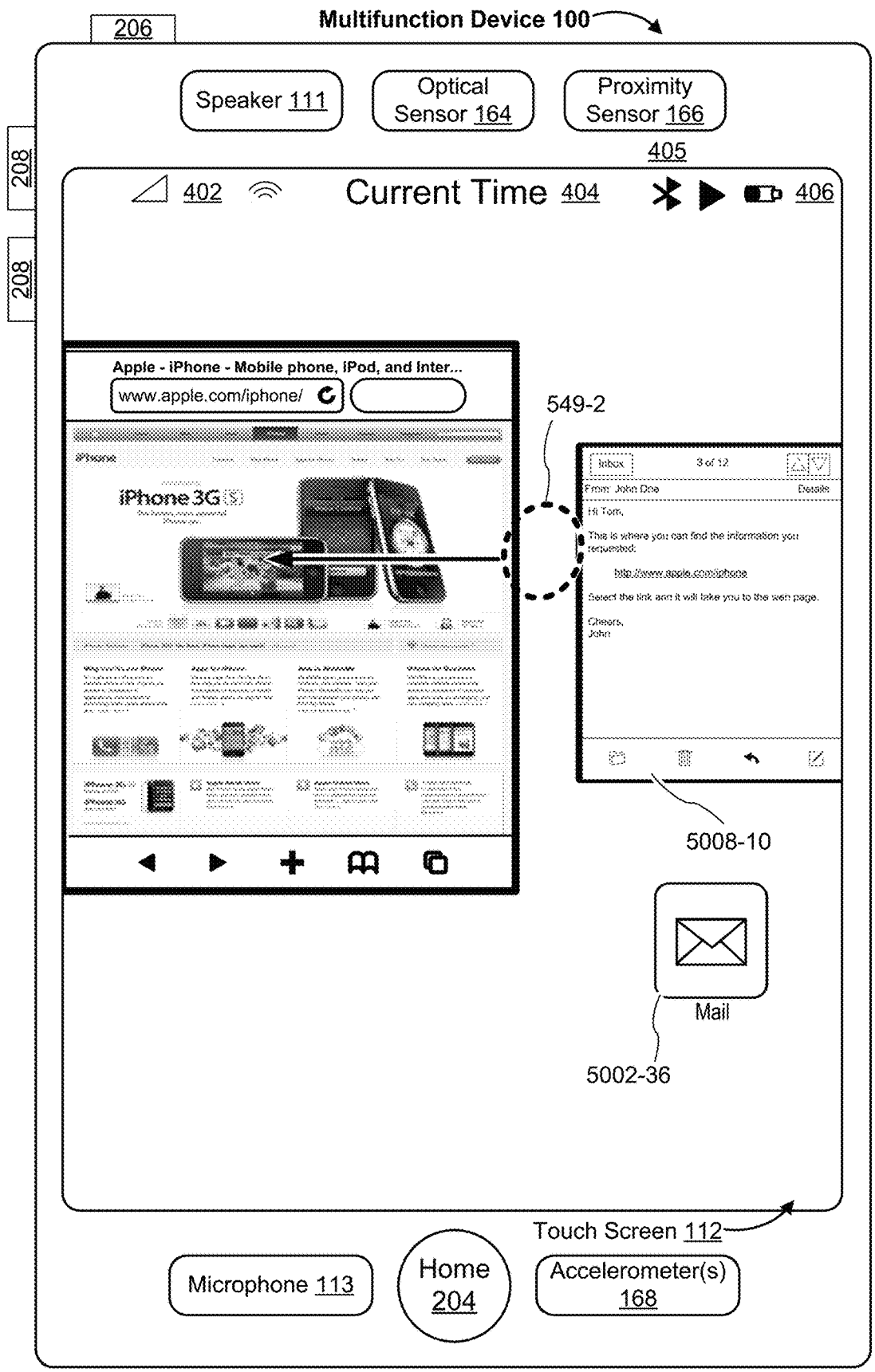
Figure 5N:
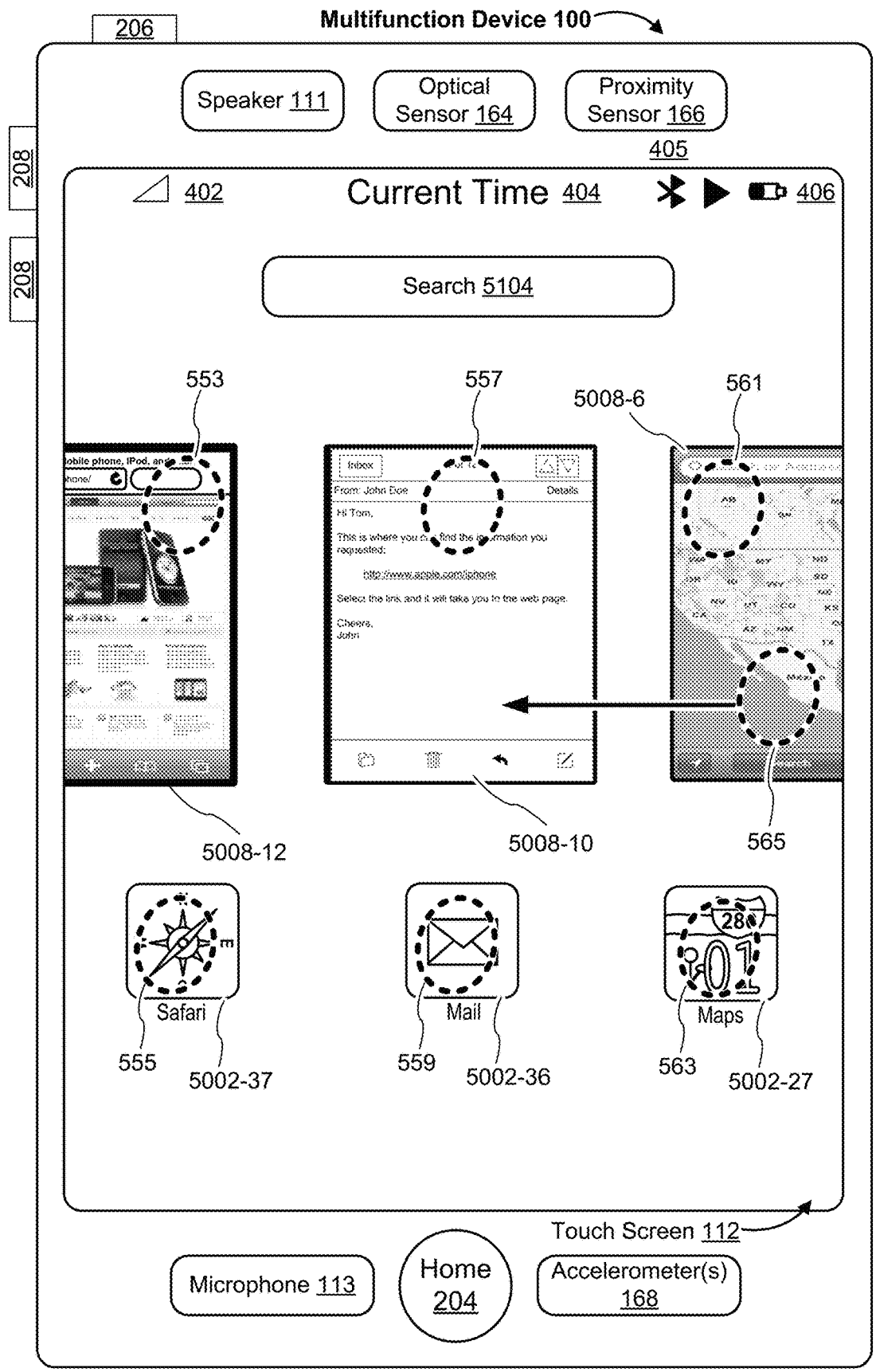
Figure 5O:
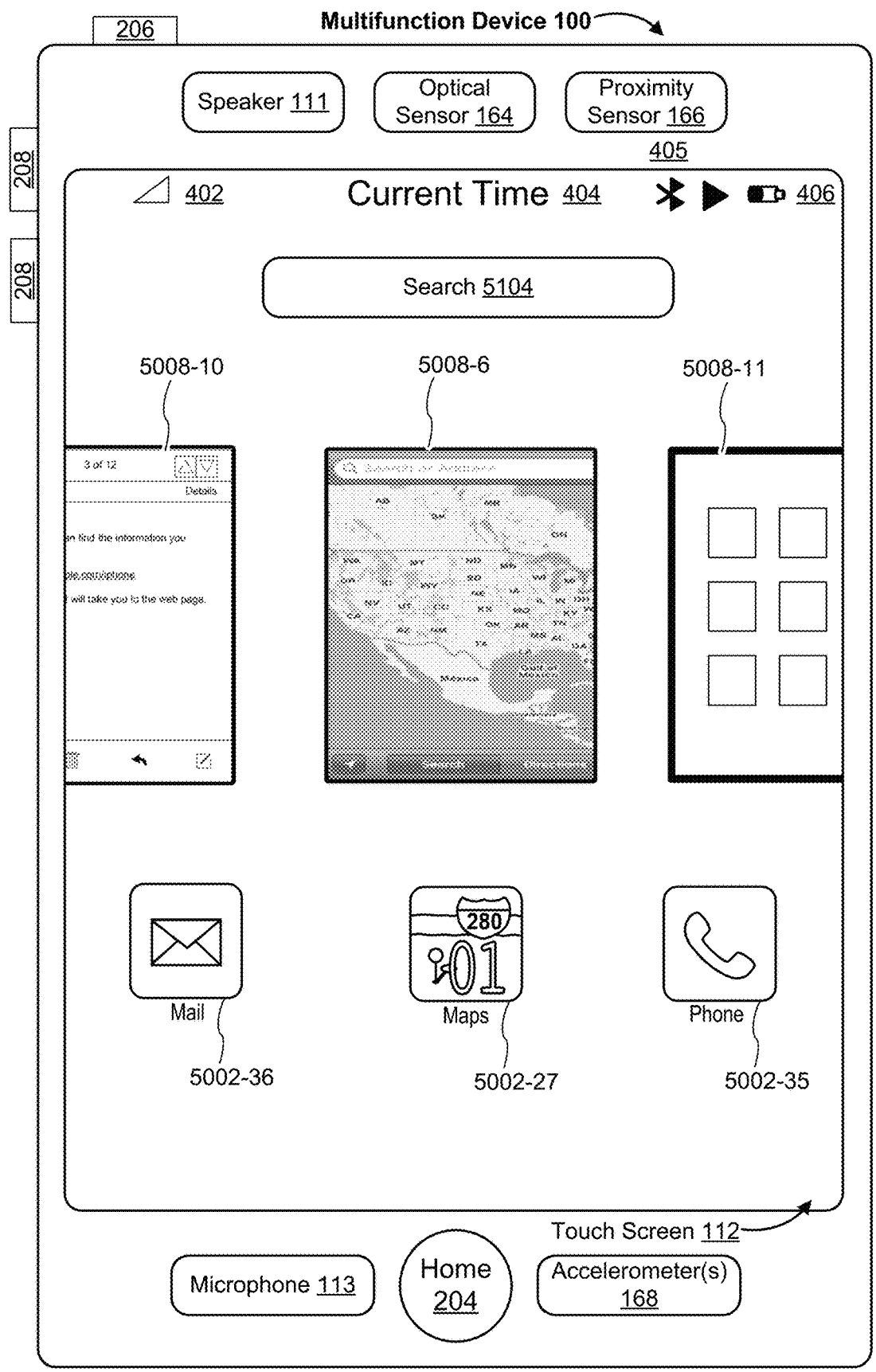
Figure 5P:
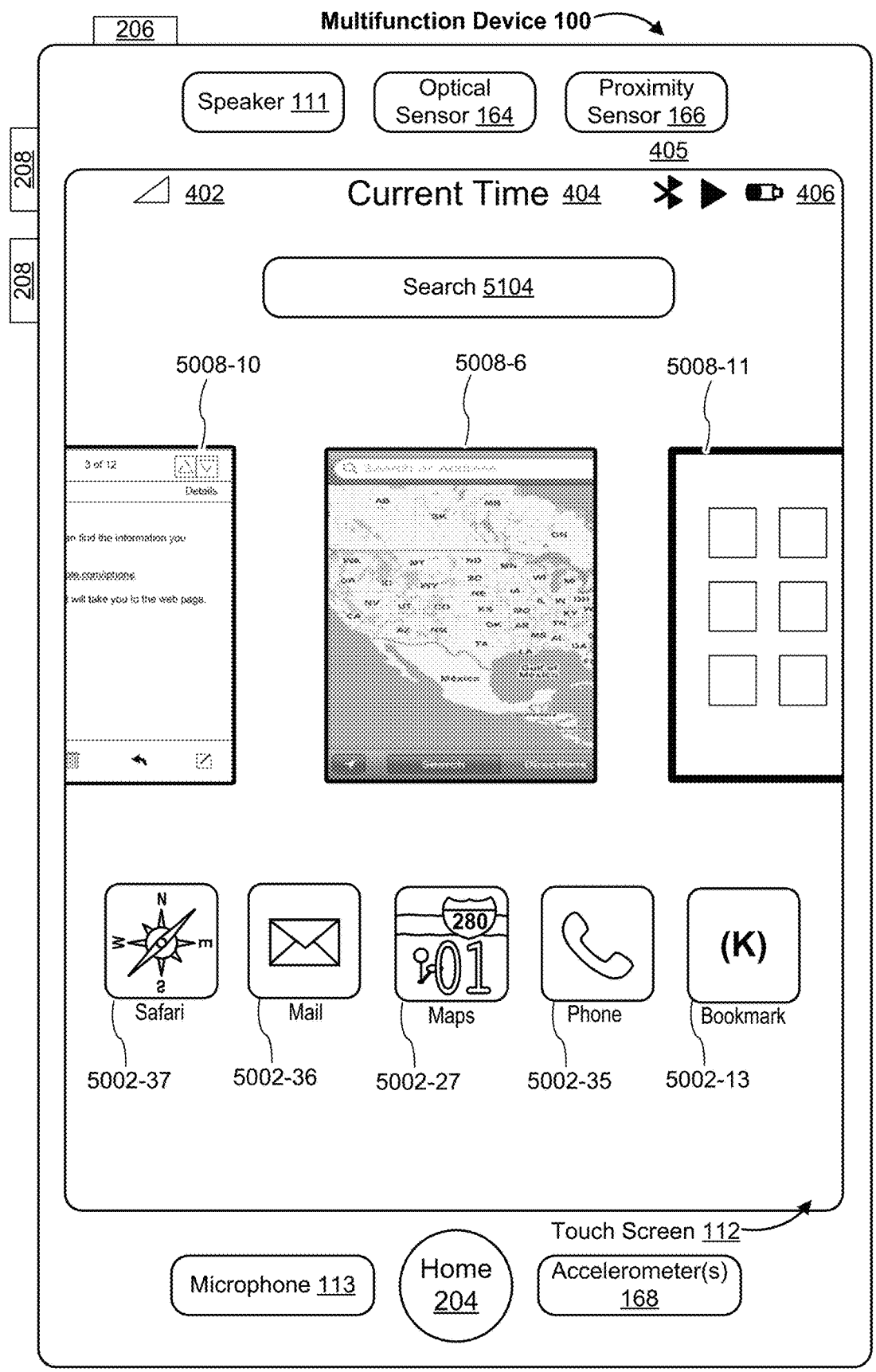
Figure 5Q:
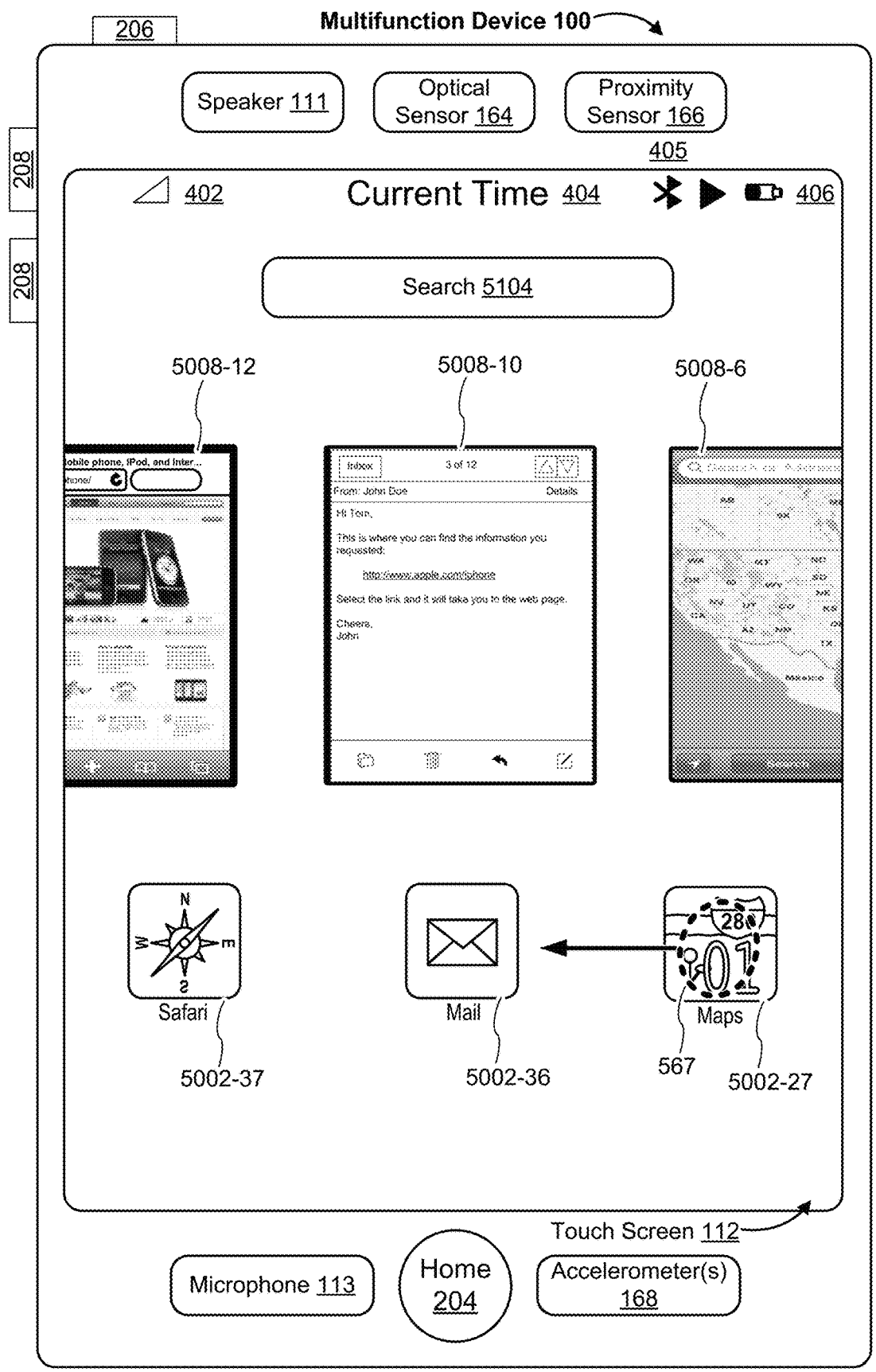
Figure 5R:
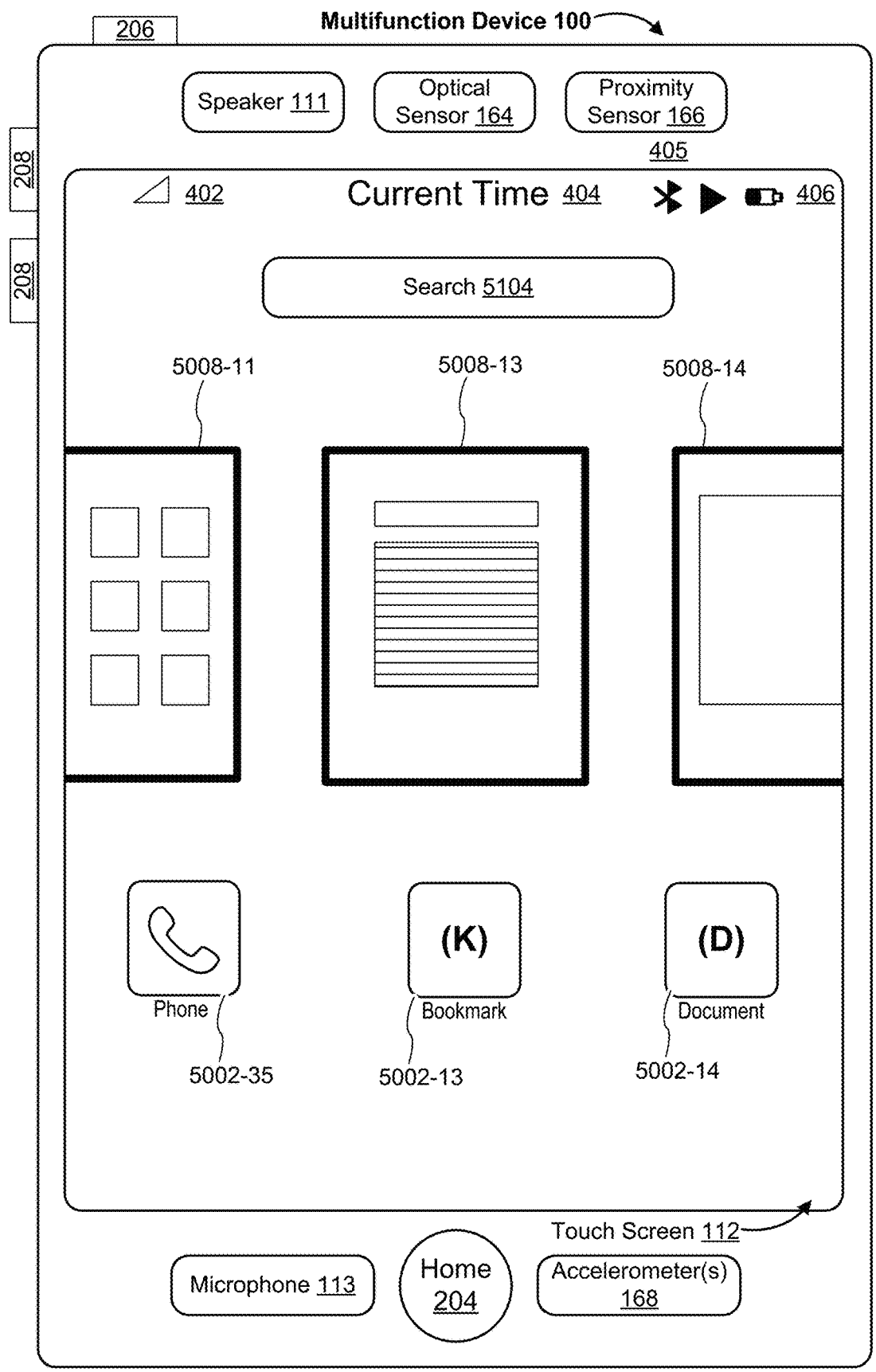
Figure 5S:
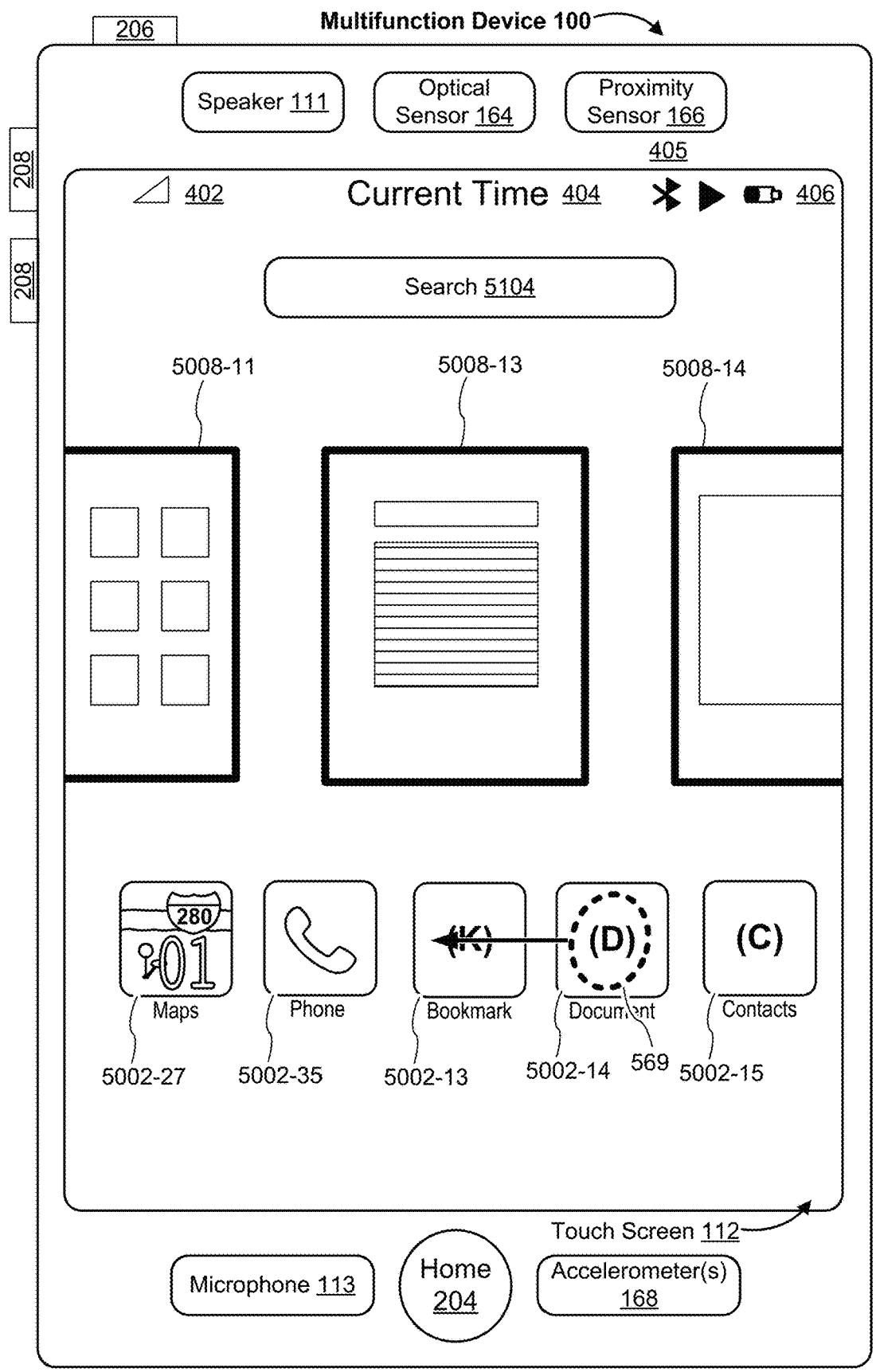
Figure 5T:
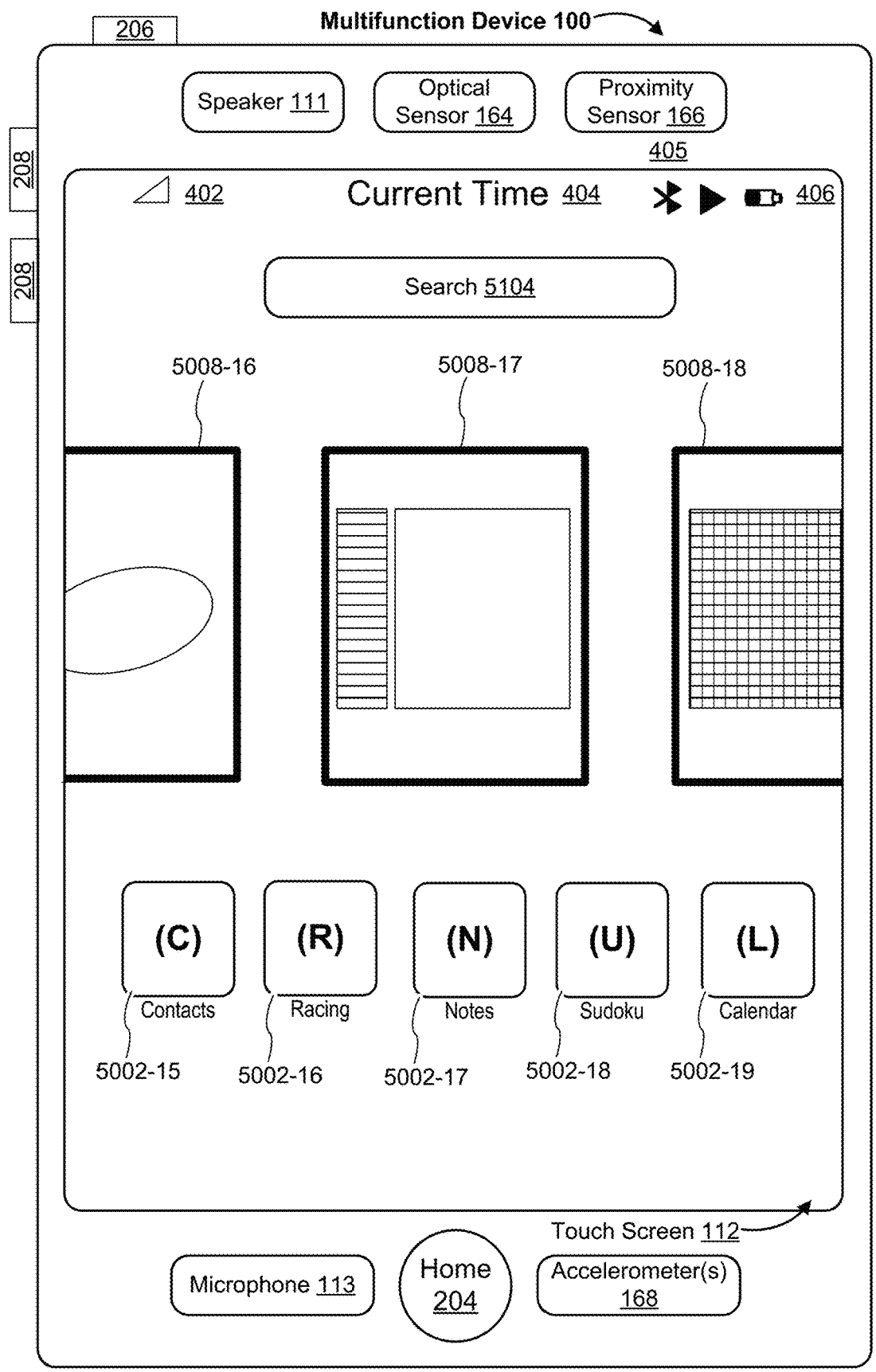
Figure 5U:
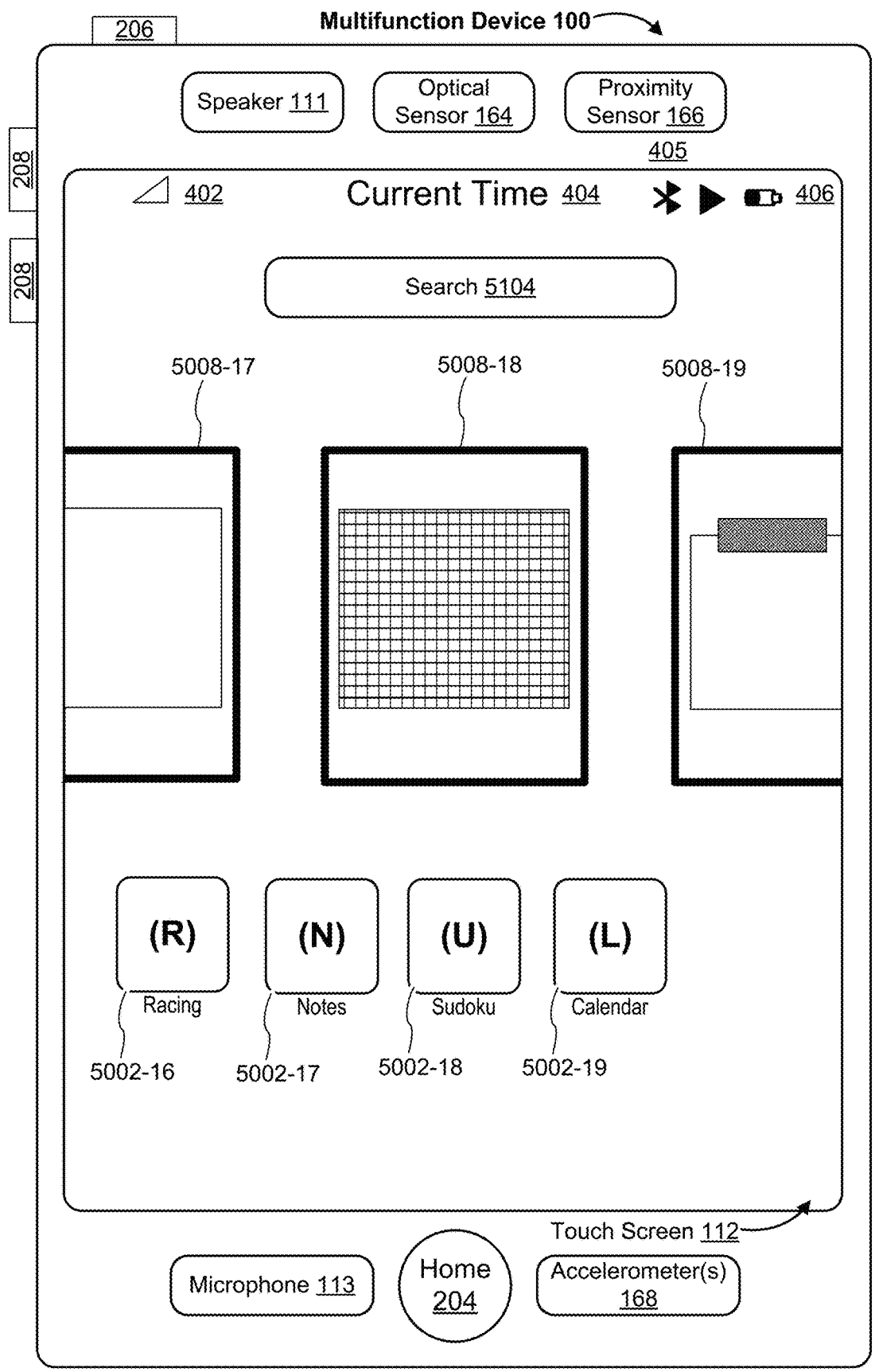
Figure 5V:
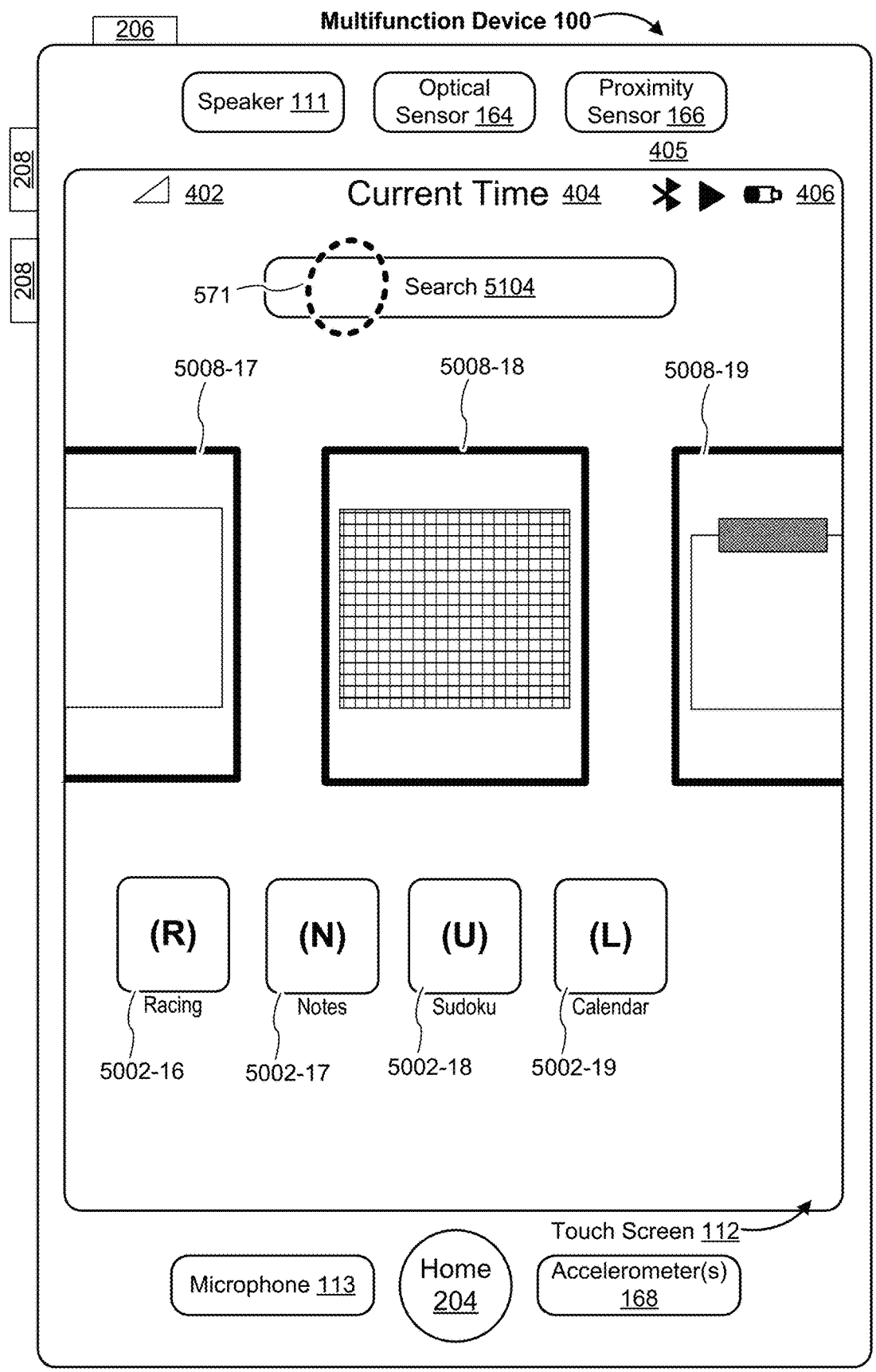
Figure 5W:
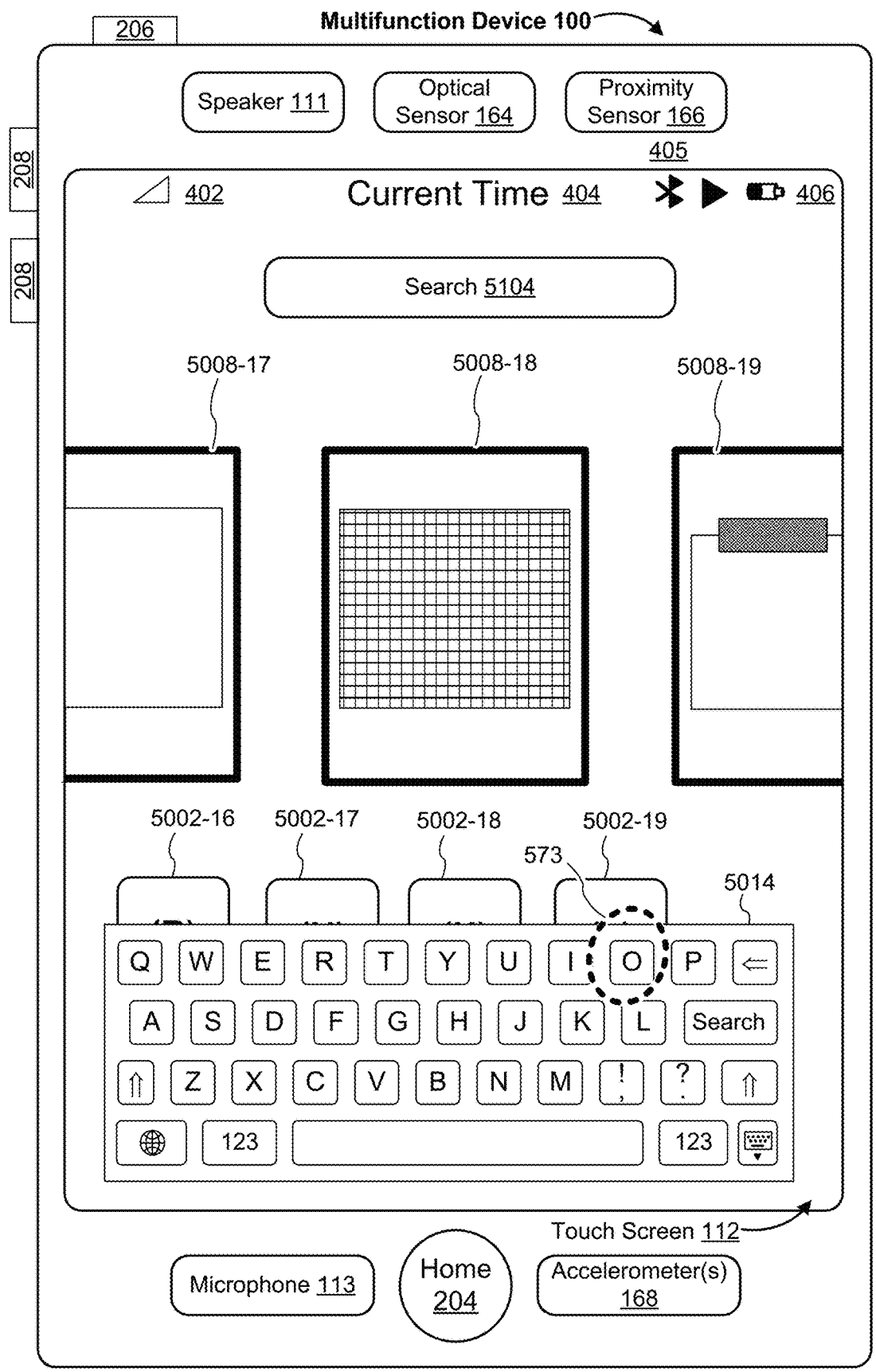
Figure 5X:
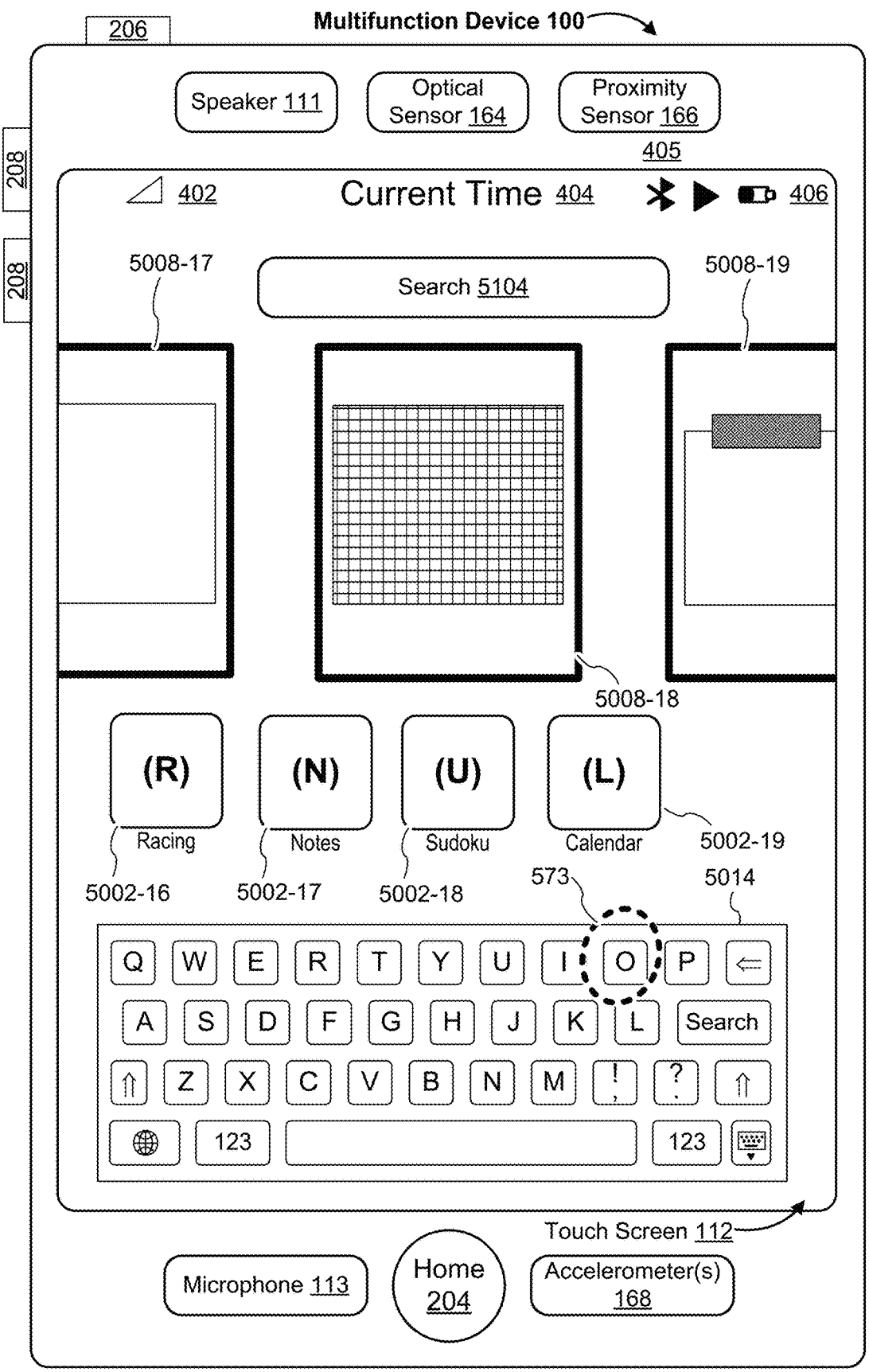
Figure 5Y:
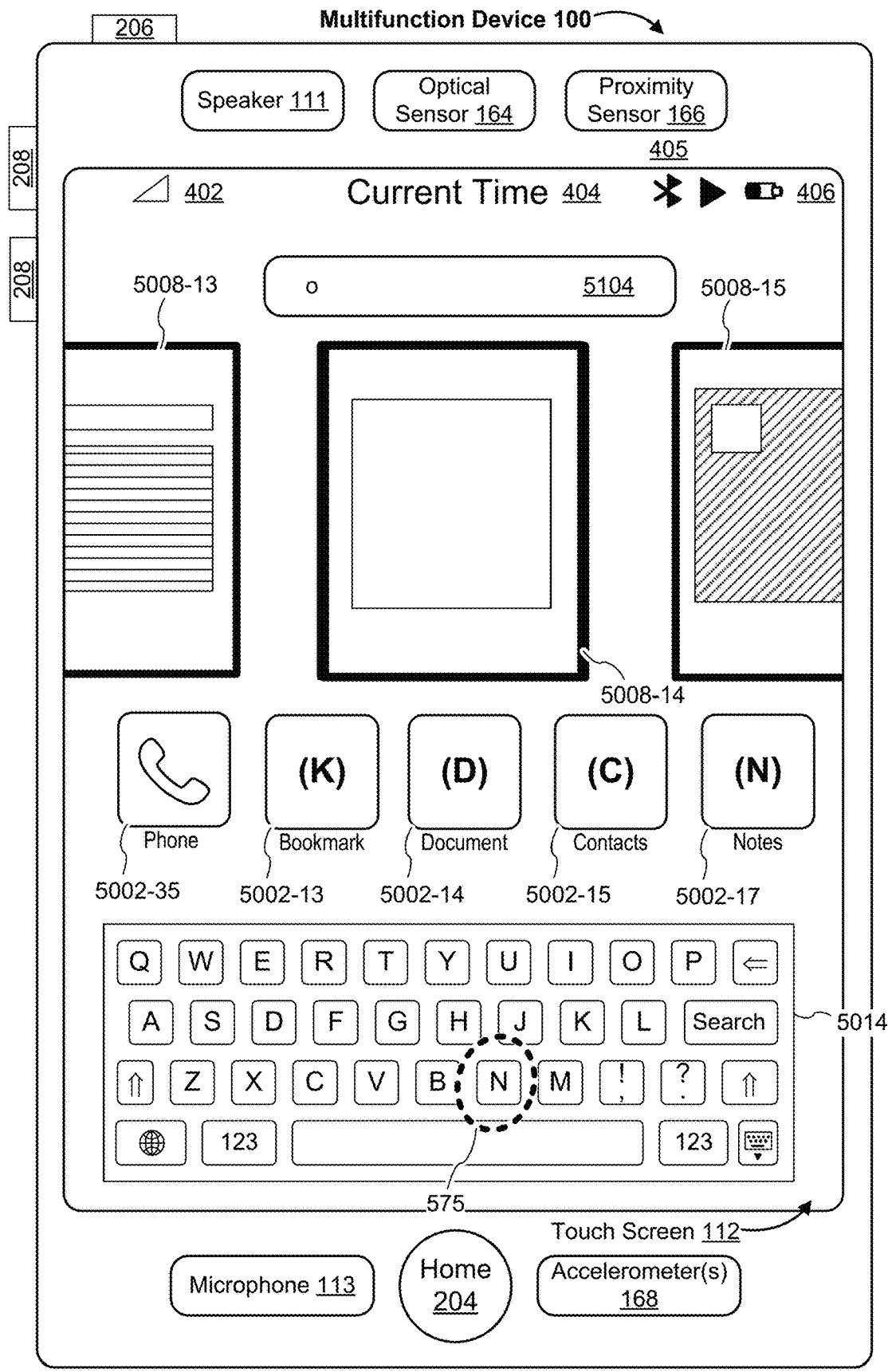
Figure 5Z:
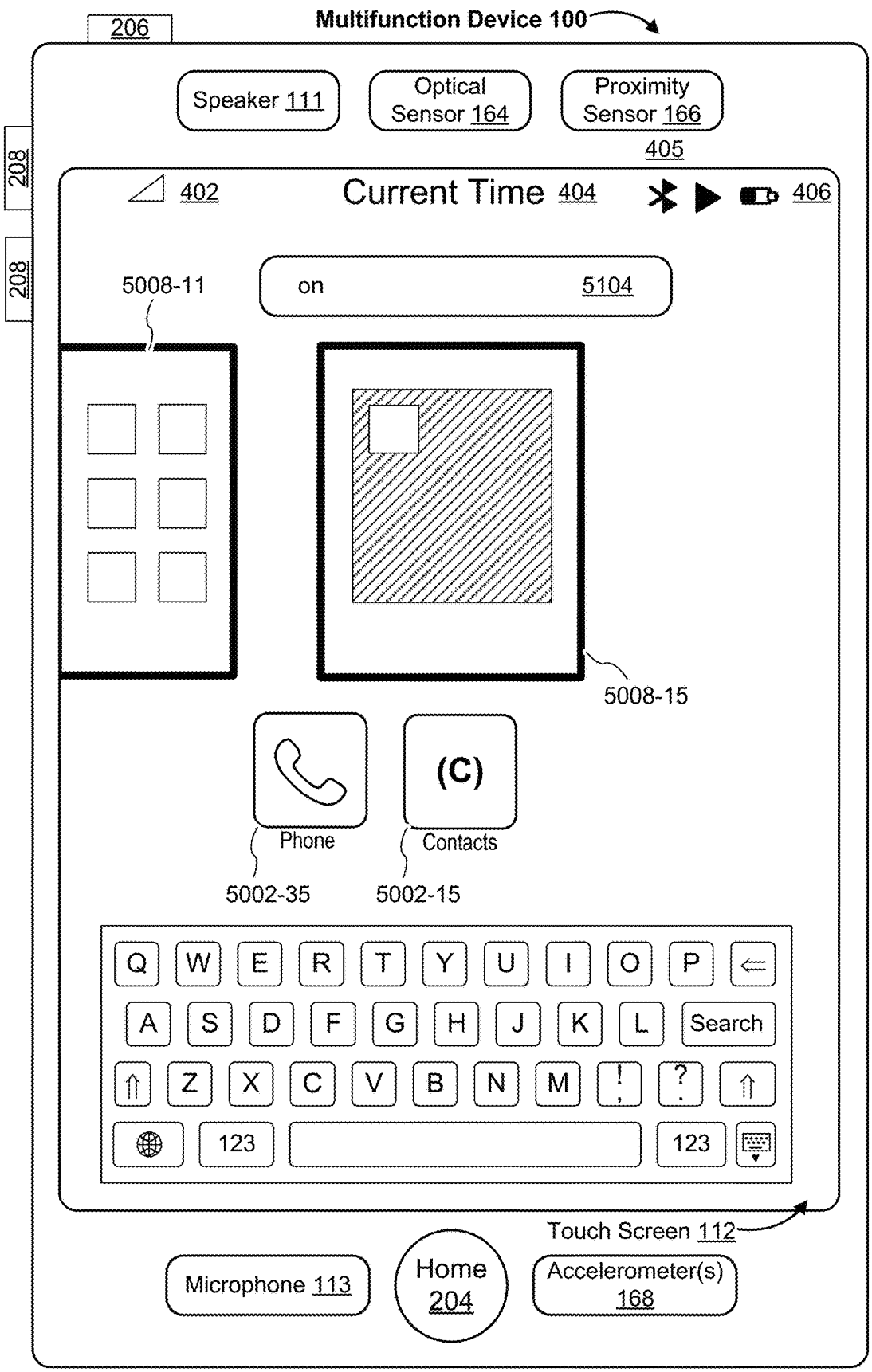

FIGS. 5A-5ZZ illustrate exemplary user interfaces for managing concurrently open applications in accordance with some embodiments. The user interfaces in these figures are used to illustrate the processes described below, including the processes in FIGS. 6A-6C, 7, 8A-8C, 9, 10, 11A-11B, and 12A-12B.

As used in the specification and claims, the term "open application" refers to a software application with retained state information (e.g., as part of device/global internal state 157 and/or application internal state 192). An open application is any one of the following types of applications:
an active application, which is currently displayed on display 112 (or a corresponding application view is currently displayed on the display);
a background application (or background process), which is not currently displayed on display 112, but one or more application processes (e.g., instructions) for the corresponding application are being processed by one or more processors 120 (i.e., running);

a suspended application, which is not currently running, and the application is stored in a volatile memory (e.g., DRAM, SRAM, DDR RAM, or other volatile random access solid state memory device of memory 102); and a hibernated application, which is not running, and the application is stored in a non-volatile memory (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application, which was an active application when displayed, may become a background application, suspended application, or hibernated application, but the first application remains an open application while its state information is retained by the device.

FIGS. 5A-5D illustrate exemplary user interfaces for selecting one of the concurrently open applications and displaying a corresponding application view.

FIG. 5A illustrates an exemplary user interface ("home screen" 5001) displaying a plurality of application icons 5002 (e.g., 5002-21 through 5002-38) on touch screen 112 of a portable electronic device (e.g., portable multifunction device 100). In FIG. 5A, finger gesture 505 (e.g., a tap gesture) is detected on touch screen 112 at a location that corresponds to map application icon 5002-27. (Note that the application icons 5002 on the home page displayed in FIG. 5A may or may not correspond to open application icons, whereas the application icons 5002 in FIGS. 5C-5Z correspond to open application icons.)

In FIG. 5B, in response to detecting the finger gesture, the map application is launched and map application view 5004-1 is displayed on touch screen 112. In this example, the map application view includes a portion of a map and user interface objects, such as a search input field, a search icon, and a directions icon. Also in FIG. 5B, input 507 (e.g., a click or double-click on home button 204) is detected.

FIG. 5C illustrates that, in response to detecting input 507, a portion of map application view 5004-1 and application icon area 5006 are concurrently displayed. In some embodiments, in response to detecting input 507, the device enters into an application selection mode for selecting one of the concurrently open applications, and the portion of map application view 5004-1 and application icon area 5006 are concurrently displayed as part of the application selection mode. Application icon area 5006 includes an initial group of open application icons that correspond to at least some of the concurrently open applications. In this example, the multifunction device has multiple applications that are concurrently open, although they are not simultaneously displayed. Also in this example, application icon area 5006 includes application icons for a web browser (Safari), a music application (iPod), a finance application (Stocks), and a multimedia store application (iTunes).

In some embodiments, the concurrent display of the map application view and the application icon area may include an animation. For example, the map application view can slide up such that a portion of the map application view moves off the display and a portion of the map application view remains on the display. The application icon area can slide in simultaneously from the bottom of the screen such that the animation gives a visual appearance that the map application view and the application icon area are connected.

In FIG. 5C, finger gesture 509 (e.g., a tap gesture) is detected on touch screen 112 at a location that corresponds to web browser application icon 5002-37.

FIG. 5D illustrates that, in response to detecting the finger gesture at a location that corresponds to the web browser application icon, web browser application view 5004-2 is displayed on touch screen 112.

FIGS. 5E-5F illustrate scrolling of the application icon area. In FIG. 5E, contact 511 (e.g., a finger contact) is detected on touch screen 112 at a location 511-A that corresponds to application icon area 5006. In FIGS. 5E-5F, contact 511 moves across the touch screen 112 to a different location (e.g., 511-B), and application icons in application icon area 5006 are scrolled in accordance with the movement of contact 511.

FIGS. 5G-5I illustrate exemplary user interfaces for closing one of the concurrently open applications. In FIG. 5G, finger gesture 513 (e.g., a press-and-hold gesture) is detected on touch screen 112 at a location that corresponds to music application icon 5002-38, while the device is in an application selection mode. FIG. 5H illustrates that in response to detecting the finger gesture, the multifunction device enters into an application closure mode. In the application closure mode, the music application icon is visually distinguished from the rest of the application icons displayed on touch screen 112. In this example, the music application icon is animated (e.g., jiggled), and the rest of the displayed application icons are dimmed. In addition, an indicia of an application closure (e.g., a close-application icon, such as "-" icon 5012-1) is displayed adjacent to the music application icon.

In FIG. 5H, finger gesture 515 (e.g., a tap gesture) is detected on touch screen 112 at a location that corresponds to the visually distinguished application icon (e.g., the music application icon 5002-38). FIG. 5I illustrates that, in response to detecting the gesture, the visually distinguished application icon (e.g., 5002-38) is removed from the application icon area. Also in response to the gesture, the multifunction device closes a corresponding application (e.g., a music application). After the visually distinguished application icon (e.g., 5002-38) is removed, the multifunction device displays a new set of application icons without visual distinction (e.g., the application icons are no longer dimmed). The new set of application icons includes application icons that were included in the initial set of application icons except for the closed application icon (e.g., 5002-37, 5002-26, and 5002-32). An additional application icon (e.g., 5002-35) is added to the new set of application icons. Also, after removing the visually distinguished application icon, the multifunction device exits the application closure mode, and returns to the application selection mode. In some embodiments, a finger gesture (e.g., a tap gesture) at a location that corresponds to close-application icon 5012-1 removes the visually distinguished application icon.

FIGS. 5J-5K illustrate exemplary user interfaces including a music application view. In FIG. 5J, music application view 5004-3 (e.g., iPod application view) is displayed. Music application view 5004-3 includes music controls (e.g., play/pause, fast forward/next track, and rewind/previous track, and/or a scrubber bar). FIG. 5J also illustrates that an input 517 is detected (e.g., a single or double click on home button 204).

In FIG. 5K, a portion of music application view 5004-3 and application icon area 5006 are concurrently displayed. In this example, it is noted that the music application icon (e.g., 5002-38) is not displayed in the application icon area while the music application view (e.g., 5004-3) is displayed, regardless of how recent the corresponding music application is used, or whether the corresponding music application is playing music.

FIG. 5L illustrates an exemplary user interface including music control icons in the predefined area (e.g., music control icons 5106 (e.g., pause, previous track, and next track icons) in application icon area 5006-1). It is noted that music control icons 5106 and application icons are displayed on separate rows in (enlarged) predefined area 5006-1. In some embodiments, while the application icons are scrolled, music control icons 5106 remain on the display. In FIG. 5L, left-to-right swipe gesture 537 is detected on touch screen 112.

FIG. 5M illustrates an exemplary user interface including settings icons in the predefined area. In some embodiments, the settings icons are displayed in response to detecting left-to-right swipe gesture 537. In FIG. 5M, settings icons (e.g., rotate lock icon 5102-1, Wi-Fi icon 5102-2, and Bluetooth icon 5102-3) are displayed in application icon area 5006-1. Each settings icon, when activated (e.g., by a finger gesture), changes a corresponding setting (e.g., Wi-Fi icon 5102-2, when activated, turns on or off a Wi-Fi connection). In some embodiments, one or more application icons can be concurrently displayed with settings icons in application icon area 5006 (not shown).

FIG. 5N illustrates a rotation of the multifunction device 100. In response to detecting a rotation of the multifunction device 100, application icons 5002 are rotated and rearranged. In some embodiments, the number of application icons displayed in a landscape mode (e.g., five, six, etc.) is different from the number of application icons displayed in a portrait mode (e.g., three, four, etc.). In some embodiments, the application icons displayed in the landscape mode includes application icons displayed in the portrait mode (e.g., after a rotation of the device as shown in FIG. 5L from the portrait mode to a landscape mode, the device can display at least Stocks, Maps, iTunes, and Game Center icons (not shown)). In other embodiments, the application icons displayed in the landscape mode do not include application icons displayed in the portrait mode (e.g., FIGS. 5M-5N).

FIG. 5O illustrates an alternative user interface for selecting an open application. When the device enters an application selection mode (e.g., by input 507 in FIG. 5B), instead of displaying application icons (e.g., as shown in FIG. 5C), images of open applications (e.g., 5008-10, 5008-11, and 5008-13) can be displayed in predefined area 5006.

FIGS. 5P-5Y illustrate exemplary user interfaces including user interface objects corresponding to open applications, arranged in a grid. The user interface objects are typically user selectable (or user activatable).

FIGS. 5P and 5Q illustrate scrolling open application icons arranged in a grid. In FIG. 5P, open application icons 5002 (e.g., 5002-1 through 5002-9) are displayed in a three-by-three grid. In some embodiments, application icons 5002 can be the same as application icons illustrated in FIGS. 5A-5K (e.g., map application icons 5002-6 and 5002-27 can be identical). In other embodiments, application icons 5002 displayed in a grid can be different from application icons displayed elsewhere (e.g., within an application icon area 5006 or on home screen 5001).

FIG. 5P also illustrates that gesture 519 (e.g., a swipe gesture) is detected on touch screen 112. FIG. 5Q illustrates that, in response to detecting gesture 519, open application icons 5002 displayed on touch screen 112 in FIG. 5P are scrolled off the display, and a different set of open application icons 5002 (e.g., 5002-10 through 5002-18) are displayed on touch screen 112.

FIGS. 5R-5T illustrate exemplary user interfaces involving images of open applications (or corresponding application views). In FIG. 5R, images 5008 (e.g., 5008-10 through 5008-18) of open applications or application views (e.g., live thumbnails) are displayed in a grid. In some embodiments, the images of open applications are updated when the corresponding applications change corresponding application views (e.g., a browser displays new content on a webpage, a movie player plays movies, etc.).

In FIG. 5S, open application icons (e.g., 5002-36, 5002-35, and 5002-37) are displayed, at least partially overlapping the images of corresponding open applications (e.g., 5008-10, 5008-11, and 5008-12). In some embodiments, open application icons 5002 are displayed adjacent to the images 5008 of the corresponding open applications without overlap. In some embodiments, open application icons 5002 are displayed entirely overlapping the images 5008 of corresponding open applications.

FIG. 5T illustrates that at least a subset of the images 5008 includes status indicia for corresponding applications. In this example, map application image 5008-6 includes compass icon 5010-1, which indicates that certain features (e.g., a GPS tracking function) are activated in a corresponding map application. In some embodiments, open application icons (e.g., 5002) can include status indicia.

FIGS. 5U-5V illustrate exemplary user interfaces including an application closure mode. In FIG. 5U, one of the images (e.g., 5008-12) is displayed with a jiggling animation. In addition, image 5008-12 includes close-application icon 5012-2. Image 5008-12, when selected (e.g., by a finger tap gesture), removes image 5008-12 from the displayed set of images, and closes a corresponding application (e.g., a web browser application). Afterwards, the rest of the images (e.g., 5008-10, 5008-11, 5008-13 through 5008-18) and a new image (e.g., 5008-19) are displayed, as shown in FIG. 5V. The close-application icon operates in a manner analogous to the application closure mode as described above with reference to FIGS. 5G-5I.

FIGS. 5W-5X illustrate exemplary user interfaces including concurrent display of the open application icons and search icon 5004. In FIG. 5W, contact 521 is detected on touch screen 112 at a location corresponding to search icon 5104. FIG. 5X illustrates that, in response to detecting contact 521 at the location corresponding to search icon 5104, keyboard 5014 is displayed on touch screen 112. In some embodiments, search icon 5104 and keyboard 5014 are concurrently displayed on touch screen 112 with at least a subset of open application icons 5002 (e.g., application icons 5002 in FIG. 5X). In some embodiments, the concurrently displayed application icons correspond to applications that match the search term(s). In some embodiments, search icon 5104 and keyboard 5014 are concurrently displayed with a list of application (e.g., applications that match the search term(s)).

FIG. 5Y illustrates a rotation of the multifunction device 100. In response to detecting a rotation of the multifunction device 100, open application icons 5002 are rotated and rearranged. In some embodiments, the number of application icons displayed in a landscape mode (e.g., two-by-four, two-by-five, etc.) is different from the number of application icons displayed in a portrait mode (e.g., three-by-three, four-by-three, four-by-two, etc.).

FIGS. 5Z-5AA illustrate a gesture for displaying user selected information. In FIG. 5Z, gesture 523 (e.g., a swipe down gesture) is detected on touch screen 112 from a top edge of the display. FIG. 5AA illustrates that, in response to detecting gesture 523, an exemplary user interface including user selected information is displayed. The user selected information user interface includes, for example, user selectable icon (e.g., done icon 5020), user selected information (e.g., local weather 5016), and recent electronic notifications (e.g., recent email 5018-1 and upcoming events 5018-2). In some embodiments, a notification panel 5021 is displayed, and the user selectable icon (e.g., done icon 5020), user selected information (e.g., local weather 5016), and recent electronic notifications (e.g., recent email 5018-1 and upcoming events 5018-2) are displayed within the notification panel 5021.

In some embodiments, the notification panel 5021 is displayed over a portion of the touch screen 112. In some embodiments, the notification panel 5021 occupies less than all (e.g., at least 80% or 90% but less than 100%) of the touch screen 112. In some embodiments, at least one edge of the notification panel 5021 touches and/or appears to be docked to an edge of the touch screen 112. In some embodiments, the notification panel 5021 does not touch an edge of the touch screen 112 (e.g., portions of the home screen 5001 are visible on all sides of the notification panel 5021). In some embodiments, the home screen 5001 (e.g., a home screen background image and/or icons displayed in the home screen) is visible in portions of the touch screen 112 that the notification panel 5021 does not occupy. In some embodiments, portions of the home screen 5001 that are visible when the notification panel 5021 is displayed are blurred, shaded, or otherwise made visually less distinct when the notification panel 5021 is displayed. In some embodiments, where the notification panel 5021 occupies less than all of the touch screen 112, the areas that are not occupied by the notification panel 5021 are blank (e.g., no graphics, icons, wallpaper, etc., of the home screen 5001 are displayed in those areas).

FIGS. 5BB-5CC illustrates an exemplary user interface including three-dimensional stack of images of open applications. In FIG. 5BB, images of open applications are displayed in a three-dimensional stack extending backwards on the display. For example, an image of an open application that was used most recently (e.g., 5008-10) is displayed up front, an image of an open application that was used second most recently (e.g., 5008-11) is displayed right behind the most recently used application (e.g., 5008-10), and so on. In some embodiments, the images can be scrolled by a swipe gesture, and a corresponding application can be selected by a tap gesture. In FIG. 5BB, gesture 533 (e.g., a tap gesture) is detected at a location that corresponds to a respective image of an open application (e.g., a mail application). In response, a mail application view is displayed, as shown in FIG. 5CC.

FIGS. 5CC-5HH illustrate exemplary user interfaces for selecting one of the concurrently open applications. FIG. 5CC illustrates mail application view 5004-4 for an email application (e.g., Mail). In FIG. 5CC, mail application view 5004-4 includes email text, including link 5020-1 to a webpage. Gesture 525 (e.g., a tap gesture) is detected on touch screen 112 at a location that corresponds to link 5020-1.

In FIG. 5DD, in response to detecting gesture 525 at the location that corresponds to link 5020-1, the corresponding web page is displayed in web browser application view 5004-2. FIG. 5DD also illustrates that input 527 (e.g., a single or double click on home button 204) is detected.

FIG. 5EE illustrates that, in response to detecting input 527, a portion of home screen 5001, web browser application view 5008-12, and a portion of mail application view 5008-10 are displayed. FIG. 5EE also illustrates that tap gesture 535 can be detected at a location that corresponds to image 5008-10 of mail application. In response to detecting tap gesture 535, mail application view 5004-4 (as shown in FIG. 5CC) will be displayed without concurrently displaying any other application view. FIG. 5EE also illustrates that swipe gesture 529 can be detected on touch screen at a location that corresponds to mail application view 5008-10, and in FIG. 5FF, in response to detecting swipe gesture 529, application views (e.g., 5008-10 and 5008-12) are scrolled, and a portion of map application view 5008-6 is displayed.

In FIG. 5FF, when gesture 531 (e.g., a tap gesture) is detected at a location that corresponds to map application view 5008-6, in response, a map application view is displayed, as shown in FIG. 5GG.

In FIG. 5FF, when gesture 533 (e.g., a tap gesture) is detected at a location that corresponds to home screen 5001, in response, home screen 5001 is displayed, as shown in FIG. 5HH.

FIGS. 5II-5ZZ illustrate exemplary user interfaces for selecting one of concurrently open applications in accordance with some embodiments. In FIGS. 5II-5ZZ, it is assumed that the concurrently open applications include a web browser application, a mail application, a map application, a phone application, a bookmark application, a document application, a contacts application, a racing application, a notes application, a sudoku application, and a calendar application (in some embodiments, in the order of recency of use).

FIG. 5II illustrates that a swipe gesture that originates from location 539-1 on touch screen 112. In FIG. 5II, location 539-1 corresponds to an edge of touch screen 112. Alternatively, swipe gesture 551 is detected on touch screen 112. As used herein, a swipe gesture that originates from an edge of touch screen 112 is called an edge swipe (e.g., a swipe gesture that originates from location 539-1), and a swipe gesture that originates from a location other than a location on an edge of touch screen 112 is called a non-edge swipe (e.g., gesture 541).

FIGS. 5JJ-5KK illustrate an animation that is displayed in response to detecting the swipe gesture that originates from location 539-1 (FIG. 5II). However, in some embodiments, the animation illustrated in FIGS. 5JJ-5KK is displayed in response to detecting a non-edge swipe gesture (e.g., gesture 541 in FIG. 5II). In some other embodiments, a non-edge swipe gesture (e.g., horizontal gesture 541 in FIG. 5II) initiates a scrolling to a next page of a home screen or an application launch pad (not shown) that includes one or more application icons that are not shown in FIG. 5II.

In FIG. 5JJ, in response to detecting the swipe gesture that originates from location 539-1 (FIG. 5II), application icons shown in FIG. 5II are clustered. In some embodiments, as shown in FIG. 5JJ, labels for application icons are removed (e.g., the label "weather" for a weather application icon is removed). The swipe gesture that originates from location 539-1 includes a movement of a touch past location 539-2. Concurrently, image 5008-12 of an open application (e.g., a web browser application) is scrolled in onto touch screen 112. FIG. 5JJ also illustrates that an application icon 5002-37 that corresponds to a web browser application is scrolled in onto touch screen 112.

FIG. 5KK illustrates that application icons shown in FIG. 5II are further reduced in size, and image 5008-12 of an open application (e.g., a web browser application) is further scrolled on touch screen 112. In addition, a portion of image 5008-10 of an open application (e.g., a mail application) is scrolled in onto touch screen 112. FIG. 5KK also illustrates that application icon 5002-37 is further scrolled on touch screen 112 and application icon 5002-36 that corresponds to a mail application is concurrently scrolled in onto touch screen 112. In FIG. 5KK, the displayed user interface includes search icon 5104, which was described above with respect to FIGS. 5W-5X.

Although FIGS. 5II-5KK illustrate that open application icons (e.g., 5002-37 and 5002-36) are scrolled in concurrently with images of open applications (e.g., 5008-12 and 5008-10), in some embodiments, a timing of displaying the open application icons is not concurrent with displaying the images of open applications. For example, in some embodiments, the open application icons are displayed subsequent to the scrolling of the images of open applications In FIG. 5KK, a tap gesture is detected on touch screen 112. In one example, tap gesture 545 is detected on image 5008-10 of a mail application, and in response, application view 5004-4 for a mail application is displayed (e.g., FIG. 5CC). In another example, tap gesture 547 is detected on icon 5002-36 for a mail application, and in response, application view 5004-4 for a mail application is displayed (e.g., FIG. 5CC). Alternatively, tap gesture 541 is detected on image 5008-12 of a web browser application, and in response, application view 5004-2 for a web browser application is displayed (e.g., FIG. 5LL). In yet another example, tap gesture 543 is detected on icon 5002-37 for a web browser application, and in response, application view 5004-2 for a web browser application is displayed (e.g., FIG. 5LL).

FIG. 5LL illustrates application view 5004-2 for a web browser application. In some embodiments, application view 5004-2 is displayed in response to detecting tap gesture 541 or tap gesture 543 in FIG. 5KK. FIG. 5LL also illustrates a swipe gesture that originates from location 549-1 is detected on touch screen 112. Alternatively, swipe gesture 551 is detected on touch screen 112.

FIGS. 5MM-5NN illustrate an animation that is displayed in response to detecting the swipe gesture that originates from location 549-1 (FIG. 5LL). However, in some embodiments, the animation illustrated in FIGS. 5MM-5NN is displayed in response to detecting a non-edge swipe gesture (e.g., gesture 551 in FIG. 5LL). In some other embodiments, a non-edge swipe gesture (e.g., horizontal gesture 551 in FIG. 5LL) initiates an operation that is supported by the displayed application (e.g., a scrolling to a next page in the displayed application, not shown). Alternatively, a non-edge swipe gesture is ignored if the displayed application does not support the detected non-edge swipe gesture.

In FIG. 5MM, in response to detecting the swipe gesture that originates from location 549-1 (FIG. 5LL), application view 5004-2 shown in FIG. 5LL is reduced in size. The swipe gesture that originates from location 549-1 includes a movement of a touch past location 549-2. Concurrently, image 5008-10 of an open application (e.g., a mail application) is scrolled in onto touch screen 112. FIG. 5MM also illustrates that an application icon 5002-36 that corresponds to a mail application is scrolled in onto touch screen 112.

FIG. 5NN illustrates that application view 5004-2 shown in FIG. 5MM is further reduced in size, and image 5008-10 of an open application (e.g., a mail application) is further scrolled on touch screen 112. In addition, a portion of image 5008-6 of an open application icon (e.g., a map application) is scrolled in onto touch screen 112. FIG. 5NN also illustrates that application icon 5002-36 is further scrolled on touch screen 112 and application icon 5002-27 that corresponds to a map application is concurrently scrolled in onto touch screen 112. Application icon 5002-37 that corresponds to a web browser application is also displayed in FIG. 5NN. In some embodiments, one of the images of open applications (e.g., 5008-12) corresponds to a most recently used application. In some embodiments, one of the images of open applications (e.g., 5008-10) corresponds to a second most recently used application. In some embodiments, one of the images of open applications (e.g., 5008-6) corresponds to a third most recently used application. In other words, in some embodiments, the displayed images of open applications correspond to most recently used applications.

Although FIGS. 5MM-5NN illustrate that open application icons (e.g., 5002-36 and 5002-27) are scrolled concurrently with images of open applications (e.g., 5008-10 and 5008-6), in some embodiments, a timing of displaying the open application icons is not concurrent with displaying the images of open applications. For example, in some embodiments, the open application icons are displayed subsequent to the scrolling of the images of open applications.

In FIG. 5NN, a tap gesture is detected on touch screen 112. In one example, tap gesture 553 is detected on image 5008-12 of a web browser application, and in response, application view 5004-2 for a web browser application is displayed (e.g., FIG. 5LL). In another example, tap gesture 555 is detected on icon 5002-37 for a web browser application, and in response, application view 5004-2 for a web browser application is displayed (e.g., FIG. 5LL). Alternatively, tap gesture 557 is detected on image 5008-10 of a mail application, and in response, application view 5004-4 for a mail application is displayed (e.g., FIG. 5CC). In yet another example, tap gesture 559 is detected on icon 5002-36 for a mail application, and in response, application view 5004-4 for a mail application is displayed (e.g., FIG. 5CC). In an example where tap gesture 561 is detected on image 5008-6 or icon 5002-27 for a map application, application view 5004-1 for the map application is displayed in response (e.g., FIG. 5B).

FIG. 5NN also illustrates that swipe gesture 565 is detected at a location that corresponds to one of the images of open applications (e.g., image 5008-6). In some embodiments, swipe gesture 565 is detected at a location that corresponds to an area that encompasses the displayed images of open applications (e.g., an area between image 5008-10 and image 5008-6).

In FIG. 5OO, in response to detecting swipe gesture 565 (FIG. 5NN), images 5008-12, 5008-10, and 5008-6 are scrolled so that image 5008-12 is scrolled off touch screen 112 and a portion of image 5008-11 is scrolled in onto touch screen 112. Icons 5002-37, 5002-36, and 5002-27 are concurrently scrolled so that icon 5002-37 is scrolled off touch screen 112, and icon 5002-35 is scrolled in onto touch screen 112.

FIG. 5PP illustrates an alternative user interface that is displayed in response to detecting swipe gesture 565. In FIG. 5PP, in response to detecting swipe gesture 565 (FIG. 5NN), images 5008-12, 5008-10, and 5008-6 are scrolled so that image 5008-12 is scrolled off touch screen 112 and a portion of image 5008-11 is scrolled in onto touch screen 112, as shown in FIG. 5OO. In FIG. 5PP, icons 5002-37, 5002-36, and 5002-27 are concurrently scrolled and icons 5002-35 and 5002-13 are scrolled in onto touch screen 112 while icons 5002-37, 5002-36, and 5002-27 remain on touch screen 112.

As shown above in FIGS. 5NN-5PP, in some embodiments, swipe gesture 565 (FIG. 5NN) at a location that correspond to an area that encompasses the displayed images of open applications initiates scrolling the images of open applications by one image. In some embodiments, as shown in FIG. 5OO, swipe gesture 565 also initiates scrolling the open application icons by one icon. In some embodiments, another swipe gesture detected at a location that corresponds to the area that encompasses the displayed images of open applications initiates scrolling the images of open application by one image and the open application icons by one icon.

In some embodiments, as shown in FIG. 5PP, the number of displayed open application icons is increased (e.g., from three to five) so that displayed open application icons include open application icons that correspond to the displayed images of open applications (e.g., icons 5002-36, 5002-27, and 5002-35), a first open application icon that corresponds to an open application that is more recent in use than open applications that correspond to the displayed images of open applications (e.g., icon 5002-37), and a second open application icon that corresponds to an open application that is less recent in use than open applications that correspond to the displayed images of open applications (e.g., icon 5002-13). For example, in some embodiments, the displayed open application icons correspond to five most recently used applications. In some embodiments, another swipe gesture detected at a location that corresponds to the area that encompasses the displayed images of open applications initiates scrolling the images of open application by one image and the open application icons by one icon.

FIG. 5QQ illustrates a user interface equivalent to the user interface illustrated in FIG. 5NN. In FIG. 5QQ, swipe gesture 567 is detected at a location that corresponds to one of the open application icons (e.g., icon 5002-27). In some embodiments, swipe gesture 567 is detected at a location that corresponds to an area that encompasses the displayed open application icons (e.g., an area between icon 5002-36 and icon 5002-27).

In FIG. 5RR, in response to detecting swipe gesture 567 (FIG. 5QQ), icons 5002-37, 5002-36, and 5002-27 (FIG. 5QQ) are scrolled so that icons 5002-37, 5002-36, and 5002-27 are scrolled off touch screen 112 and icons 5002-35, 5002-13, and 5002-14 are scrolled in onto touch screen 112. Images 5008-12, 5008-10, and 5008-6 (FIG. 5QQ) are concurrently scrolled off touch screen 112 and images 5008-11, 5008-13, and 5008-14 are scrolled in onto touch screen 112.

FIG. 5SS illustrates an alternative user interface that is displayed in response to detecting swipe gesture 567. In FIG. 5SS, in response to detecting swipe gesture 567 (FIG. 5QQ), images 5008-12, 5008-10, and 5008-6 (FIG. 5QQ) are scrolled off touch screen 112 and images 5008-11, 5008-13, and 5008-14 are scrolled in onto touch screen 112, as shown in FIG. 5RR. In FIG. 5SS, icons 5002-37, 5002-36, and 5002-27 (FIG. 5QQ) are scrolled so that icons 5002-37 and 5002-36 are scrolled off touch screen 112 and icon 5002-27 remains on touch screen 112. In addition, icons 5002-35, 5002-13, 5002-14, and 5002-15 are scrolled in onto touch screen 112.

As shown above in FIGS. 5QQ-5SS, swipe gesture 567 (FIG. 5QQ) detected at a location that correspond to an area that encompasses the displayed open application icons initiates scrolling the open application icons by a group of open application icons. In comparison, as explained above, a swipe gesture detected at a location that corresponds to an area that encompasses the images of open applications (e.g., gesture 565 in FIG. 5NN) initiates scrolling the open application icons by one icon. Thus, displaying a first number of images of open applications and a second number, distinct from the first number, of open application icons, allows a user to navigate through concurrently open applications rapidly. For example, a user can quickly go through concurrently open applications with a swipe gesture on an open application icon. Alternatively, the user can go through concurrently open applications one-by-one by scrolling with a swipe gesture on an image of an open application.

In some embodiments, as shown in FIGS. 5QQ-5RR, swipe gesture 567 (FIG. 5QQ) initiates scrolling the open application icons so that all open application icons are replaced (e.g., three open application icons are removed and next three open application icons, based on their recency of use, are displayed). In some embodiments, as shown in FIG. 5SS, one of the open application icons displayed prior to detecting swipe gesture 567 (e.g., maps application icon 5002-27 in FIG. 5QQ) remains on touch screen 112, thereby providing a cue as to a relationship between open application icons shown in FIG. 5QQ and open application icons shown in FIG. 5SS.

FIG. 5SS also illustrates that swipe gesture 569 is detected at a location that corresponds to one of the images of open applications (e.g., image 5002-14). In some embodiments, swipe gesture 569 is detected at a location that corresponds to an area that encompasses the displayed open application icons.

In FIG. 5TT, in response to detecting swipe gesture 569 (FIG. 5SS), icons 5002-27, 5002-35, 5002-13, 5002-14, and 5002-15 (in FIG. 5SS) are scrolled so that icons 5002-27, 5002-35, 5002-13, and 5002-14 are scrolled off touch screen 112 and icon 5002-15 remains on touch screen 112. In addition, icons 5002-16, 5002-17, 5002-18, and 5002-19 are scrolled in onto touch screen 112. Furthermore, images 5008-11, 5008-13, and 5008-14 are concurrently scrolled off touch screen 112 and images 5008-16, 5008-17, and 5008-18 are scrolled in onto touch screen 112. "Contacts" application icon 5002-15 shown in FIG. 5SS remains on touch screen 112 after gesture 569 (FIG. 5TT), thereby providing a cue as to a relationship between open application icons shown in FIG. 5SS and open application icons shown in FIG. 5TT.

Alternatively, in response to detecting swipe gesture 569 (FIG. 5SS), in some embodiments, icons 5002-27, 5002-35, 5002-13, 5002-14 and 5002-15 (FIG. 5SS) are scrolled so that icons 5002-27, 5002-35, and 5002-13 are scrolled off touch screen 112 and icons 5002-14 and 5002-15 remain on touch screen 112 (not shown). In addition, icons 5002-16, 5002-17, and 5002-18 are scrolled in onto touch screen 112 (not shown). Images of open applications that correspond to application icons 5002-15, 5002-16, and 5002-17 are concurrently displayed (not shown). By replacing images 5008-11, 5008-13, and 5008-14 (FIG. 5SS) with images that correspond to application icons 5002-15, 5002-16, and 5002-17, images of open applications that correspond to open application icons 5002-35, 5002-13, 5002-14, 5002-15, 5002-16, and 5002-17 are displayed without omitting an image for any of open application icons 5002-35, 5002-13, 5002-14, 5002-15, 5002-16, and 5002-17. In comparison, in a transition from FIG. 5SS to FIG. 5TT, an image of an open application that corresponds to open application icon 5002-

15 is skipped (e.g., by scrolling through the image of an open application that corresponds to open application icon 5002-15) or not displayed (e.g., displaying the image of an open application that corresponds to open application icon 5002-15 is foregone).

FIG. 5UU illustrates an alternative user interface that is displayed in response to detecting swipe gesture 569. In FIG. 5UU, icons 5002-27, 5002-35, 5002-13, 5002-14, and 5002-15 (in FIG. 5SS) are scrolled off touch screen 112 and icons 5002-16, 5002-17, 5002-18, and 5002-19 are scrolled in onto touch screen 112. In addition, images 5008-11, 5008-13, and 5008-14 are concurrently scrolled off touch screen 112 and images 5008-17, 5008-18, and 5008-19 are scrolled in onto touch screen 112. Open application icons shown in FIG. 5UU and open application icons shown in FIG. 5SS do not have a common open application icon, thereby allowing a faster navigation through open application icons. In some embodiments, in a transition from FIG. 5SS to FIG. 5UU, an image of an open application that corresponds to open application icon 5002-15 is skipped (e.g., by scrolling through the image of an open application that corresponds to open application icon 5002-15) or not displayed (e.g., displaying the image of an open application that correspond to open application icon 5002-15 is foregone).

FIG. 5VV illustrates that gesture 571 (e.g., a tap gesture) is detected at a location that corresponds to search icon 5104.

In FIG. 5WW, a search input user interface that includes keyboard 5014 is displayed in response to gesture 571 (FIG. 5VV). As shown in FIG. 5WW, in some embodiments, keyboard 5014 is displayed over the user interface displayed prior to detecting gesture 571. FIG. 5WW also illustrates that gesture 573 (e.g., a tap gesture) is detected at a location that corresponds to a character "O" on keyboard 5014.

FIG. 5XX illustrates an alternative user interface that is displayed in response to detecting gesture 571. In response to detecting gesture 571, the displayed images of open applications (e.g., images 5008-17, 5008-18, and 5008-19) and open application icons (e.g., icons 5002-16, 5002-17, 5002-18, and 5002-19) are scrolled up. In some embodiments, the displayed images of open applications and open application icons are scrolled up so that the displayed images of open applications and open application icons do not overlap with the search input user interface (e.g., keyboard 5014). Alternatively, images of open applications and concurrent open applications (e.g., images 5008 and icons 5002) are positioned prior to detecting gesture 571 so that the displayed images of open applications and open application icons do not overlap with the search input user interface (e.g., keyboard 5014).

FIG. 5XX also illustrates that gesture 573 (e.g., a tap gesture) is detected at a location that corresponds to a character "O" on keyboard 5014.

FIG. 5YY illustrates that, in response to detecting gesture 573 (FIG. 5WW or FIG. 5XX), search icon 5014 is updated to display the received input, namely the character "O." In addition, in response to gesture 573, the previously displayed images of open applications and open application icons (e.g., images 5008-17, 5008-18, and 5008-19 and icons 5002-16, 5002-17, 5002-18, and 5002-19) are replaced with open application icons for at least some of open applications that match the received input (e.g., open applications with application names that include the character "O") and images for at least some of open applications that match the received input. In FIG. 5YY, open application icons for application names "phone," "bookmark," "document," "contacts," and "notes" are displayed. In addition, images for "bookmark," "document," and "contacts" applications are displayed. In FIG. 5YY, the images correspond to a predefined number (e.g., three) of open application icons displayed in the middle. In some other embodiments, images of open applications that correspond to a predefined number of left-most open application icons (e.g., "phone," "bookmark," and "document") or right-most open application icons (e.g., "document," "contacts," and "notes) may be displayed.

FIG. 5YY also illustrates that gesture 575 (e.g., a tap gesture) is detected at a location that corresponds to a character "N" on keyboard 5014.

FIG. 5ZZ illustrates that, in response to detecting gesture 575 (FIG. 5YY), search icon 5014 is updated to display the received input, namely the characters "ON." In addition, in response to gesture 577, the previously displayed images of open applications and open application icons (e.g., images 5008-13, 5008-14, and 5008-15 and icons 5002-35, 5002-13, 5002-14, 5002-15, and 5002-17) are replaced with open application icons for at least some of open applications that match the received input (e.g., open applications with application names that include "ON") and images for at least some of open applications that match the received input. In FIG. 5ZZ, open application icons and images for application names "phone" and "contacts" are displayed.

Although user interfaces illustrated in FIGS. 5KK and 5NN-5ZZ include search icon 5104, a person having ordinary skill in the art would understand that similar user interfaces that do not include search icon 5104 may be used.

FIGS. 5AAA-5HHH illustrate exemplary user interfaces for displaying settings icons and other information.

FIG. 5AAA illustrates an exemplary user interface (e.g., home screen 5001) displaying a plurality of application icons (e.g., corresponding to application icons 5002-21 through 5002-38, depicted in FIG. 5A). FIG. 5AAA illustrates upward swipe gestures 570 and 571 that can be detected by the device 100. Upward swipe gesture 570 is a non-edge swipe (e.g., it originates from a contact "within" the touch screen 112). Upward swipe gesture 571 is an edge swipe (e.g., it originates from an edge of touch screen 112 and/or a contact with both a touch-sensitive portion of the device 100 and a non-touch-sensitive portion of the device 100). Swipe gestures 570 and 571 can cause one or more settings icons (and/or other information) to be displayed on the device 100. In some embodiments, only one of swipe gestures 570 or 571 causes the one or more settings icons to be displayed. In some embodiments, either swipe gesture 570 or swipe gesture 571 can cause the one or more settings icons to be displayed.

FIG. 5BBB illustrates an exemplary user interface displaying one or more settings icons in response to detecting swipe gesture 570 or swipe gesture 571. As shown in FIG. 5BBB, a settings panel 5024 is displayed. In some embodiments, the settings panel 5024 is displayed over a portion of the touch screen 112. In some embodiments, the settings panel 5024 occupies less than all (e.g., at least 80% or 90% but less than 100%) of the touch screen 112. In some embodiments, at least one edge of the settings panel 5024 touches and/or appears to be docked to an edge of the touch screen 112. In some embodiments, the settings panel 5024 does not touch an edge of the touch screen 112 (e.g., portions of the home screen 5001 are visible on all sides of the settings panel 5024). In some embodiments, the home screen 5001 (e.g., a home screen background image and/or icons displayed in the home screen) is visible in portions of the touch screen 112 that the settings panel 5024 does not occupy. In some embodiments, portions of the home screen 5001 that are visible when the settings panel 5024 is displayed are blurred, shaded, or otherwise made visually less distinct when the settings panel 5024 is displayed. In some embodiments, where the settings panel 5024 occupies less than all of the touch screen 112, the areas that are not occupied by the settings panel 5024 are blank (e.g., no graphics, icons, wallpaper, etc., of the home screen 5001 are displayed in those areas).

In some embodiments, the settings panel 5024 looks substantially similar to the notification panel 5021. For example, the settings panel 5024 and the notification panel may use the same or substantially similar background graphics and/or color. In some embodiments, the settings panel 5024 looks substantially different from the notification panel 5021. For example, the settings panel 5024 and the notification panel 5021 may use different background graphics and/or colors.

In FIG. 5BBB, settings icons (e.g., settings icons 5022-1 through 5022-5) are displayed in a settings panel 5024. Settings icons include, for example, a Wi-Fi icon 5022-1, a Bluetooth icon 5022-2, an airplane mode icon 5022-3, a do-not-disturb icon 5022-4, and a rotation lock icon 5022-5. In some embodiments, the do-not-disturb icon 5022-4 corresponds to a setting in which notifications (e.g., ring tones, audible email notifications, etc.) are turned off while the "do-not-disturb" setting is selected or "on." In some embodiments, other settings icons are displayed. In some embodiments, the particular settings (and hence settings icons) displayed in the settings panel are determined by a user. Thus, a user can select more, fewer, or different settings to be represented in the settings panel 5024. For example, a settings icon corresponding to a "3G" setting (not shown) may replace the rotation lock icon 5022-5.

In some embodiments, settings icons 5022-1 through 5022-5 are "on/off" switches (e.g., they represent a setting that can have one of two distinct states). In some embodiments, settings icons 5022-1 through 5022-5 change appearance based on the state of its underlying setting. For example, the settings icons 5022-1 through 5022-5 may have a first color, shape, or other characteristic when the underlying setting is "off," and a second color, shape, or other characteristic distinct from the first when the underlying setting is on.

In FIG. 5BBB, also displayed in the settings panel 5024 are brightness adjustment control 5026 (e.g., a slider bar), audio control icons 5028 (e.g., play/pause, fast forward, reverse, stop, volume controls, and/or track controls), and user-specified application icons 5030-1 through 5030-4. As shown in FIG. 5BBB, settings icons 5022-1 through 5022-5 are displayed in a first portion of the settings panel 5024, brightness adjustment control 5026 are displayed in a second portion of the settings panel 5024 beneath the first portion, audio control icons 5028 are displayed in a third portion of the settings panel 5024 beneath the second portion, and user-specified application icons 5030-1 through 5030-4 are displayed in a fourth portion of the settings panel 5024 beneath the third portion. Some embodiments display these items in another arrangement.

FIG. 5CCC illustrates another exemplary user interface displaying one or more settings icons in response to detecting swipe gesture 570 or swipe gesture 571. In FIG. 5CCC, settings icons 5022-1 through 5022-5, brightness adjustment control 5026, audio control icons 5028, and user-specified application icons 5030-1 through 5030-4 are displayed on the touch screen 112 without the settings panel.

FIG. 5DDD illustrates an exemplary user interface displaying one or more settings icons in response to detecting swipe gesture 570 or swipe gesture 571 (e.g., in FIG. 5AAA). As shown in FIG. 5DDD, a settings panel 5024 is displayed. In some embodiments, the settings panel 5024 is displayed over a portion of the touch screen 112. In some embodiments, the settings panel 5024 occupies less than all (e.g., at least 80% or 90% but less than 100%) of the touch screen 112. In some embodiments, at least one edge of the settings panel 5024 touches and/or appears to be docked to an edge of the touch screen 112. In some embodiments, the settings panel 5024 does not touch an edge of the touch screen 112 (e.g., portions of the home screen 5001 are visible on all sides of the settings panel 5024). In some embodiments, the home screen 5001 (e.g., a home screen background image and/or icons displayed in the home screen) is visible in portions of the touch screen 112 that the settings panel 5024 does not occupy. In some embodiments, portions of the home screen 5001 that are visible when the settings panel 5024 is displayed are blurred, shaded, or otherwise made visually less distinct when the settings panel 5024 is displayed. In some embodiments, where the settings panel 5024 occupies less than all of the touch screen 112, the areas that are not occupied by the settings panel 5024 are blank (e.g., no graphics, icons, wallpaper, etc., of the home screen 5001 are displayed in those areas).

In some embodiments, the settings panel 5024 looks substantially similar to the notification panel 5021 shown in FIG. 5AA. For example, the settings panel 5024 and the notification panel may use the same or substantially similar background graphics and/or color. In some embodiments, the settings panel 5024 looks substantially different from the notification panel 5021. For example, the settings panel 5024 and the notification panel 5021 may use different background graphics and/or colors.

In FIG. 5DDD, settings icons (e.g., settings icons 5022-1 through 5022-5) are displayed in a settings panel 5024. Settings icons include, for example, a Wi-Fi icon 5022-1, a Bluetooth icon 5022-2, an airplane mode icon 5022-3, a do-not-disturb icon 5022-4, and a rotation lock icon 5022-5. In some embodiments, the do-not-disturb icon 5022-4 corresponds to a setting in which notifications (e.g., ring tones, audible email notifications, etc.) are turned off while the "do-not-disturb" setting is selected or "on." In some embodiments, other settings icons are displayed. In some embodiments, the particular settings (and hence settings icons) displayed in the settings panel are determined by a user. Thus, a user can select more, fewer, or different settings to be represented in the settings panel 5024. For example, a settings icon corresponding to a "3G" setting (not shown) may replace the rotation lock icon 5022-5.

In some embodiments, settings icons 5022-1 through 5022-5 are "on/off" switches (e.g., they represent a setting that can have one of two distinct states). In some embodiments, settings icons 5022-1 through 5022-5 change appearance based on the state of its underlying setting. For example, the settings icons 5022-1 through 5022-5 may have a first color, shape, or other characteristic when the underlying setting is "off," and a second color, shape, or other characteristic distinct from the first when the underlying setting is on.

In FIG. 5DDD, also displayed in the settings panel 5024 are brightness adjustment control 5026 (e.g., a slider bar), audio control icons 5028 (e.g., play/pause, fast forward, reverse, stop, volume controls, and/or track controls), sharing status indicator icon 5032 and remote media controls icon 5034, and user-specified application icons 5030-1 through 5030-4. As shown in FIG. 5DDD, settings icons 5022-1 through 5022-5 are displayed in a first portion of the settings panel 5024, brightness adjustment control 5026 are displayed in a second portion of the settings panel 5024 beneath the first portion, audio control icons 5028 are displayed in a third portion of the settings panel 5024 beneath the second portion, sharing status indicator icon 5032 and remote media controls icon 5034 are displayed in a fourth portion of the setting panel 5024 beneath the third portion, and user-specified application icons 5030-1 through 5030-4 are displayed in a fifth portion of the settings panel 5024 beneath the fourth portion. Some embodiments display these items in another arrangement.

In some embodiments, sharing status indictor icon 5032, when activated, causes device 100 to display a discoverability interface for changing the discoverability (or availability) of device 100 for a sharing functionality. In some embodiments, the sharing functionality enables device 100 to share media content with one or more devices different from device 100. More details on the sharing functionality are described in U.S. provisional Application Ser. No. 61/832,939, filed Jun. 9, 2013, entitled "Device, Method, and Graphical User Interface for Sharing Content From a Respective Application." In some embodiments, remote media controls icon 5034, when activated, causes device 100 to display an interface for adjusting media player settings for one or more remote devices different from device 100.

FIG. 5EEE illustrates another exemplary user interface displaying one or more settings icons in response to detecting swipe gesture 570 or swipe gesture 571. In FIG. 5EEE, settings icons 5022-1 through 5022-5, brightness adjustment control 5026, audio control icons 5028, sharing status indicator icon 5032 and remote media controls icon 5034, and user-specified application icons 5030-1 through 5030-4 are displayed on the touch screen 112 without the settings panel. FIG. 5EEE also illustrates device 100 detecting gesture 580 (e.g., a tap gesture) at a location that corresponds to sharing status indicator icon 5032.

FIG. 5FFF illustrates device 100 displaying discoverability interface 5036 on touch screen 112 in response to detecting gesture 580 in FIG. 5EEE. In FIG. 5FFF, discoverability interface 5036 includes one or more options for adjusting the discoverability (or availability) of device 100 for the sharing functionality. In FIG. 5FFF, discoverability interface 5036 includes "off" affordance 5038-1, which when activated, causes device 100 to disable the sharing functionality, a "contacts only" affordance 5038-2, which when activated, causes device 100 to be available for sharing with only contacts (e.g., contacts in the address book associated with the user of device 100 or a specified list of contacts associated with the sharing functionality) within "sharing range" of device 100, "everyone" affordance 5038-3, which when activated, causes device 100 to be available (e.g., advertise the availability of device 100) for sharing with everyone (e.g., all users with a compatible sharing functionality enabled on their respective device) within "sharing range" of device 100, and "cancel" affordance 5038-4, which when activated, causes device 100 to dismiss discoverability interface 5036. In some embodiments, "sharing range" is limited to the current WiFi capabilities of device 100 or to near-field communication or a communication protocol specified by the sharing functionality. FIG. 5FFF also illustrates device 100 detecting gesture 581 (e.g., a tap gesture) at a location that corresponds to "everyone" affordance 5038-3.

FIG. 5GGG illustrates device 100 displaying an exemplary user interface displaying one or more settings icons. In FIG. 5GGG, sharing status indicator icon 5032 displays text indicating that the sharing functionality is currently in an "everyone" sharing mode in response to selection of "everyone" affordance 5038-3 in FIG. 5FFF. FIG. 5GGG also illustrates device 100 detecting gesture 582 (e.g., a tap gesture) at a location that corresponds to remote media controls icon 5034.

FIG. 5HHH illustrates device 100 displaying remote media controls interface 5040 on touch screen 112 in response to detecting gesture 582 in FIG. 5GGG. In FIG. 5HHH, remote media controls interface 5040 includes controls (e.g., on/off switches and volume sliders) for selecting one or more devices from a plurality of remote devices 5042-1, 5042-2, 5042-3, 5042-4 on which to play media content. In FIG. 5HHH, remote media controls interface 5040 also includes master controls 5044 (e.g., play/pause, fast forward, reverse, stop, volume controls, and/or track controls) for controlling the media content played on the one or more selected remote devices.

Figure 6A:
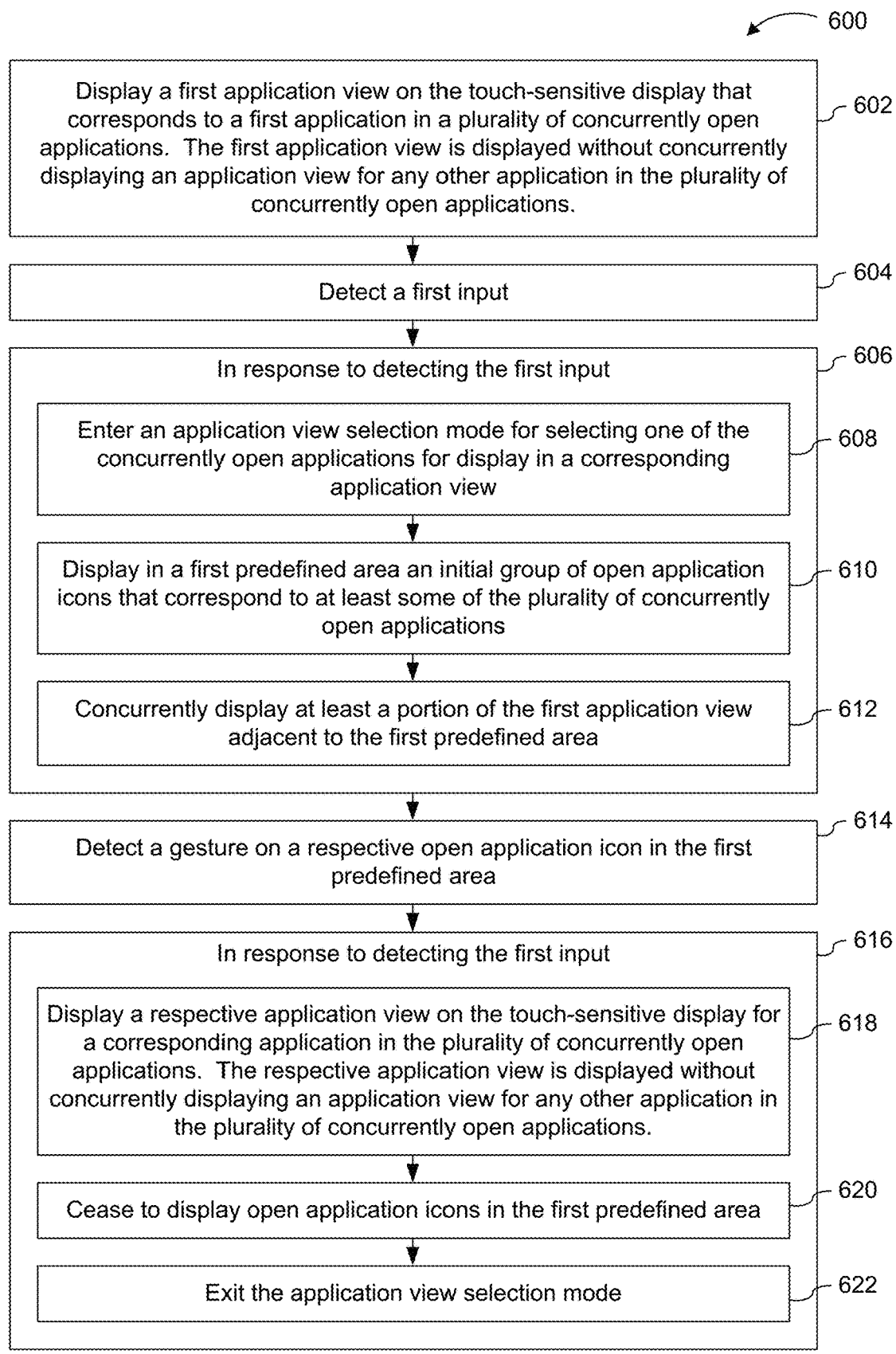
FIGS. 6A-6C are flow diagrams illustrating a method of selecting one of concurrently open applications in accordance with some embodiments.
Figure 6B:
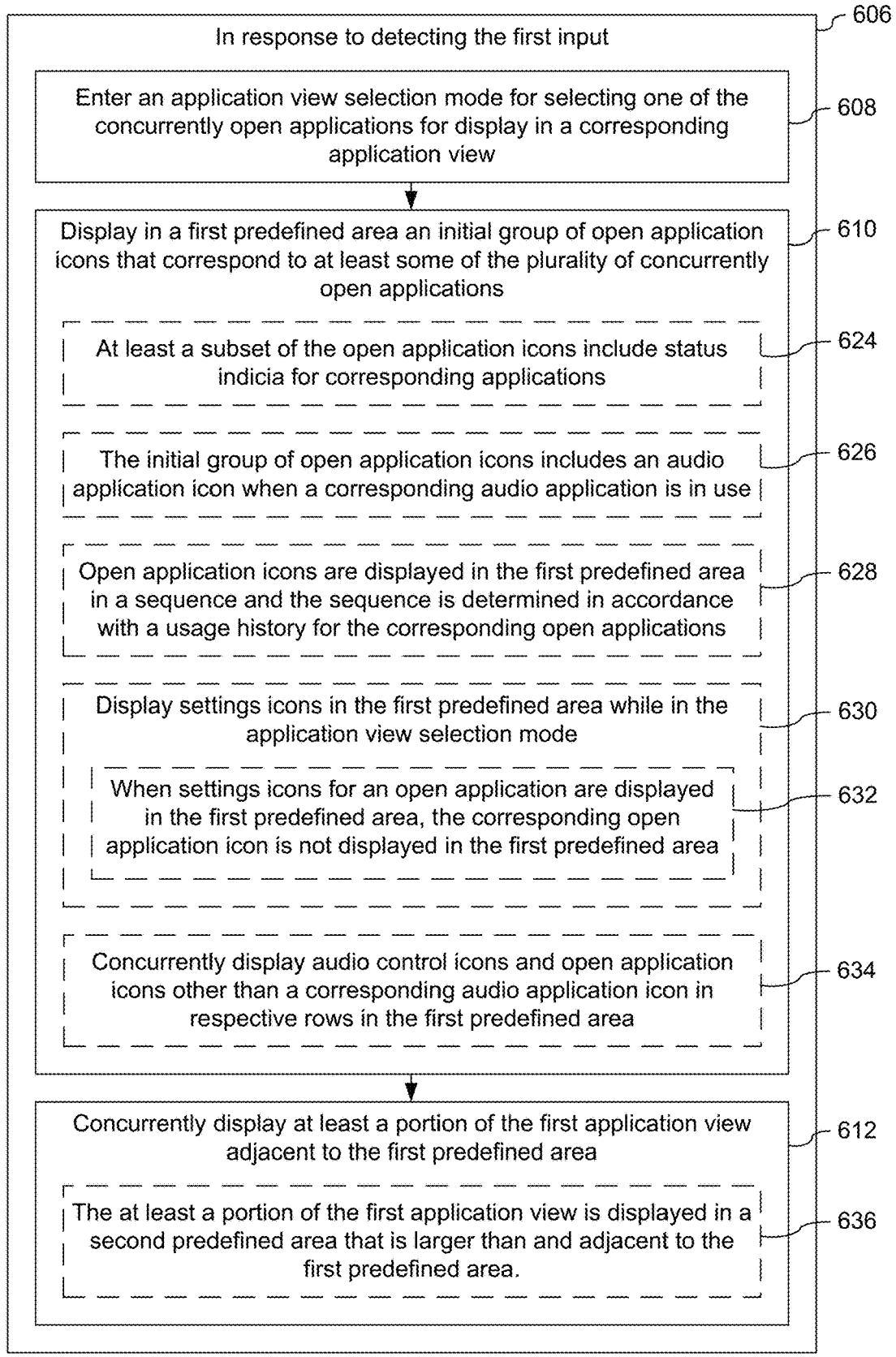
Figure 6C:
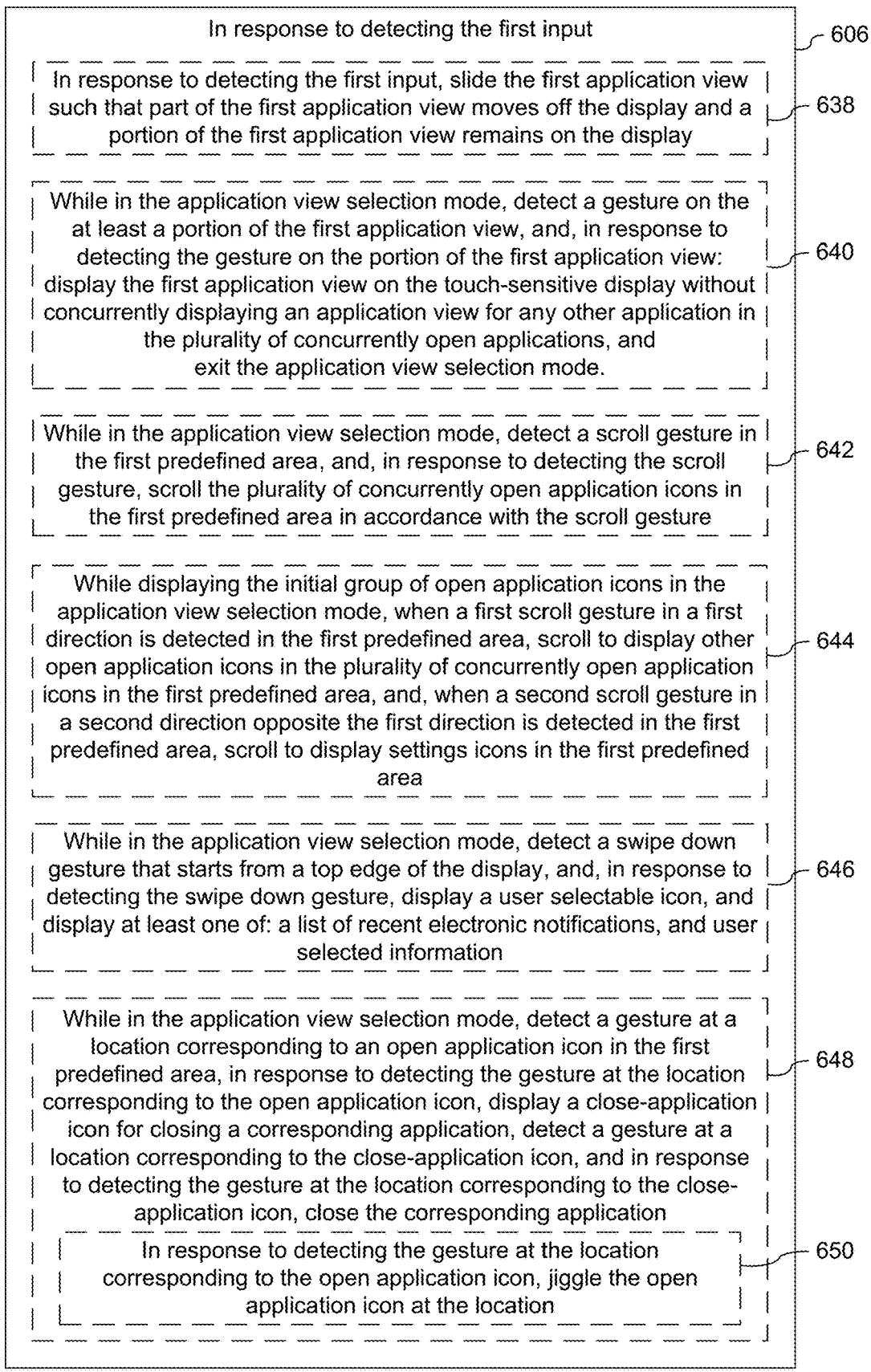

FIGS. 6A-6C are flow diagrams illustrating method 600 of selecting one of concurrently open applications in accordance with some embodiments. Method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

The device displays (602) a first application view (e.g., map application view 5004-1 in FIG. 5B) on a touch-sensitive display that corresponds to a first application in a plurality of concurrently open applications (e.g., the device may have multiple open applications, such as Safari, iPod, Stocks, and iTunes). The first application view is displayed without concurrently displaying an application view for any other application in the plurality of concurrently open applications (e.g., in FIG. 5B, map application view 5004-1 is displayed without concurrently displaying an application view for any other application). In other words, in a normal operation mode, just a single application view is displayed, which corresponds to one of the plurality of concurrently open applications. The other open applications (e.g., the other open applications, such as Safari, iPod, Stocks, and iTunes) may be running in the background or be in a suspended or hibernated operating state.

The device detects (604) a first input (e.g., input 507 in FIG. 5B). In some embodiments, the first input is a single tap on a home button (e.g., 204). In some embodiments, the first input is a double tap on the home button (e.g., 204). In some embodiments, the first input is a gesture on the touch-sensitive display, such as a three-finger pinch gesture or a swipe gesture.

In response to detecting the first input (606), the device performs the following actions. The device enters (608) an application view selection mode for selecting one of the concurrently open applications for display in a corresponding application view. The device displays (610) in a first predefined area (e.g., a strip in a predefined location on the touch-sensitive display) an initial group of open application icons that correspond to at least some of the plurality of concurrently open applications (e.g., application icons 5002 in application icon area 5006 in FIG. 5C). In some embodiments, the device maintains the display of the first predefined area without further input (e.g., press-and-hold on home button 204 or on touch screen 112) until the application view selection mode is exited. In some embodiments, the area displays the open application icons as a scrollable strip with a linear array of open application icons (e.g., application icon area 5006 is scrollable as shown in FIGS. 5E-5F). The device concurrently displays (612) at least a portion of the first application view adjacent to the first predefined area (e.g., in FIG. 5C, at least a portion of map application view 5004-1 and application icon area 5006 are concurrently displayed). The concurrent display provides several benefits. For example, it provides context by maintaining the first application view while an open application icon is being selected. In addition, it is easy to get back to the first application (and cease the display of the application icon area) by, for example, tapping on the first application view.

In some embodiments, at least a subset of the open application icons include (624 in FIG. 6B) status indicia for corresponding applications. For example, an audio application icon includes a "now recording" indicia (e.g., a red dot) displayed on or proximate to the audio application icon. In another example, a map application icon includes a "GPS active" indicia (e.g., a compass image) displayed on or proximate to the map application icon (e.g., see an analogous example in FIG. 5S where image 5008-6 includes a compass icon 5010-1).

In some embodiments, the initial group of open application icons includes (626) an audio application icon when a corresponding audio application is in use. For example, when a music player application is playing music, the initial group of open application icons always includes a corresponding music player application icon (e.g., iPod application icon 5002-38 in FIG. 5C). Displaying the audio application icon as part of the initial group of open application icons facilitates rapid selection and display of the corresponding audio application. For example, there is no need to scroll the open application icons in the predefined area to display the audio application icon.

In some embodiments, open application icons are displayed (628) in the first predefined area in a sequence and the sequence is determined in accordance with a usage history for the corresponding open applications. For example, assume multimedia store application iTunes is used first, then finance application Stocks, then music application iPod, web browser application Safari, and finally a map application is the last application used prior to entering the application view selection mode. Then, in some embodiments, the initial group of open application icons will be iTunes, Stocks, iPod, and Safari. In addition, the sequence of open application icons will be Safari, iPod, Stocks, and iTunes (as shown in FIG. 5C). In some embodiments, selecting an open application icon corresponding to one of the initial group of open applications does not change the sequence in which the initial group of open application icons is displayed. For example, selecting the iTunes application icon in FIG. 5C and re-entering the application view selection mode does not change the sequence of open application icons, Safari, iPod, Stocks, and iTunes. This has a benefit of providing a previously presented sequence (which is familiar to the user) of open application icons, thereby avoiding the need for the user to learn a new arrangement of open application icons. This reduces the cognitive burden on a user and produces a more efficient human-machine interface.

In some embodiments, the device displays scrollable pages of icons (e.g., application launch icons and/or folder icons), a scrollable list of icons, or a scrollable array of icons in a predefined area of the display (e.g., application icons 5002-21 through 5002-34 are displayed on a scrollable page of icons in FIG. 5A). The device concurrently displays stationary icons (e.g., frequently used or favorite application launch icons and/or folder icons selected by a user) in another, distinct predefined area of the display (e.g., a dock area) (e.g., application icons 5002-35 through 5002-38 are stationary icons in the dock area). In some embodiments, the device can also enter the application view selection mode from this display in response to detecting an input (e.g., in response to detecting a double tap on the home button). In some embodiments, in response to detecting the input, the stationary icons in the dock area are replaced by the initial group of open application icons that correspond to at least some of the plurality of concurrently open applications. In other words, the dock area in normal operation mode is replaced by the first predefined area with open application icons in the application view selection mode. In some embodiments, in response to detecting the input, the application icons on the scrollable pages and the dock area (e.g., application icons 5002-21 through 5002-38) slide up, and at least a subset of the application icons and a predefined area including open application icons are concurrently displayed, in a manner analogous to the concurrent display of application view 5004-1 and predefined area 5006 in FIG. 5C.

In some embodiments, the device displays (630) settings icons in the first predefined area while in the application view selection mode (e.g., settings icons 5102 in FIG. 5M). Exemplary setting icons include: a rotation lock icon; communication mode icons, such as an airplane mode icon, a Wi-Fi icon, and/or Bluetooth icon; and audio controls, such as play/pause, fast forward, reverse, stop, volume controls, and/or track controls.

In some embodiments, when settings icons for an open application are displayed in the first predefined area, the corresponding open application icon is not displayed (632) in the first predefined area. For example, when music player controls are displayed in the first predefined area, the corresponding music player application icon is not displayed (e.g., in FIG. 5L, when music player controls 5106 are displayed in application icon area 5006-1, the corresponding music player application icon (e.g., iPod) is not displayed in application icon area 5006-1).

In some embodiments, the device concurrently displays (634) audio control icons and open application icons other than a corresponding audio application icon in respective rows in the first predefined area (e.g., audio control icons 5106 and other application icons in respective rows in application icon area 5006-1 in FIG. 5L).

In some embodiments, the at least a portion of the first application view is displayed (636) in a second predefined area that is larger than and adjacent to the first predefined area. For example, in FIG. 5C, the area where a portion of map application view 5004-1 is displayed is larger than and adjacent to application icon area 5006.

In some embodiments, a first set of open application icons includes the initial group of open application icons, and the first set of open application icons is displayed in a first orientation. The device detects a rotation of the multifunction device from the first orientation to a second orientation, and displays a second set of open application icons in the second orientation (e.g., FIG. 5N). The initial group of open application icons and the second set of open application icons have different numbers of open application icons (e.g., in FIG. 5N, the second set of open application icons has six open application icons, whereas the initial group of applications in FIG. 5C has four open application icons). In some embodiments, displaying the second set of open application icons in the second orientation includes ceasing to display the first set of open application icons in the first orientation. In some embodiments, displaying the second set of open application icons in the second orientation includes rearranging the first set of open application icons in the first orientation.

The device detects (614 in FIG. 6A) a gesture (e.g., a tap gesture) on a respective open application icon in the first predefined area (e.g., gesture 509 on application icon 5002-37 in FIG. 5C). In response to detecting the gesture on the respective open application icon (616), the device performs the following actions. The device displays (618) a respective application view on the touch-sensitive display for a corresponding application in the plurality of concurrently open applications (e.g., browser application view 5004-2 in FIG. 5D). The respective application view is displayed without concurrently displaying an application view for any other application in the plurality of concurrently open applications (e.g., in FIG. 5D, browser application view 5004-2 is displayed without concurrently displaying any other application views). The device ceases (620) to display open application icons in the first predefined area (e.g., application icon area 5006 and application icons 5002 in application icon area 5006 are no longer displayed in FIG. 5D). The device exits (622) the application view selection mode (and enters a normal operation mode for the respective application).

In some embodiments, while in the application view selection mode, the device performs (640 in FIG. 6C) the following actions. The device detects a gesture (e.g., a tap gesture) on the at least a portion of the first application view. In response to detecting the gesture on the portion of the first application view, the device displays the first application view on the touch-sensitive display without concurrently displaying an application view for any other application in the plurality of concurrently open applications, and exits the application view selection mode (and enters a normal operation mode for the first application). For example, in FIG. 5C, when a gesture is detected on touch screen 112 at a location corresponding to map application view 5004-1, the device displays map application view 5004-1 without concurrently displaying application icon area 5006 or an application view for any other application, as shown in FIG. 5B.

In some embodiments, in response to detecting the first input, the device slides (638, FIG. 6C) the first application view such that part of the first application view moves off the display and a portion of the first application view remains on the display (e.g., in FIG. 5C, a portion of map application view 5004-1 moves off the display and a portion of map application view 5004-1 remains on the display).

In some embodiments, while in the application view selection mode, the device detects (642) a scroll gesture (e.g., a swipe gesture) in the first predefined area, and in response to detecting the scroll gesture, scrolls the plurality of concurrently open application icons in the first predefined area in accordance with the scroll gesture (e.g., FIGS. 5E-5F).

In some embodiments, while displaying the initial group of open application icons in the application view selection mode, the device performs (644) one of the following actions. When a first scroll gesture in a first direction (e.g., a right-to-left swipe gesture) is detected in the first predefined area, the device scrolls to display other open application icons in the plurality of concurrently open application icons in the first predefined area (e.g., FIGS. 5E-5F). When a second scroll gesture in a second direction opposite the first direction (e.g., a left-to-right swipe gesture) is detected in the first predefined area, the device scrolls to display settings icons in the first predefined area (e.g., FIGS. 5L-5M). In some embodiments, when the second scroll gesture in a second direction different from the first direction (e.g., a top-to-bottom swipe gesture, a bottom-to-top swipe gesture, or a diagonal swipe gesture) is detected in the first predefined area, the device scrolls to display settings icons in the first predefined area.

In some embodiments, while in the application view selection mode, the device detects (646) a swipe down gesture that starts from a top edge of the display (e.g., gesture 523 in FIG. 5Z). In response to detecting the swipe down gesture, the device displays a user selectable icon (e.g., done icon 5020 in FIG. 5AA), and displays at least one of: a list of recent electronic notifications, (e.g., recent emails 5018-1 and/or upcoming events 5018-2) and user selected information (e.g., local weather information 5016, stock price (not shown), news headings (not shown), etc.).

In some embodiments, while in the application view selection mode, the device performs the following actions. The device detects (648) a gesture at a location corresponding to an open application icon in the first predefined area (e.g., press-and-hold gesture 513 on open application icon 5002-38 in FIG. 5G). In response to detecting the gesture at the location corresponding to the open application icon, the device displays a close-application icon for closing a corresponding application (e.g., an "X" icon or "-" icon 5012-1 on or proximate to the open application icon). The device detects a gesture at a location corresponding to the close-application icon (e.g., a tap gesture on close-application icon 5012-1). In response to detecting the gesture at the location corresponding to the close-application icon, the device closes the corresponding application. In other words, the device performs quitting/ending of the corresponding application so that the corresponding application ceases to be an open application. Alternatively, a tap gesture on the open application icon including the close-application icon (e.g., gesture 515 on open application icon 5002-38 in FIG. 5H) has the same effect.

In some embodiments, in response to detecting the gesture at the location corresponding to the open application icon, the device jiggles (650) the open application icon at the location. In some embodiments, in response to detecting the gesture at the location corresponding to the open application icon, the device visually distinguishes the open application icon by dimming other open application icons (e.g., FIG. 5H).

As described above, method 600 is used to select a single application for display among multiple, concurrently open applications. An analogous method may also be used to select a single view for display among multiple, concurrently open views in a single application (e.g., selecting one web page for display among multiple, concurrently open web pages in a browser application).

Note that details of the processes described above with respect to method 600 (e.g., FIGS. 6A-6B and 5A-5HH) are also applicable in an analogous manner to the methods described below. For example, methods 700, 800, 900, 1000, and 1100 may include one or more of the characteristics of the various methods described above with reference to method 600. For brevity, these details are not repeated below.

Figure 7:
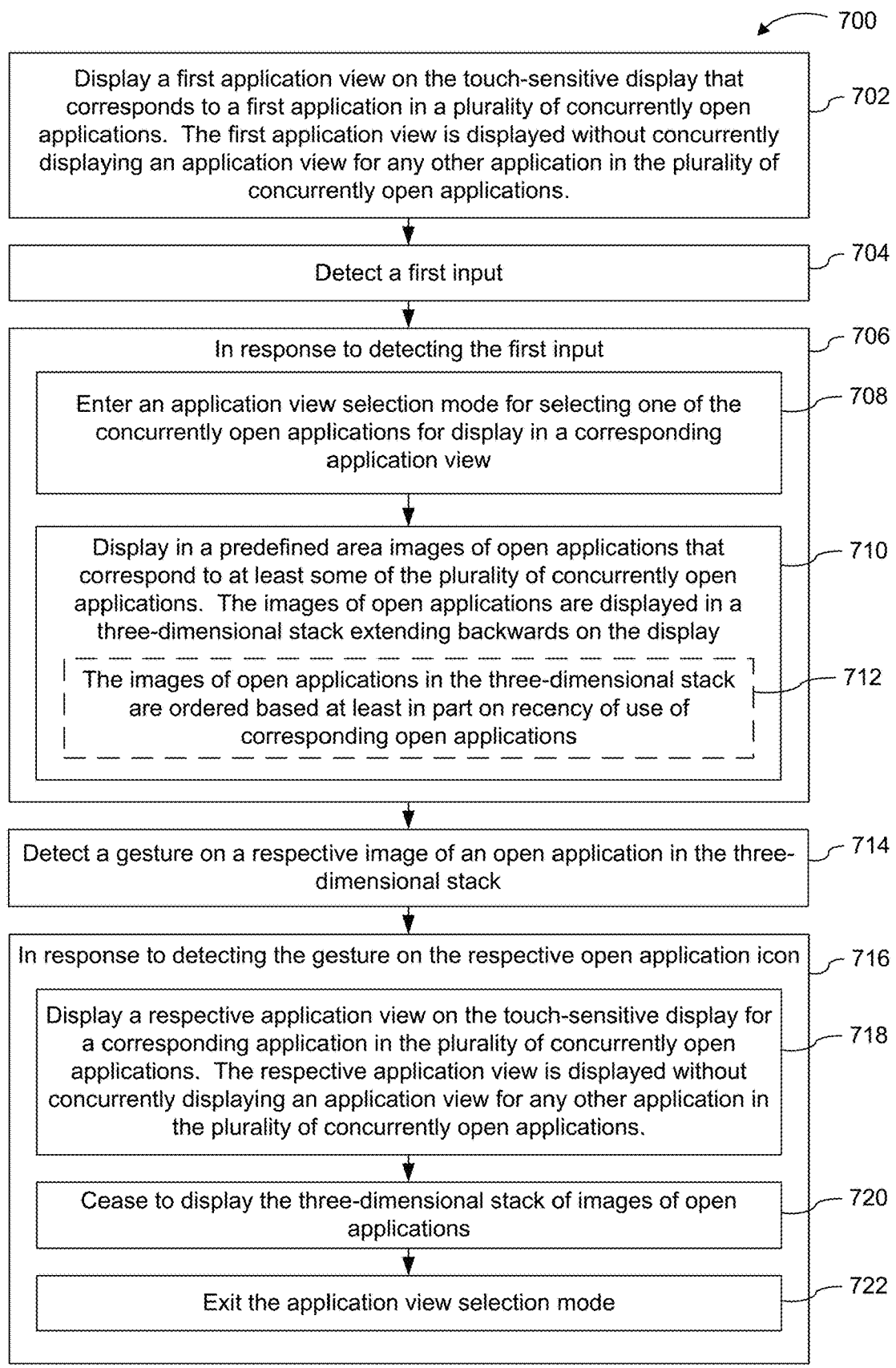
FIG. 7 is a flow diagram illustrating a method of selecting one of concurrently open applications in accordance with some embodiments.

FIG. 7 is a flow diagram illustrating method 700 of selecting one of concurrently open applications in accordance with some embodiments. Method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

The device displays (702) a first application view on a touch-sensitive display that corresponds to a first application in a plurality of concurrently open applications. The first application view is displayed without concurrently displaying an application view for any other application in the plurality of concurrently open applications (e.g., map application view 5004-1 in FIG. 5B).

The device detects (704) a first input (e.g., input 507 in FIG. 5B). In response to detecting the first input (706), the device enters (708) an application view selection mode for selecting one of the concurrently open applications for display in a corresponding application view, and displays (710) in a predefined area images of open application that correspond to at least some of the plurality of concurrently open applications (e.g., in FIG. 5BB, images 5008 that correspond to at least some of the plurality of concurrently open applications are displayed). The images of open applications are displayed in a three-dimensional stack extending backwards on the display (e.g., three-dimensional stack of images 5008 in FIG. 5BB).

In some embodiments, the images of open applications include open application icons (e.g., see an analogous example of images 5008 including open application icons 5002 in FIG. 5S). Alternatively, the device can display in the predefined area, open application icons that correspond to at least some of the plurality of concurrently open applications, in a three-dimensional stack.

In some embodiments, the images of open applications in the three-dimensional stack are ordered (712) based at least in part on recency of use of corresponding open applications (e.g., an image of an open application that corresponds to the most recently used open application is displayed at the front of the stack, while progressively less recently used applications are displayed progressively further back in the stack).

The device detects (714) a gesture (e.g., 533 in FIG. 5BB) on a respective image of an open application in the three-dimensional stack. In response to detecting the gesture on the respective image of the open application (716), the device performs the following actions. The device displays (718) a respective application view (e.g., mail application view 5004-4 in FIG. 5CC) on the touch-sensitive display for a corresponding application in the plurality of concurrently open applications. The respective application view is displayed without concurrently displaying an application view for any other application in the plurality of concurrently open applications (e.g., mail application view 5004-4 in FIG. 5CC). The device ceases (720) to display the three-dimensional stack of open application icons, and exits (722) the application view selection mode.

Note that details of the processes described above with respect to method 700 (e.g., FIGS. 7 and 5A-5HH) are also applicable in an analogous manner to the methods described below. For example, methods 800, 900, 1000, and 1100 may include one or more of the characteristics of the various methods described above with reference to method 700. For brevity, these details are not repeated below.

Figure 8A:
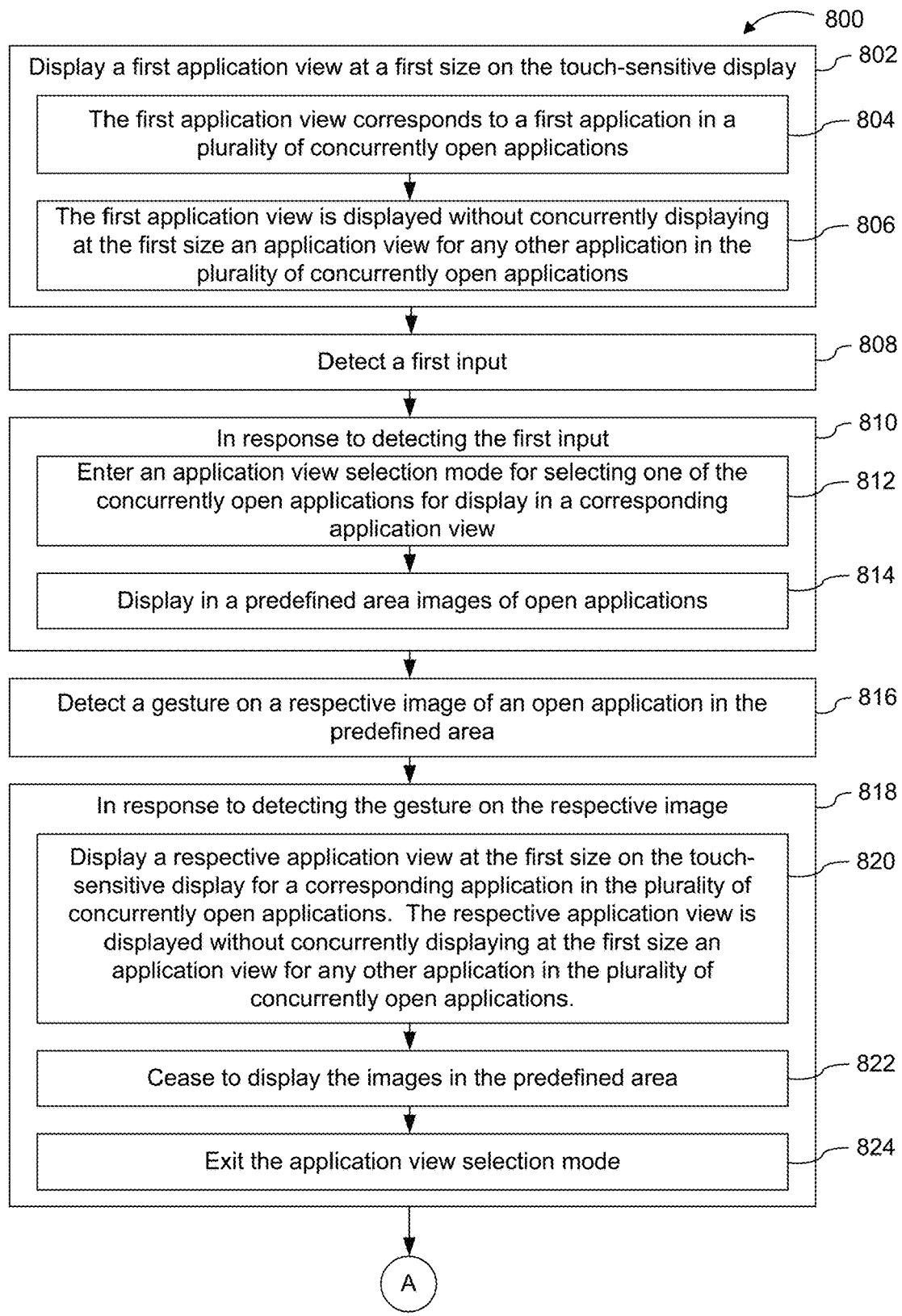
FIGS. 8A-8C are flow diagrams illustrating a method of selecting one of concurrently open applications in accordance with some embodiments.
Figure 8B:
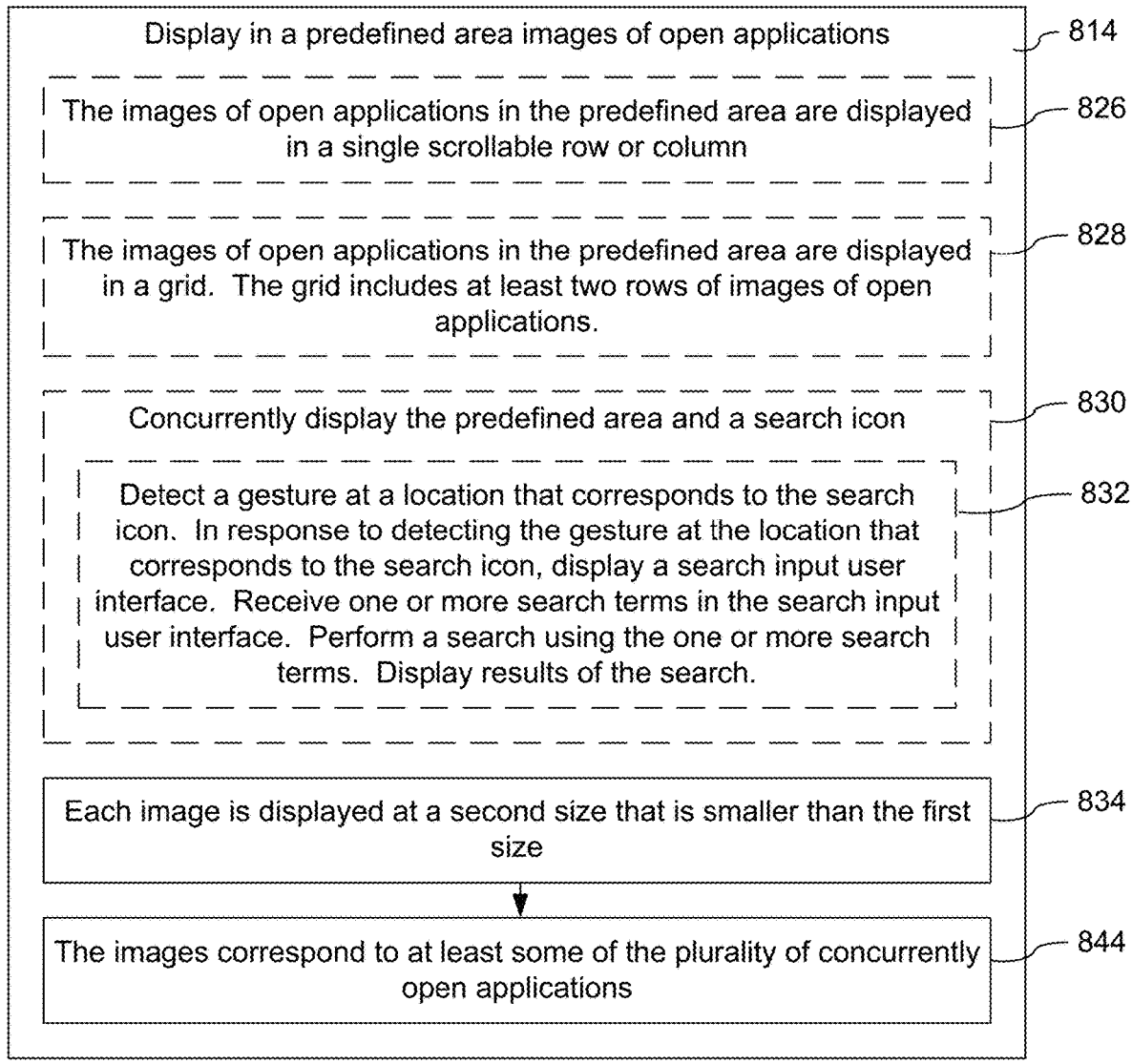
Figure 8C:
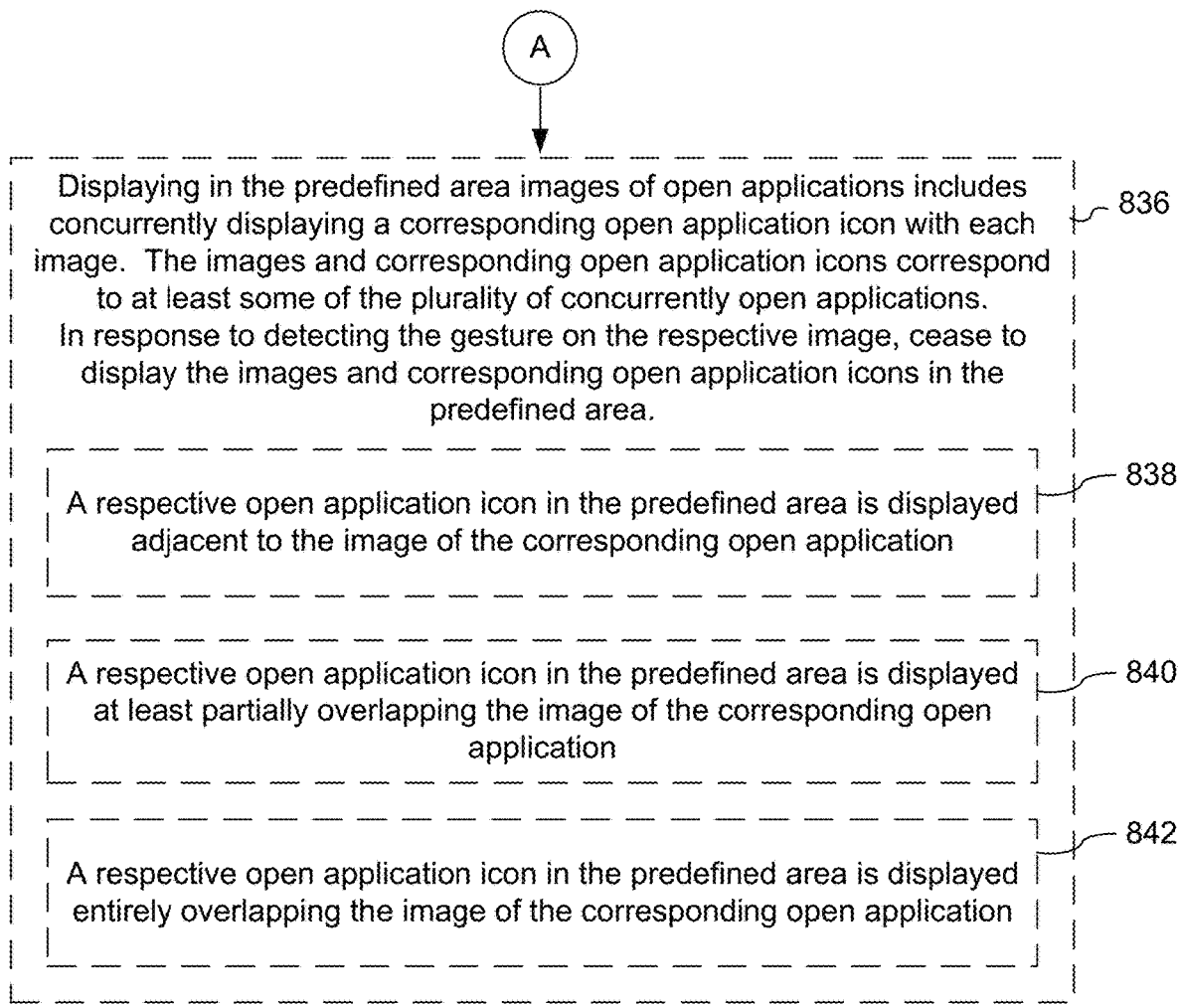

FIGS. 8A-8C are flow diagrams illustrating method 800 of selecting one of concurrently open applications in accordance with some embodiments. Method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

The device displays (802) a first application view at a first size (e.g., the first size of the application view occupies all or substantially all (e.g., at least 80% or 90%) of the touch sensitive display) on a touch-sensitive display (e.g., map application view 5004-1 in FIG. 5B occupies at least 80% of touch screen 112). The first application view corresponds (804) to a first application in a plurality of concurrently open applications, and the first application view is displayed (806) without concurrently displaying at the first size an application view for any other application in the plurality of concurrently open applications.

The device detects (808) a first input (e.g., input 507 in FIG. 5B). In response to detecting the first input (810), the device enters (812) an application view selection mode for selecting one of the concurrently open applications for display in a corresponding application view, and displays (814) in a predefined area images of open applications (e.g., images of open application 5008 in FIG. 5R). Typically, the images of open applications are user selectable, and the images of open applications, when selected (e.g., by a gesture), initiate certain processes associated with them (e.g., displaying a corresponding application view).

In some embodiments, the images of open applications in the predefined area are displayed (826 in FIG. 8B) in a single scrollable row or column (e.g., images of open applications 5008 in FIG. 5O). In some embodiments, the images of open applications in the predefined area are displayed (828) in a grid (e.g., images of open applications 5008 in a grid in FIG. 5R). The grid includes at least two rows of images of open applications.

In some embodiments, the device concurrently displays (830) the predefined area and a search icon (e.g., search icon 5104 in FIG. 5W). In some embodiments, the device detects (832) a gesture (e.g., 521 in FIG. 5W) at a location that corresponds to the search icon, and in response to detecting the gesture at the location that corresponds to the search icon, the device displays a search input user interface (e.g., the user interface in FIG. 5X, including keyboard 5014), receives one or more search terms in the search input user interface, performs a search using the one or more search terms, and displays results of the search.

Each image (e.g., live thumbnails) is displayed (834) at a second size that is smaller than the first size. For example, each image 5008 in FIG. 5R is smaller than map application view 5004-1 in FIG. 5B. In some embodiments, the images are updated to display reduced-size images of corresponding applications (or current views in the corresponding application).

The images and corresponding open application icons correspond (844) to at least some of the plurality of concurrently open applications. For example, in FIG. 5S, image 5008-10 and application icon 5002-36 correspond to a mail application. Therefore, in some embodiments, removing image 5008-10 and application icon 5002-36 closes the corresponding mail application in device 100.

In some embodiments, a grid of reduced-scale images of open applications and/or open application icons are displayed in a predefined area within a search user interface (e.g., as a linear array or as an array with at least two rows) (e.g., application icons 5002 in FIG. 5X).

The device detects (816 in FIG. 8A) a gesture on a respective image of an open application in the predefined area (e.g., a gesture on image 5008-10, not shown). In response to detecting the gesture on the respective image (818), the device performs the following actions. The device displays (820) a respective application view at the first size on the touch-sensitive display for a corresponding application in the plurality of concurrently open applications. The respective application view is displayed without concurrently displaying at the first size an application view for any other application in the plurality of concurrently open applications (e.g., mail application view 5004-4 in FIG. 5CC). The device ceases (822) to display the images and corresponding open application icons in the predefined area, and exits (824) the application view selection mode.

In some embodiments, displaying in the predefined area images of open applications includes (836 in FIG. 8C) concurrently displaying a corresponding open application icon with each image (e.g., in FIG. 5S, application icons 5002-36, 5002-35, and 5002-38 are concurrently displayed with images 5008-10, 5008-11, and 5008-12). The images and corresponding open application icons correspond to at least some of the plurality of concurrently open applications. In response to detecting the gesture on the respective image, the device ceases to display the images and corresponding open application icons in the predefined area. The concurrent display of images and application icons provide several benefits. In particular, a user can easily identify the application to which a respective reduced image corresponds to. Without the concurrent display of application icons, it can be difficult to distinguish multiple images with similar background. Therefore, providing the concurrent display of application icons with the images reduces the cognitive burden on a user and makes a better human-machine interface.

In some embodiments, a respective open application icon in the predefined area is displayed (838) adjacent to the image of the corresponding open application (not shown). In some embodiments, a respective open application icon in the predefined area is displayed (840) at least partially overlapping the image of the corresponding open application (e.g., application icons 5002 in FIG. 5S). In some embodiments, a respective open application icon in the predefined area is displayed (842) entirely overlapping the image of the corresponding open application (not shown).

Note that details of the processes described above with respect to method 800 (e.g., FIGS. 8A-8C and 5A-5HH) are also applicable in an analogous manner to the methods described below. For example, methods 900, 1000, and 1100 may include one or more of the characteristics of the various methods described above with reference to method 800. For brevity, these details are not repeated below.

Figure 9:
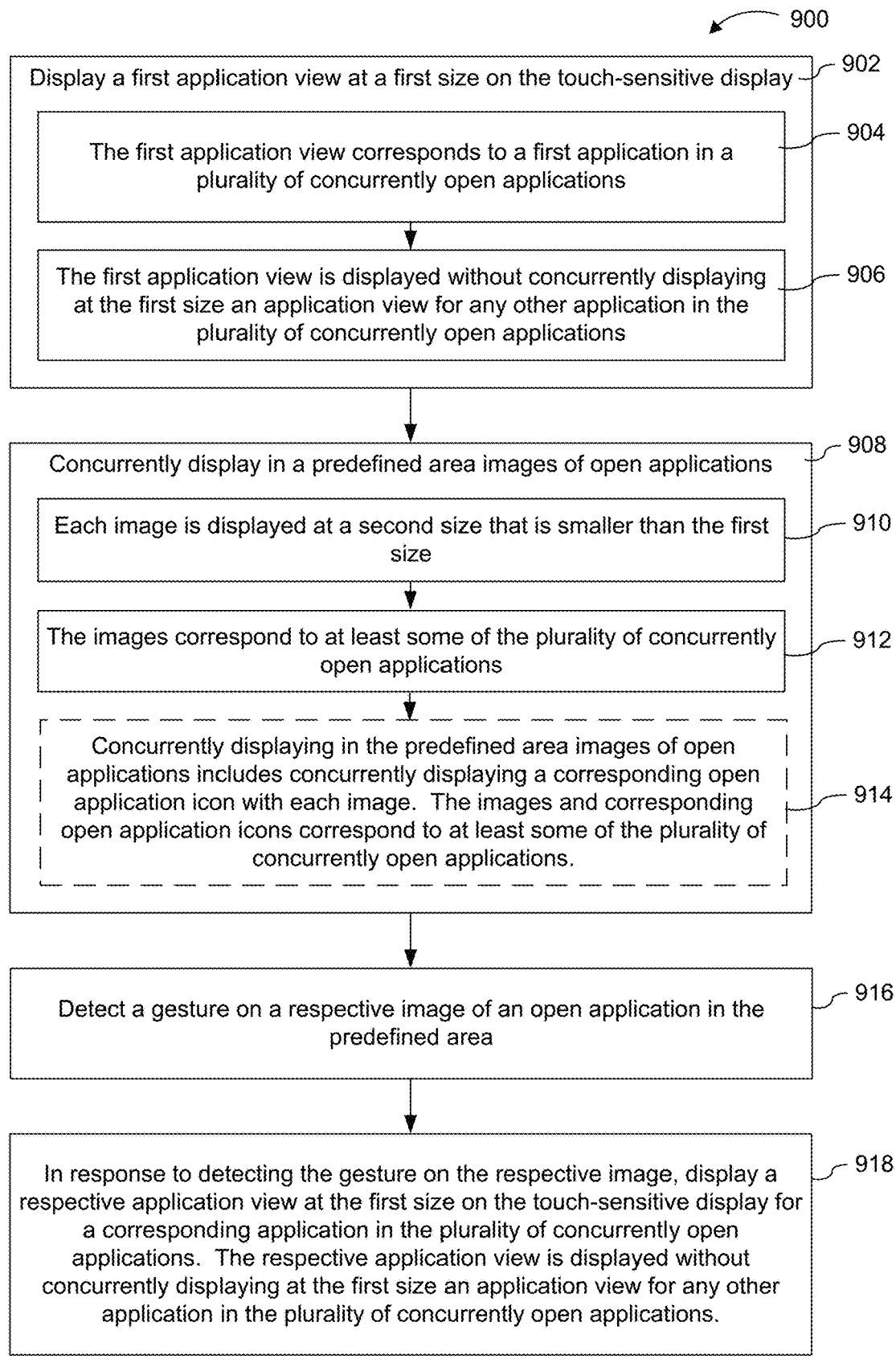
FIG. 9 is a flow diagram illustrating a method of selecting one of concurrently open applications in accordance with some embodiments.

FIG. 9 is a flow diagram illustrating method 900 of selecting one of concurrently open applications in accordance with some embodiments. Method 900 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, method 900 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

The device displays (902) a first application view at a first size (e.g., the first size of the application view occupies more than 50% of the touch sensitive display) on a touch-sensitive display. The first application view corresponds (904) to a first application in a plurality of concurrently open applications. The first application view is displayed (906) without concurrently displaying at the first size an application view for any other application in the plurality of concurrently open applications. For example, in FIG. 5B, map application view 5004-1 is displayed without concurrently displaying an application view for any other application.

The device concurrently displays (908) in a predefined area, images of open applications (e.g., FIG. 5O). Each image is displayed (910) at a second size that is smaller than the first size (e.g., live thumbnails). The images correspond (912) to at least some of the plurality of concurrently open applications. In some embodiments, concurrently displaying in the predefined area images of open applications includes (914) concurrently displaying a corresponding open application icon with each image. The images and corresponding open application icons correspond to at least some of the plurality of concurrently open applications.

The device detects (916) a gesture on a respective image of an open application in the predefined area. In response to detecting the gesture on the respective image, the device displays (918) a respective application view at the first size on the touch-sensitive display for a corresponding application in the plurality of concurrently open applications (e.g., a gesture on image 5008-10 of an email application initiates the display of mail application view 5004-4, as shown in 5CC). The respective application view is displayed without concurrently displaying at the first size an application view for any other application in the plurality of concurrently open applications (e.g., mail application view 5004-4 in 5CC).

Note that details of the processes described above with respect to method 900 (e.g., FIGS. 9 and 5A-5HH) are also applicable in an analogous manner to the methods described below. For example, methods 1000 and 1100 may include one or more of the characteristics of the various methods described above with reference to method 900. For brevity, these details are not repeated below.

Figure 10:
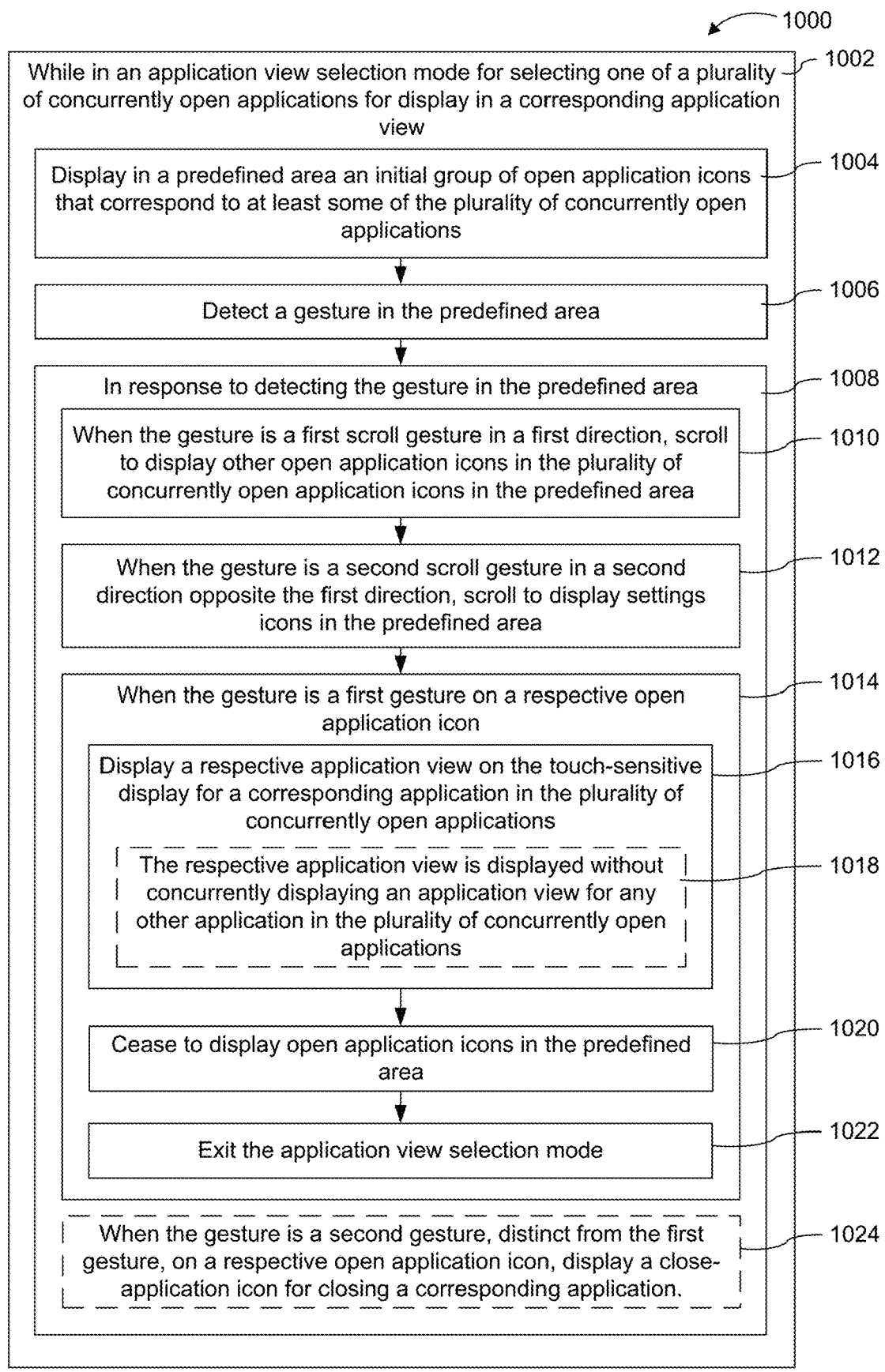
FIG. 10 is a flow diagram illustrating a method of selecting one of concurrently open applications in accordance with some embodiments.

FIG. 10 is a flow diagram illustrating method 1000 of selecting one of concurrently open applications in accordance with some embodiments. Method 1000 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, method 1000 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

While in an application view selection mode for selecting one of a plurality of concurrently open applications for display in a corresponding application view (1002), the device performs the following actions.

The device displays (1004) in a predefined area, an initial group of open application icons that correspond to at least some of the plurality of concurrently open applications (e.g., application icons 5002 in FIG. 5C).

The device detects (1006) a gesture in the predefined area. In response to detecting the gesture in the predefined area (1008), the device performs one of the following actions.

When the gesture is a first scroll gesture in a first direction (e.g., a right-to-left swipe gesture), the device scrolls (1010) to display other open application icons in the plurality of concurrently open application icons in the predefined area (e.g., application icons in FIG. 5E-5F).

When the gesture is a second scroll gesture in a second direction opposite the first direction (e.g., a left-to-right swipe gesture), the device scrolls (1012) to display settings icons in the predefined area (e.g., settings icons 5102 in FIGS. 5L-5M). In some embodiments, when the gesture is a second scroll gesture in a second direction different from the first direction (e.g., a top-to-bottom swipe gesture), the device scrolls to display settings icons in the predefined area.

When the gesture is a first gesture (e.g., a tap gesture) on a respective open application icon (1014), the device displays (1016) a respective application view on the touch-sensitive display for a corresponding application in the plurality of concurrently open applications, ceases (1020) to display open application icons in the predefined area, and exits (1022) the application view selection mode (and enters a normal operation mode for the respective application). In some embodiments, the respective application view is displayed (1018) without concurrently displaying an application view for any other application in the plurality of concurrently open applications.

In some embodiments, when the gesture is a first gesture (e.g., a tap gesture) on a respective settings icon, the device changes a corresponding setting, ceases to display open application icons in the predefined area, and exits the application view selection mode (and enters a normal operation mode for the respective application).

In some embodiments, in response to detecting the gesture in the predefined area, when the gesture is a second gesture (e.g., tap-and-hold gesture 513 in FIG. 5G) that is distinct from the first gesture, on a respective open application icon, the device displays (1024) a close-application icon for closing a corresponding application (e.g., an "X" icon or "-" icon 5002-38 in FIG. 5H on or proximate to the open application icon).

Note that details of the processes described above with respect to method 1000 (e.g., FIGS. 10 and 5A-5HH) are also applicable in an analogous manner to the methods described below. For example, method 1100 may include one or more of the characteristics of the various methods described above with reference to method 1000. For brevity, these details are not repeated below.

Figure 11A:
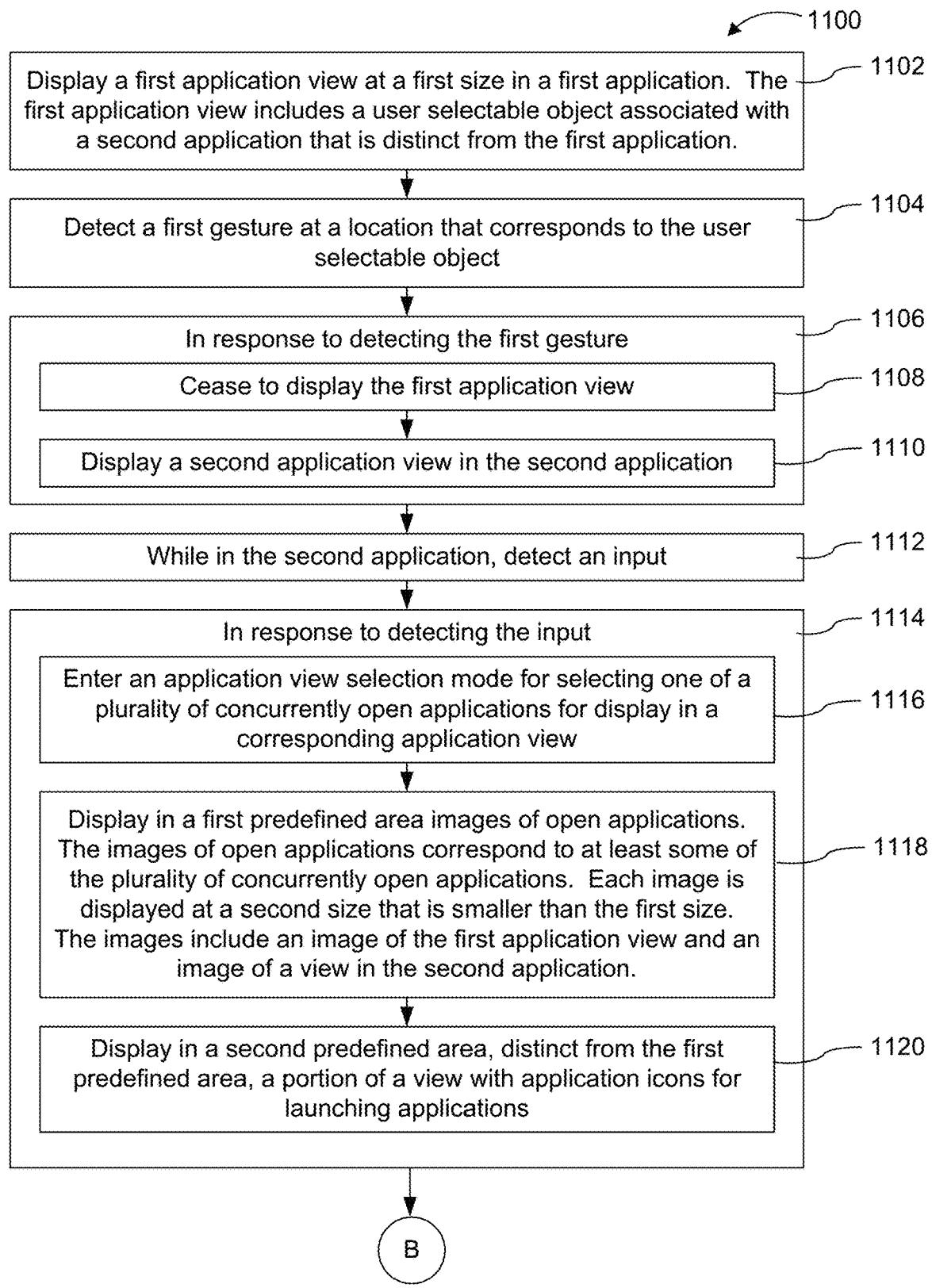
FIGS. 11A-11B are flow diagrams illustrating a method of selecting one of concurrently open applications in accordance with some embodiments.
Figure 11B:
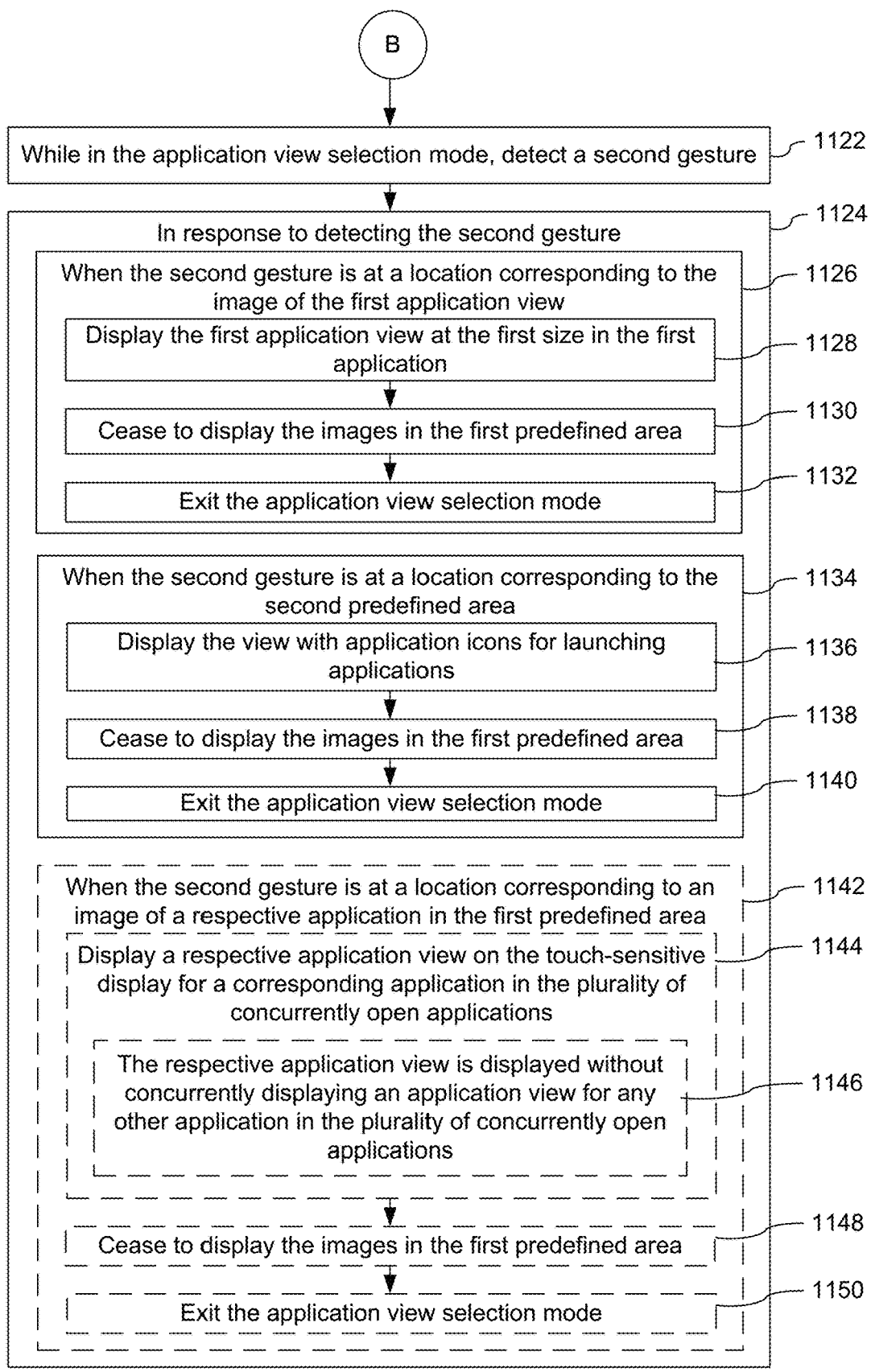

FIGS. 11A-11B are flow diagrams illustrating method 1100 of selecting one of concurrently open applications in accordance with some embodiments. Method 1100 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, method 1100 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

The device displays (1102) a first application view at a first size in a first application (e.g., in FIG. 5CC, mail application view 5004-4 in a mail application). The first application view includes a user selectable object (e.g., link 5020-1) associated with a second application (e.g., a web browser application) that is distinct from the first application.

The device detects (1104) a first gesture at a location that corresponds to the user selectable object (e.g., gesture 525 in FIG. 5CC). In response to detecting the first gesture (1106), the device ceases (1108) to display the first application view, and displays (1110) a second application view in the second application (e.g., browser application view 5004-2 in FIG. 5DD). In some embodiments, the second application view replaces the first application view (e.g., in FIGS. 5CC-5DD, browser application view 5004-2 replaces mail application view 5004-4).

While in the second application, the device detects (1112) an input (e.g., input 527 in FIG. 5DD). In response to detecting the input (1114), the device performs the following actions. The device enters (1116) an application view selection mode for selecting one of a plurality of concurrently open applications for display in a corresponding application view. The device displays (1118) images of open applications in a first predefined area (e.g., images 5008-12 and 5008-10 in FIG. 5EE). The images of open applications correspond to at least some of the plurality of concurrently open applications. In some embodiments, the images are displayed as a scrollable linear strip of images (e.g., images 5008 are scrollable as shown in FIGS. 5EE-5FF). Each image is displayed at a second size that is smaller than the first size (e.g., live thumbnails). The images include an image of the first application view and an image of a view in the second application (e.g., image 5008-12 of a browser application view and image 5008-10 of a mail application view). The device displays (1120) in a second predefined area that is distinct from the first predefined area, a portion of a view with application icons for launching applications (e.g., a home screen or springboard with application icons) (e.g., a portion of "home screen" 5001).

In some embodiments, the device displays images of open applications that are logically connected. For example, assume that in a mail application (e.g., FIG. 5CC), a web browser application is opened (e.g., FIG. 5DD). Also assume that in the web browser application, an electronic book application is opened (not shown). Then, the device displays images of a subset of the mail application, the web browser application, and the electronic book application, regardless of any other concurrently open applications.

While in the application view selection mode, the device detects (1122, FIG. 11B) a second gesture (e.g., a tap gesture). In response to detecting the second gesture (1124), the device performs one of the following actions.

When the second gesture is at a location corresponding to the image of the first application view (1126) (e.g., gesture 535 in FIG. 5EE), the device displays (1128) the first application view at the first size in the first application (e.g., map application view 5004-4 in FIG. 5CC), ceases (1130) to display the images in the first predefined area, and exits (1132) the application view selection mode (and enters a normal operation mode for the respective application).

When the second gesture is at a location corresponding to the second predefined area (1134) (e.g., gesture 533 in FIG. 5FF), the device displays (1136) the view with application icons for launching applications (in other words, displaying the view with application launch items in its entirety, rather than displaying just a portion of this view) (e.g., home screen 5001 as shown in FIG. 5HH), ceases (1138) to display the images in the first predefined area, and exits (1140) the application view selection mode (and enters a normal operation mode for launching applications from the view with application icons).

In some embodiments, when the second gesture is at a location corresponding to an image of a respective application in the first predefined area (1142), the device displays (1144) a respective application view on the touch-sensitive display for a corresponding application in the plurality of concurrently open applications, ceases (1148) to display the images in the first predefined area, and exits (1150) the application view selection mode (and enters a normal operation mode for the respective application). For example, in response to detecting gesture 531 at a location corresponding to image 5008-6 of a map application, map application view is displayed on the display (e.g., FIG. 5GG).

In some embodiments, the respective application view is displayed (1146) without concurrently displaying an application view for any other application in the plurality of concurrently open applications (e.g., FIG. 5GG).

FIGS. 12A-12B are flow diagrams illustrating method 1200 of selecting one of concurrently open applications in accordance with some embodiments. Method 1200 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., a touch-sensitive display). In some embodiments, the display is separate from the touch-sensitive surface. Some operations in method 1200 may be combined and/or the order of some operations may be changed.

As described below, method 1200 provides an intuitive way to select one of concurrently open applications. The method reduces the cognitive burden on a user when selecting one of concurrently open application, thereby creating a more efficient human-machine interface. For battery-operated computing devices, enabling a user to select one of concurrently open applications faster and more efficiently conserves power and increases the time between battery charges.

The device displays (1202) a first application view at a first size on the touch-sensitive display. In some embodiments, the first size of the application view occupies all or substantially all (e.g., at least 80% or 90%) of the touch sensitive display. For example, map application view 5004-1 in FIG. 5B occupies at least 80% of touch screen 112 and web browser application view 5004-2 in FIG. 5LL occupies at least 80% of touch screen 112. The first application view corresponds to a first application in a plurality of concurrently open applications. For example, map application view 5004-2 in FIG. 5LL corresponds to a map application and web browser application view 5004-2 in FIG. 5LL corresponds to a web browser application. The first application view is displayed without concurrently displaying at the first size an application view for any other application in the plurality of concurrently open applications. For example, in FIG. 5B, no application view for any application other than the map application is displayed. In FIG. 5LL, no application view for any application other than the web browser application is displayed.

The device detects (1204) a first input. For example, input 507 is detected in FIG. 5B. In another example, in FIG. 5LL, a swipe gesture that includes touch 549-1 is detected. Alternatively, swipe gesture 551 may be detected as shown in FIG. 5LL.

In some embodiments, the first input includes (1206) a swipe gesture on the touch-sensitive display that originates from an edge of the touch-sensitive display. For example, in FIG. 5LL, a swipe gesture originates from location 549-1 that corresponds to an edge of touch screen 112. In some embodiments, the first input includes a horizontal swipe gesture on the touch-sensitive display that originates from a side edge of the touch-sensitive display (e.g., a horizontal swipe gesture that originates from location 549-1 in FIG. 5LL).

In response to detecting the first input, the device enters (1208) an application view selection mode for selecting one of the concurrently open applications for displaying a corresponding application view, and displays (1210) images of open applications (e.g., images of open application 5008 in FIG. 5S and FIG. 5NN). Each image is displayed at a second size that is smaller than the first size. For example, each image 5008 in FIG. 5S is displayed at a size that is smaller than the size of map application view 5004-1 in FIG. 5B. In another example, each image 5008 in FIG. 5NN is displayed at a size smaller than the size of web browser application view 5004-2 in FIG. 5LL. A corresponding open application icon is concurrently displayed with each image (e.g., open application icons 5002 in FIG. 5S and FIG. 5NN). In some embodiments, the open application icons are displayed below the images of open applications. The images and corresponding open application icons correspond to at least some of the plurality of concurrently open applications. In some embodiments, the images and corresponding open application icons correspond to the entire plurality of concurrently open applications. In some embodiments, the images and corresponding open application icons correspond to a subset of the plurality of concurrently open applications. For example, images 5008 of open applications in FIG. 5S may not correspond to all concurrently open applications. For example, image 5008-19 of a concurrently open calendar application is not shown in FIG. 5S.

In some embodiments, the images of open applications are displayed (1212) in a single scrollable row or column (e.g., images of open applications 5008 in FIGS. 5O and 5NN).

In some embodiments, the images of open applications are displayed (1214) in a grid (e.g., images of open applications 5008 in FIG. 5R). The grid includes at least two rows of images of open applications.

In some embodiments, the device concurrently displays (1216) the images of open applications and a search icon. For example, in FIG. 5VV, search icon 5104 is concurrently displayed with images of open applications 5008-17, 5008-18, and 5008-19.

In some embodiments, the device detects (1218) a gesture at a location that corresponds to the search icon. For example, the device detects gesture 571 in FIG. 5VV. In response to detecting the gesture at the location that corresponds to the search icon, the device displays a search input user interface (e.g., the user interface in FIG. 5WW that includes keyboard 5014). The device receives one or more search terms in the search input user interface. For example, in FIG. 5XX, gesture 573 is detected at a location that corresponds to a character "O" on keyboard 5014. The device performs a search using the one or more search terms (e.g., search for open applications that contain the character "O" in application names); and displays results of the search. For example, in FIG. 5YY, at least some of open applications that include the character "O" in the application names are displayed (e.g., phone, bookmark, document, contacts, and notes applications). In some embodiments, the results of the search are displayed with images of a first subset of concurrently open applications that match the one or more search terms and open application icons of a second subset of the concurrently open applications that match the one or more search terms (e.g., images of bookmark, document, and contacts applications 5008-13, 5008-14, and 5008-15 and application icons of phone, bookmark, document, contacts, and notes applications 5002-35, 5002-13, 5002-14, 5002-15, and 5002-17). In some embodiments, a number of concurrently open applications in the first subset is distinct from a number of concurrently open applications in the second subset. In some embodiments, more open application icons are displayed than images of open applications.

In some embodiments, the device detects (1220, FIG. 12B) a swipe gesture on one of the images of open applications (e.g., swipe gesture 565 at a location that corresponds to image 5008-6 in FIG. 5NN). In response to detecting the swipe gesture on the one of the images of open applications, the device scrolls the images of open applications so that at least one of the images of open applications is removed from the touch-sensitive display and at least a portion of another one of the images of open applications is added to the touch-sensitive display. For example, in response to swipe gesture 565 in FIG. 5NN, images 5008-12, 5008-10, and 5008-6 are scrolled so that image 5008-12 is removed from touch screen 112, and a portion of image 5008-11 is added to touch screen 112, as shown in FIG. 5OO. The device concurrently scrolls the open application icons. For example, open application icons 5002-37, 5002-36, and 5002-27 are concurrently scrolled so that open application icon 5002-37 is removed from touch screen 112. In some embodiments, an open application icon that corresponds to the added image of an open application is displayed (e.g., application icon 5002-35 in FIG. 5OO).

In some embodiments, the device detects (1222) a swipe gesture on one of the open application icons (e.g., gesture 567 at a location that corresponds to icon 5002-27 in FIG. 5QQ). In response to detecting the swipe gesture on the one of the open application icons, the device scrolls the open application icons so that a plurality of the open application icons is removed from the touch-sensitive display and a second plurality of open application icons is added to the touch-sensitive display. For example, in response to swipe gesture 567 in FIG. 5QQ, icons 5002-37, 5002-36, and 5002-27 are scrolled off so that icons 5002-37, 5002-36, and 5002-27 in FIG. 5QQ are replaced with icons 5002-35, 5002-13, and 5002-14 in FIG. 5RR. The device concurrently scrolls the images of open applications so that the displayed images of open applications are removed from the touch-sensitive display and a plurality of images of open applications is added to the touch-sensitive display. For example, in response to swipe gesture 567 in FIG. 5QQ, images 5008-12, 5008-10, and 5008-6 are concurrently scrolled so that images 5008-12, 5008-10, and 5008-6 are removed from touch screen 112 and images 5008-11, 5008-13, and 5008-14 are added to touch screen 112. In some embodiments, the plurality of added images of open applications does not include any of the removed images of open applications. For example, icons 5008-11, 5008-13, and 5008-14 do not include any of images 5008-12, 5008-10, and 5008-6.

In some embodiments, subsequent to scrolling the images of open applications and the open application icons, the device concurrently displays (1224) a first number of images of open applications and a second number of open application icons, and the second number is larger than the first number. For example, in some embodiments, in response to swipe gesture 565 in FIG. 5NN, a first number of images of open applications (e.g., images 5008-12, 5008-10, and 5008-6 in FIG. 5PP) and a second number of open application icons (e.g., icons 5002-37, 5002-36, 5002-27, 5002-35, and 5002-13 in FIG. 5PP) are concurrently displayed. In this example, the second number (e.g., five) is larger than the first number (e.g., three). In some embodiments, the open application icons are displayed in a single scrollable row or column, and the images of open applications correspond to a predefined number of open application icons in a middle of the displayed open application icons.

The device detects (1226) a selection gesture on a respective image of an open application. For example, gesture 531 is detected at a location that corresponds to image 5008-6 in FIG. 5FF. In another example, tap gesture 553 on image 5008-12 for a web browser application, tap gesture 557 on image 5008-10 for a mail application, or tap gesture 561 on image 5008-6 for a map application is detected in FIG. 5NN.

In response to detecting the selection gesture on the respective image, the device displays (1228) a respective application view at the first size on the touch-sensitive display for a corresponding application in the plurality of concurrently open applications. For example, in response to gesture 531 in FIG. 5FF, a map application view is displayed in FIG. 5GG. The respective application view is displayed without concurrently displaying at the first size an application view for any other application in the plurality of concurrently open applications. The device ceases to display the images and corresponding open application icons; and exits the application view selection mode.

In some embodiments, while in the application view selection mode, the device detects (1230) a selection gesture on a respective open application icon (e.g., a tap gesture). For example, tap gesture 555 at a location that corresponds to icon 5002-37 for a web browser application, tap gesture 559 at a location that corresponds to icon 5002-36 for a mail application, or tap gesture 563 at a location that corresponds to icon 5002-27 for a map application is detected in FIG. 5NN. In response to detecting the selection gesture on the respective open application icon, the device displays a particular application view at the first size on the touch-sensitive display for a corresponding application in the plurality of concurrently open applications. For example, in some embodiments, in response to detecting tap gesture 563 on icon 5002-27 for a map application, a map application view is displayed (e.g., FIG. 5GG). The particular application view is displayed without concurrently displaying at the first size an application view for any other application in the plurality of concurrently open applications. The device ceases to display the images and corresponding open application icons; and exits the application view selection mode.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. For brevity, these details are not repeated here. Additionally, it should be noted that details of other processes described herein with respect to method 600 (e.g., FIGS. 6A-6C), method 700 (e.g., FIG. 7), method 800 (e.g., FIGS. 8A-8C), method 900 (e.g., FIG. 9), method 1000 (e.g., FIG. 10), and method 1100 (e.g., FIGS. 11A-11B) are also applicable in an analogous manner to method 1200 described above with respect to FIGS. 12A-12B. For example, the open application icons described above with reference to method 800 may have one or more of the characteristics of the open application icons described herein with reference to method 1200. For brevity, these details are not repeated here.

Figure 13:
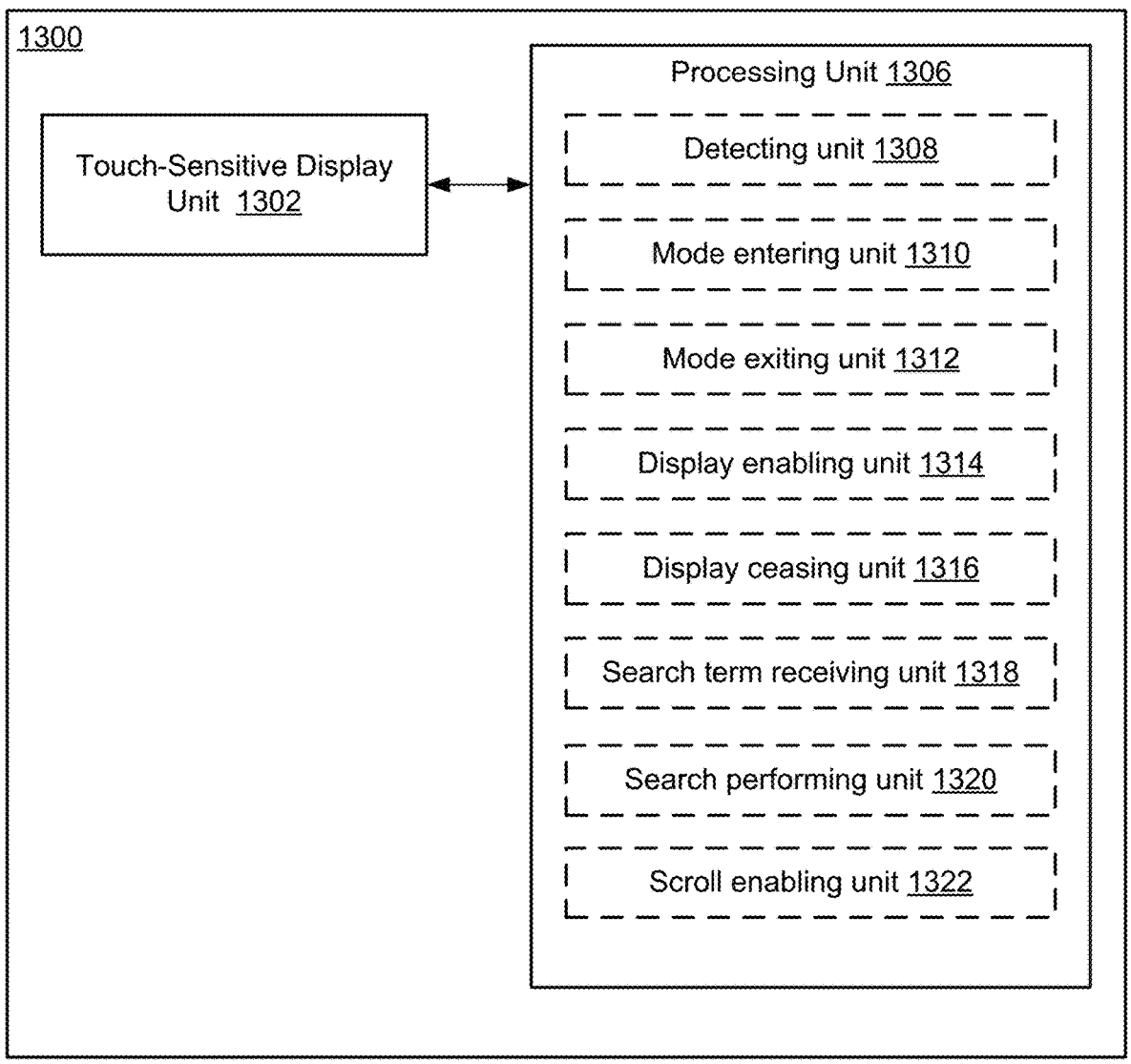
FIG. 13 is a functional block diagram of an electronic device in accordance with some embodiments.

In accordance with some embodiments, FIG. 13 shows a functional block diagram of electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, electronic device 1300 includes touch-sensitive display unit 1302 configured to display a first application view at a first size on touch-sensitive display unit 1302. The first application view corresponds to a first application in a plurality of concurrently open applications, and the first application view is displayed without concurrently displaying at the first size an application view for any other application in the plurality of concurrently open applications. Electronic device 1300 also includes processing unit 1306 coupled to touch-sensitive display unit 1302. In some embodiments, processing unit 1306 includes detecting unit 1308, mode entering unit 1310, mode exiting unit 1312, display enabling unit 1314, display ceasing unit 1316, search term receiving unit 1318, search performing unit 1320, and scroll enabling unit 1322.

Processing unit 1306 is configured to detect a first input (e.g., with detecting unit 1308, on touch-sensitive display unit 1302); and, in response to detecting the first input, enter an application view selection mode for selecting one of the concurrently open applications for display in a corresponding application view (e.g., with mode entering unit 1310); and enable display of images of open applications (e.g., with display enabling unit 1314, on touch-sensitive display unit 1302). Each image is displayed at a second size that is smaller than the first size. A corresponding open application icon is concurrently displayed with each image. The images and corresponding open application icons correspond to at least some of the plurality of concurrently open applications. Processing unit 1306 is configured to detect a selection gesture on a respective image of an open application (e.g., with detecting unit 1308, on touch-sensitive display unit 1302); and, in response to detecting the selection gesture on the respective image, enable display of a respective application view at the first size on touch-sensitive display unit 1302 for a corresponding application in the plurality of concurrently open applications (e.g., with display enabling unit 1314, on touch-sensitive display unit 1302), wherein the respective application view is displayed without concurrently displaying at the first size an application view for any other application in the plurality of concurrently open applications; cease to display the images and corresponding open application icons (e.g., with display ceasing unit 1316); and exit the application view selection mode (e.g., with mode exiting unit 1312).

In some embodiments, the images of open applications are displayed in a single scrollable row or column (e.g., on touch-sensitive display unit 1302).

In some embodiments, the images of open applications are displayed in a grid, the grid comprising at least two rows of images of open applications (e.g., on touch-sensitive display unit 1302).

In some embodiments, processing unit 1306 is configured to enable concurrent display of the images of open applications and a search icon (e.g., with display enabling unit 1314).

In some embodiments, processing unit 1306 is configured to detect a gesture at a location that corresponds to the search icon (e.g., with detecting unit 1308, on touch-sensitive display unit 1302); in response to detecting the gesture at the location that corresponds to the search icon, enable display of a search input user interface (e.g., with display enabling unit 1314, on touch-sensitive display unit 1302); receive one or more search terms in the search input user interface (e.g., with search term receiving unit 1318); perform a search using the one or more search terms (e.g., with search performing unit 1320); and enable display of results of the search (e.g., with display enabling unit 1314, on touch-sensitive display unit 1302).

In some embodiments, processing unit 1306 is configured to, while in the application view selection mode, detect a selection gesture on a respective open application icon (e.g., with detecting unit 1308); and, in response to detecting the selection gesture on the respective open application icon, enable display of a particular application view at the first size on touch-sensitive display unit 1302 for a corresponding application in the plurality of concurrently open applications (e.g., with display enabling unit 1314, on touch-sensitive display unit 1302), wherein the particular application view is displayed without concurrently displaying at the first size an application view for any other application in the plurality of concurrently open applications; cease to display the images and corresponding open application icons (e.g., with display ceasing unit 1316); and exit the application view selection mode (e.g., with mode exiting unit 1312).

In some embodiments, processing unit 1306 is configured to detect a swipe gesture on one of the images of open applications (e.g., with detecting unit 1308); in response to detecting the swipe gesture on the one of the images of open applications, enable scroll of the images of open applications so that at least one of the images of open applications is removed from touch-sensitive display unit 1302 and at least a portion of another one of the images of open applications is added to touch-sensitive display unit 1302 (e.g., with scroll enabling unit 1322); and enable concurrent scroll of the open application icons (e.g., with scroll enabling unit 1322).

In some embodiments, processing unit 1306 is configured to detect a swipe gesture on one of the open application icons (e.g., with detecting unit 1308, on touch-sensitive display unit 1302); in response to detecting the swipe gesture on the one of the open application icons, enable scroll of the open application icons so that a plurality of the open application icons is removed from touch-sensitive display unit 1302 and a second plurality of open application icons is added to touch-sensitive display unit 1302 (e.g., with scroll enabling unit 1322); and enable concurrent scroll of the images of open applications so that the displayed images of open applications are removed from touch-sensitive display unit 1302 and a plurality of images of open applications is added to touch-sensitive display unit 1302 (e.g., with scroll enabling unit 1322).

In some embodiments, processing unit 1306 is configured to, subsequent to scrolling the images of open applications and the open application icons, enable concurrent display of a first number of images of open applications and a second number of open application icons (e.g., with display enabling unit 1314), wherein the second number is larger than the first number.

In some embodiments, the first input includes a swipe gesture on touch-sensitive display unit 1302 that originates from an edge of touch-sensitive display unit 1302.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

Figure 14:
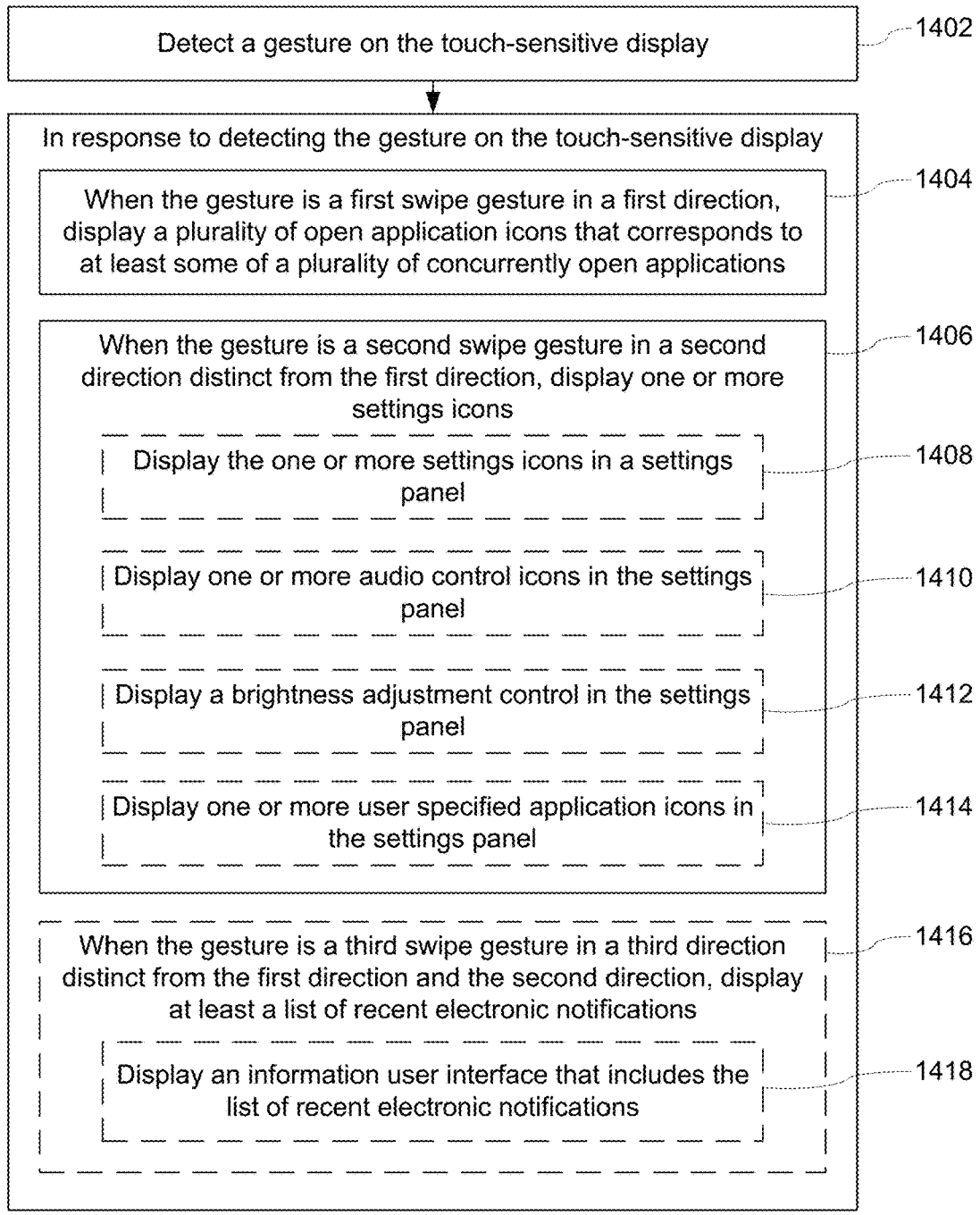
FIG. 14 is a flow diagram illustrating a method of displaying settings icons in accordance with some embodiments.

FIG. 14 is a flow diagram illustrating method 1400. Method 1400 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1400 may be combined and/or the order of some operations may be changed.

As described below, method 1400 provides an intuitive way to display settings icons and/or open application icons. The method reduces the cognitive burden on a user when selecting one of concurrently open applications and/or selecting a settings icon, thereby creating a more efficient human-machine interface. For battery-operated computing devices, enabling a user to select one of concurrently open applications and/or settings icons faster and more efficiently conserves power and increases the time between battery charges.

The device detects (1402) a gesture on the touch-sensitive display. In response to detecting (1402) the gesture, the device performs one of the following actions.

When the gesture is a first swipe gesture in a first direction, the device displays (1404) a plurality of open application icons that corresponds to at least some of a plurality of concurrently open applications (e.g., application icons 5002 in FIGS. 5C, 5JJ, 5KK, and 5KK-5ZZ). In some embodiments, when the gesture is the first swipe gesture in the first direction, the device displays a plurality of open application images that corresponds to at least some of a plurality of concurrently open applications (e.g., images 5008 in FIG. 5FF). In some embodiments, when the gesture is the first swipe gesture in the first direction, the device displays a plurality of open application images that corresponds to at least some of a plurality of concurrently open applications and a plurality of open application icons that corresponds to at least some of a plurality of concurrently open applications (e.g., images 5008 and icons 5002 in FIGS. 5MM-5ZZ).

In some embodiments, the first swipe gesture in the first direction is a swipe in a horizontal direction (e.g., swipe gesture originating from location 539-1 or location 541 in FIG. 5II). In some embodiments, the first swipe is either a left-to-right swipe or a right-to-left swipe (e.g., as shown in FIG. 5II).

When the gesture is a second swipe gesture in a second direction distinct from the first direction, the device displays (1406) one or more settings icons (e.g., settings icons 5102 in FIG. 5M; settings icons 5022 in FIG. 5BBB-5CCC or 5DDD-5EEE). In some embodiments, when the gesture is the second swipe gesture in the second direction distinct from the first direction, the device displays (1408) the one or more settings icons (e.g., settings icons 5022 in FIG. 5BBB or 5DDD) in a settings panel (e.g., settings panel 5024 in FIG. 5BBB or 5DDD).

In some embodiments, the second swipe gesture in the second direction is a swipe in a horizontal direction (e.g., left-to-right swipe gesture originating from location 537 in FIG. 5L). In some embodiments, where both the first and the second swipe gestures correspond to swipe gestures in a horizontal direction, the first direction is a left-to-right direction, and the second direction is a right-to-left direction (or vice versa). In some embodiments, the second swipe gesture in the second direction is a swipe in an upward direction (e.g., swipe gesture swipe gesture originating from location 571 or 570 in FIG. 5AAA).

In some embodiments, displaying (1406) the one or more settings icons includes displaying at least one of: a Wi-Fi icon (e.g., icon 5102-2 in FIG. 5M; icon 5022-1 in FIG. 5BBB-5CCC or 5DDD-5EEE), a Bluetooth icon (e.g., icon 5102-3 in FIG. 5M; icon 5022-2 in FIG. 5BBB-5CCC or 5DDD-5EEE), an airplane mode icon (e.g., icon 5022-1 in FIG. 5BBB-5CCC or 5DDD-5EEE), and a rotation lock icon (e.g., icon 5102-1 in FIG. 5M; icon 5022-5 in FIG. 5BBB-5CCC or 5DDD-5EEE). In some embodiments, displaying (1406) the one or more settings icons includes displaying a do-not-disturb icon (e.g., icon 5022-4 in FIG. 5BBB-5CCC or 5DDD-5EEE).

In some embodiments, when the gesture is the second swipe gesture in the second direction distinct from the first direction, the device displays (1410) one or more audio control icons in the settings panel (e.g., audio control icons (e.g., play/pause, fast forward, reverse) in FIG. 5M; audio control icons 5028 in FIG. 5BBB-5CCC or 5DDD-5EEE). The audio control icons are configured to control any active audio presentation, regardless of its source (e.g., whether the audio is being generated by video and music player module 152 or another application and/or module). In some embodiments, when the settings panel is displayed (1408), the audio control icons are displayed only if audio is being concurrently presented.

In some embodiments, when the gesture is the second swipe gesture in the second direction distinct from the first direction, the device displays (1412) a brightness adjustment control in the settings panel (e.g., brightness adjustment control 5026 in FIG. 5BBB-5CCC or 5DDD-5EEE). The brightness adjustment control allows a user to change the brightness of the touch screen 112. In some embodiments, the brightness control is a slider control that allows a user to slide a displayed position indicator into a desired position on a displayed slider bar, or to tap on a location of the slider bar to cause the position indicator to move to the selected location.

In some embodiments, when the gesture is the second swipe gesture in the second direction distinct from the first direction, the device displays (1414) one or more user specified application icons in the settings panel (e.g., user-specified application icons 5030-1 through 5030-4, FIG. 5BBB-5CCC or 5DDD-5EEE). In some embodiments, application icons include any application icon specified by the user. In some embodiments, the application icons include a flashlight application icon, a clock application icon, a camera application icon, and a calculator application icon.

In some embodiments, when the gesture is the second swipe gesture in the second direction, the device concurrently displays in the settings panel (e.g., the settings panel 5024 in FIG. 5BBB or 5DDD) the one or more settings icons; the brightness adjustment control; the one or more music control icons; and the one or more user specified application icons. In some embodiments, the one or more settings icons are displayed in a first portion of the settings panel, the brightness adjustment control is displayed in a second portion of the settings panel, the second portion being below the first portion, the one or more music control icons are displayed in a third portion of the settings panel, the third portion being below the second portion, and the one or more user specified application icons are displayed in a fourth portion of the settings panel, the fourth portion being below the third portion (e.g., as shown in FIG. 5BBB or 5DDD).

In some embodiments, when the gesture is a third swipe gesture in a third direction distinct from the first direction and the second direction, the device displays (1416) at least a list of recent electronic notifications. In some embodiments, the third swipe gesture in the third direction is a swipe in a downward direction (e.g., downward swipe gesture originating from location 523 in FIG. 5Z).

In some embodiments, when the gesture is the third swipe gesture in the third direction, the device displays (1418) an information user interface that includes the list of recent electronic notifications. In some embodiments, the information user interface replaces a user interface displayed prior to detecting the third swipe gesture on the touch-sensitive display (e.g., some or all of the home screen 5001, FIG. 5A). In some embodiments, displaying the information user interface includes ceasing to display one or more application icons, and displaying the information user interface. In some embodiments, the information user interface is or includes a panel (e.g., notification panel 5021 in FIG. 5AA).

Figure 15:
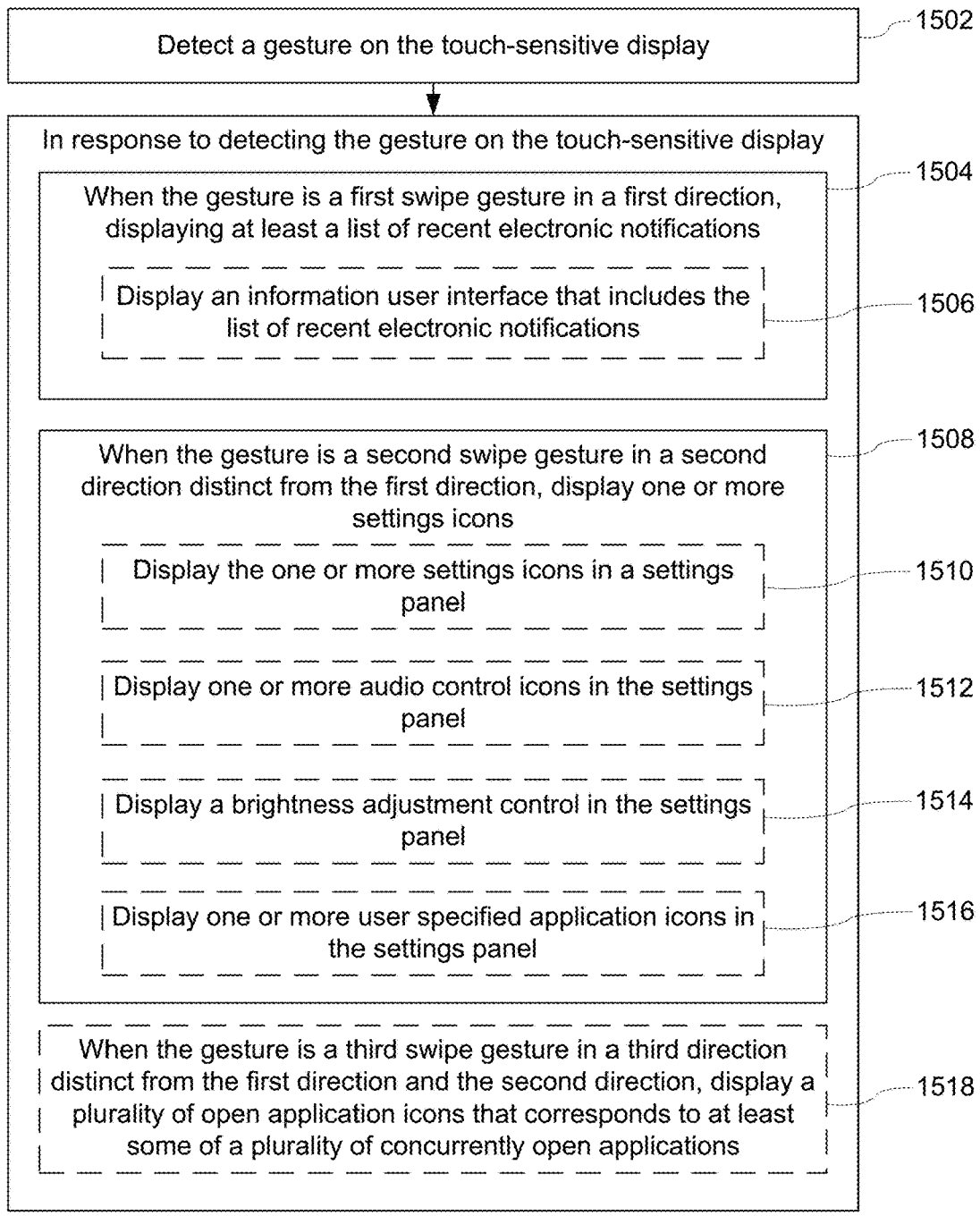
FIG. 15 is a flow diagram illustrating a method of displaying settings icons in accordance with some embodiments.

FIG. 15 is a flow diagram illustrating method 1500. Method 1500 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1500 may be combined and/or the order of some operations may be changed.

As described below, method 1500 provides an intuitive way to display settings icons and/or open application icons. The method reduces the cognitive burden on a user when selecting one of concurrently open applications and/or selecting a settings icon, thereby creating a more efficient human-machine interface. For battery-operated computing devices, enabling a user to select one of concurrently open applications and/or settings icons faster and more efficiently conserves power and increases the time between battery charges.

The device detects (1502) a gesture on the touch-sensitive display. In response to detecting (1502) the gesture, the device performs one of the following actions.

When the gesture is a first swipe gesture in a first direction, the device displays (1504) at least a list of recent electronic notifications. In some embodiments, the first swipe gesture in the first direction is a swipe in a downward direction (e.g., downward swipe gesture originating from location 523 in FIG. 5Z).

In some embodiments, when the gesture is the first swipe gesture in the first direction, the device displays (1506) an information user interface that includes the list of recent electronic notifications. In some embodiments, the information user interface replaces a user interface displayed prior to detecting the third swipe gesture on the touch-sensitive display (e.g., some or all of the home screen 5001, FIG. 5A). In some embodiments, displaying the information user interface includes ceasing to display one or more application icons, and displaying the information user interface. In some embodiments, the information user interface is or includes a panel (e.g., notification panel 5021 in FIG. 5AA).

When the gesture is a second swipe gesture in a second direction distinct from the first direction, the device displays (1508) one or more settings icons (e.g., settings icons 5102 in FIG. 5M; settings icons 5022 in FIG. 5BBB-5CCC or 5DDD-5EEE). In some embodiments, when the gesture is the second swipe gesture in the second direction distinct from the first direction, the device displays (1510) the one or more settings icons (e.g., settings icons 5022 in FIG. 5BBB or 5DDD) in a settings panel (e.g., settings panel 5024 in FIG. 5BBB or 5DDD).

In some embodiments, the second swipe gesture in the second direction is a swipe in a horizontal direction (e.g., left-to-right swipe gesture originating from location 537 in FIG. 5L). In some embodiments, the second swipe gesture in the second direction is a swipe in an upward direction (e.g., swipe gesture swipe gesture originating from location 571 or 570 in FIG. 5AAA).

In some embodiments, displaying (1508) the one or more settings icons includes displaying at least one of: a Wi-Fi icon (e.g., icon 5102-2 in FIG. 5M; icon 5022-1 in FIG. 5BBB-5CCC or 5DDD-5EEE), a Bluetooth icon (e.g., icon 5102-3 in FIG. 5M; icon 5022-2 in FIG. 5BBB-5CCC or 5DDD-5EEE), an airplane mode icon (e.g., icon 5022-1 in FIG. 5BBB-5CCC or 5DDD-5EEE), and a rotation lock icon (e.g., icon 5102-1 in FIG. 5M; icon 5022-5 in FIG. 5BBB-5CCC or 5DDD-5EEE). In some embodiments, displaying (1508) the one or more settings icons includes displaying a do-not-disturb icon (e.g., icon 5022-4 in FIG. 5BBB-5CCC or 5DDD-5EEE).

In some embodiments, when the gesture is the second swipe gesture in the second direction distinct from the first direction, the device displays (1512) one or more audio control icons in the settings panel (e.g., audio control icons (e.g., play/pause, fast forward, reverse) in FIG. 5M; audio control icons 5028 in FIG. 5BBB-5CCC or 5DDD-5EEE). The audio control icons are configured to control any active audio presentation, regardless of its source (e.g., whether the audio is being generated by video and music player module 152 or another application and/or module). In some embodiments, when the settings panel is displayed (1510) (e.g., in response to an upward swipe gesture), the audio control icons are displayed only if audio is being concurrently presented.

In some embodiments, when the gesture is the second swipe gesture in the second direction distinct from the first direction, the device displays (1514) a brightness adjustment control in the settings panel (e.g., brightness adjustment control 5026 in FIG. 5BBB-5CCC or 5DDD-5EEE). The brightness adjustment control allows a user to change the brightness of the touch screen 112. In some embodiments, the brightness control is a slider control that allows a user to slide a displayed position indicator into a desired position on a displayed slider bar, or to tap on a location of the slider bar to cause the position indicator to move to the selected location.

In some embodiments, when the gesture is the second swipe gesture in the second direction distinct from the first direction, the device displays (1516) one or more user specified application icons in the settings panel (e.g., user-specified application icons 5030-1 through 5030-4, FIG. 5BBB-5CCC or 5DDD-5EEE). In some embodiments, application icons include any application icon specified by the user. In some embodiments, the application icons include a flashlight application icon, a clock application icon, a camera application icon, and a calculator application icon.

In some embodiments, when the gesture is the second swipe gesture in the second direction, the device concurrently displays in the settings panel (e.g., the settings panel 5024 in FIG. 5BBB or 5DDD) the one or more settings icons; the brightness adjustment control; the one or more music control icons; and the one or more user specified application icons. In some embodiments, the one or more settings icons are displayed in a first portion of the settings panel, the brightness adjustment control is displayed in a second portion of the settings panel, the second portion being below the first portion, the one or more music control icons are displayed in a third portion of the settings panel, the third portion being below the second portion, and the one or more user specified application icons are displayed in a fourth portion of the settings panel, the fourth portion being below the third portion (e.g., as shown in FIG. 5BBB or 5DDD).

In some embodiments, when the gesture is a third swipe gesture in a third direction distinct from the first direction and the second direction, the device displays (1518) a plurality of open application icons that corresponds to at least some of a plurality of concurrently open applications (e.g., application icons 5002 in FIGS. 5C, 5JJ, 5KK, and 5KK-5ZZ). In some embodiments, when the gesture is the third swipe gesture in the third direction, the device displays a plurality of open application images that corresponds to at least some of a plurality of concurrently open applications (e.g., images 5008 in FIG. 5FF). In some embodiments, when the gesture is the third swipe gesture in the third direction, the device displays a plurality of open application images that corresponds to at least some of a plurality of concurrently open applications and a plurality of open application icons that corresponds to at least some of a plurality of concurrently open applications (e.g., images 5008 and icons 5002 in FIGS. 5MM-5ZZ).

In some embodiments, the third swipe gesture in the third direction is a swipe in a horizontal direction (e.g., swipe gesture originating from location 539-1 or location 541 in FIG. 5II). In some embodiments, the third swipe is either a left-to-right swipe or a right-to-left swipe (e.g., as shown in FIG. 5II).

Figure 16:
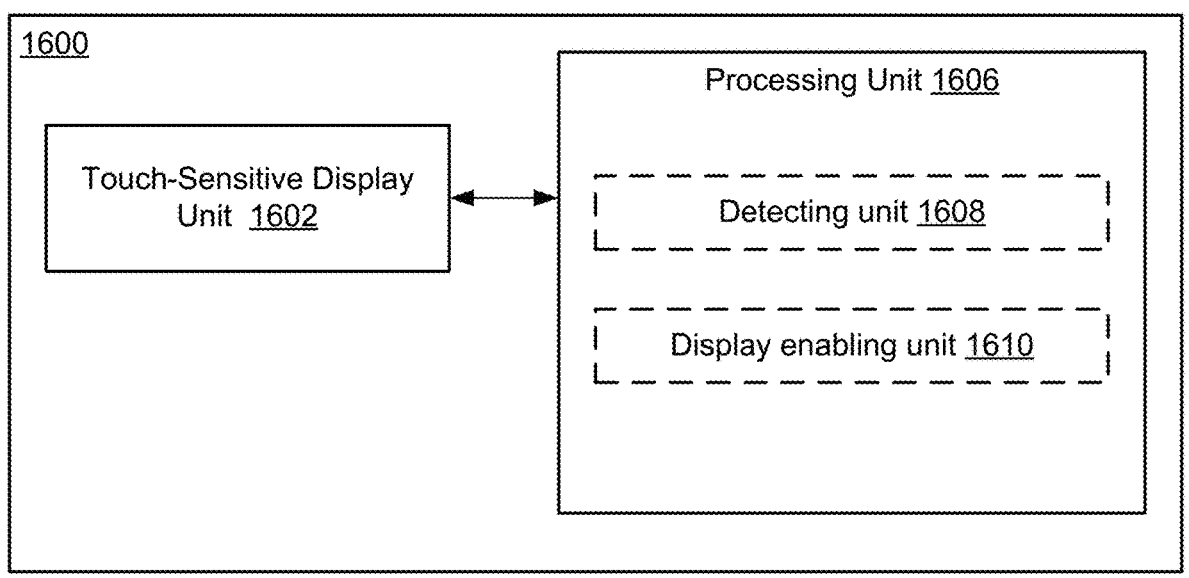
FIG. 16 is a functional block diagram of an electronic device in accordance with some embodiments.

In accordance with some embodiments, FIG. 16 shows a functional block diagram of electronic device 1600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 16 may be combined or separated into sub-blocks to implement the principles of the invention as described above. Therefore, the description herein may support any possible combination or separation or further definition of the functional blocks described herein.

As shown in FIG. 16, electronic device 1600 includes touch-sensitive display unit 1602. Electronic device 1600 also includes processing unit 1606 coupled to touch-sensitive display unit 1602. In some embodiments, processing unit 1606 includes detecting unit 1608, and display enabling unit 1610.

In some embodiments, processing unit 1606 is configured to detect a gesture on a touch-sensitive display of the touch-sensitive display unit (e.g., with detecting unit 1608); and in response to detecting the gesture on the touch-sensitive display: when the gesture is a first swipe gesture in a first direction, enable display of a plurality of open application icons that corresponds to at least some of a plurality of concurrently open applications (e.g., with display enabling unit 1610); and when the gesture is a second swipe gesture in a second direction distinct from the first direction, enable display of one or more settings icons (e.g., with display enabling unit 1610). In some embodiments, the first swipe gesture corresponds to a horizontal direction, and the second swipe gesture corresponds to an upward direction.

In some embodiments, processing unit 1606 is configured to detect a gesture on a touch-sensitive display of the touch-sensitive display unit (e.g., with detecting unit 1608); and in response to detecting the gesture on the touch-sensitive display: when the gesture is a first swipe gesture in a first direction, enable display of at least a list of recent electronic notifications (e.g., with display enabling unit 1610); and when the gesture is a second swipe gesture in a second direction distinct from the first direction, enable display of one or more settings icons (e.g., with display enabling unit 1610). In some embodiments, the first swipe gesture corresponds to a downward direction, and the second swipe gesture corresponds to an upward direction.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6C, 7, 8A-8C, 9, 10, 11A-11B, 12A-12B, and 14-15 may be implemented by components depicted in FIGS. 1A-1C. For example, detection operation 604, application view selection mode entering operation 608, and exiting operation 622 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event.

Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising: at a multifunction device with a touch-sensitive display:
    detecting a gesture on the touch-sensitive display while displaying a home screen user interface; and
    in response to detecting the gesture on the touch-sensitive display:
        displaying a plurality of application images that corresponds to at least some of a plurality of recently used applications in accordance with a determination that the gesture is a first swipe gesture in a first direction; and
        displaying a settings user interface that includes one or more media player controls for adjusting media playback at the multifunction device in accordance with a determination that the gesture is a second swipe gesture in a second direction distinct from the first direction.

2. The method of claim 1, including:
    in response to detecting the gesture on the touch-sensitive display:
        displaying at least a list of recent electronic notifications when the gesture is a third swipe gesture in a third direction distinct from the first direction and the second direction.

3. The method of claim 2, wherein:
    the first direction is a horizontal direction;
    the second direction is an upward direction; and
    the third direction is a downward direction.

4. The method of claim 2, including:
    in response to detecting the gesture on the touch-sensitive display:
        displaying an information user interface that includes the list of recent electronic notifications when the gesture is the third swipe gesture in the third direction.

5. The method of claim 1, wherein the first swipe gesture starts from a first edge of the touch-sensitive display.

6. The method of claim 5, wherein the second swipe gesture starts from a second edge of the touch-sensitive display that is distinct from the first edge.

7. The method of claim 1, including:
    in response to detecting the gesture on the touch-sensitive display:
        displaying one or more settings icons in a settings panel when the gesture is the second swipe gesture in the second direction.

8. The method of claim 7, wherein displaying the one or more settings icons includes displaying at least one of: an airplane mode icon, a Wi-Fi icon, a Bluetooth icon, and a rotation lock icon.

9. The method of claim 8, wherein displaying the one or more settings icons further includes displaying a do-not-disturb icon.

10. The method of claim 7, including:
    in response to detecting the gesture on the touch-sensitive display:
        displaying one or more audio control icons in the settings panel when the gesture is the second swipe gesture in the second direction.

11. The method of claim 7, including:
    in response to detecting the gesture on the touch-sensitive display:
        displaying a brightness adjustment control in the settings panel when the gesture is the second swipe gesture in the second direction.

12. The method of claim 7, including:
    in response to detecting the gesture on the touch-sensitive display:
        displaying one or more user specified application icons in the settings panel when the gesture is the second swipe gesture in the second direction.

13. The method of claim 7, including:
    in response to detecting the gesture on the touch-sensitive display:
        concurrently displaying in the settings panel when the gesture is the second swipe gesture in the second direction:
            the one or more settings icons;
            a brightness adjustment control;
            one or more audio control icons; and
            one or more user specified application icons.

14. The method of claim 13, wherein:
    the one or more settings icons are displayed in a first portion of the settings panel,
    the brightness adjustment control is displayed in a second portion of the settings panel, the second portion being below the first portion,
    the one or more audio control icons are displayed in a third portion of the settings panel, the third portion being below the second portion, and the one or more user specified application icons are displayed in a fourth portion of the settings panel, the fourth portion being below the third portion.

15. The method of claim 1, wherein the application images are reduced size images of the applications previously displayed user interface.

16. The method of claim 1, wherein displaying the plurality of application images includes displaying corresponding application icons.

17. The method of claim 16, wherein the corresponding application icons overlap with the application images.

18. The method of claim 1, including:
in response to detecting the gesture on the touch-sensitive display, replacing display of the first page of the home screen user interface with a system user interface that is different from the first page of the home screen user interface in accordance with a determination that the gesture is a swipe gesture in a third direction from a non-edge region of the touch-sensitive display to another non-edge region of the display.

19. The method of claim 18, wherein the first direction and third direction are along substantially parallel axes.

20. The method of claim 1, wherein a first application image of the plurality of application images is a current view of a first application, and a second application image of the plurality of application images is a current view of a second application.

21. The method of claim 1, wherein a first application image of the plurality of application images is a current view of a first application, and a second application image of the plurality of application images includes a corresponding application icon.

22. The method of claim 1, wherein a first application image of the plurality of application images is a current view of a first application and a first corresponding first application icon, and a second application image of the plurality of application images is a current view of a second application and a corresponding second application icon.

23. A multifunction device, comprising:
a touch-sensitive display;
one or more processors;
memory; and
one or more programs, wherein the one or more programs are stored in the memory and configured to be executed by the one or more processors, the one or more programs including instructions for:
while displaying a home screen user interface, detecting a gesture on the touch-sensitive display; and
in response to detecting the gesture on the touch-sensitive display:
in accordance with a determination that the gesture is a first swipe gesture in a first direction, displaying a plurality of application images that corresponds to at least some of a plurality of recently used applications; and
in accordance with a determination that the gesture is a second swipe gesture in a second direction distinct from the first direction, displaying a settings user interface that includes one or more media player controls for adjusting media playback at the multifunction device.

24. The multifunction device of claim 23, wherein the one or more programs including instructions for:
in response to detecting the gesture on the touch-sensitive display:
displaying at least a list of recent electronic notifications when the gesture is a third swipe gesture in a third direction distinct from the first direction and the second direction.

25. The multifunction device of claim 24, wherein:
the first direction is a horizontal direction;
the second direction is an upward direction; and
the third direction is a downward direction.

26. The multifunction device of claim 24, wherein the one or more programs include instructions for:
in response to detecting the gesture on the touch-sensitive display:
displaying an information user interface that includes the list of recent electronic notifications when the gesture is the third swipe gesture in the third direction.

27. The multifunction device of claim 23, wherein the first swipe gesture starts from a first edge of the touch-sensitive display.

28. The multifunction device of claim 27, wherein the second swipe gesture starts from a second edge of the touch-sensitive display that is distinct from the first edge.

29. The multifunction device of claim 23, wherein the one or more programs include instructions for:
in response to detecting the gesture on the touch-sensitive display:
displaying one or more settings icons in a settings panel when the gesture is the second swipe gesture in the second direction.

30. The multifunction device of claim 29, wherein displaying the one or more settings icons includes displaying at least one of: an airplane mode icon, a Wi-Fi icon, a Bluetooth icon, and a rotation lock icon.

31. The multifunction device of claim 30, wherein displaying the one or more settings icons further includes displaying a do-not-disturb icon.

32. The multifunction device of claim 29, wherein the one or more programs include instructions for:
in response to detecting the gesture on the touch-sensitive display:
displaying one or more audio control icons in the settings panel when the gesture is the second swipe gesture in the second direction.

33. The multifunction device of claim 29, wherein the one or more programs include instructions for:
in response to detecting the gesture on the touch-sensitive display:
displaying a brightness adjustment control in the settings panel when the gesture is the second swipe gesture in the second direction.

34. The multifunction device of claim 29, wherein the one or more programs include instructions for:
in response to detecting the gesture on the touch-sensitive display:
displaying one or more user specified application icons in the settings panel when the gesture is the second swipe gesture in the second direction.

35. The multifunction device of claim 29, wherein the one or more programs include instructions for:
in response to detecting the gesture on the touch-sensitive display:
concurrently displaying in the settings panel when the gesture is the second swipe gesture in the second direction:
the one or more settings icons;
a brightness adjustment control;
one or more audio control icons; and
one or more user specified application icons.

36. The multifunction device of claim 35, wherein the one or more programs include instructions for:
- the one or more settings icons are displayed in a first portion of the settings panel,
- the brightness adjustment control is displayed in a second portion of the settings panel, the second portion being below the first portion,
- the one or more audio control icons are displayed in a third portion of the settings panel, the third portion being below the second portion, and
- the one or more user specified application icons are displayed in a fourth portion of the settings panel, the fourth portion being below the third portion.

37. The multifunction device of claim 23, wherein the application images are reduced size images of the applications previously displayed user interface.

38. The multifunction device of claim 23, wherein displaying the plurality of application images includes displaying corresponding application icons.

39. The multifunction device of claim 38, wherein the corresponding application icons overlap with the application images.

40. The multifunction device of claim 23, wherein the one or more programs include instructions for:
- in response to detecting the gesture on the touch-sensitive display, replacing display of the first page of the home screen user interface with a system user interface that is different from the first page of the home screen user interface in accordance with a determination that the gesture is a swipe gesture in a third direction from a non-edge region of the touch-sensitive display to another non-edge region of the display.

41. The multifunction device of claim 40, wherein the first direction and third direction are along substantially parallel axes.

42. The multifunction device of claim 23, wherein a first application image of the plurality of application images is a current view of a first application, and a second application image of the plurality of application images is a current view of a second application.

43. The multifunction device of claim 23, wherein a first application image of the plurality of application images is a current view of a first application, and a second application image of the plurality of application images includes a corresponding application icon.

44. The multifunction device of claim 23, wherein a first application image of the plurality of application images is a current view of a first application and a first corresponding first application icon, and a second application image of the plurality of application images is a current view of a second application and a corresponding second application icon.

45. A non-transitory computer readable storage medium storing one or more programs comprising instructions, which when executed by a multifunction device with a touch-sensitive display, cause the device to:
- while displaying a home screen user interface, detect a gesture on the touch-sensitive display; and
- in response to detecting the gesture on the touch-sensitive display:
  - in accordance with a determination that the gesture is a first swipe gesture in a first direction, display a plurality of application images that corresponds to at least some of a plurality of recently used applications; and
  - in accordance with a determination that the gesture is a second swipe gesture in a second direction distinct from the first direction, display a settings user interface that includes one or more media player controls for adjusting media playback at the multifunction device.

46. The non-transitory computer readable storage medium of claim 45, wherein the instructions, which when executed by a multifunction device, cause the device to:
- in response to detecting the gesture on the touch-sensitive display:
  - displaying at least a list of recent electronic notifications when the gesture is a third swipe gesture in a third direction distinct from the first direction and the second direction.

47. The non-transitory computer readable storage medium of claim 46, wherein:
- the first direction is a horizontal direction;
- the second direction is an upward direction; and
- the third direction is a downward direction.

48. The non-transitory computer readable storage medium of claim 46, wherein the instructions, which when executed by a multifunction device, cause the device to:
- in response to detecting the gesture on the touch-sensitive display:
  - displaying an information user interface that includes the list of recent electronic notifications when the gesture is the third swipe gesture in the third direction.

49. The non-transitory computer readable storage medium of claim 45, wherein the first swipe gesture starts from a first edge of the touch-sensitive display.

50. The non-transitory computer readable storage medium of claim 49, wherein the second swipe gesture starts from a second edge of the touch-sensitive display that is distinct from the first edge.

51. The non-transitory computer readable storage medium of claim 45, wherein the instructions, which when executed by a multifunction device, cause the device to:
- in response to detecting the gesture on the touch-sensitive display:
  - displaying one or more settings icons in a settings panel when the gesture is the second swipe gesture in the second direction.

52. The non-transitory computer readable storage medium of claim 51, wherein displaying the one or more settings icons includes displaying at least one of: an airplane mode icon, a Wi-Fi icon, a Bluetooth icon, and a rotation lock icon.

53. The non-transitory computer readable storage medium of claim 52, wherein displaying the one or more settings icons further includes displaying a do-not-disturb icon.

54. The non-transitory computer readable storage medium of claim 51 wherein the instructions, which when executed by a multifunction device, cause the device to:
- in response to detecting the gesture on the touch-sensitive display:
  - displaying one or more audio control icons in the settings panel when the gesture is the second swipe gesture in the second direction.

55. The non-transitory computer readable storage medium of claim 51, wherein the instructions, which when executed by a multifunction device, cause the device to:
- in response to detecting the gesture on the touch-sensitive display:
  - displaying a brightness adjustment control in the settings panel when the gesture is the second swipe gesture in the second direction.

56. The non-transitory computer readable storage medium of claim 51, wherein the instructions, which when executed by a multifunction device, cause the device to:

in response to detecting the gesture on the touch-sensitive display:
displaying one or more user specified application icons in the settings panel when the gesture is the second swipe gesture in the second direction.

57. The non-transitory computer readable storage medium of claim 51, wherein the instructions, which when executed by a multifunction device, cause the device to:
in response to detecting the gesture on the touch-sensitive display:
concurrently displaying in the settings panel when the gesture is the second swipe gesture in the second direction:
the one or more settings icons;
a brightness adjustment control;
one or more audio control icons; and
one or more user specified application icons.

58. The non-transitory computer readable storage medium of claim 57, wherein the instructions, which when executed by a multifunction device, cause the device to:
the one or more settings icons are displayed in a first portion of the settings panel,
the brightness adjustment control is displayed in a second portion of the settings panel, the second portion being below the first portion,
the one or more audio control icons are displayed in a third portion of the settings panel, the third portion being below the second portion, and
the one or more user specified application icons are displayed in a fourth portion of the settings panel, the fourth portion being below the third portion.

59. The non-transitory computer readable storage medium of claim 45, wherein the application images are reduced size images of the applications previously displayed user interface.

60. The non-transitory computer readable storage medium of claim 45, wherein displaying the plurality of application images includes displaying corresponding application icons.

61. The non-transitory computer readable storage medium of claim 60, wherein the corresponding application icons overlap with the application images.

62. The non-transitory computer readable storage medium of claim 45, wherein the instructions, which when executed by a multifunction device, cause the device to:
in response to detecting the gesture on the touch-sensitive display, replacing display of the first page of the home screen user interface with a system user interface that is different from the first page of the home screen user interface in accordance with a determination that the gesture is a swipe gesture in a third direction from a non-edge region of the touch-sensitive display to another non-edge region of the display.

63. The non-transitory computer readable storage medium of claim 62, wherein the first direction and third direction are along substantially parallel axes.

64. The non-transitory computer readable storage medium of claim 45, wherein a first application image of the plurality of application images is a current view of a first application, and a second application image of the plurality of application images is a current view of a second application.

65. The non-transitory computer readable storage medium of claim 45, wherein a first application image of the plurality of application images is a current view of a first application, and a second application image of the plurality of application images includes a corresponding application icon.

66. The non-transitory computer readable storage medium of claim 45, wherein a first application image of the plurality of application images is a current view of a first application and a first corresponding first application icon, and a second application image of the plurality of application images is a current view of a second application and a corresponding second application icon.

* * * * *